US007764308B2

(12) United States Patent
Kusaka et al.

(10) Patent No.: US 7,764,308 B2
(45) Date of Patent: Jul. 27, 2010

(54) IMAGE TRANSMISSION SYSTEM, IMAGE RELAY APPARATUS, AND ELECTRONIC IMAGE DEVICE

(75) Inventors: Yosuke Kusaka, Tokyo (JP); Hideo Hibino, Tokyo (JP); Setsu Mitsuhashi, Tokyo (JP); Masami Takemoto, Tokyo (JP); Tadashi Fujimura, Tokyo (JP); Hirotake Nozaki, Tokyo (JP)

(73) Assignee: Nikon Corporation, Tokyo (JP)

(*) Notice: Subject to any disclaimer, the term of this patent is extended or adjusted under 35 U.S.C. 154(b) by 976 days.

(21) Appl. No.: 10/445,050

(22) Filed: May 27, 2003

(65) Prior Publication Data

US 2004/0109063 A1 Jun. 10, 2004

(30) Foreign Application Priority Data

| | | | |
|---|---|---|---|
| May 27, 2002 | (JP) | ............................ | 2002-151749 |
| May 28, 2002 | (JP) | ............................ | 2002-154284 |
| May 28, 2002 | (JP) | ............................ | 2002-154285 |
| Jul. 9, 2002 | (JP) | ............................ | 2002-199498 |
| Jul. 9, 2002 | (JP) | ............................ | 2002-199499 |

(51) Int. Cl.
*H04N 5/225* (2006.01)
*H04N 5/232* (2006.01)

(52) U.S. Cl. .................. 348/211.3; 348/207.1; 709/203

(58) Field of Classification Search ............. 348/207.1, 348/208.7, 208.11, 211.99, 211.2, 211.3, 348/211.4, 231.99; 396/421
See application file for complete search history.

(56) References Cited

U.S. PATENT DOCUMENTS

| | | | | |
|---|---|---|---|---|
| 5,806,005 | A * | 9/1998 | Hull et al. | 455/566 |
| 6,349,324 | B1 * | 2/2002 | Tokoro | 709/200 |
| 6,522,352 | B1 * | 2/2003 | Strandwitz et al. | 348/211.2 |
| 6,657,660 | B2 * | 12/2003 | Shiota et al. | 348/231.99 |
| 6,681,120 | B1 * | 1/2004 | Kim | 455/556.1 |
| 6,701,058 | B1 * | 3/2004 | Tsubaki | 386/46 |
| 6,788,332 | B1 * | 9/2004 | Cook | 348/14.02 |
| 6,957,040 | B1 * | 10/2005 | Tanaka | 455/3.06 |
| 6,967,675 | B1 * | 11/2005 | Ito et al. | 348/207.1 |
| 7,062,230 | B1 * | 6/2006 | Ishiguro et al. | 455/91 |
| 7,117,519 | B1 * | 10/2006 | Anderson et al. | 725/105 |
| 7,133,893 | B2 * | 11/2006 | Goldstein | 709/203 |
| 7,194,253 | B2 * | 3/2007 | Ritter et al. | 455/414.1 |
| 7,197,531 | B2 * | 3/2007 | Anderson | 709/203 |
| 7,327,387 | B2 * | 2/2008 | Tanaka et al. | 348/207.99 |
| 7,339,610 | B2 * | 3/2008 | Kusaka | 348/207.1 |

(Continued)

FOREIGN PATENT DOCUMENTS

EP 771095 A2 * 5/1997

(Continued)

*Primary Examiner*—Tuan Ho
*Assistant Examiner*—Wanda M Negron
(74) *Attorney, Agent, or Firm*—Oliff & Berridge, PLC

(57) ABSTRACT

An electronic camera 100 automatically transmits captured image data and user identification information to a gateway server 160 over a wireless portable telephone link 130. The gateway server 160 manages image albums created on a per-user basis on multiple image servers on the Internet 170, automatically selects one of the multiple image servers based on the user identification information received from the electronic camera 100, and stores the image data received from the electronic camera 100 in an image album corresponding to the user identification information on the selected image server.

16 Claims, 142 Drawing Sheets

U.S. PATENT DOCUMENTS

| | | | | |
|---|---|---|---|---|
| 7,394,966 | B1 * | 7/2008 | Wada et al. | 386/46 |
| 7,415,287 | B2 * | 8/2008 | Ueno | 455/557 |
| 7,489,945 | B2 * | 2/2009 | Iida | 455/556.1 |
| 2002/0087601 | A1 * | 7/2002 | Anderson et al. | 707/515 |
| 2002/0158970 | A1 * | 10/2002 | Takeshi | 348/211.3 |
| 2003/0030731 | A1 * | 2/2003 | Colby | 348/231.3 |
| 2003/0157960 | A1 * | 8/2003 | Kennedy | 455/556 |
| 2004/0005915 | A1 * | 1/2004 | Hunter | 455/575.1 |

FOREIGN PATENT DOCUMENTS

| | | |
|---|---|---|
| JP | A-7-162821 | 6/1995 |
| JP | A-10-112855 | 4/1998 |
| JP | A-11-73247 | 3/1999 |
| JP | A-11-275413 | 10/1999 |
| JP | A-11-284986 | 10/1999 |
| JP | A-11-338796 | 12/1999 |
| JP | A-2000-78518 | 3/2000 |
| JP | A-2000-175092 | 6/2000 |
| JP | A-2001-175005 | 6/2000 |
| JP | A-2000-235642 | 8/2000 |
| JP | A-2000-278550 | 10/2000 |
| JP | A-2000-305734 | 11/2000 |
| JP | A-2000-341619 | 12/2000 |
| JP | A-2001-45452 | 2/2001 |
| JP | A-2001-69093 | 3/2001 |
| JP | A-2001-127803 | 5/2001 |
| JP | A-2001-128113 | 5/2001 |
| JP | A-2001-148839 | 5/2001 |
| JP | A-2001-169016 | 6/2001 |
| JP | A-2001-195486 | 7/2001 |
| JP | A-2001-203997 | 7/2001 |
| JP | A-2001-230962 | 8/2001 |
| JP | A-2001-318420 | 11/2001 |
| JP | A-2001-326898 | 11/2001 |
| JP | A-2002-9879 | 1/2002 |
| JP | A-2002-16865 | 1/2002 |
| JP | A-2002-24690 | 1/2002 |
| JP | A-2002-63052 | 2/2002 |
| JP | A-2002-77871 | 3/2002 |
| JP | A-2002-84448 | 3/2002 |
| JP | A-2002-91851 | 3/2002 |
| JP | A-2002-158908 | 5/2002 |
| WO | WO 02/08926 A1 | 1/2002 |

* cited by examiner

IMAGE FILE

| |
|---|
| IMAGE DATA |
| ADDITIONAL INFORMATION DATA |

ADDITIONAL INFORMATION DATA

| ITEM | CONTENT |
|---|---|
| IMAGE IDENTIFICATION INFORMATION | I M G 0 0 1 2 3 4 |
| CAMERA IDENTIFICATION INFORMATION | C I D 0 0 8 8 7 8 |
| USER IDENTIFICATION INFORMATION | U I D 5 3 0 7 2 8 |
| SHOOTING DATE AND TIME DATA | OCTOBER 31, 2001 10:58:47 |
| SHOOTING POSITION DATA | 137°50'E 38°21'N |
| SHOOTING LENS | 50-100mm/f4 |
| SHOOTING FOCAL LENGTH | 80mm |
| SHOOTING STOP VALUE | f4 |
| SHUTTER SPEED | 1/250 |
| EXPOSURE | +0.5 LEVEL |
| FOCUS | +50 MICRON |
| STROBE | YES |
| STROBE LIGHT AMOUNT | -1 LEVEL |
| ... | ... |

| |
|---|
| CAMERA IDENTIFICATION INFORMATION |
| GATEWAY SERVER ACCESS INFORMATION |
| ... |

Fig. 7

MEMORY CARD

| |
|---|
| IMAGE FILE A |
| IMAGE FILE B |
| IMAGE FILE C |
| ... |

IMAGE FILE

| |
|---|
| IMAGE DATA |
| ADDITIONAL INFORMATION DATA |

ADDITIONAL INFORMATION DATA

| ITEM | CONTENT |
|---|---|
| SHOOTING DATE AND TIME | OCTOBER 31, 2001 10:58:47 |
| SHOOTING POSITION | 137°50'E 38°21'N |
| SHOOTING LENS | 50-100mm/f4 |
| SHOOTING FOCAL LENGTH | 80mm |
| SHOOTING STOP VALUE | f4 |
| SHUTTER SPEED | 1/250 |
| EXPOSURE | +0.5 LEVEL |
| FOCUS | +50 MICRON |
| STROBE | YES |
| STROBE LIGHT AMOUNT | -1 LEVEL |
| ... | ... |

Fig. 34

EEPROM

| |
|---|
| CAMERA IDENTIFICATION INFORMATION |
| GATEWAY SERVER ACCESS INFORMATION |
| ... |

Fig. 35

CAMERA IDENTIFICATION INFORMATION A : PARENT
CAMERA IDENTIFICATION INFORMATION B → CAMERA IDENTIFICATION INFORMATION A
CAMERA IDENTIFICATION INFORMATION C → CAMERA IDENTIFICATION INFORMATION A
CAMERA IDENTIFICATION INFORMATION D : PARENT
CAMERA IDENTIFICATION INFORMATION E → CAMERA IDENTIFICATION INFORMATION D
CAMERA IDENTIFICATION INFORMATION F : NO LINK
CAMERA IDENTIFICATION INFORMATION H : NOT YET USED
...

Fig. 40

PERSONAL INFORMATION DATA

| |
|---|
| NAME |
| GENDER |
| AGE |
| ADDRESS |
| E-MAIL ADDRESS |
| OCCUPATION |
| PASSWORD |
| PHONE NUMBER |
| ... |

Fig. 41

MEMORY CARD

| |
|---|
| IMAGE FILE A |
| IMAGE FILE B |
| IMAGE FILE C |
| ... |

IMAGE FILE

| |
|---|
| IMAGE DATA |
| ADDITIONAL INFORMATION DATA |

ADDITIONAL INFORMATION DATA

| ITEM | CONTENT |
|---|---|
| SHOOTING DATE AND TIME | OCTOBER 31, 2001 10:58:47 |
| SHOOTING POSITION | 137°50'E 38°21'N |
| SHOOTING LENS | 50-100mm/f4 |
| SHOOTING FOCAL LENGTH | 80mm |
| SHOOTING STOP VALUE | f4 |
| SHUTTER SPEED | 1/250 |
| EXPOSURE | +0.5 LEVEL |
| FOCUS | +50 MICRON |
| STROBE | YES |
| STROBE LIGHT AMOUNT | -1 LEVEL |
| ... | ... |

Fig. 78

EEPROM

| |
|---|
| CAMERA IDENTIFICATION INFORMATION |
| GATEWAY SERVER ACCESS INFORMATION |
| ... |

Fig. 79

CAMERA IDENTIFICATION INFORMATION A : PARENT
CAMERA IDENTIFICATION INFORMATION B → CAMERA IDENTIFICATION INFORMATION A
CAMERA IDENTIFICATION INFORMATION C → CAMERA IDENTIFICATION INFORMATION A
CAMERA IDENTIFICATION INFORMATION D : PARENT
CAMERA IDENTIFICATION INFORMATION E → CAMERA IDENTIFICATION INFORMATION D
CAMERA IDENTIFICATION INFORMATION F : NO LINK
CAMERA IDENTIFICATION INFORMATION H : NOT YET USED
...

Fig. 84

PERSONAL INFORMATION DATA

| |
|---|
| NAME |
| GENDER |
| AGE |
| ADDRESS |
| E-MAIL ADDRESS |
| OCCUPATION |
| PASSWORD |
| PHONE NUMBER |
| ... |

Fig. 85

MEMORY CARD

| |
|---|
| IMAGE FILE A |
| IMAGE FILE B |
| IMAGE FILE C |
| ... |

IMAGE FILE

| |
|---|
| IMAGE DATA |
| ADDITIONAL INFORMATION DATA |

ADDITIONAL INFORMATION DATA

| ITEM | CONTENT |
|---|---|
| SHOOTING DATE AND TIME | OCTOBER 31, 2001 10:58:47 |
| SHOOTING POSITION | 137°50'E 38°21'N |
| SHOOTING LENS | 50-100mm/f4 |
| SHOOTING FOCAL LENGTH | 80mm |
| SHOOTING STOP VALUE | f4 |
| SHUTTER SPEED | 1/250 |
| EXPOSURE | +0.5 LEVEL |
| FOCUS | +50 MICRON |
| STROBE | YES |
| STROBE LIGHT AMOUNT | -1 LEVEL |
| ... | ... |

Fig. 122

EEPROM

| |
|---|
| CAMERA IDENTIFICATION INFORMATION |
| GATEWAY SERVER ACCESS INFORMATION |
| ... |

Fig. 123

CAMERA IDENTIFICATION INFORMATION A : PARENT
CAMERA IDENTIFICATION INFORMATION B → CAMERA IDENTIFICATION INFORMATION A
CAMERA IDENTIFICATION INFORMATION C → CAMERA IDENTIFICATION INFORMATION A
CAMERA IDENTIFICATION INFORMATION D : PARENT
CAMERA IDENTIFICATION INFORMATION E → CAMERA IDENTIFICATION INFORMATION D
CAMERA IDENTIFICATION INFORMATION F : NO LINK
CAMERA IDENTIFICATION INFORMATION H : NOT YET USED
...

Fig. 128

PERSONAL INFORMATION DATA

| |
|---|
| NAME |
| GENDER |
| AGE |
| ADDRESS |
| E-MAIL ADDRESS |
| OCCUPATION |
| PASSWORD |
| PHONE NUMBER |
| ... |

Fig. 129

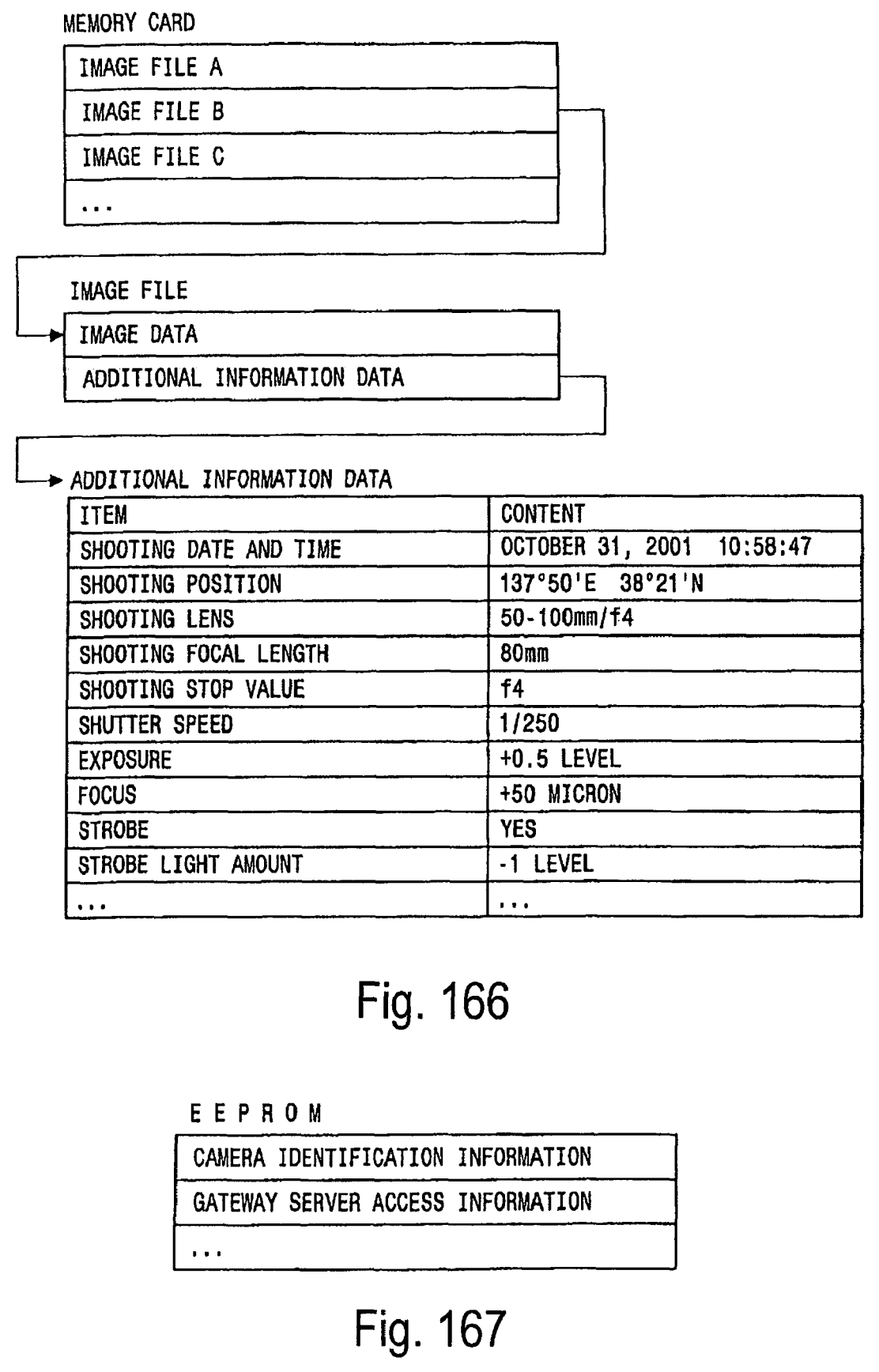

MEMORY CARD

| |
|---|
| IMAGE FILE A |
| IMAGE FILE B |
| IMAGE FILE C |
| ... |

IMAGE FILE

| |
|---|
| IMAGE DATA |
| ADDITIONAL INFORMATION DATA |

ADDITIONAL INFORMATION DATA

| ITEM | CONTENT |
|---|---|
| SHOOTING DATE AND TIME | OCTOBER 31, 2001 10:58:47 |
| SHOOTING POSITION | 137°50'E 38°21'N |
| SHOOTING LENS | 50-100mm/f4 |
| SHOOTING FOCAL LENGTH | 80mm |
| SHOOTING STOP VALUE | f4 |
| SHUTTER SPEED | 1/250 |
| EXPOSURE | +0.5 LEVEL |
| FOCUS | +50 MICRON |
| STROBE | YES |
| STROBE LIGHT AMOUNT | -1 LEVEL |
| ... | ... |

Fig. 166

EEPROM

| |
|---|
| CAMERA IDENTIFICATION INFORMATION |
| GATEWAY SERVER ACCESS INFORMATION |
| ... |

Fig. 167

CAMERA IDENTIFICATION INFORMATION A : PARENT
CAMERA IDENTIFICATION INFORMATION B → CAMERA IDENTIFICATION INFORMATION A
CAMERA IDENTIFICATION INFORMATION C → CAMERA IDENTIFICATION INFORMATION A
CAMERA IDENTIFICATION INFORMATION D : PARENT
CAMERA IDENTIFICATION INFORMATION E → CAMERA IDENTIFICATION INFORMATION D
CAMERA IDENTIFICATION INFORMATION F : NO LINK
CAMERA IDENTIFICATION INFORMATION H : NOT YET USED
...

Fig. 172

PERSONAL INFORMATION DATA

| |
|---|
| NAME |
| GENDER |
| AGE |
| ADDRESS |
| E-MAIL ADDRESS |
| OCCUPATION |
| PASSWORD |
| PHONE NUMBER |
| ... |

Fig. 173

IMAGE TRANSMISSION SYSTEM, IMAGE RELAY APPARATUS, AND ELECTRONIC IMAGE DEVICE

INCORPORATION BY REFERENCE

The disclosures of the following priority application(s) are herein incorporated by reference:

The present application is based on Japanese Patent Applications 2002-151749, 2002-154284, 2002-154285, 2002-199498 and 2002-199499, which are incorporated herein by reference in their entireties.

BACKGROUND OF THE INVENTION

1. Field of Invention

The present invention relates to an image transmission system that transmits image data through telecommunication means; in particular, it relates to an image transmission system wherein image data captured with an electronic image device such as an electronic camera is transmitted via an image relay apparatus such as a gateway server to an image storage device such as an image server on the Internet and stored there, and image data stored in an image storage device such as an image server on the Internet is downloaded to and browsed in an electronic image device such as an electronic camera via an image relay apparatus such as a gateway server; the invention furthermore relates to the image relay apparatus and electronic image device used in the image transmission system.

2. Description of Related Art

There has been active development of image transmission systems wherein all the image data captured with an electronic camera is transmitted via telecommunication lines to an externally located high capacity storage device (image server) and stored there, and the image data stored in the image server is used (browsed, printed, distributed, etc.) by making use of the various image services offered by the image server.

For example, image data transmission systems are known, wherein image data captured with an electronic camera is transmitted to and stored on a personal computer or image server on the Internet or the like using a digital data transmission function built into the electronic camera or a digital data transmission function of a portable telephone connected to the digital camera; image data stored on a personal computer or image server on the Internet or the like is received by the electronic camera using the digital data transmission function built into the electronic camera or the digital data transmission function of a portable telephone connected to the electronic camera; and received image data is displayed on the liquid crystal display of the electronic camera and viewed.

Such image transmission systems have the following advantages.

- Large capacity built-in memory or removable memory for storing image data becomes unnecessary, so the cost of the electronic camera can be reduced.
- All the image data is stored on a specific image server, so the benefits of post-processing services (printing, etc.) can be expected.
- The user of the electronic camera only has to depress the shutter button to have the image data stored on an image server, so in cases such as where image print orders are placed over the Internet, the effort of having to transmit image data to the image server that performs the printing service from one's electronic camera or memory card can be done away with.

In such an image data transmission system, there are limits to the storage capacity of the storage area (album) allocated to a single user of the image server, and if the data size of the image data that one wishes to newly store exceeds the available capacity of the aforementioned album, it would be necessary to delete some of the image data stored in the album to increase the available capacity of the aforementioned album, or to register with a different image server and open a new album. Or else, whenever storing image data, one would have to designate an album with available capacity from among several albums to store the image data in that album. Such operations are very bothersome and a source of anguish for users with little knowledge of image transmission systems, especially children and the elderly, and such a situation arising while taking pictures would end the enjoyment of taking pictures, and as a result has been a cause that has impeded the general adoption of such image transmission systems. Moreover, even for users with extensive knowledge of image transmission systems, such operations are time consuming, and there have been situation where photo opportunities have been lost as a result.

In this connection, an object of the present invention is to provide an image transmission system that allows image data transmission operations to be carried out in a reliable, efficient and simple manner, as well as providing an image relay apparatus and electronic image device used in the image transmission system.

SUMMARY OF THE INVENTION

To achieve the aforementioned object, in the image transmission system according to the present invention, a gateway is set up between the electronic camera (electronic image device) and the image storage device that stores the image data (image server), which gateway automatically performs the various image server related procedures on behalf of the user. For example, the operation of selecting an image server holding an album with available capacity, the registration procedure for setting up a new album on an image server, the procedure for writing and reading image data to and from an image server, operations for avoiding conflict of image identification information (image file names) of image data when image data captured with multiple electronic cameras is stored on the same image server, and the like, are performed automatically.

BRIEF DESCRIPTION OF THE DRAWINGS

FIG. 6 is a diagram of the data of an image file.

FIG. 7 is a diagram of the data of an EEPROM.

FIG. 34 is a diagram of the data of a memory card.

FIG. 35 is a diagram of the data of an EEPROM.

FIG. 40 is an explanatory drawing of camera identification information link data.

FIG. 41 is an explanatory drawing of personal identification data.

FIG. 78 is a diagram of the data of a memory card.

FIG. 79 is a diagram of the data of an EEPROM.

FIG. 84 is an explanatory drawing of camera identification information link data.

FIG. 85 is an explanatory drawing of personal identification data.

FIG. 120 is an external view (rear view) of an electronic camera.

FIG. 121 is a block diagram showing the electrical configuration of an electronic camera.

FIG. 122 is a diagram of the data of a memory card.

FIG. 123 is a diagram of the data of an EEPROM.

FIG. 124 is an external view of a portable telephone.

FIG. 125 is a block diagram showing the electrical configuration of a portable telephone.

FIG. 126 is block diagram showing the configuration of a gateway server.

FIG. 127 is a diagram of the memory of a gateway server.

FIG. 128 is an explanatory drawing of camera identification information link data.

FIG. 129 is an explanatory drawing of personal identification data.

FIG. 130 is an explanatory drawing of server management data.

FIG. 131 is an explanatory drawing of transfer history data.

Figure 132:
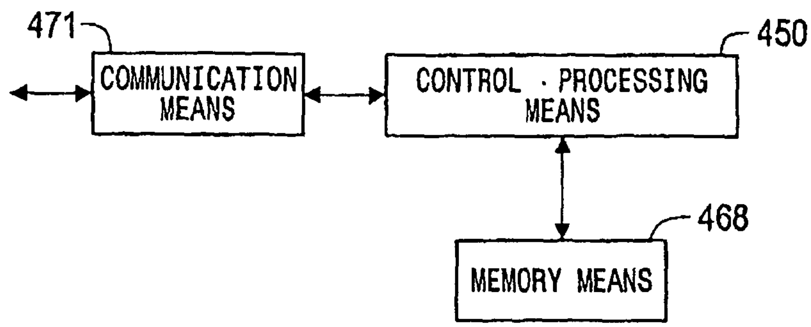

FIG. 132 is a block diagram showing the configuration of an image server.

Figure 133:
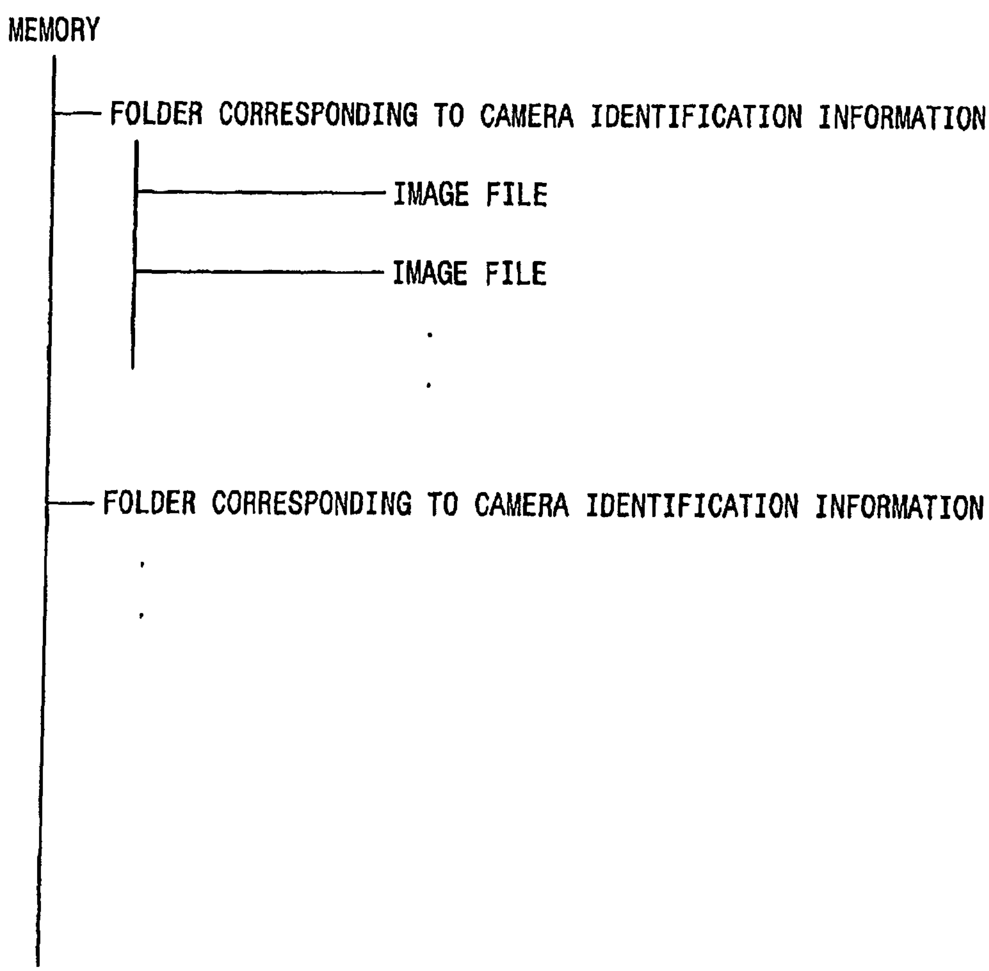

FIG. 133 is a diagram of the memory of an image server.

Figure 134:
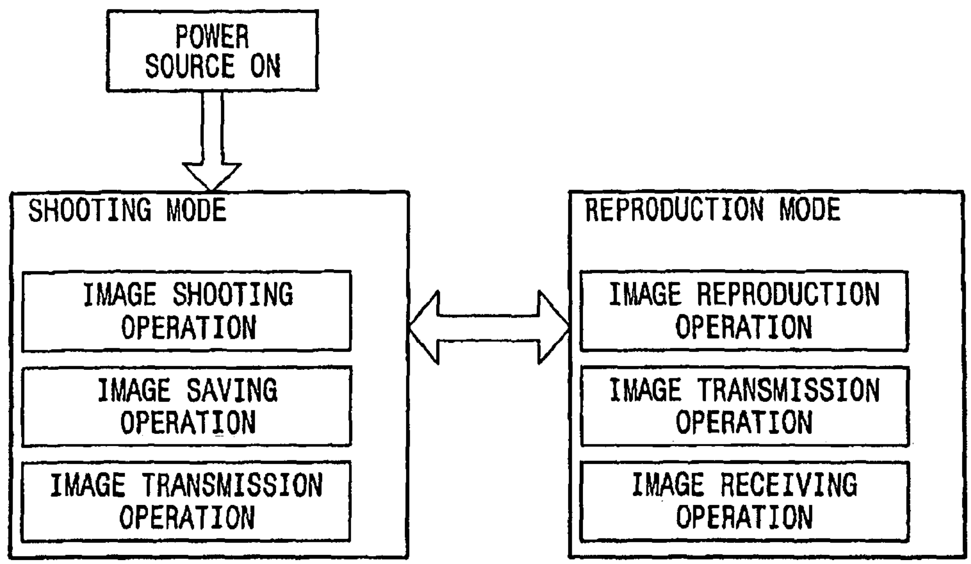

FIG. 134 is a state transition diagram for an electronic camera.

Figure 135:
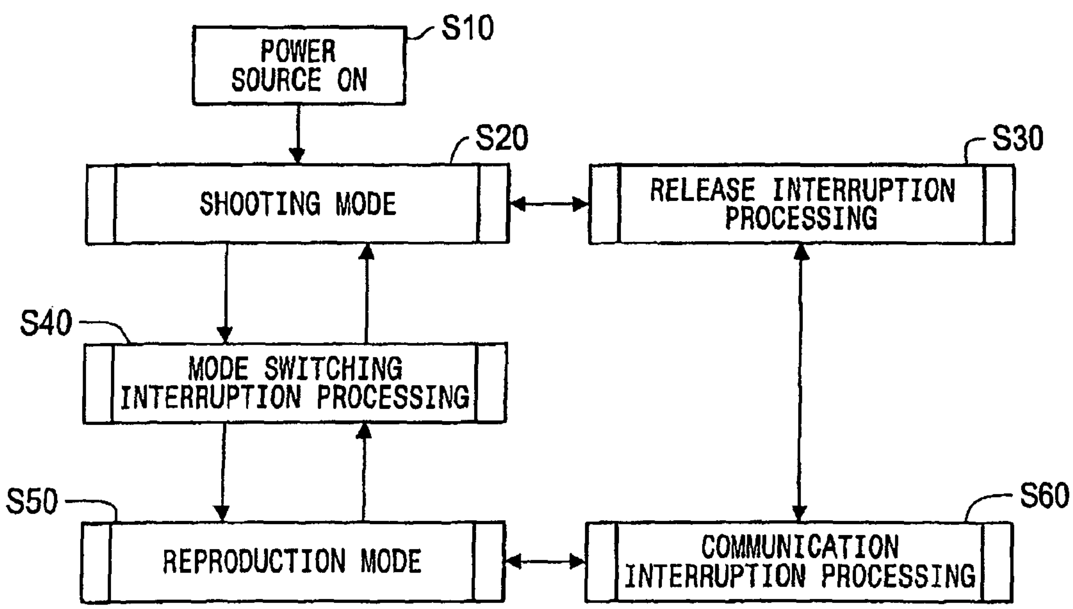

FIG. 135 is a main flow chart of a CPU.

Figure 136:
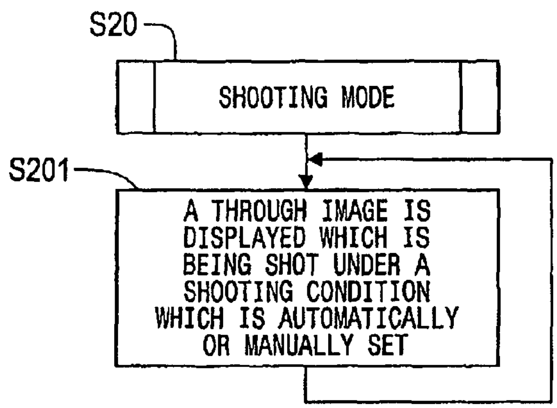

FIG. 136 is subroutine flow chart.

Figure 137:
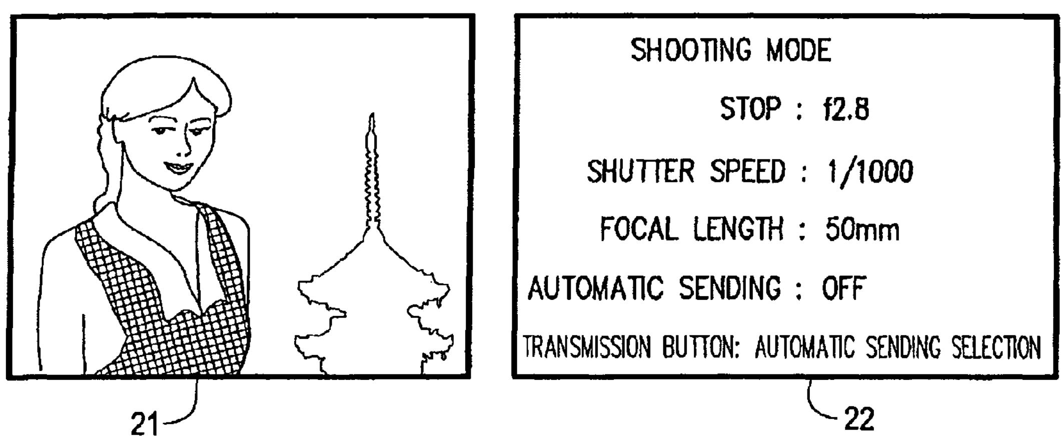

FIG. 137 is a screen display example.

Figure 138:
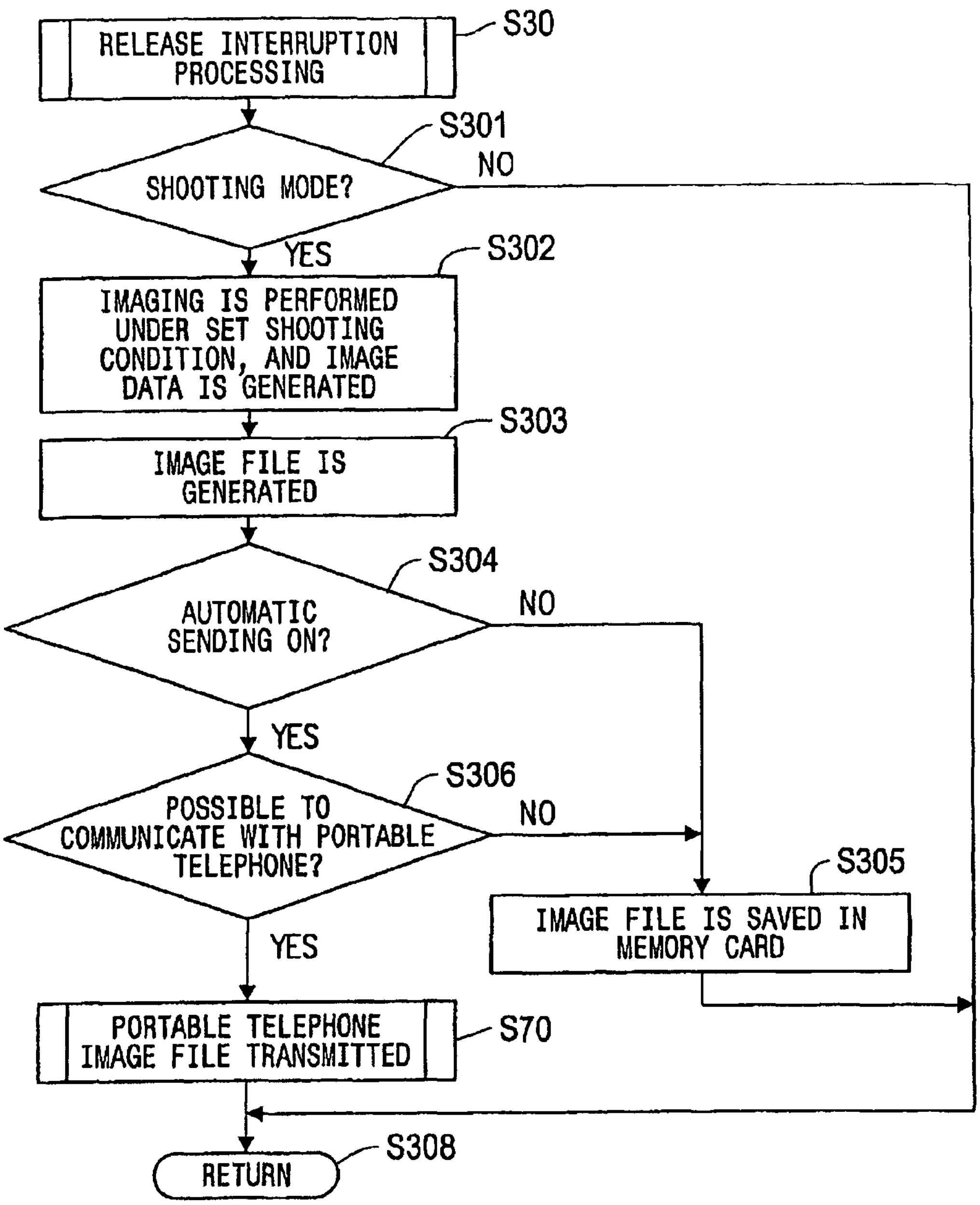

FIG. 138 is subroutine flow chart.

Figure 139:
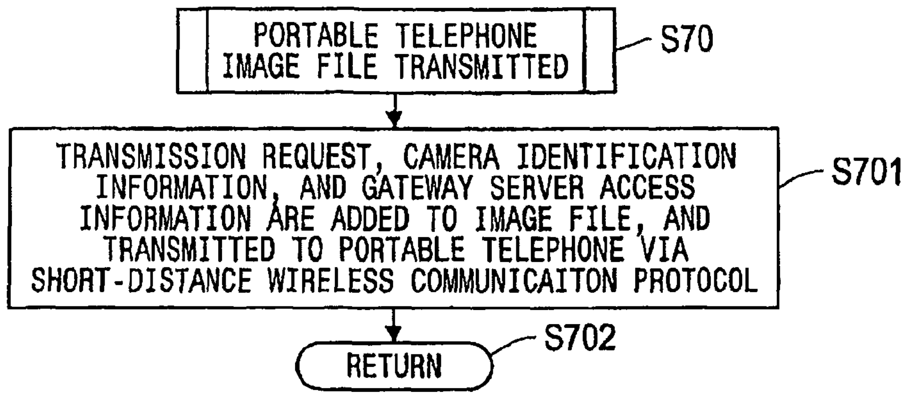

FIG. 139 is subroutine flow chart.

Figure 140:
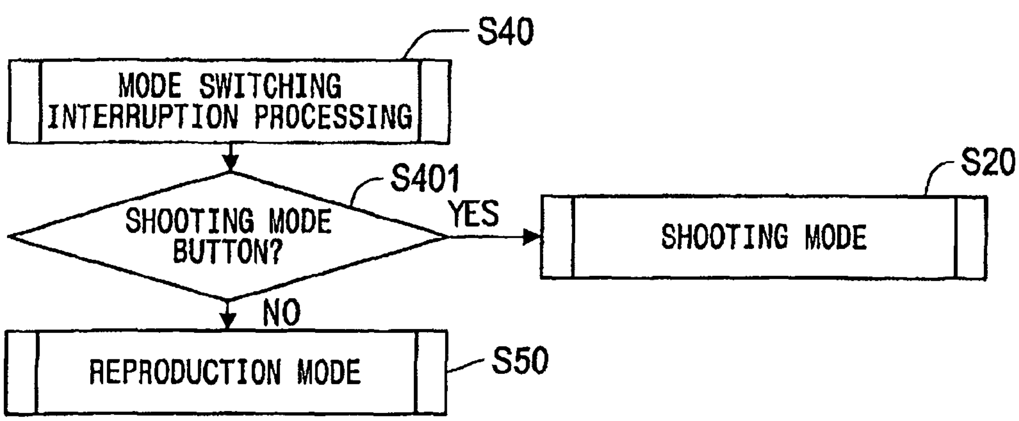

FIG. 140 is subroutine flow chart.

Figure 141:
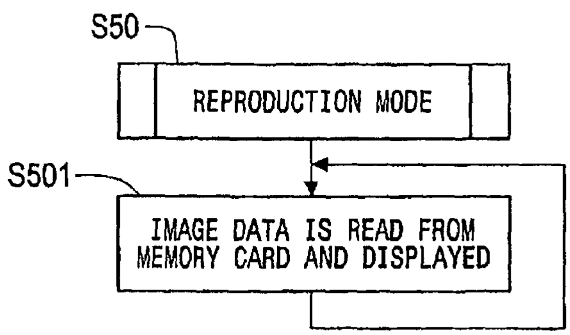

FIG. 141 is subroutine flow chart.

Figure 142:
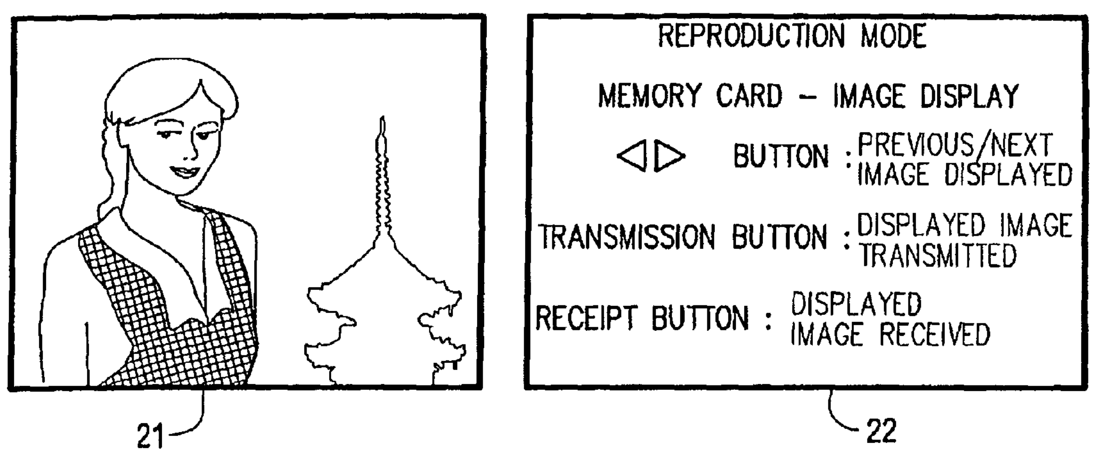

FIG. 142 is a screen display example.

Figure 143:
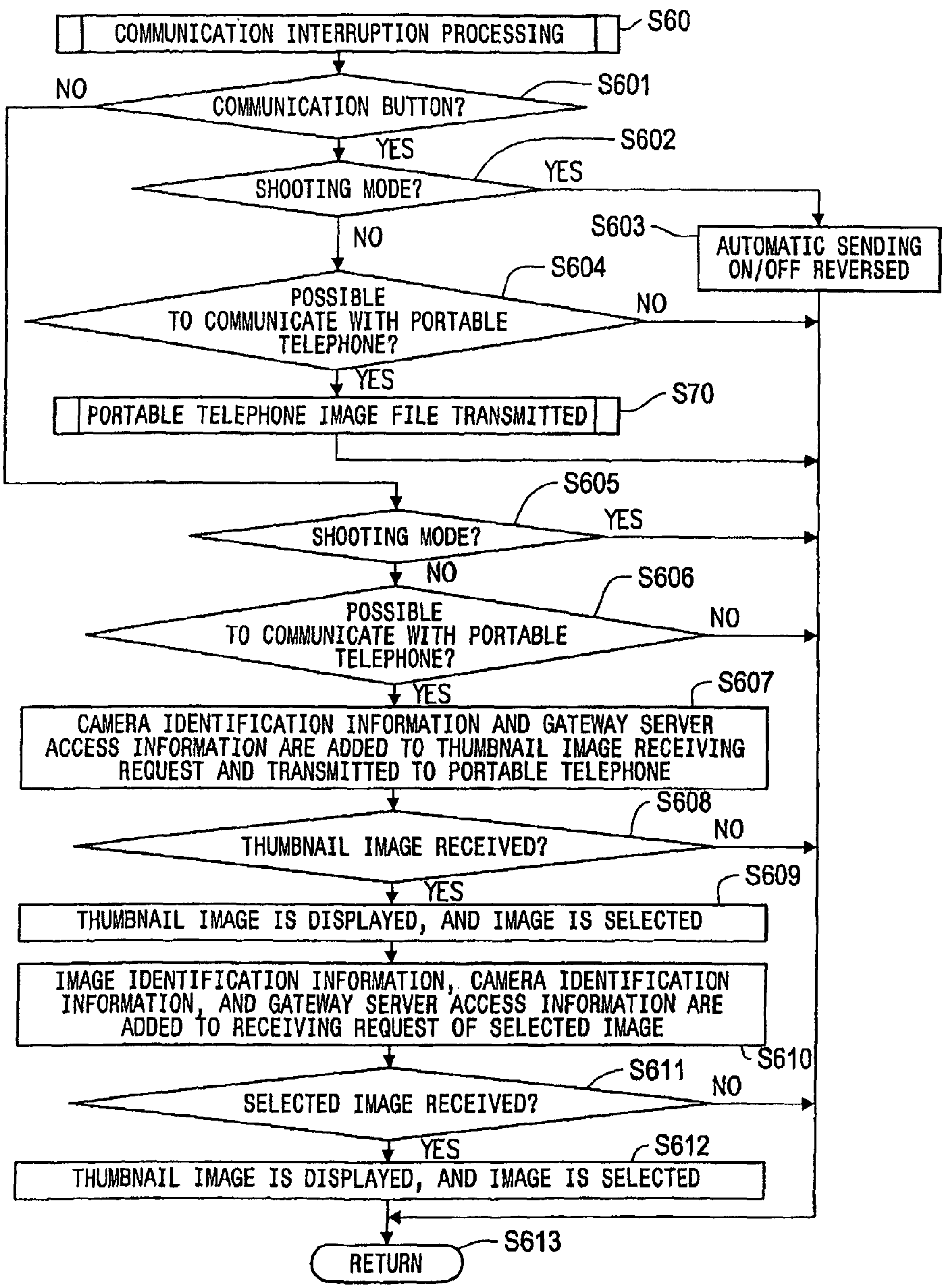

FIG. 143 is subroutine flow chart.

Figure 144:
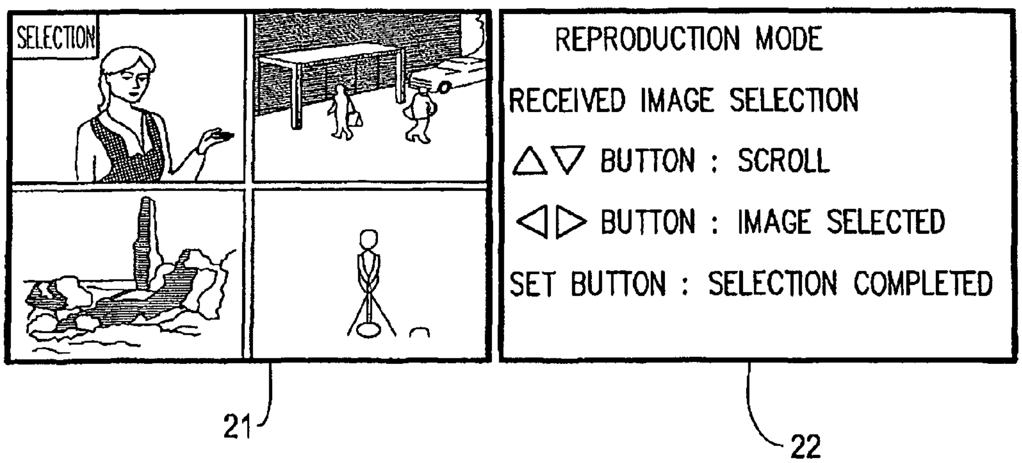

FIG. 144 is a screen display example.

Figure 145:
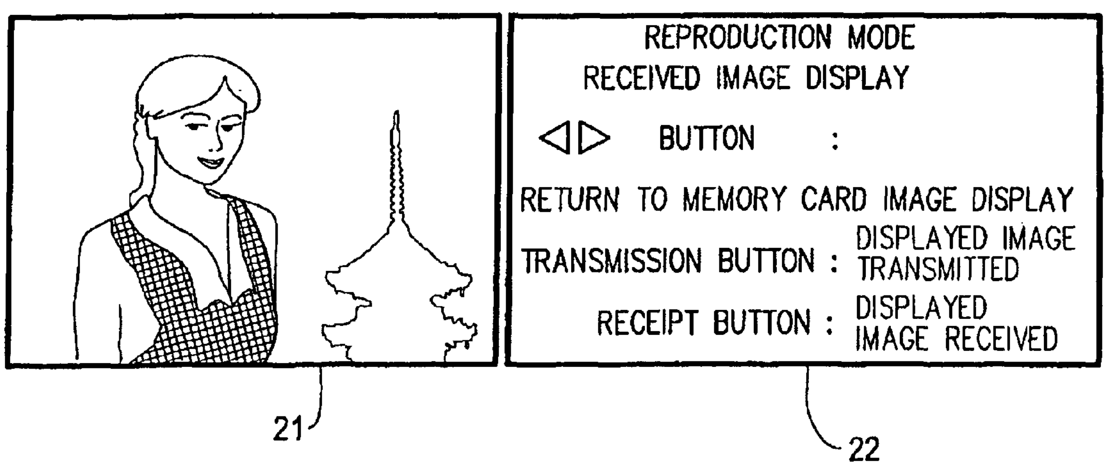

FIG. 145 is a screen display example.

Figure 146:
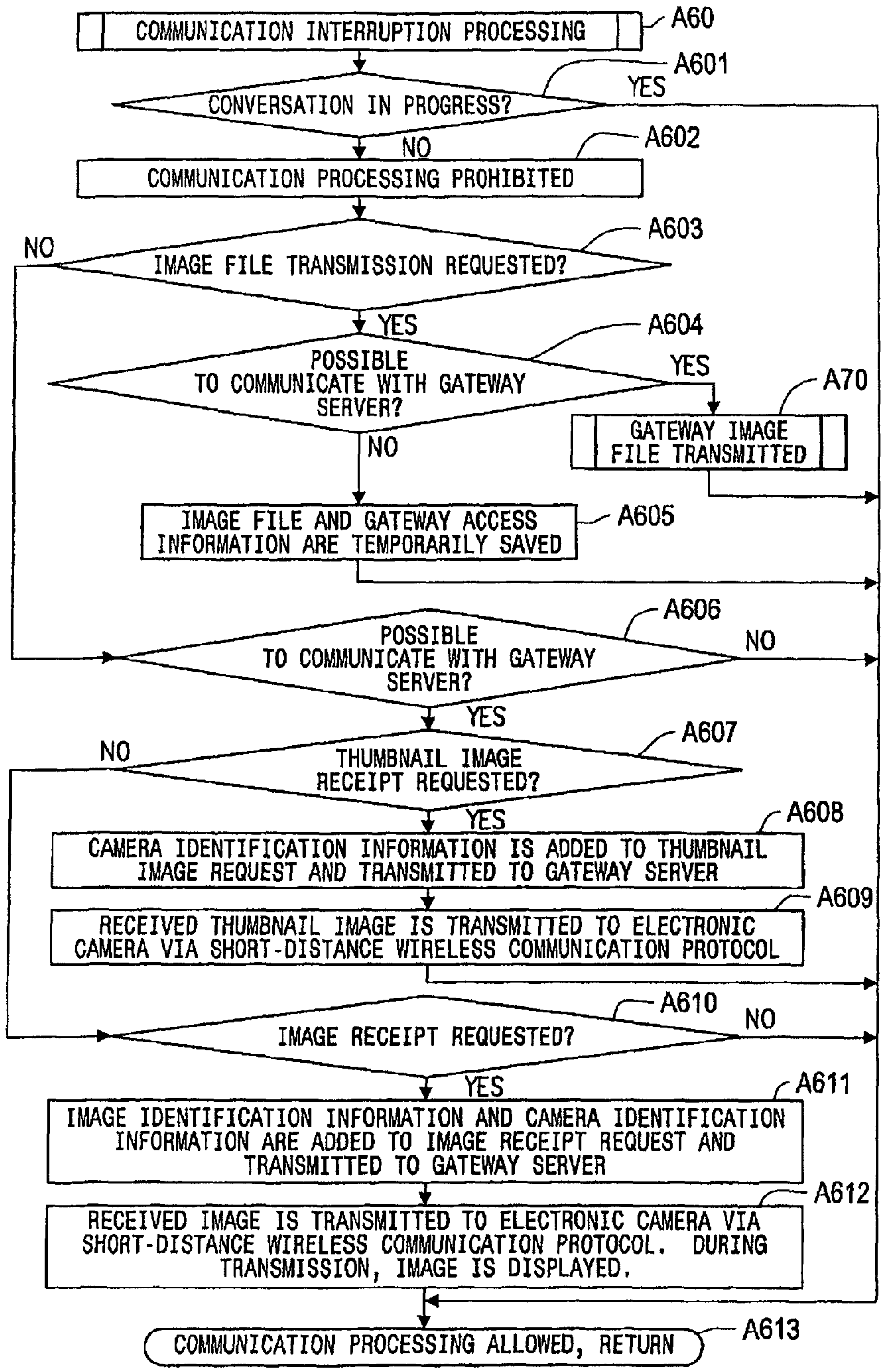

FIG. 146 is subroutine flow chart.

Figure 147:
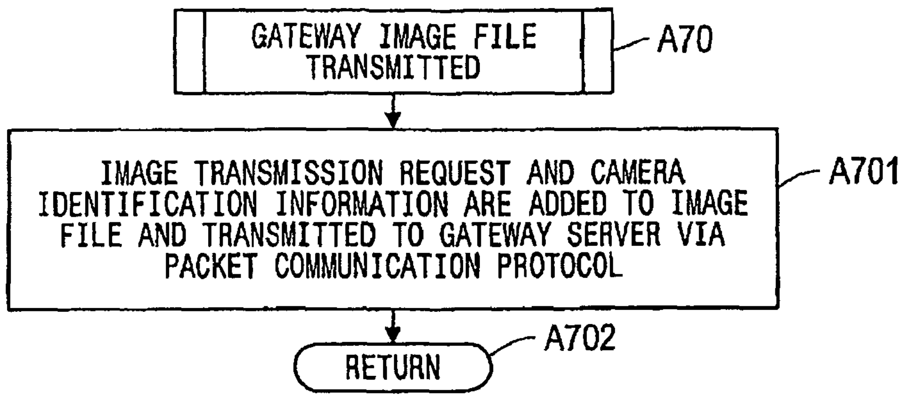

FIG. 147 is subroutine flow chart.

Figure 148:
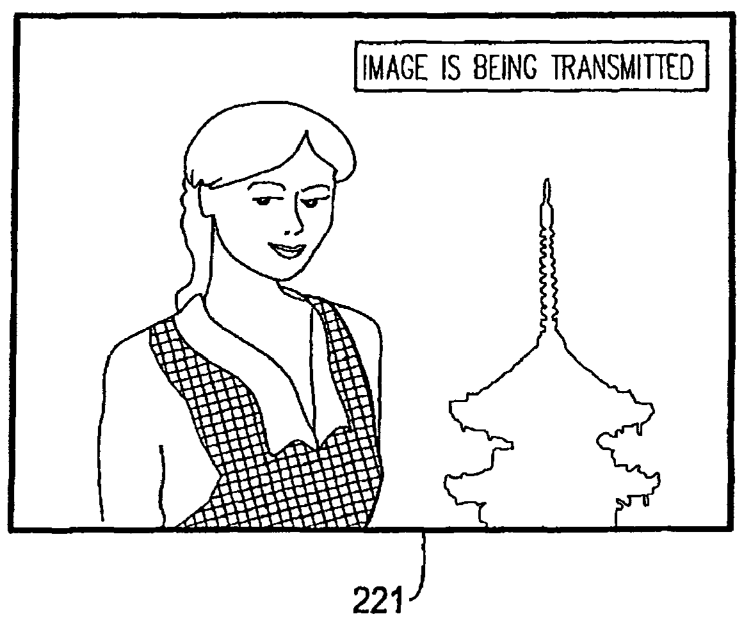

FIG. 148 is a screen display example.

Figure 149:
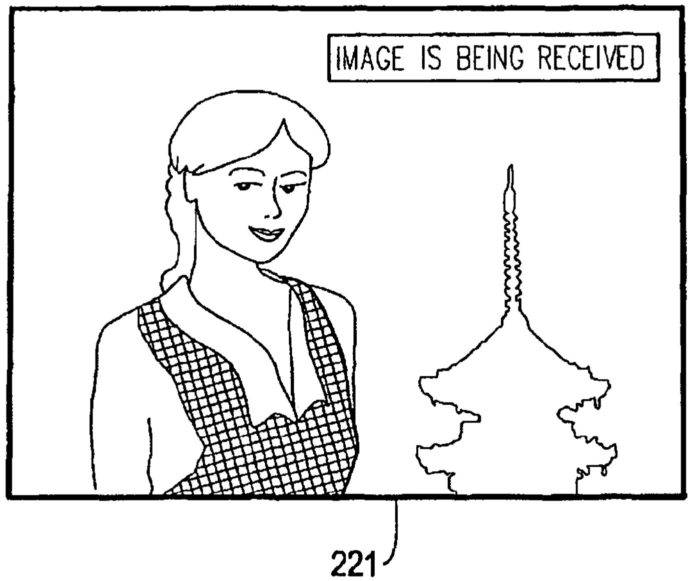

FIG. 149 is a screen display example.

Figure 150:
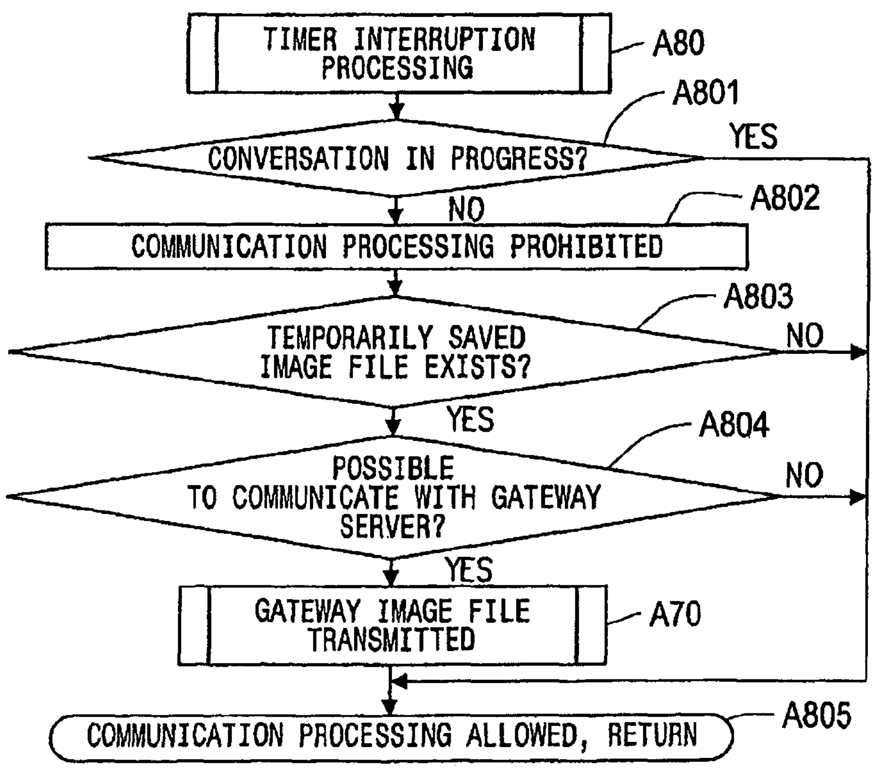

FIG. 150 is subroutine flow chart.

Figure 151:
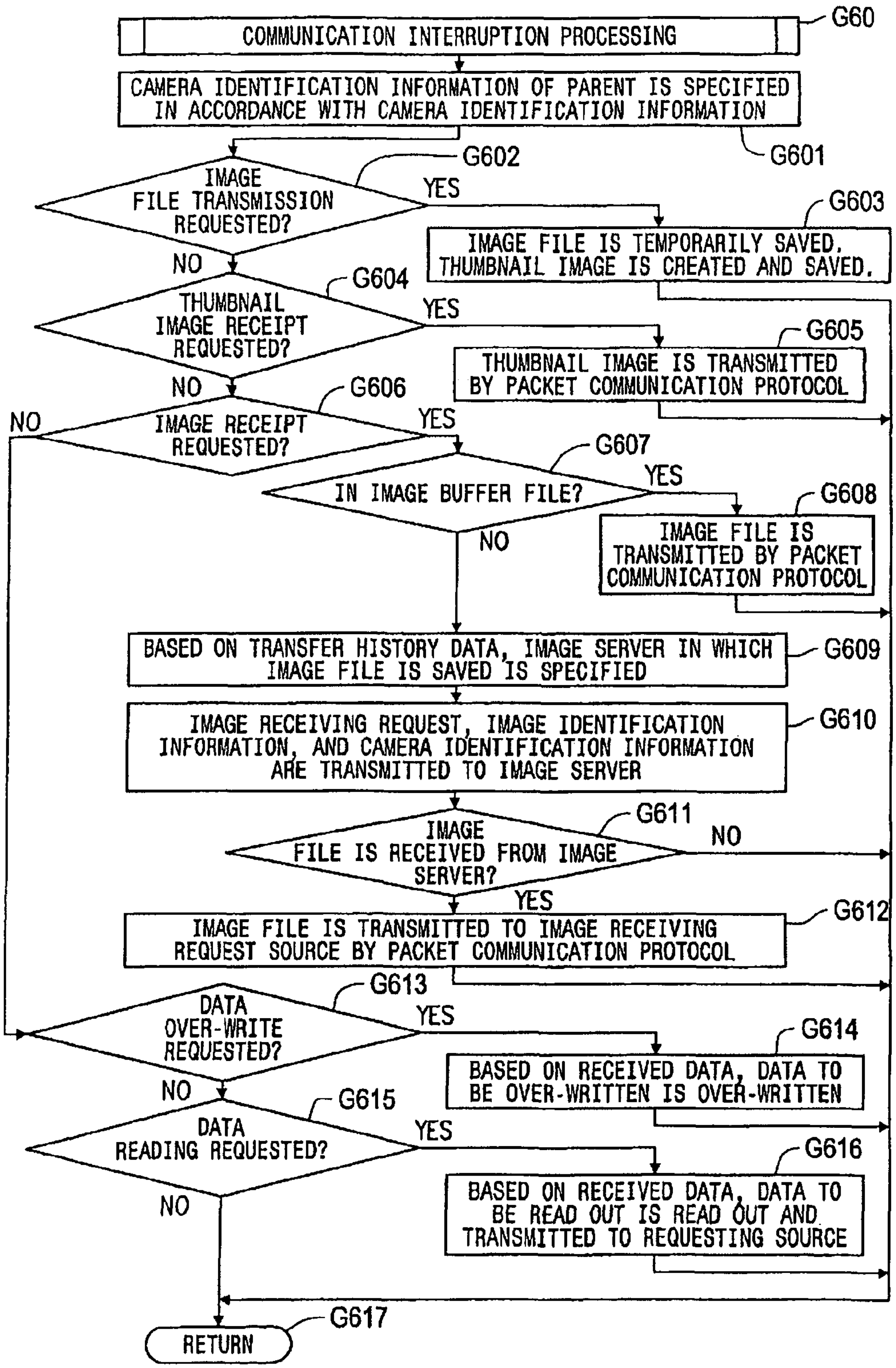

FIG. 151 is subroutine flow chart.

Figure 152:
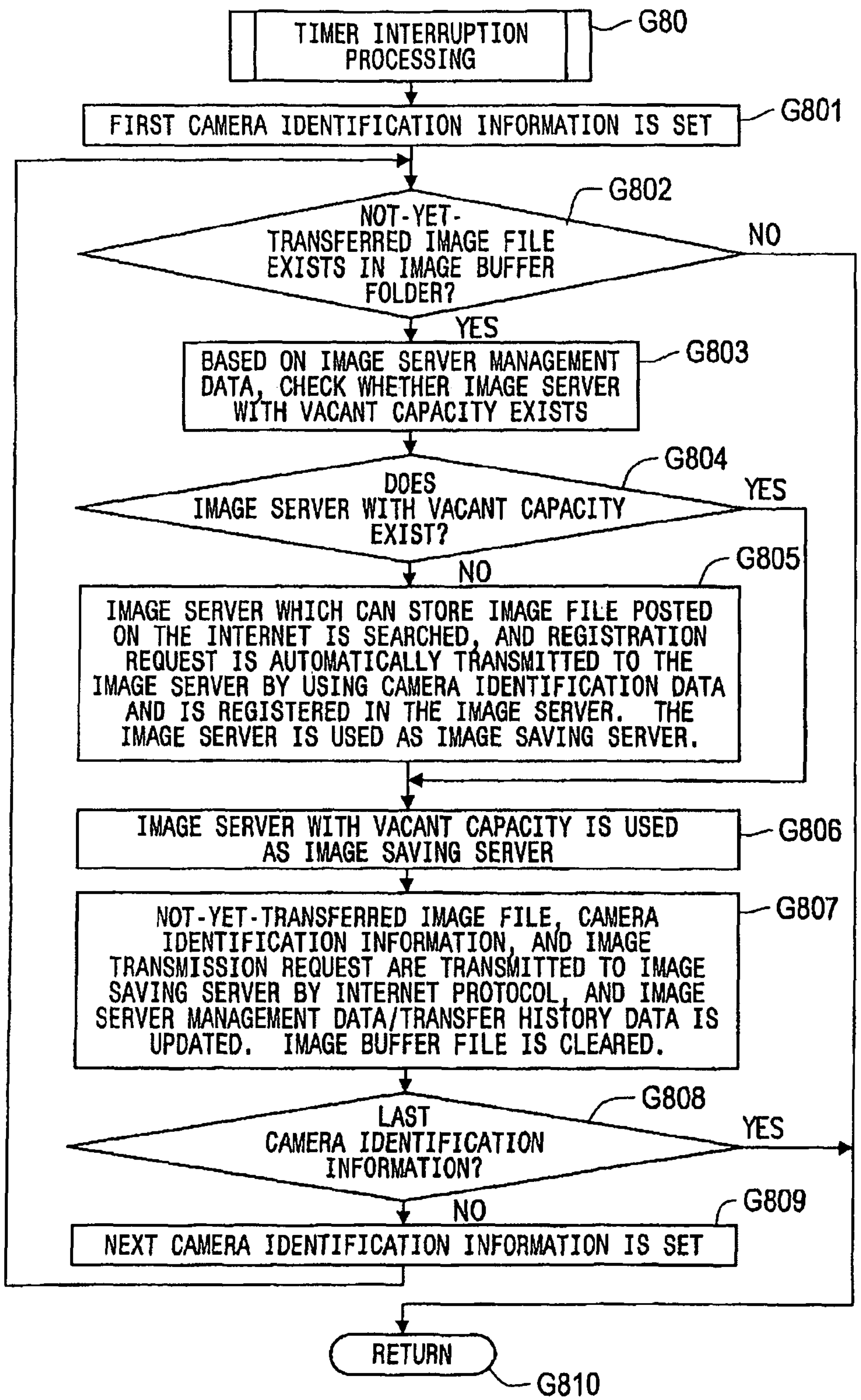

FIG. 152 is subroutine flow chart.

Figure 153:
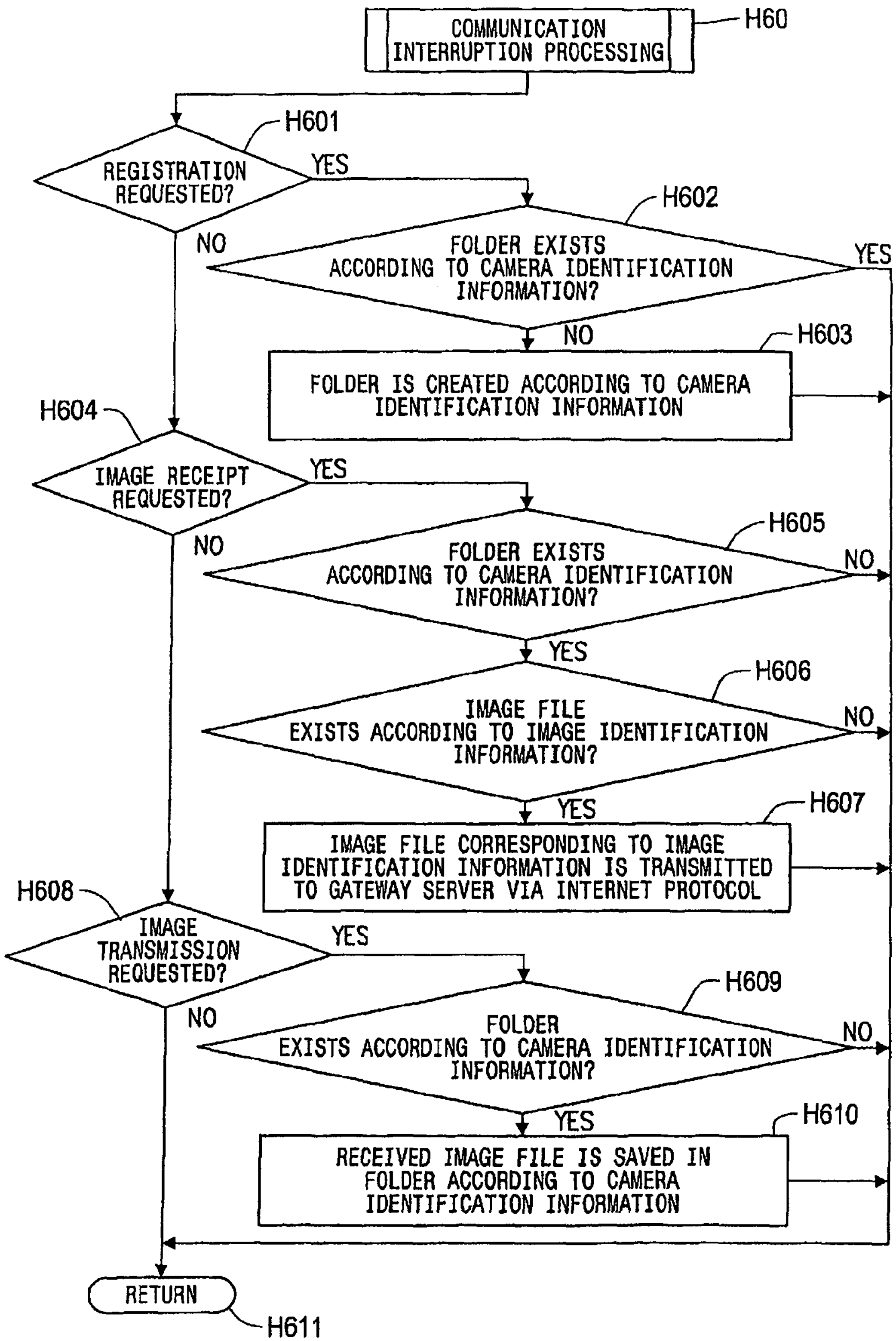

FIG. 153 is subroutine flow chart.

Figure 154:
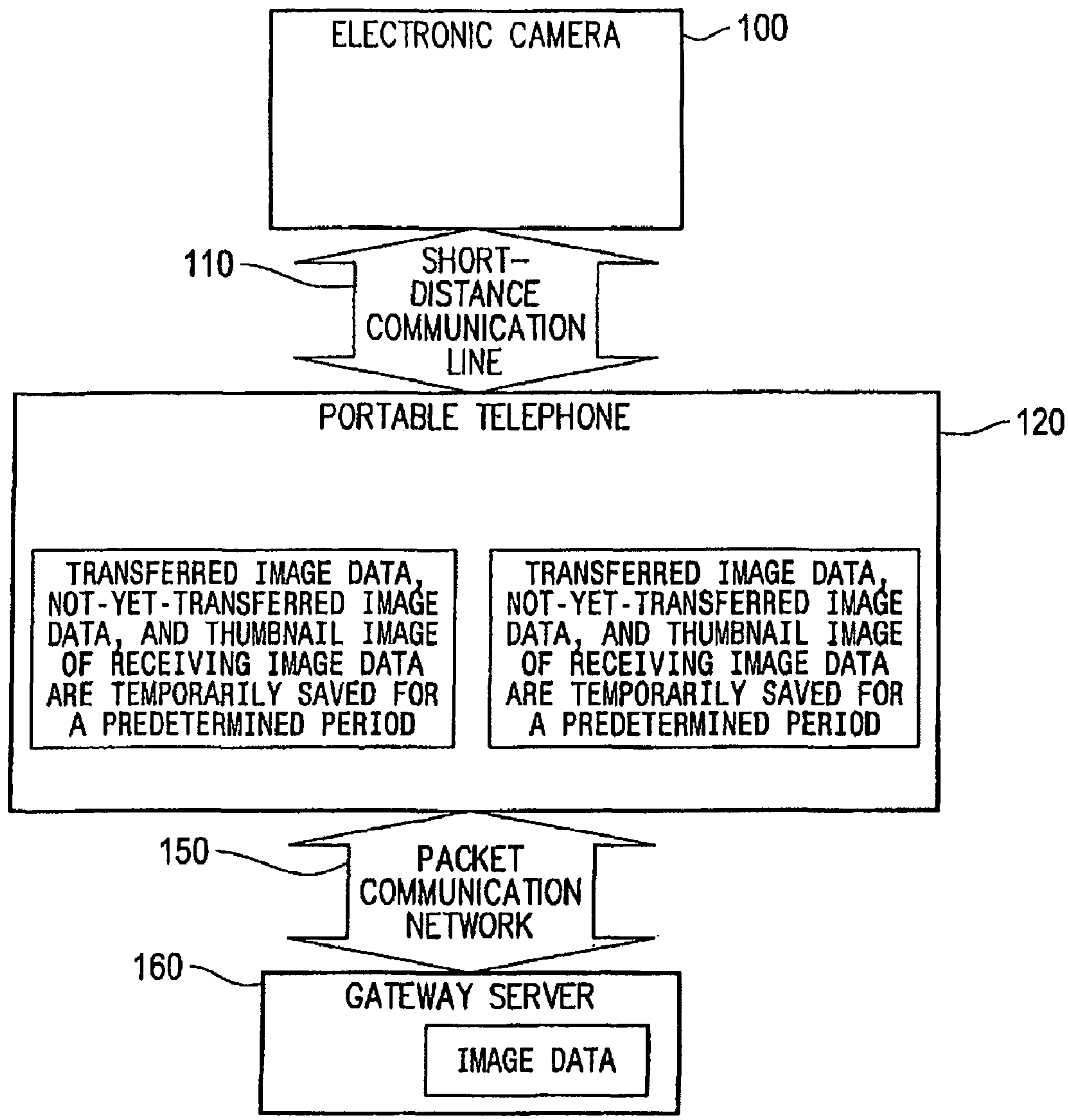

FIG. 154 is a conceptual drawing of an image transmission system.

Figure 155:
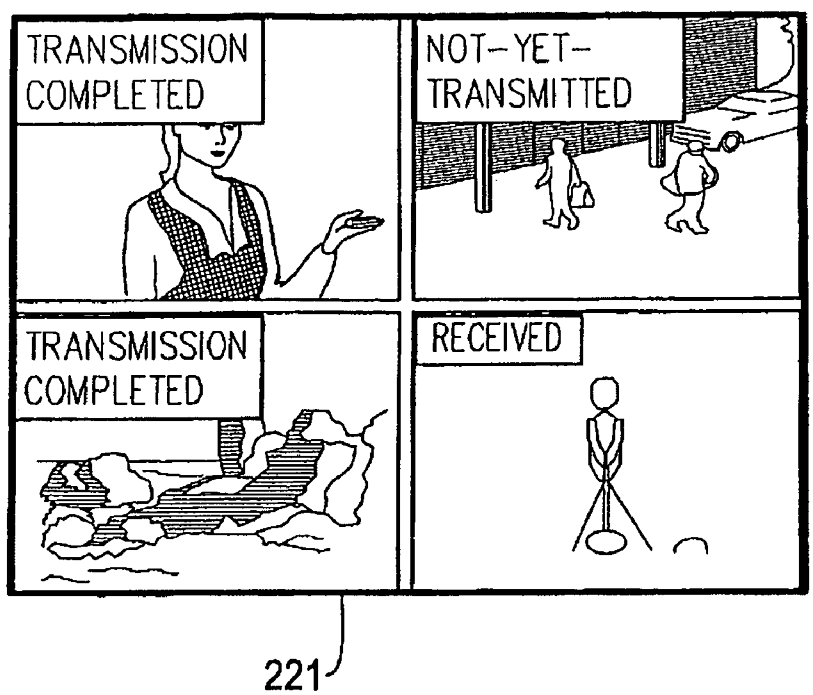

FIG. 155 is a screen display example.

Figure 156:
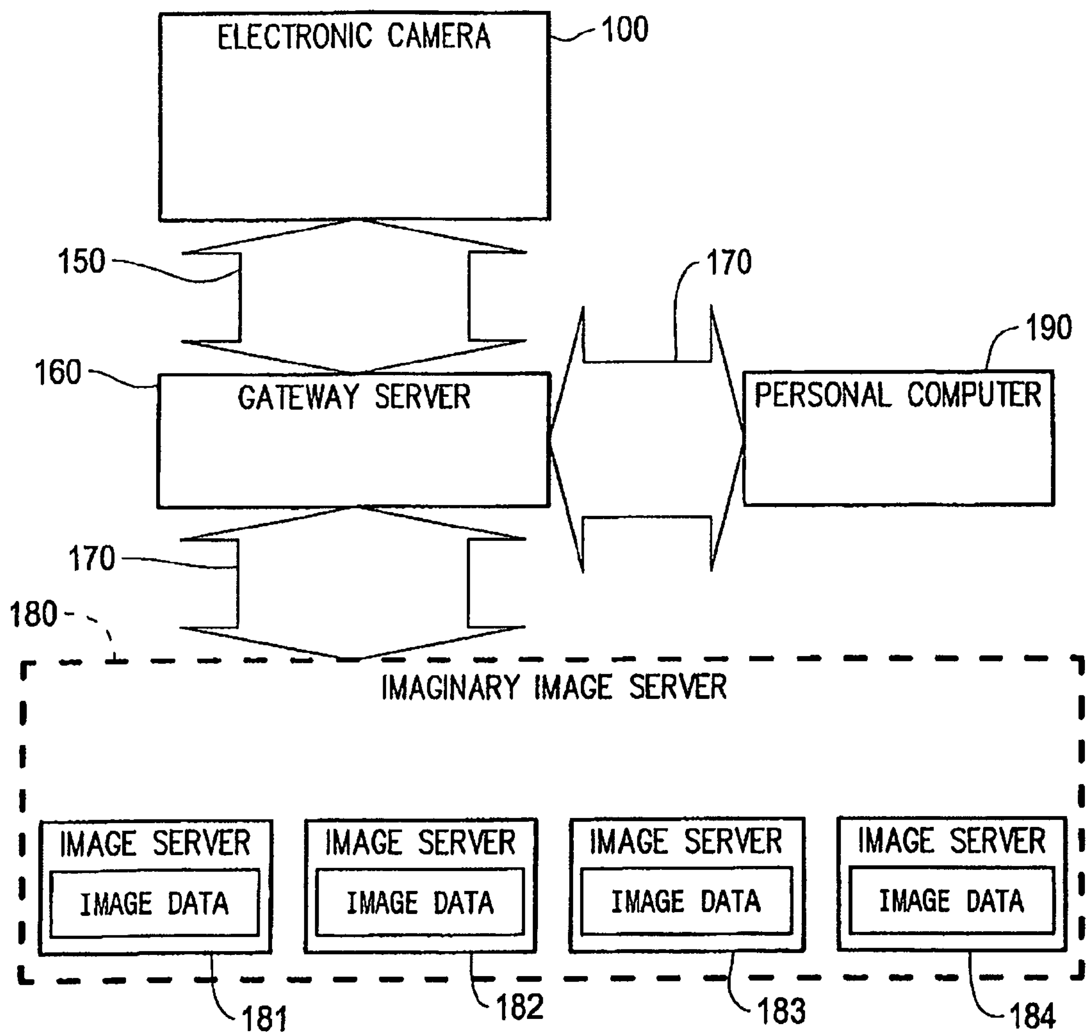

FIG. 156 is a conceptual drawing of an image transmission system.

Figure 157:
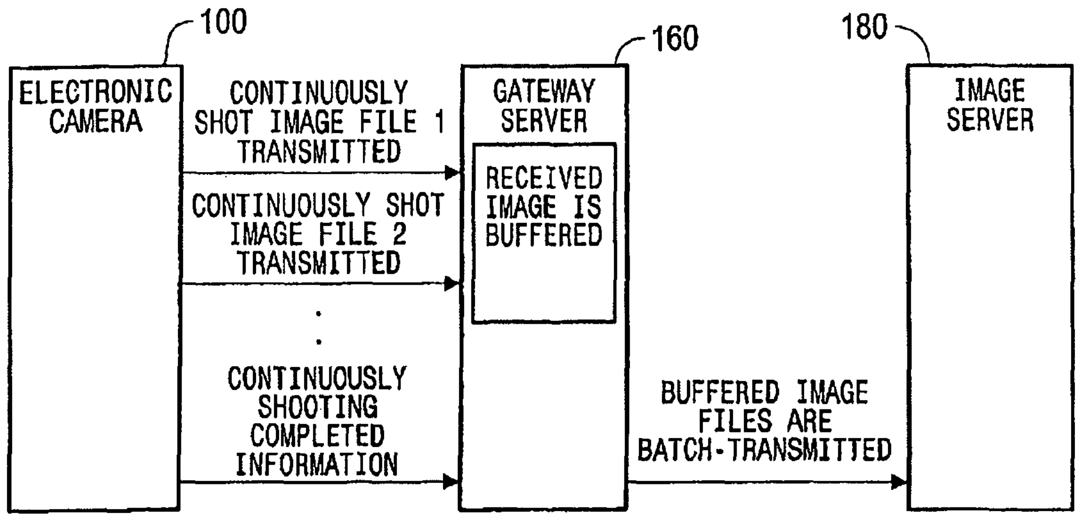

FIG. 157 is an explanatory drawing of the operation of image transmission.

Figure 158:
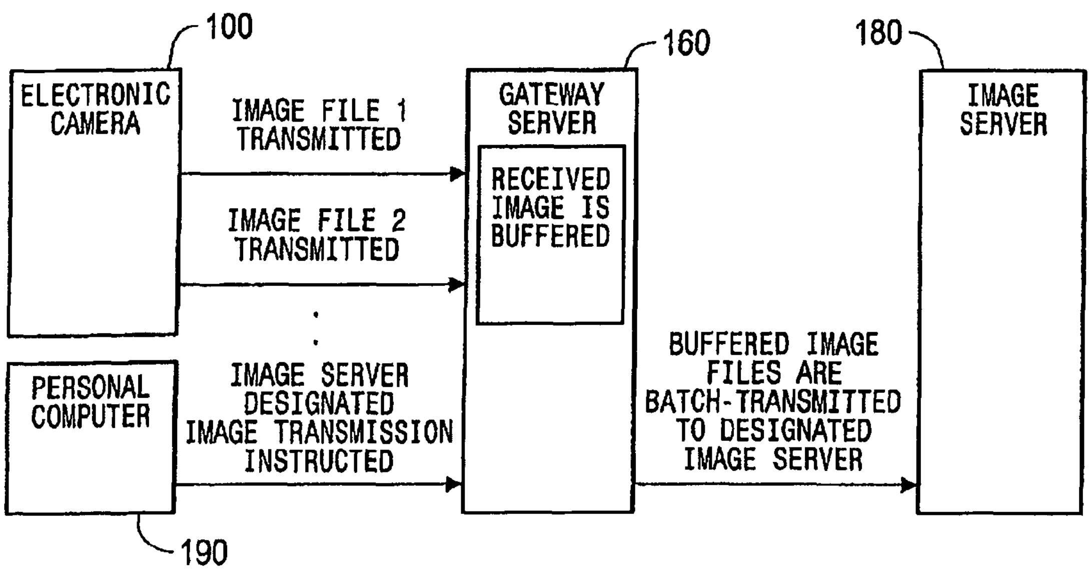

FIG. 158 is an explanatory drawing of the operation of image transmission.

Figure 159:
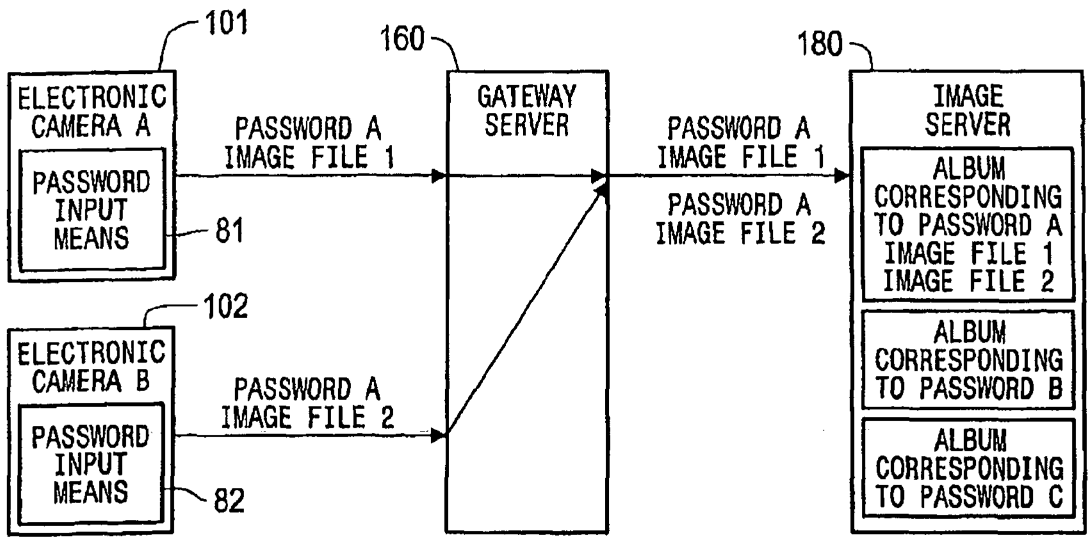

FIG. 159 is an explanatory drawing of the operation of image transmission.

Figure 160:
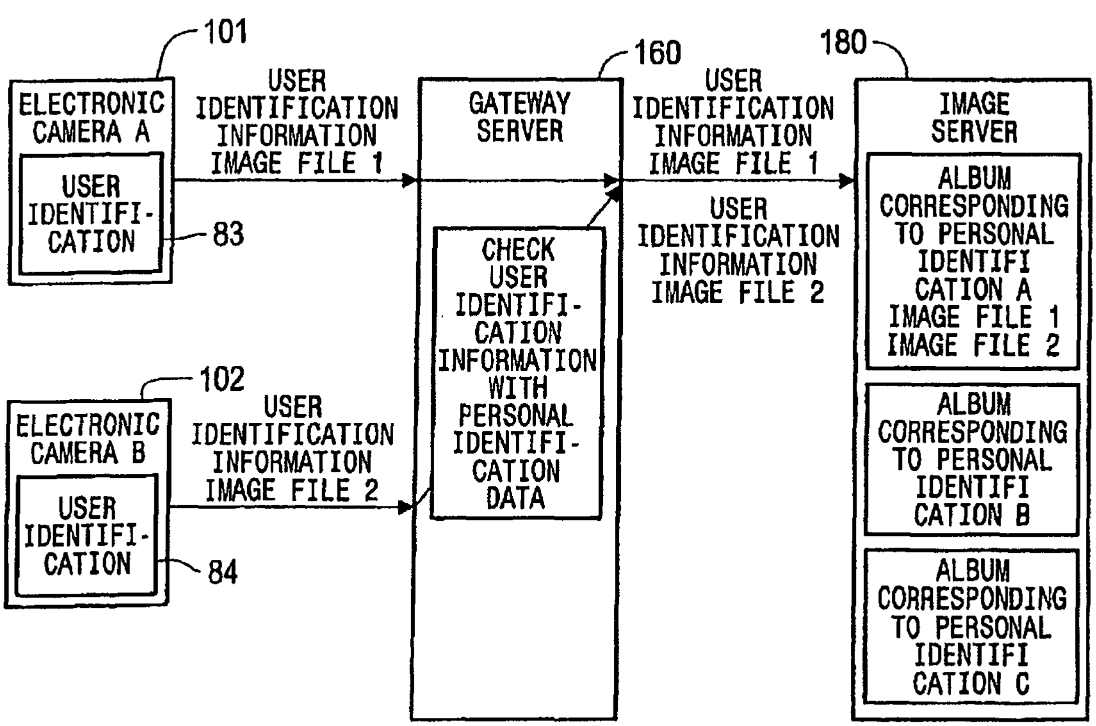

FIG. 160 is an explanatory drawing of the operation of image transmission.

Figure 161:
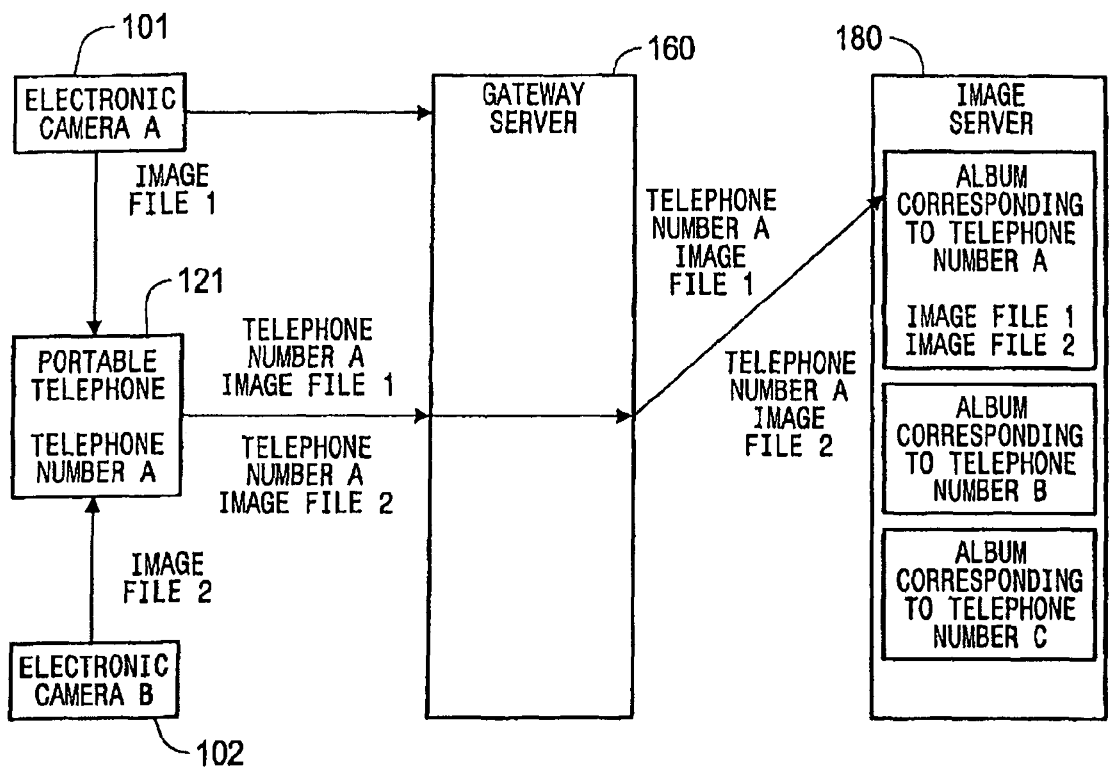

FIG. 161 is an explanatory drawing of the operation of image transmission.

Figure 162:
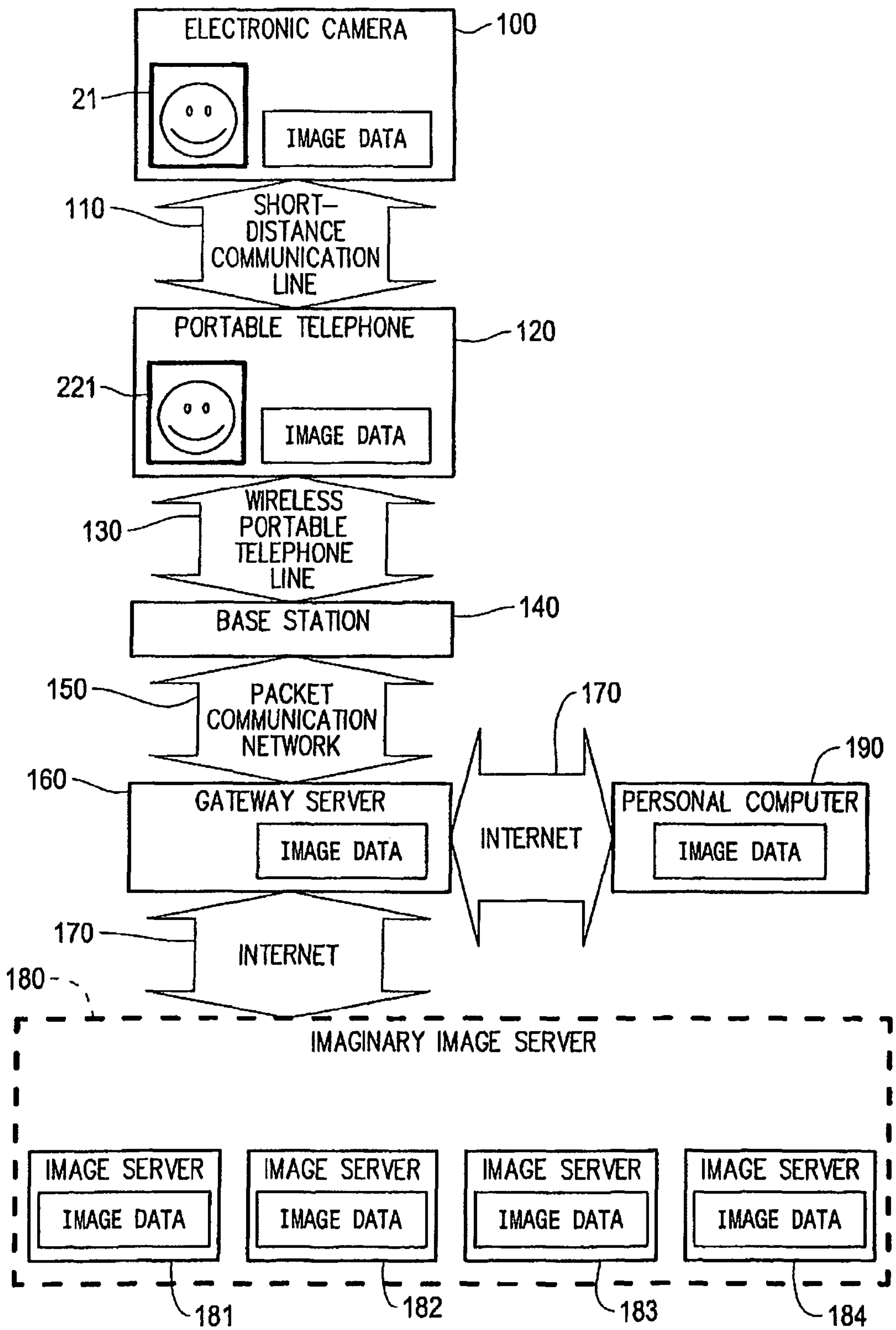

FIG. 162 is a conceptual drawing of an image transmission system.

Figure 163:
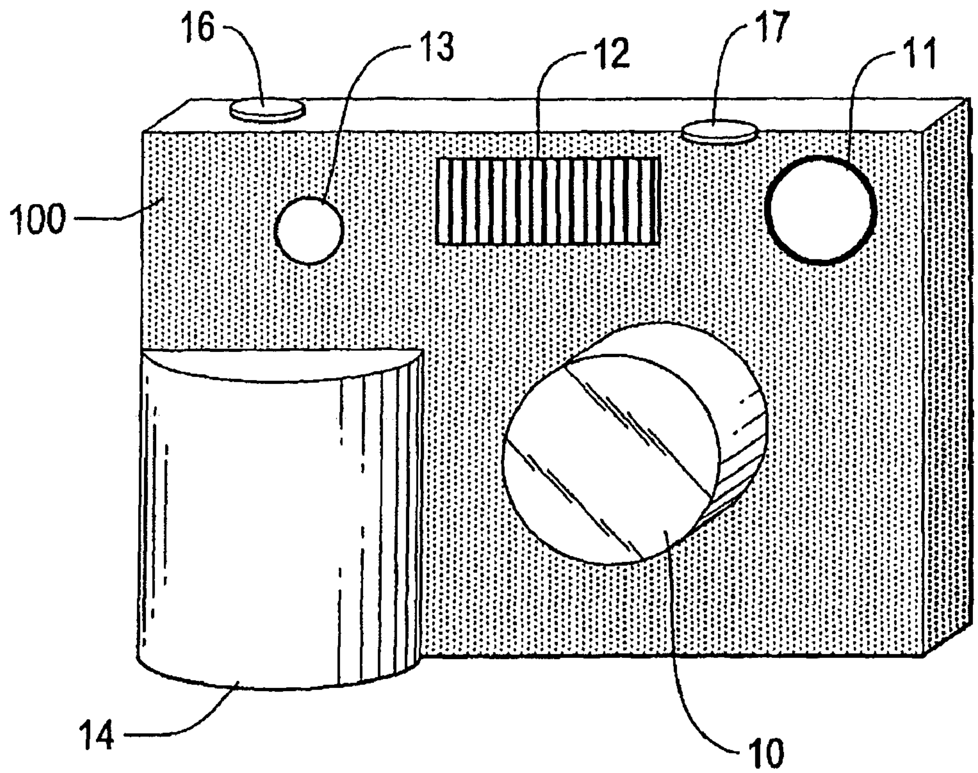

FIG. 163 is an external view (front view) of an electronic camera.

Figure 164:
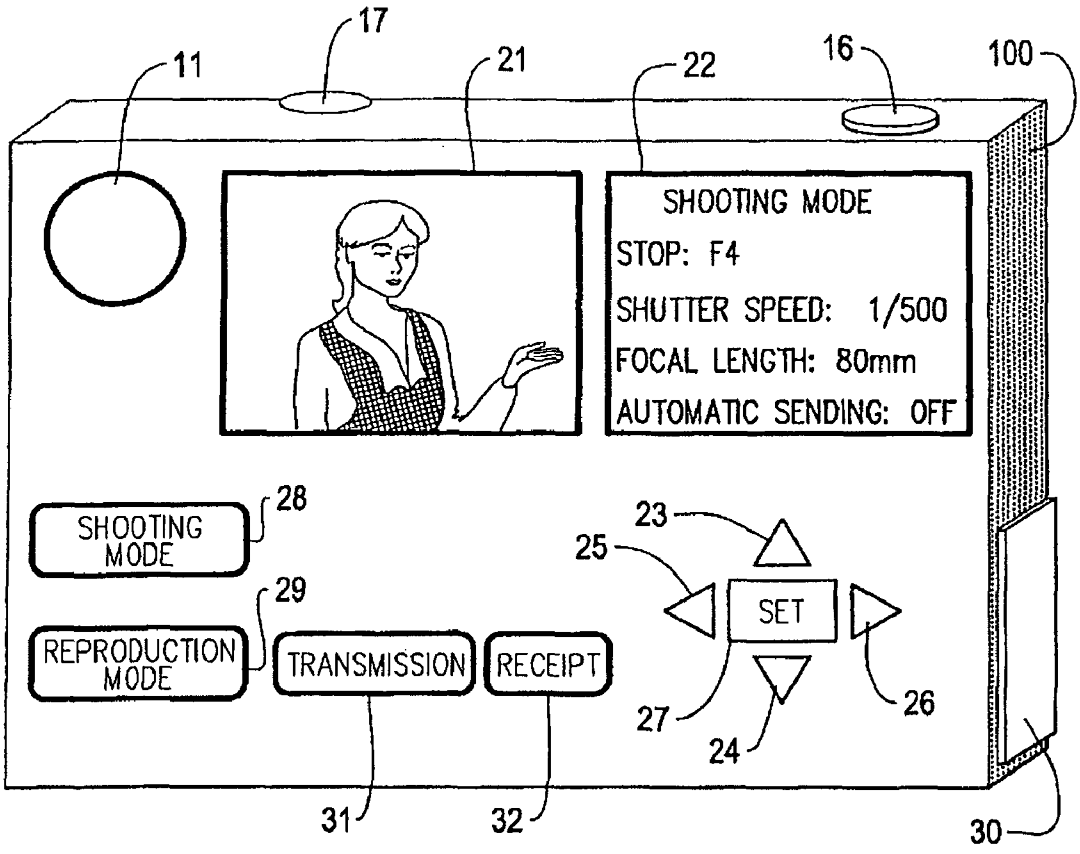

FIG. 164 is an external view (rear view) of an electronic camera.

Figure 165:
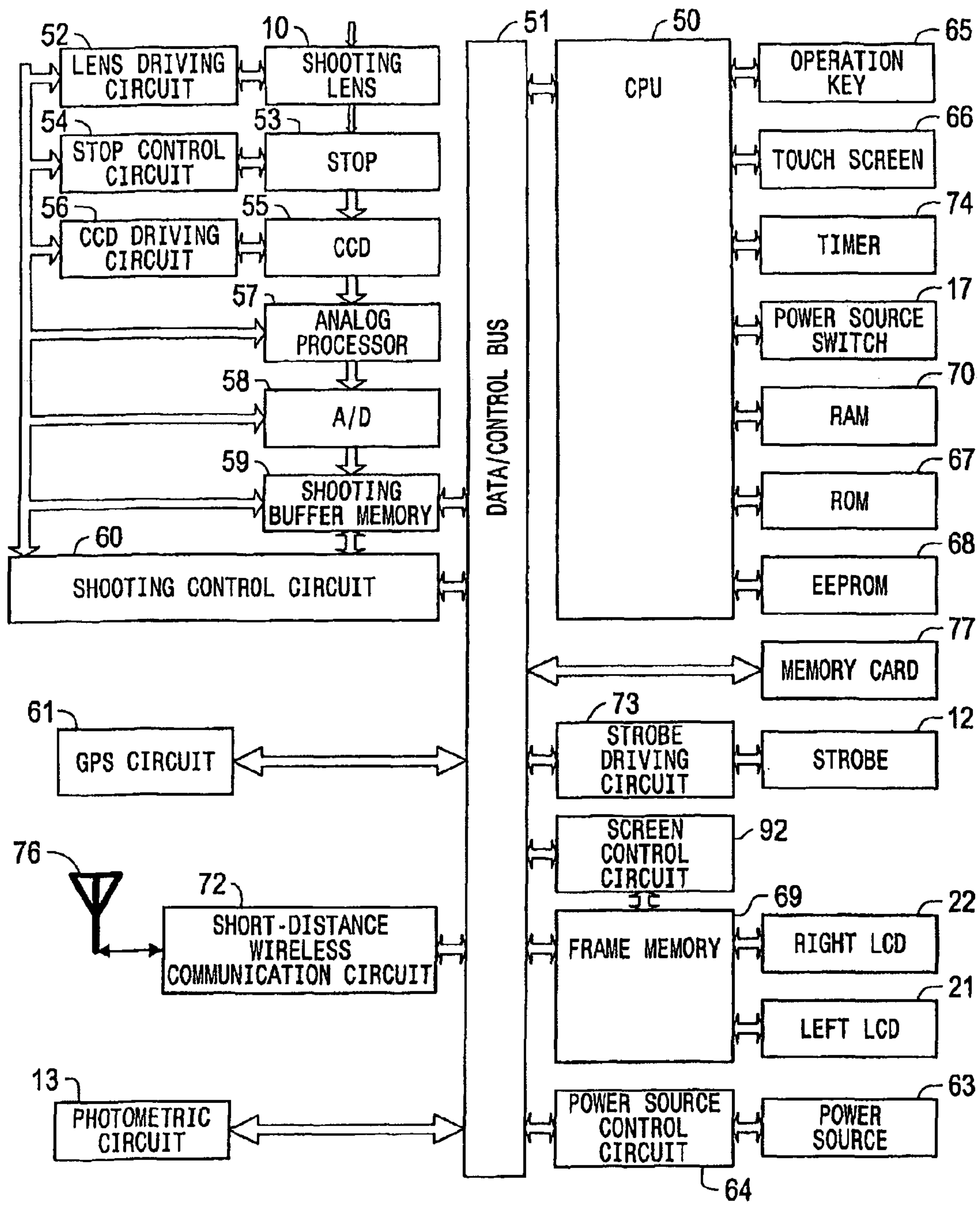

FIG. 165 is a block diagram showing the electrical configuration of an electronic camera.

FIG. 166 is a diagram of the data of a memory card.

FIG. 167 is a diagram of the data of an EEPROM.

Figure 168:
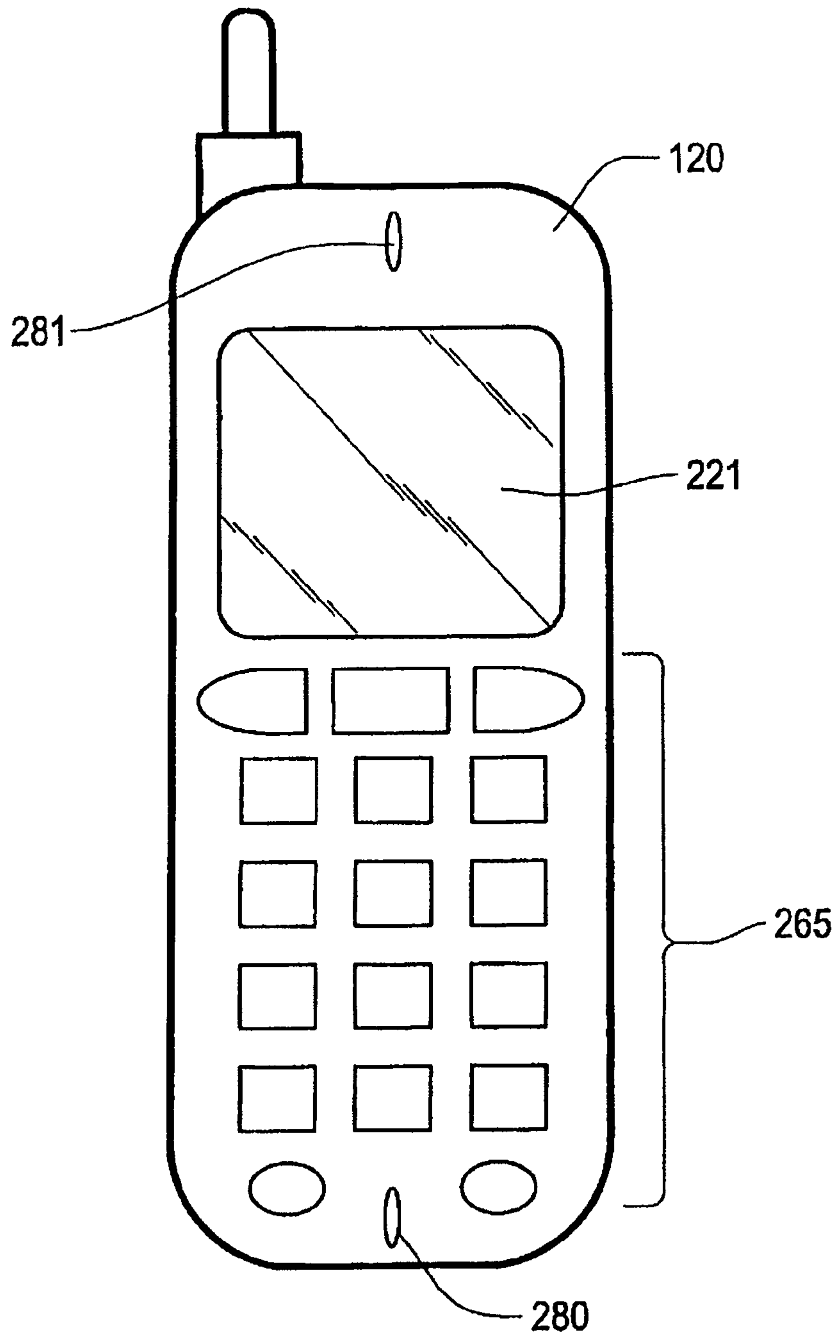

FIG. 168 is an external view of a portable telephone.

Figure 169:
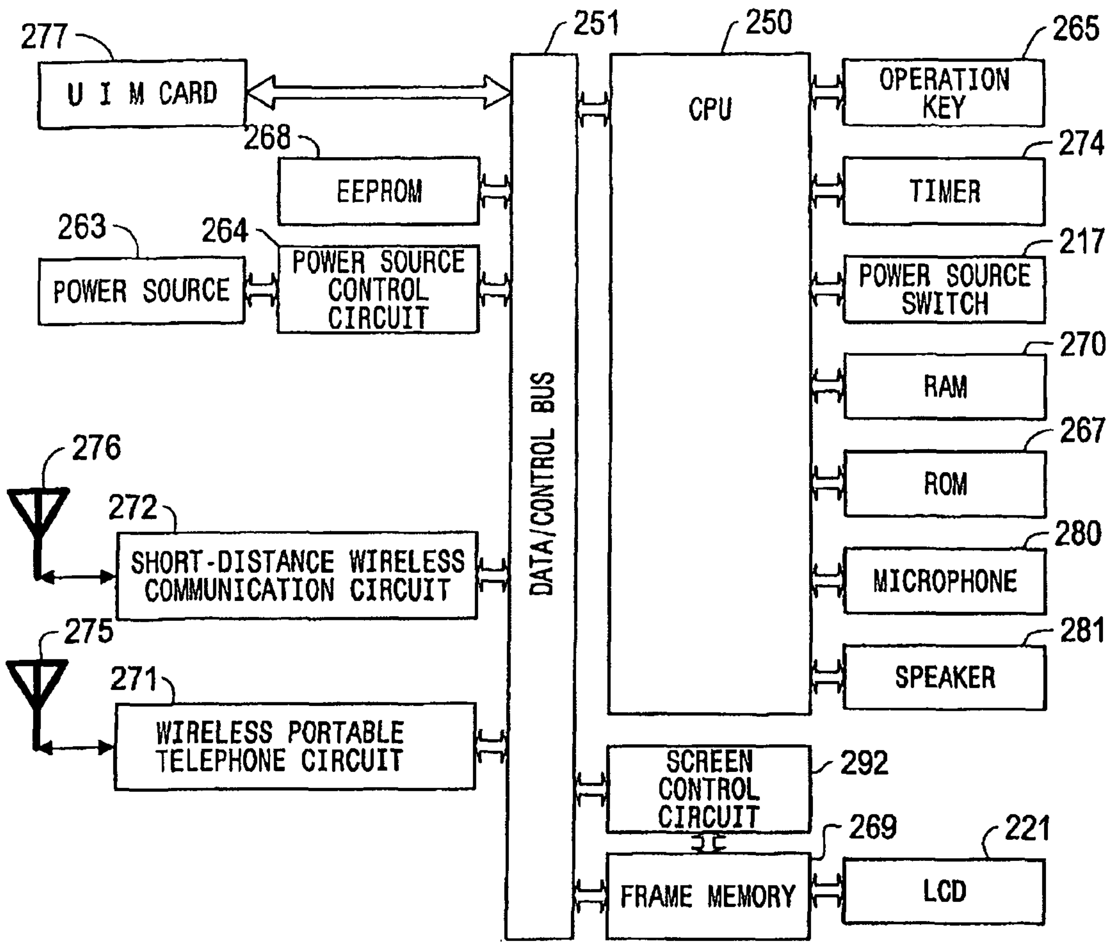

FIG. 169 is a block diagram showing the electrical configuration of a portable telephone.

Figure 170:
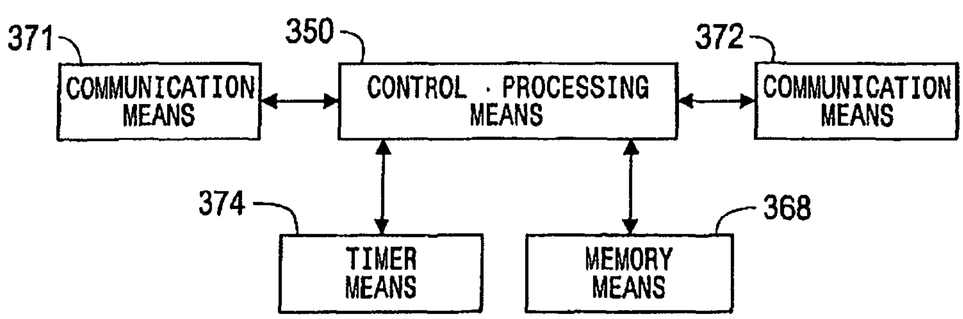

FIG. 170 is block diagram showing the configuration of a gateway server.

Figure 171:
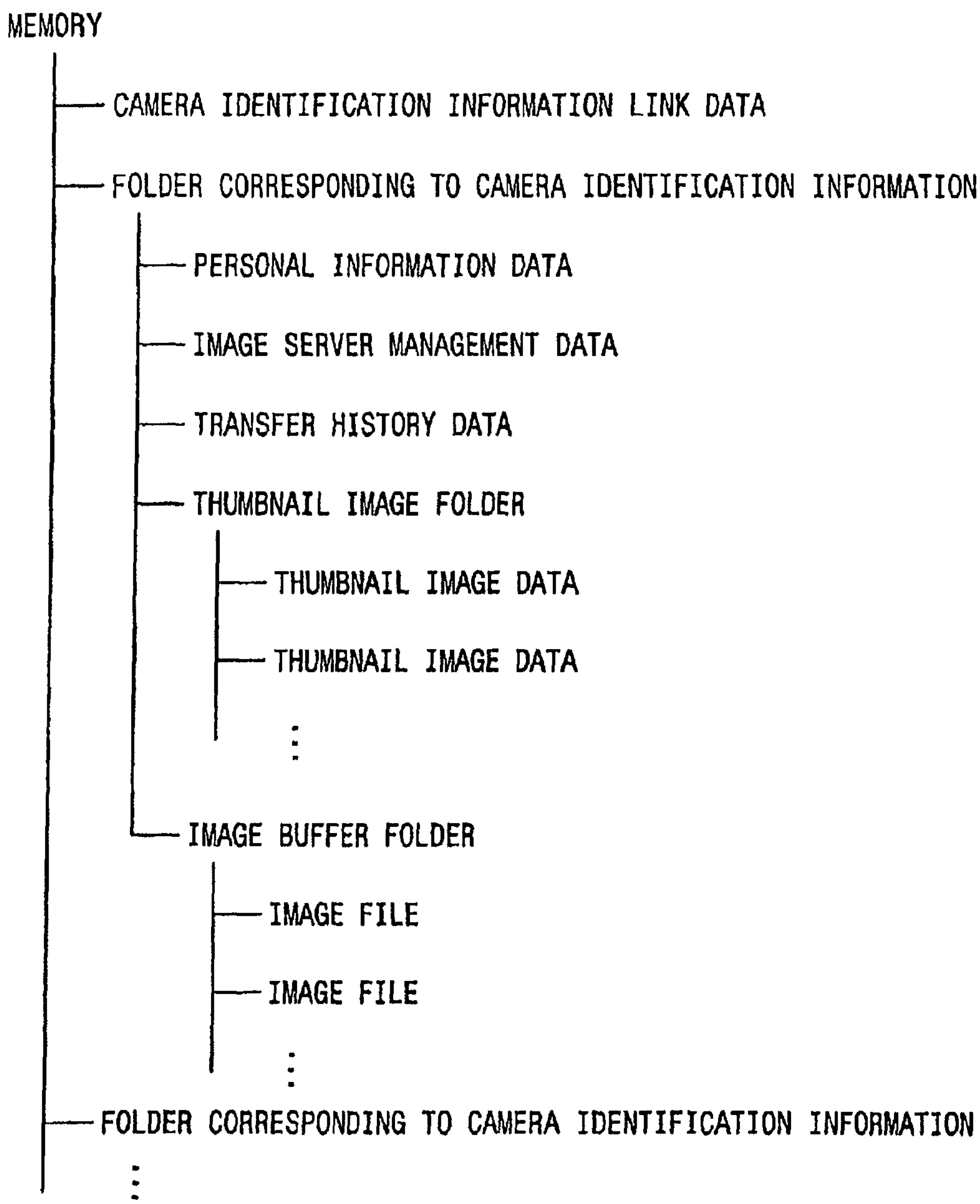

FIG. 171 is a diagram of the memory of a gateway server.

FIG. 172 is an explanatory drawing of camera identification information link data.

FIG. 173 is an explanatory drawing of personal identification data.

Figure 174:
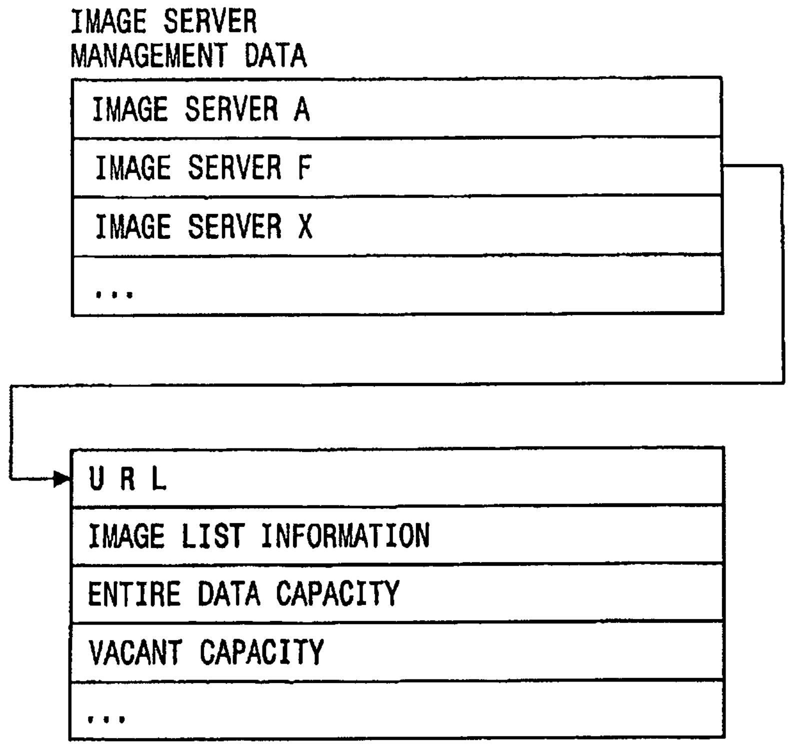

FIG. 174 is an explanatory drawing of server management data.

Figure 175:
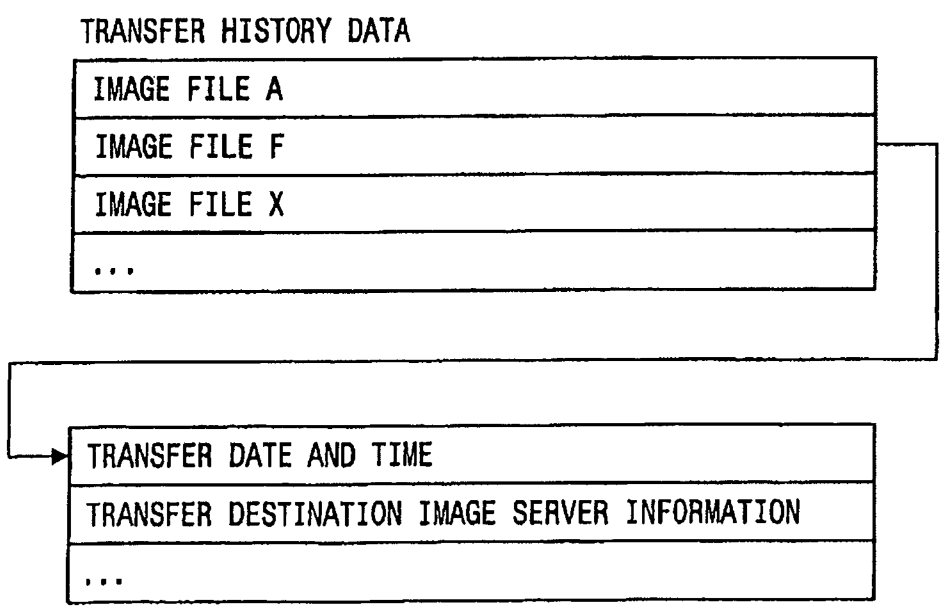

FIG. 175 is an explanatory drawing of transfer history data.

Figure 176:
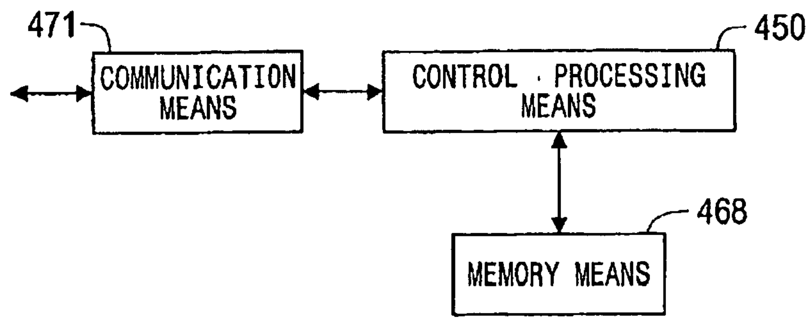

FIG. 176 is a block diagram showing the configuration of an image server.

Figure 177:
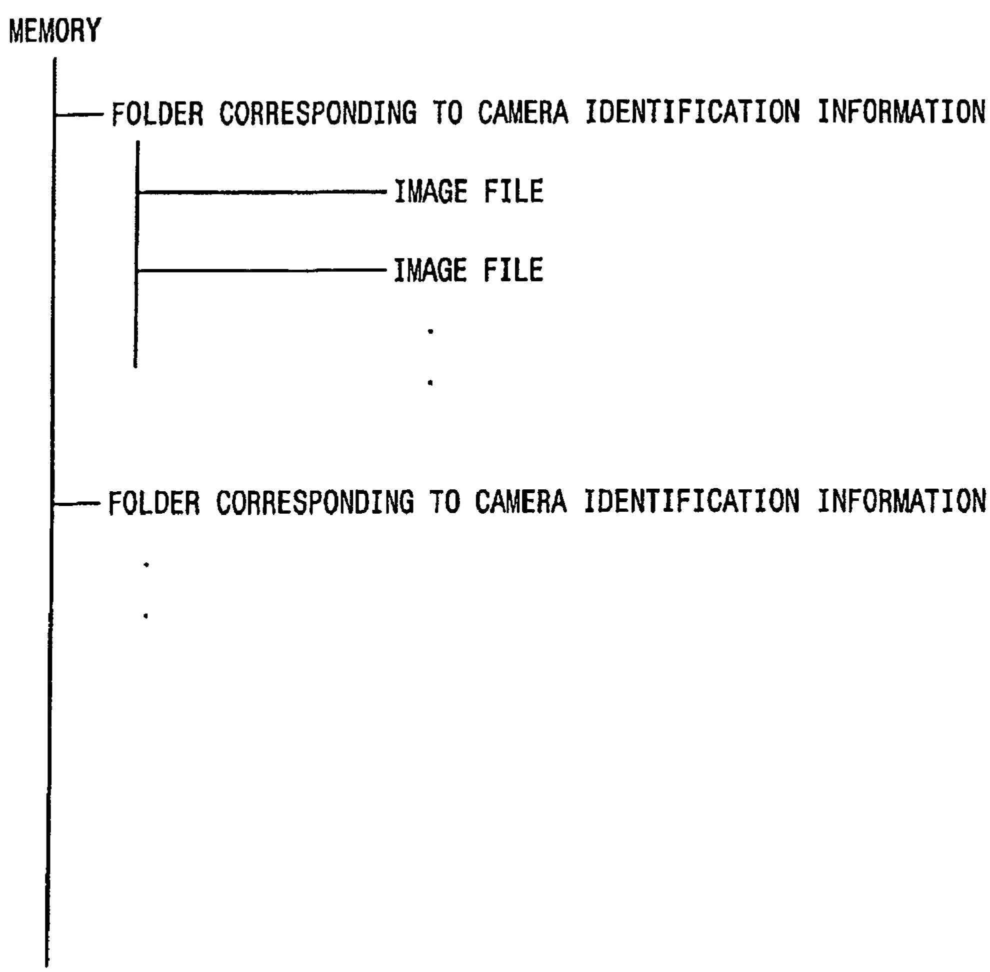

FIG. 177 is a diagram of the memory of an image server.

Figure 178:
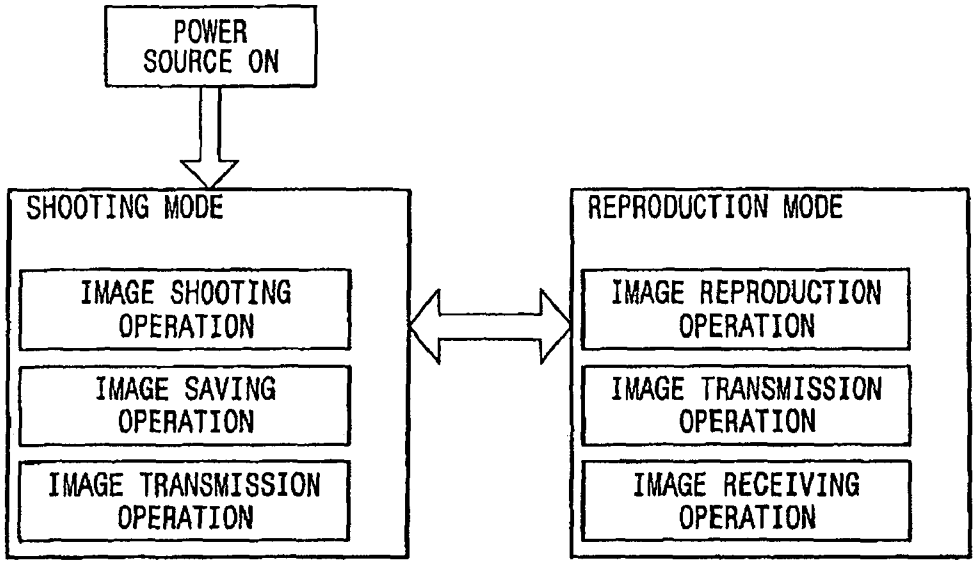

FIG. 178 is a state transition diagram for an electronic camera.

Figure 179:
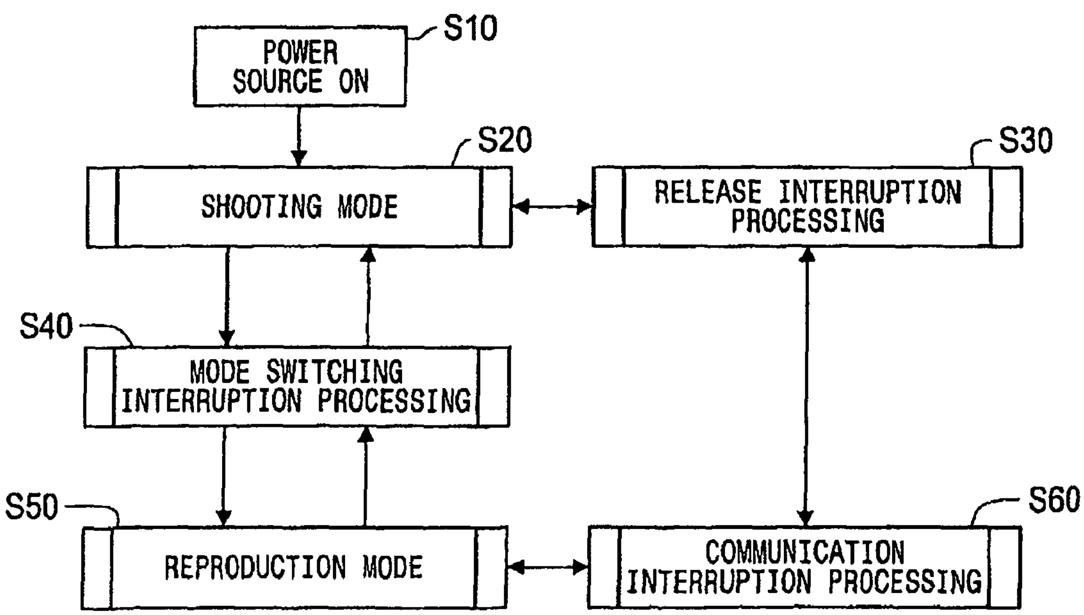

FIG. 179 is a main flow chart of a CPU.

Figure 180:
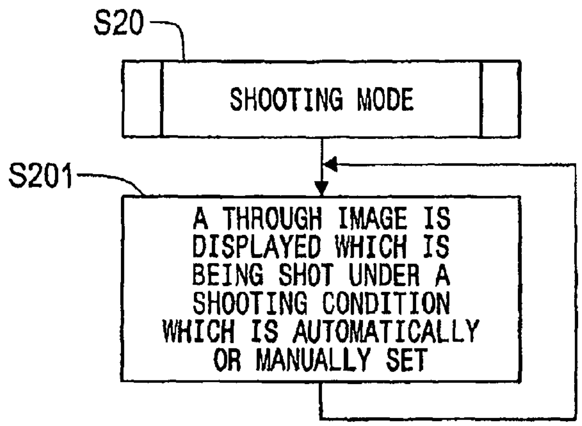

FIG. 180 is subroutine flow chart.

Figure 181:
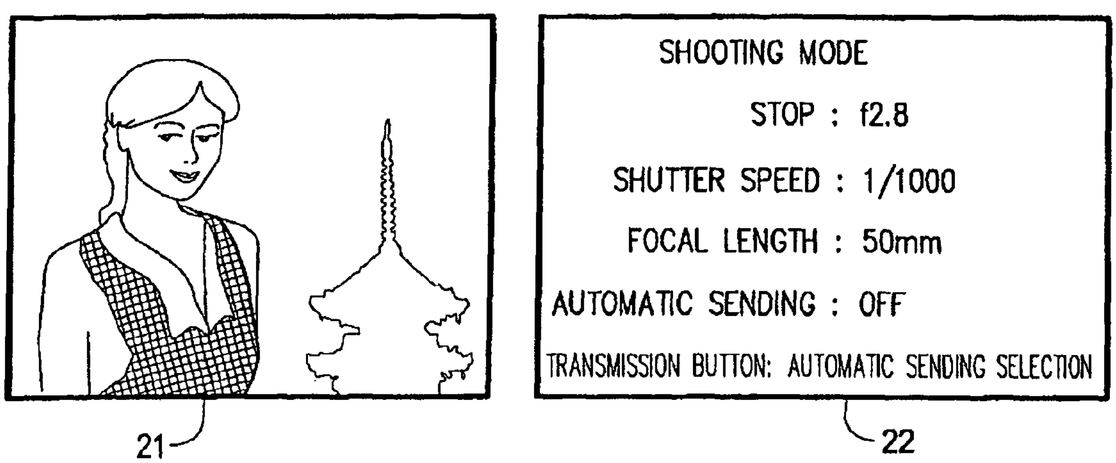

FIG. 181 is a screen display example.

Figure 182:
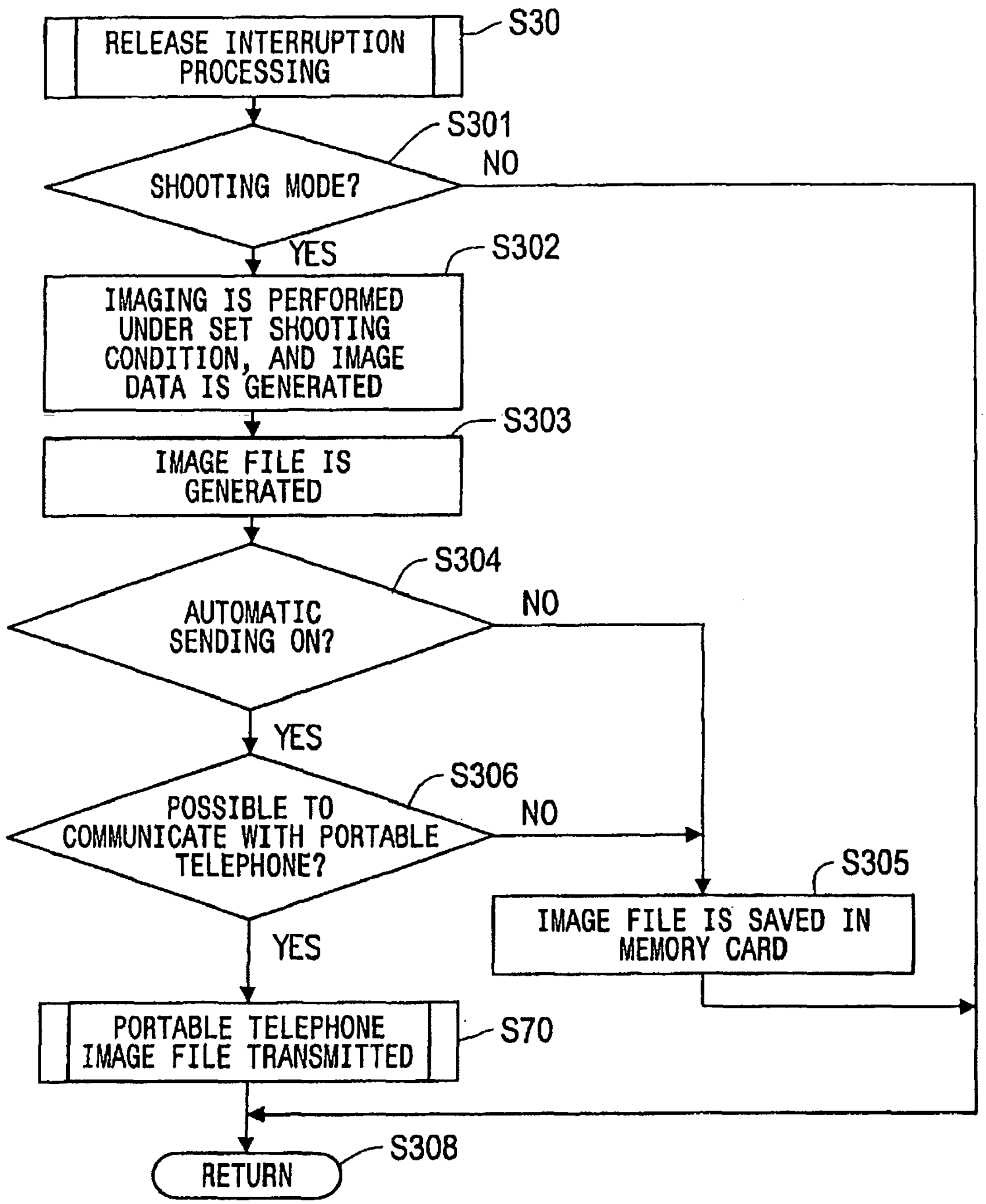

FIG. 182 is subroutine flow chart.

Figure 183:
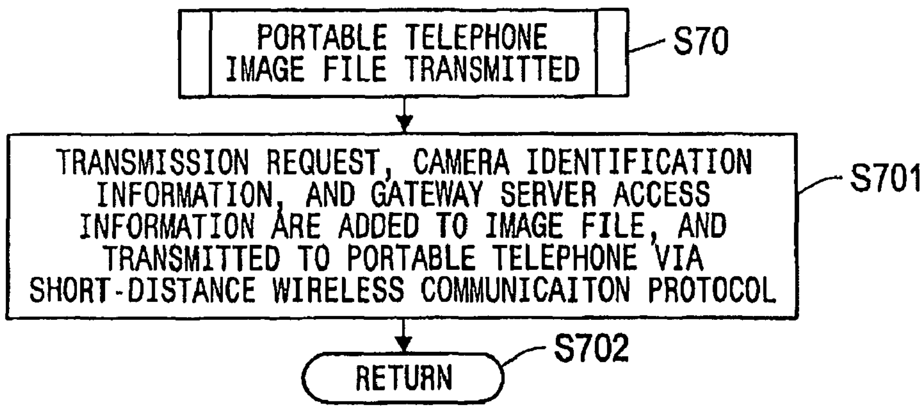

FIG. 183 is subroutine flow chart.

Figure 184:
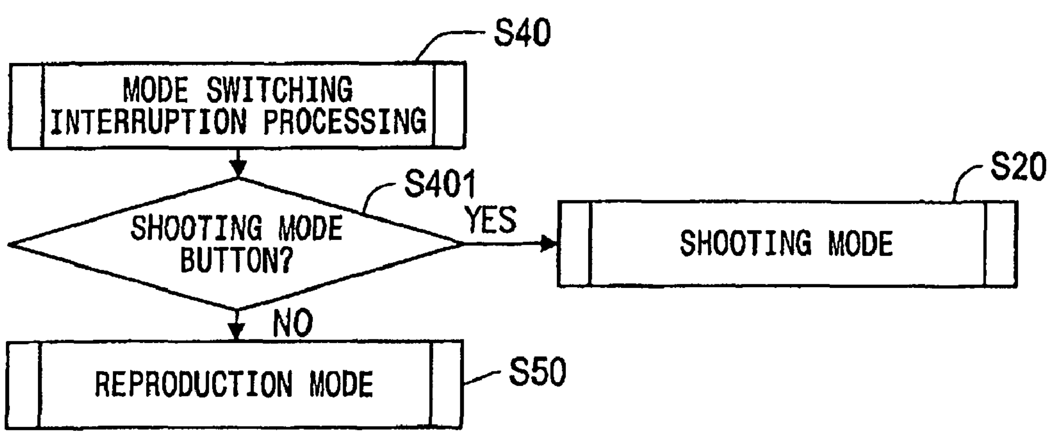

FIG. 184 is subroutine flow chart.

Figure 185:
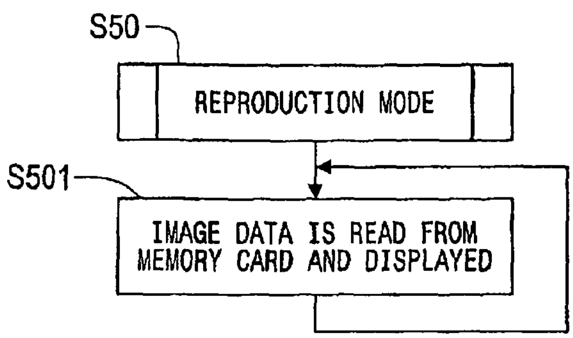

FIG. 185 is subroutine flow chart.

Figure 186:
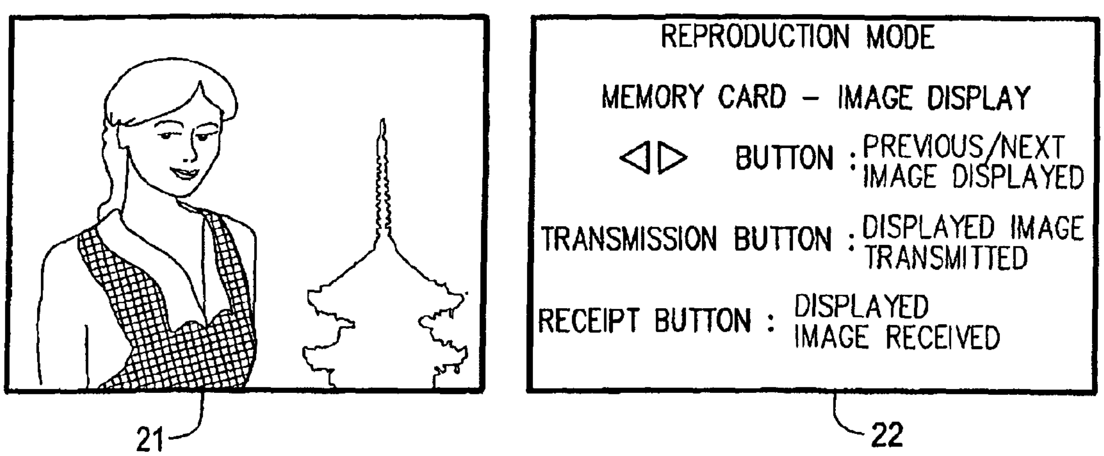

FIG. 186 is a screen display example.

Figure 187:
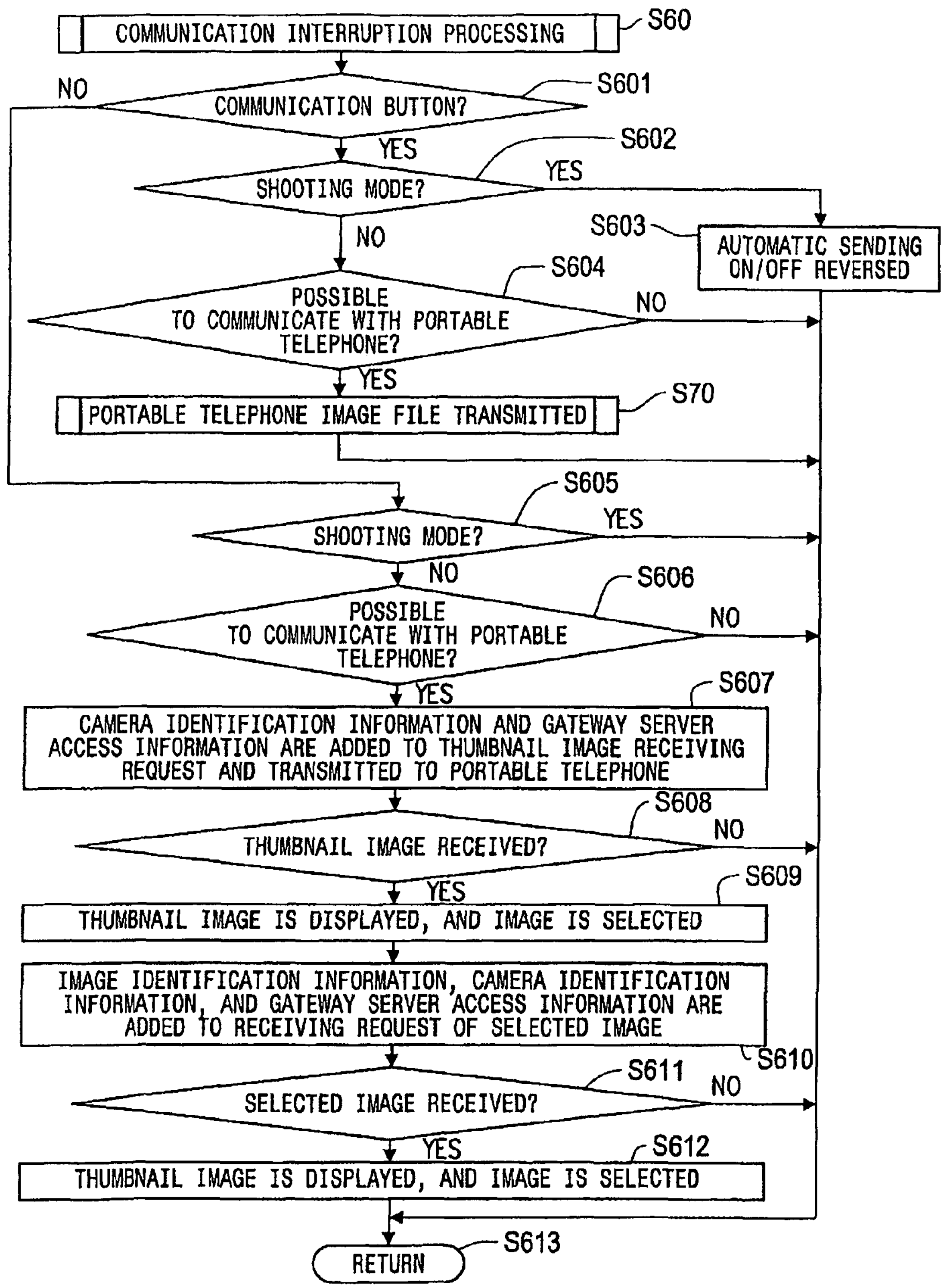

FIG. 187 is subroutine flow chart.

Figure 188:
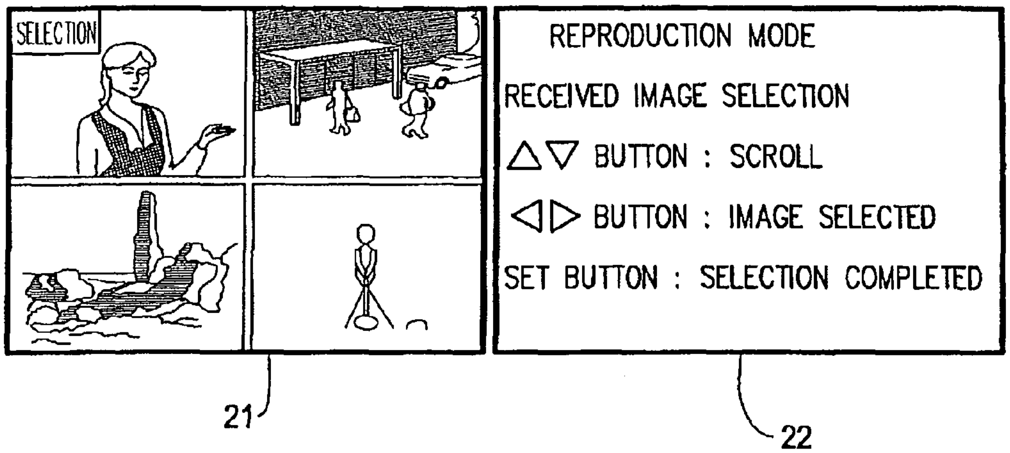

FIG. 188 is a screen display example.

Figure 189:
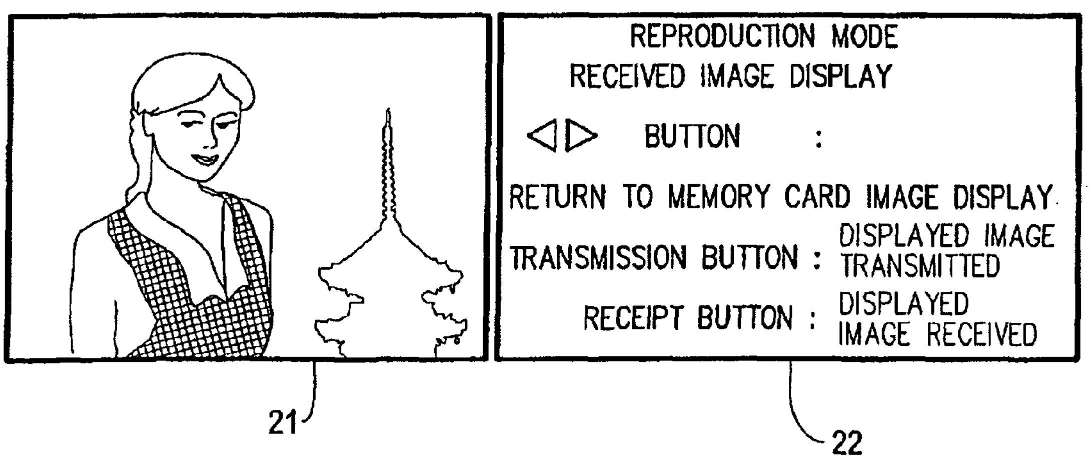

FIG. 189 is a screen display example.

Figure 190:
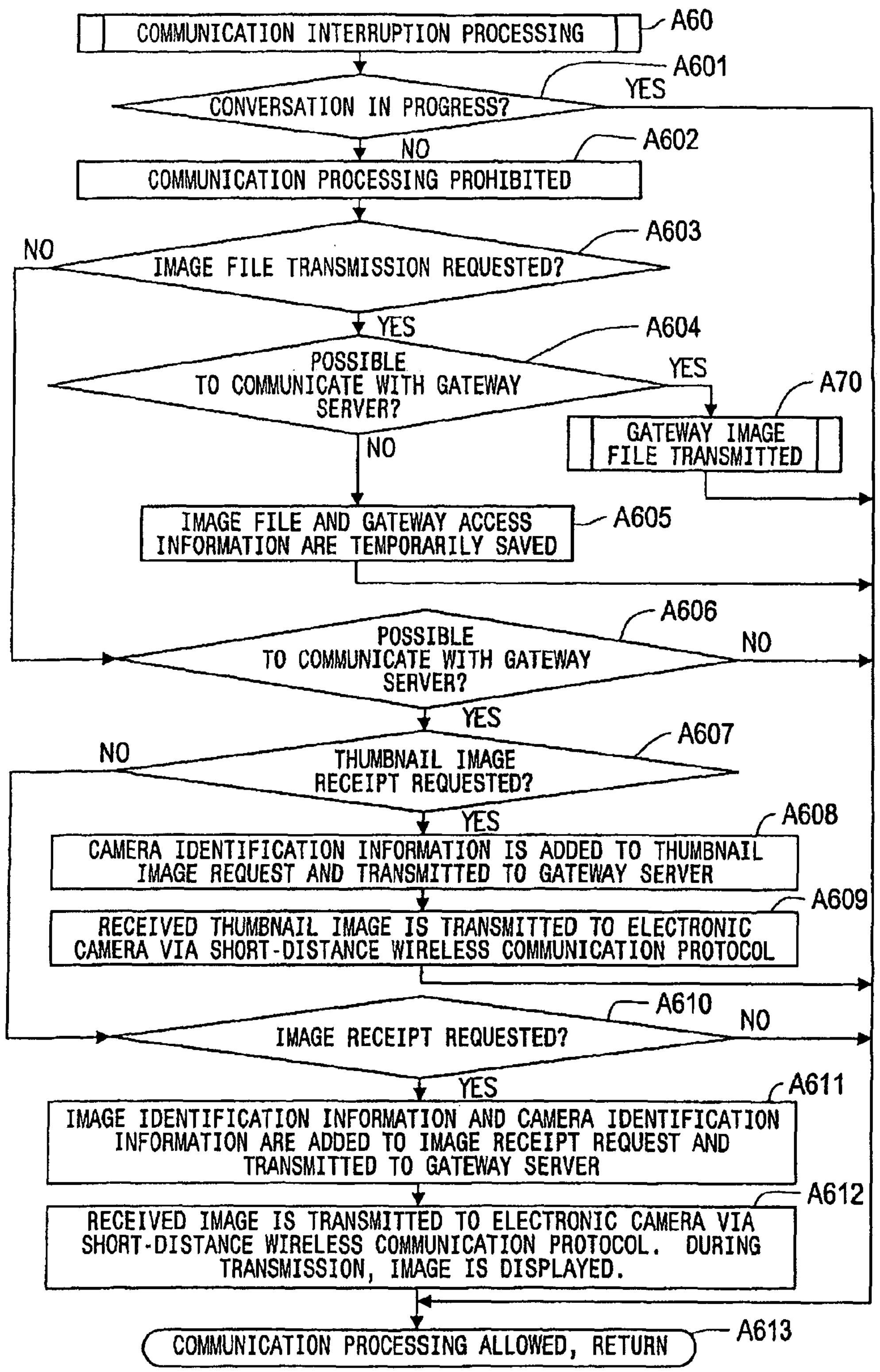

FIG. 190 is subroutine flow chart.

Figure 191:
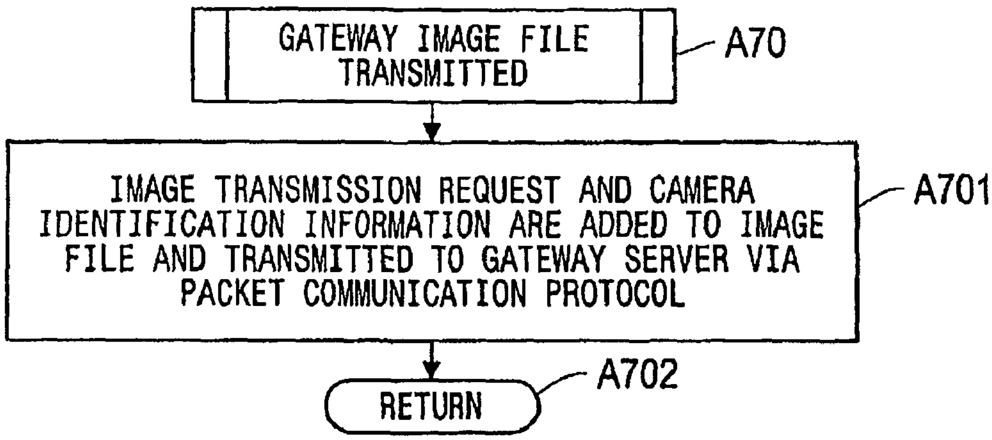

FIG. 191 is subroutine flow chart.

Figure 192:
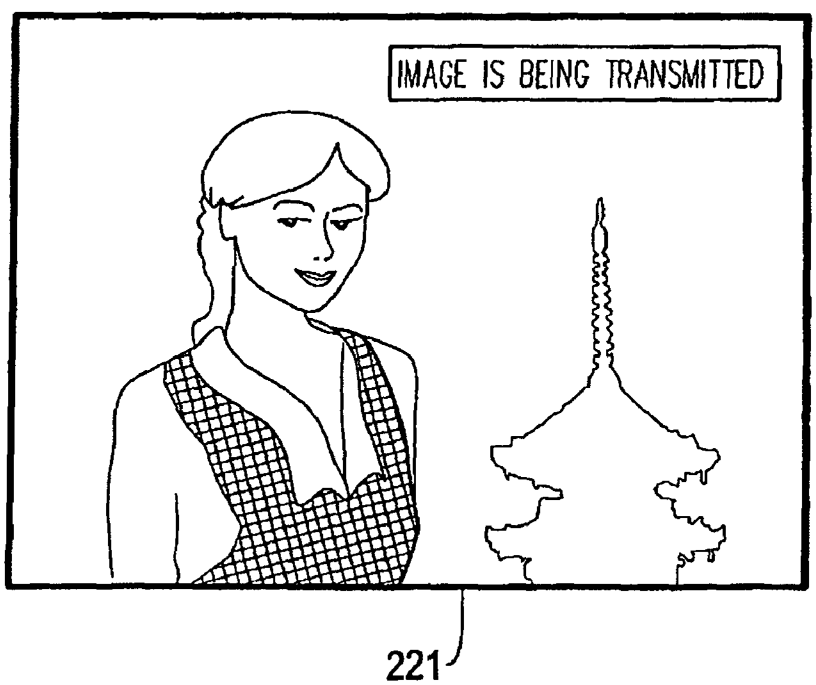

FIG. 192 is a screen display example.

Figure 193:
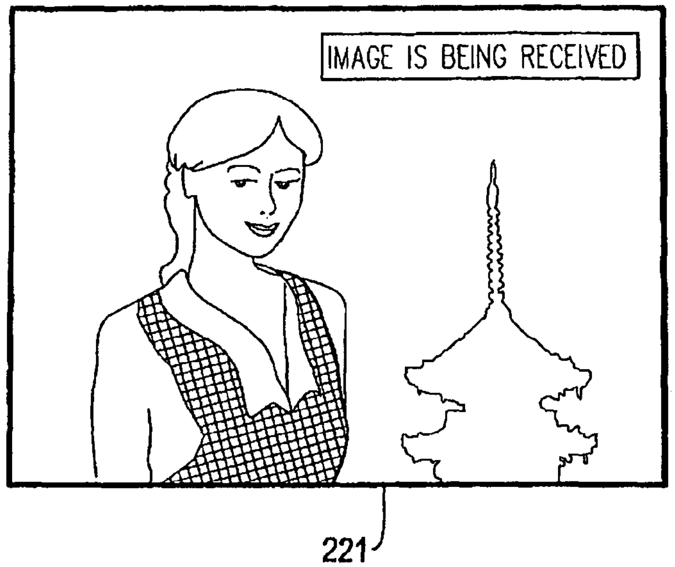

FIG. 193 is a screen display example.

Figure 194:
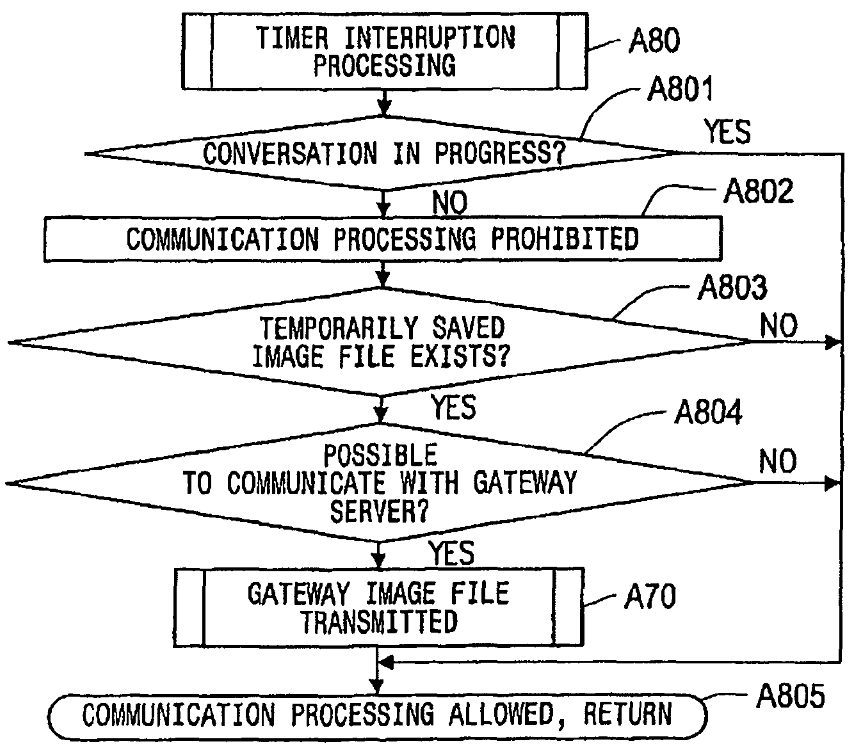

FIG. 194 is subroutine flow chart.

Figure 195:
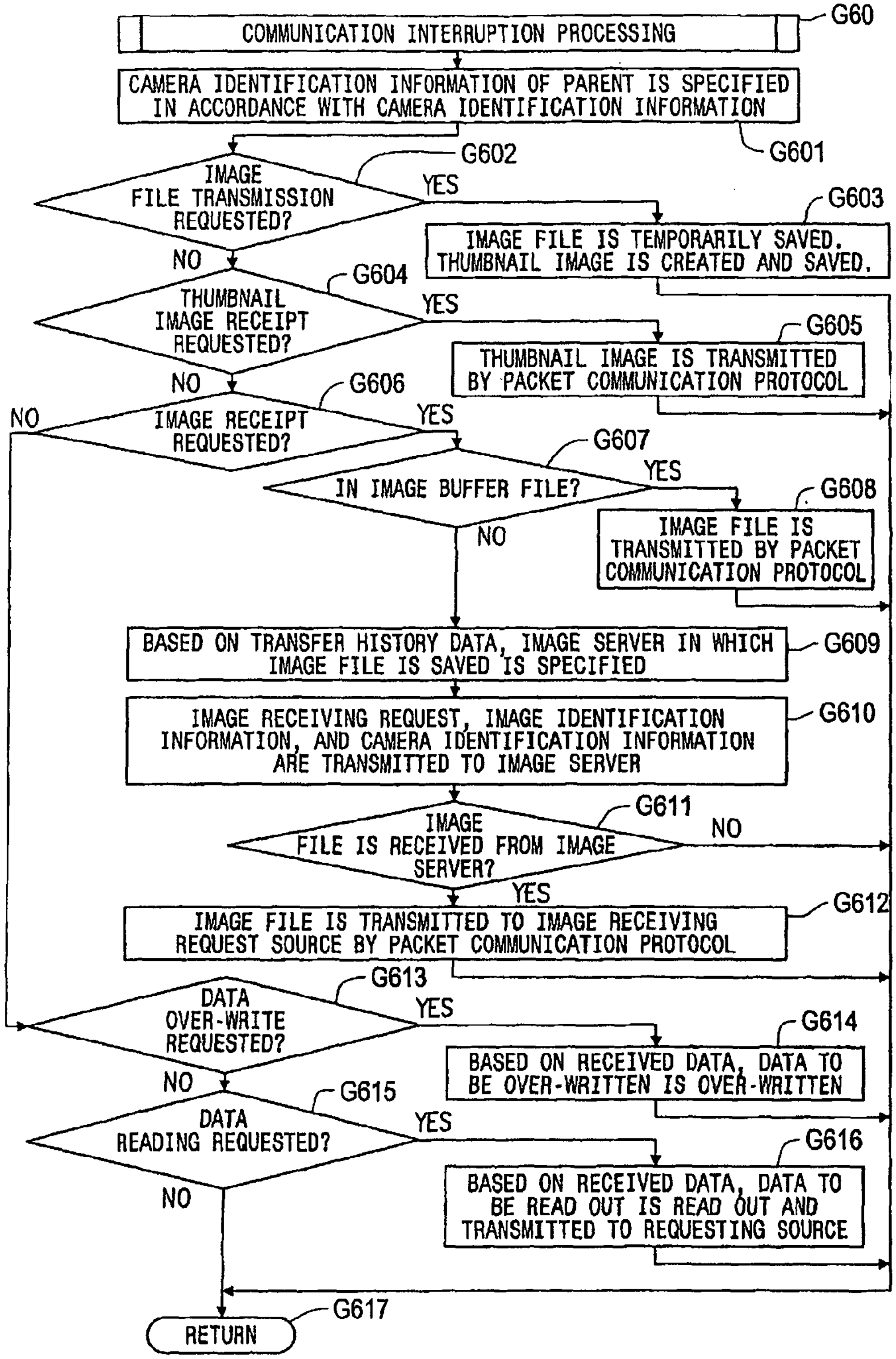

FIG. 195 is subroutine flow chart.

Figure 196:
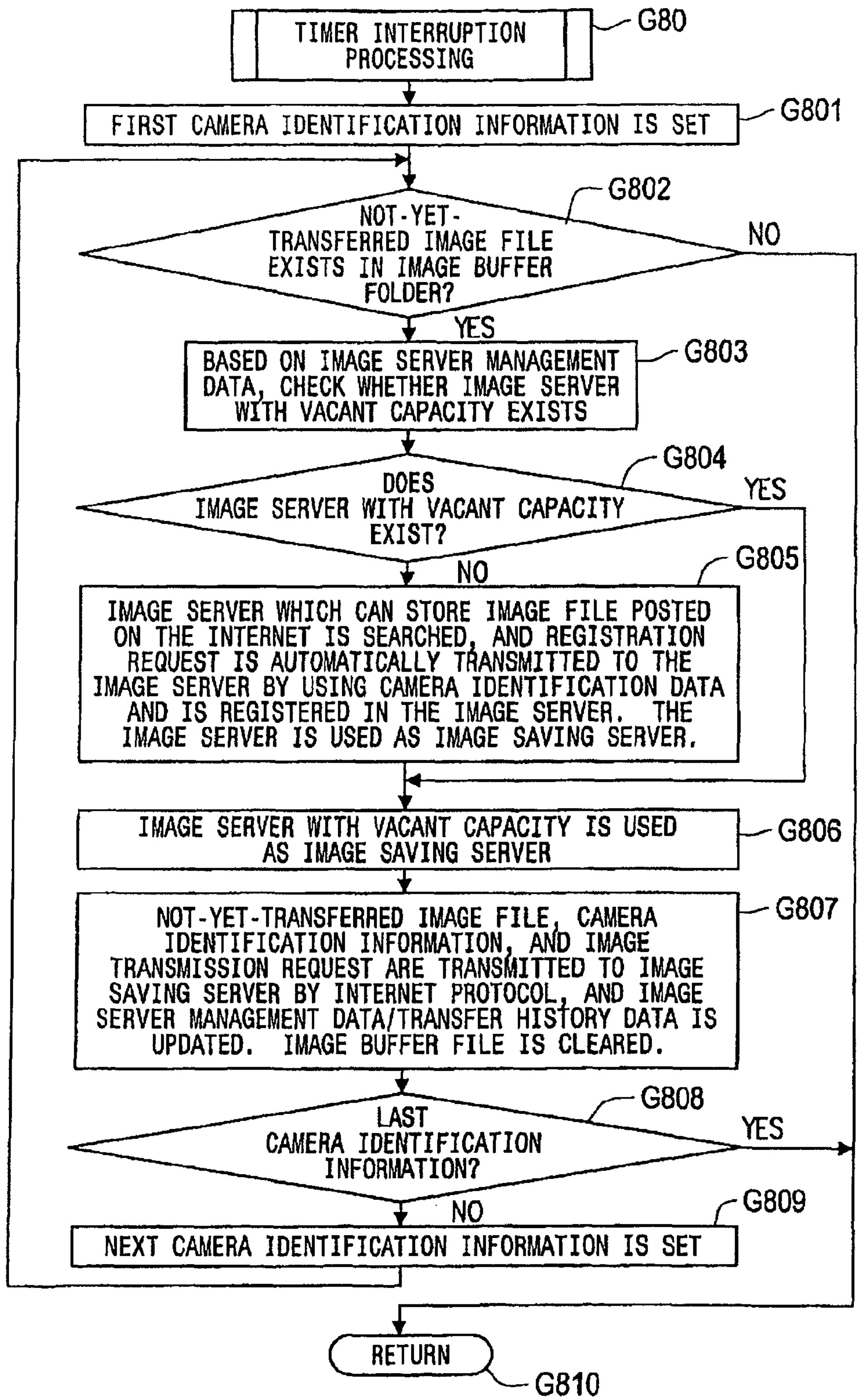

FIG. 196 is subroutine flow chart.

Figure 197:
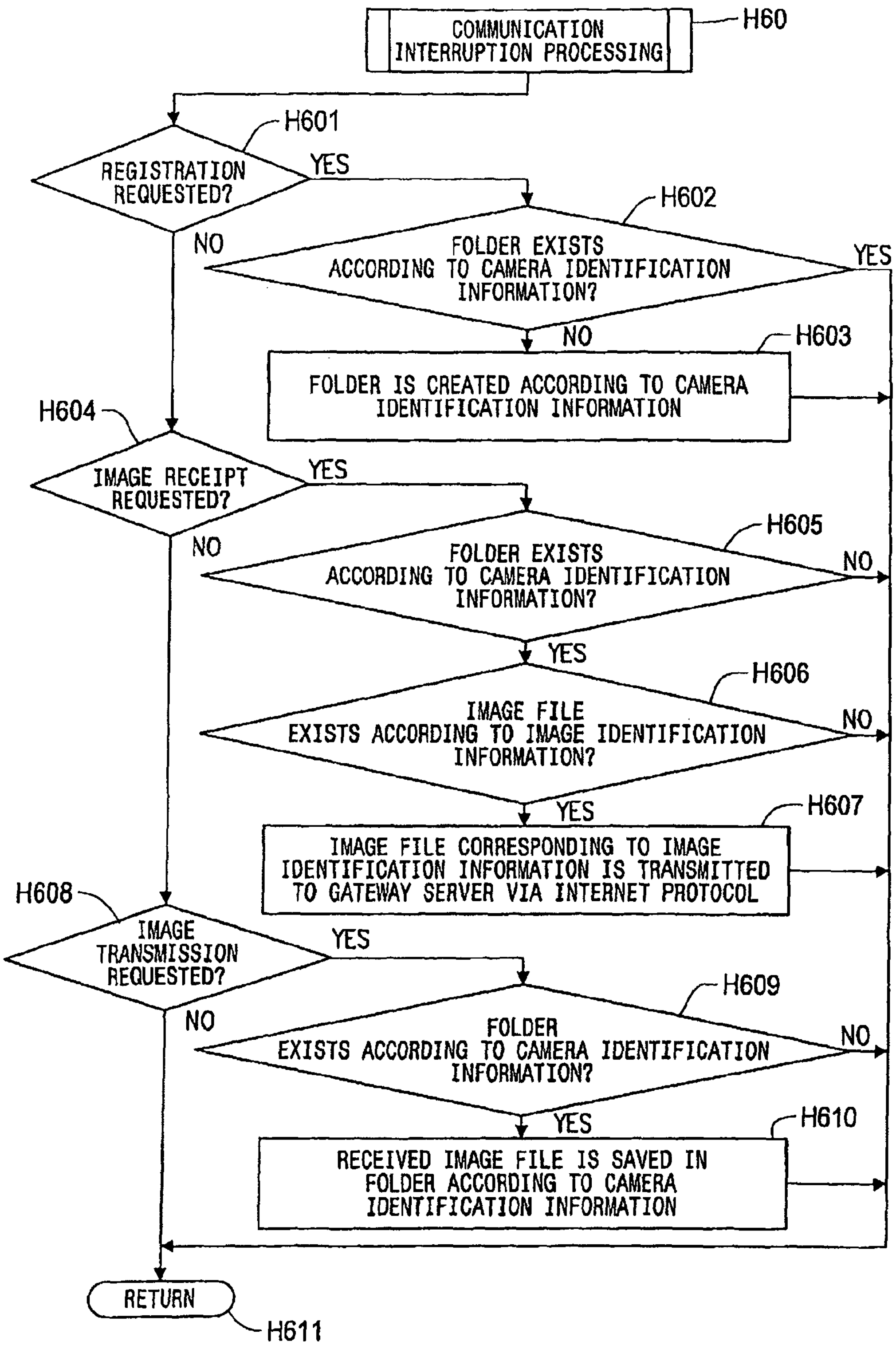

FIG. 197 is subroutine flow chart.

Figure 198:
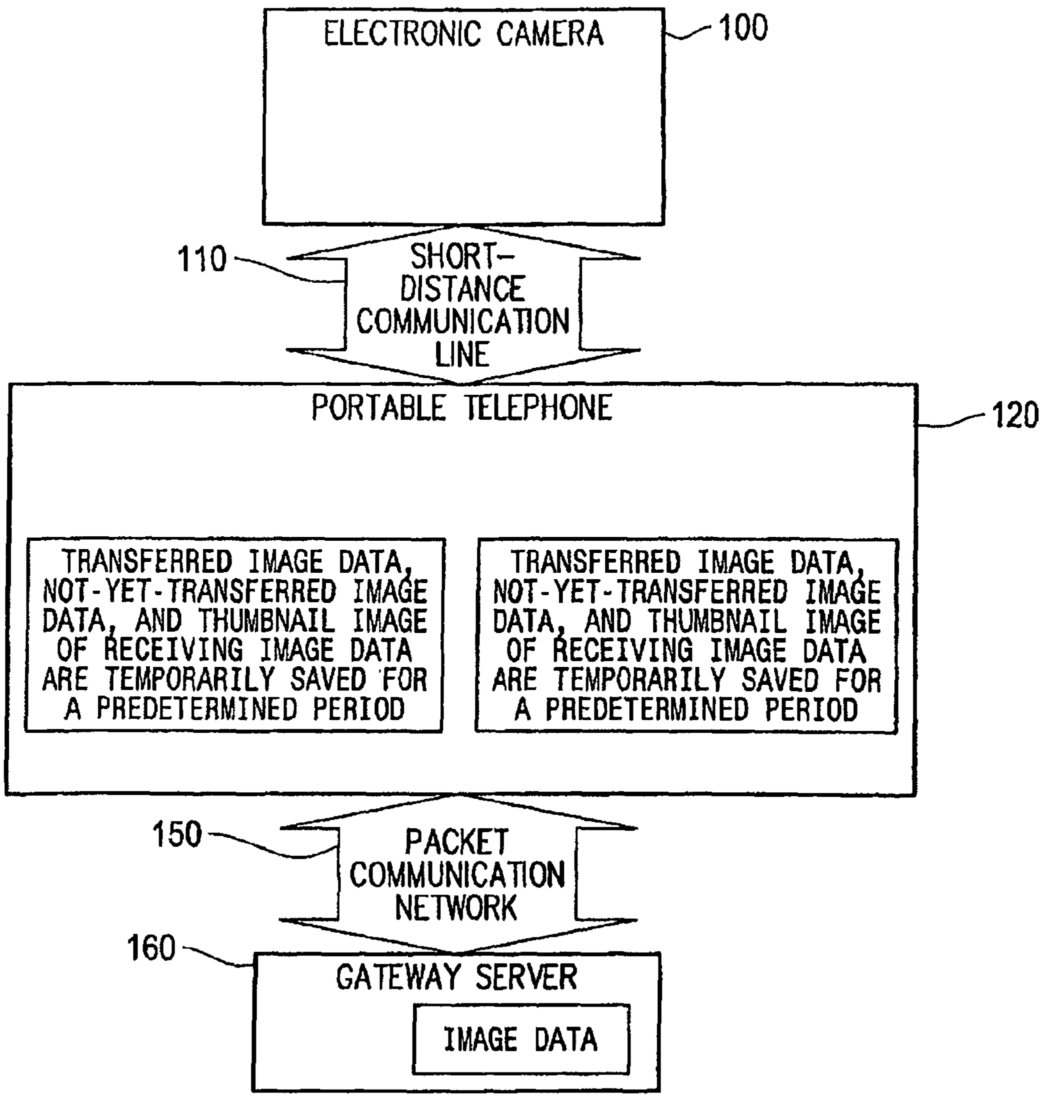

FIG. 198 is a conceptual drawing of an image transmission system.

Figure 199:
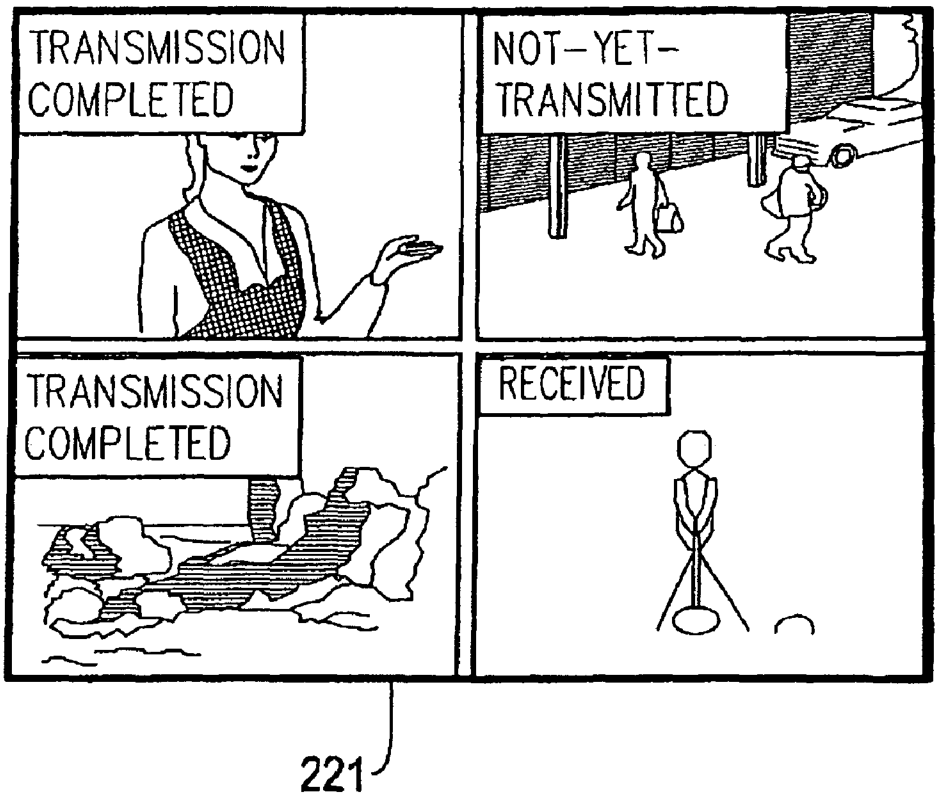

FIG. 199 is a screen display example.

Figure 200:
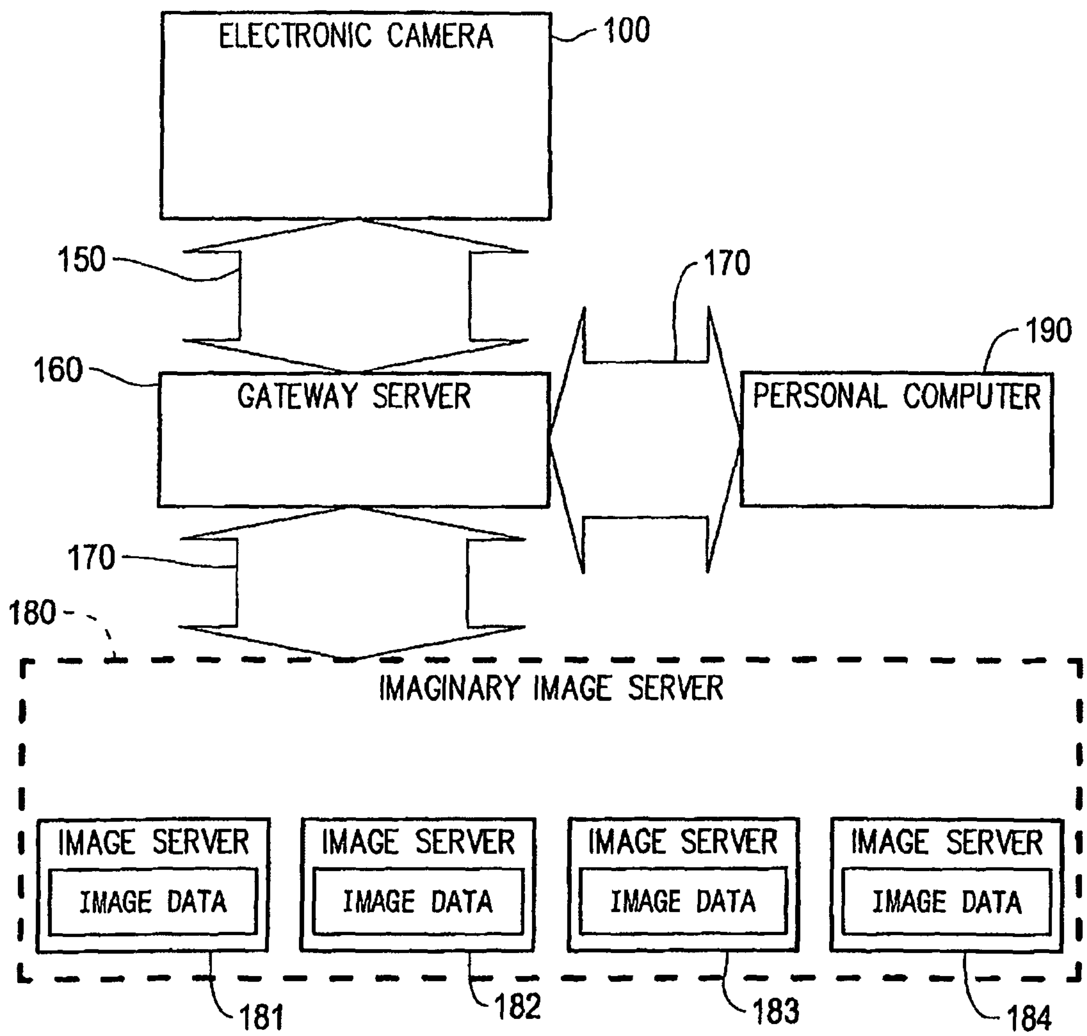

FIG. 200 is a conceptual drawing of an image transmission system.

Figure 201:
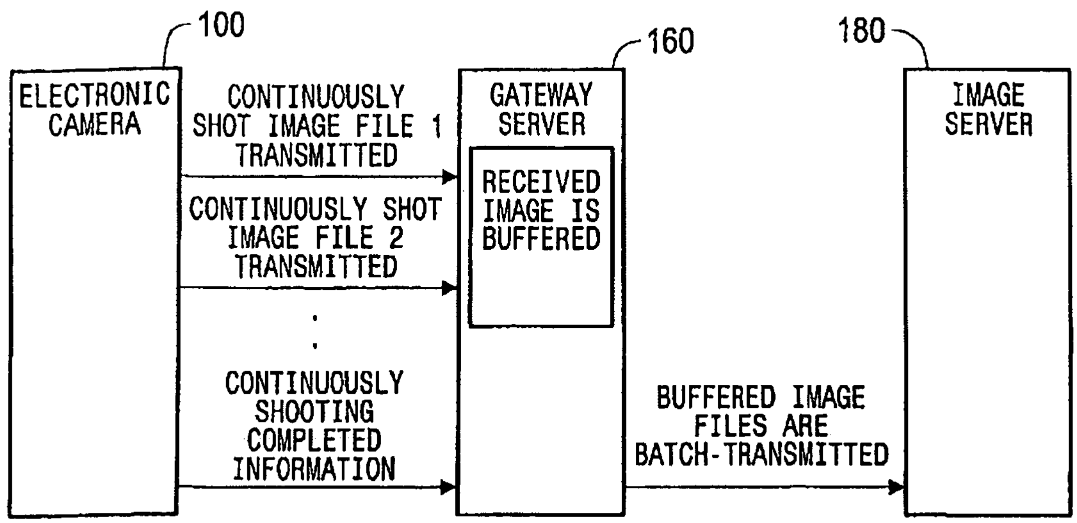

FIG. 201 is an explanatory drawing of the operation of image transmission.

Figure 202:
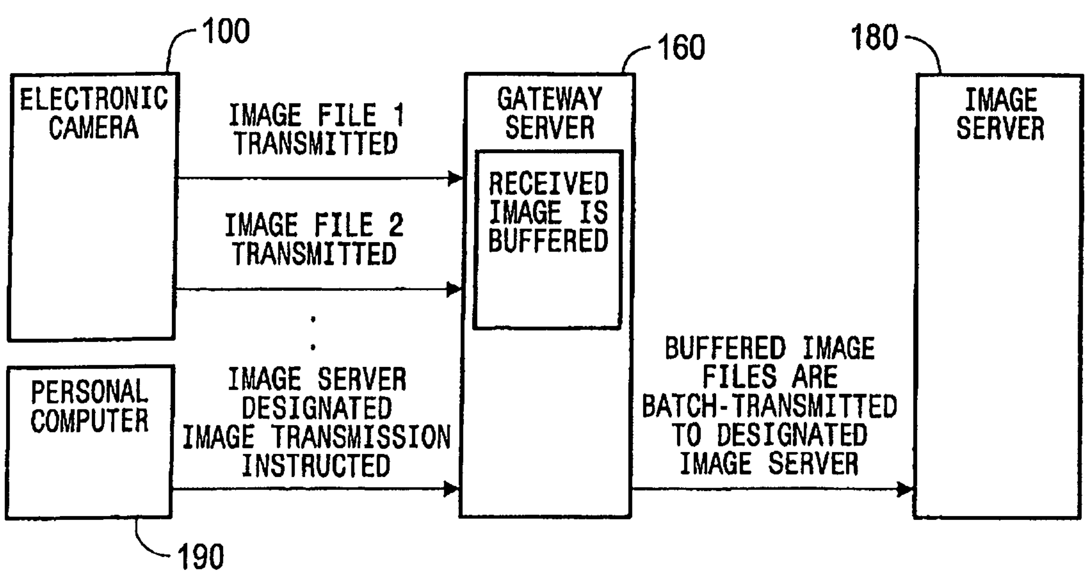

FIG. 202 is an explanatory drawing of the operation of image transmission.

Figure 203:
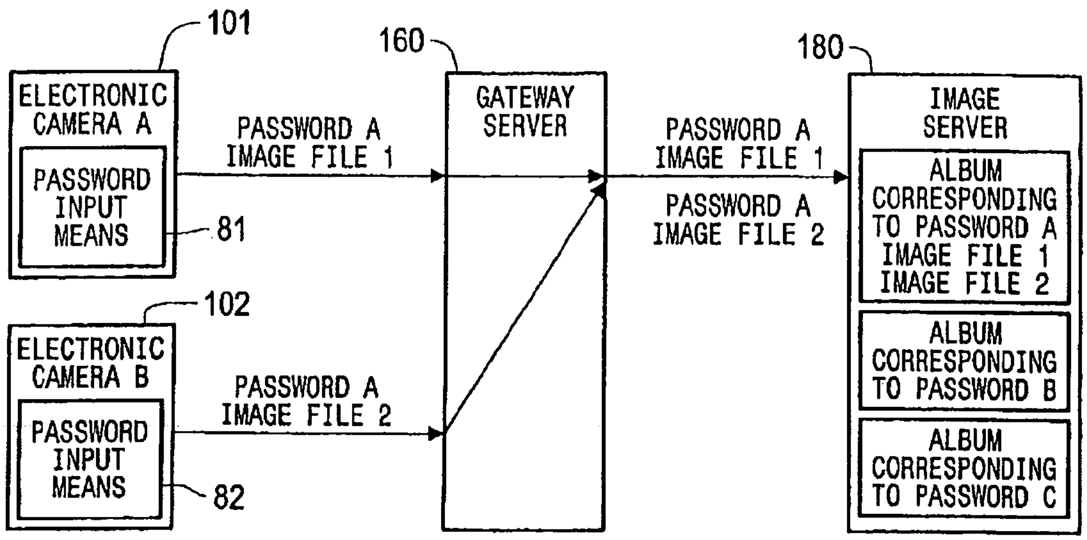

FIG. 203 is an explanatory drawing of the operation of image transmission.

Figure 204:
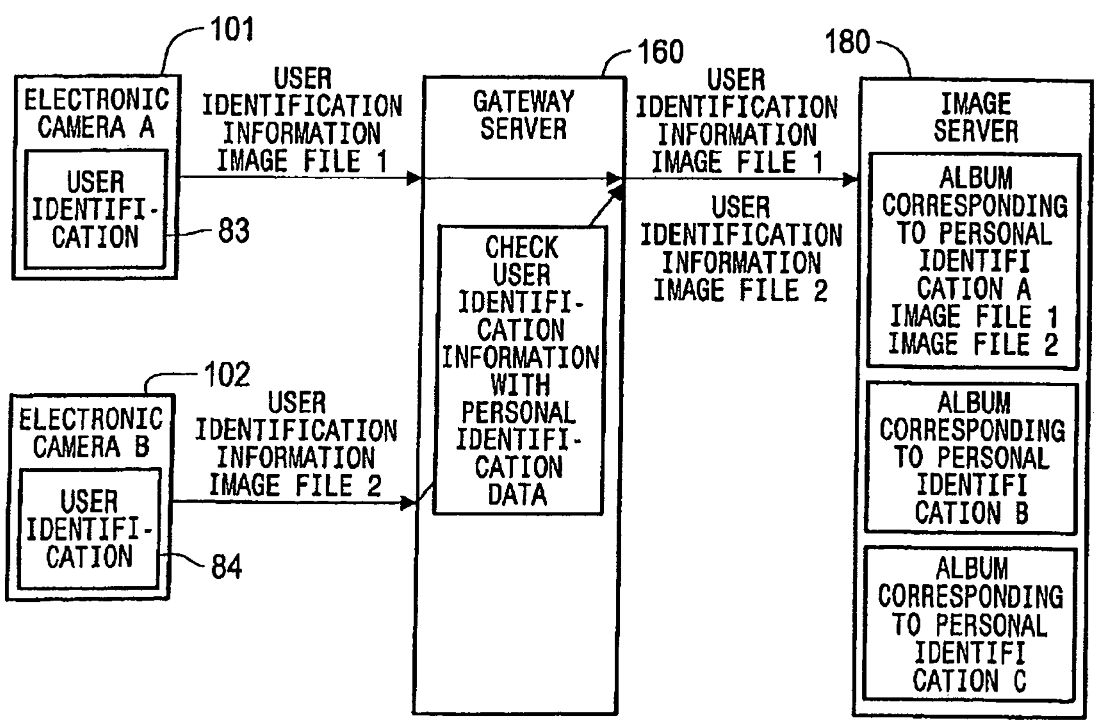

FIG. 204 is an explanatory drawing of the operation of image transmission.

Figure 205:
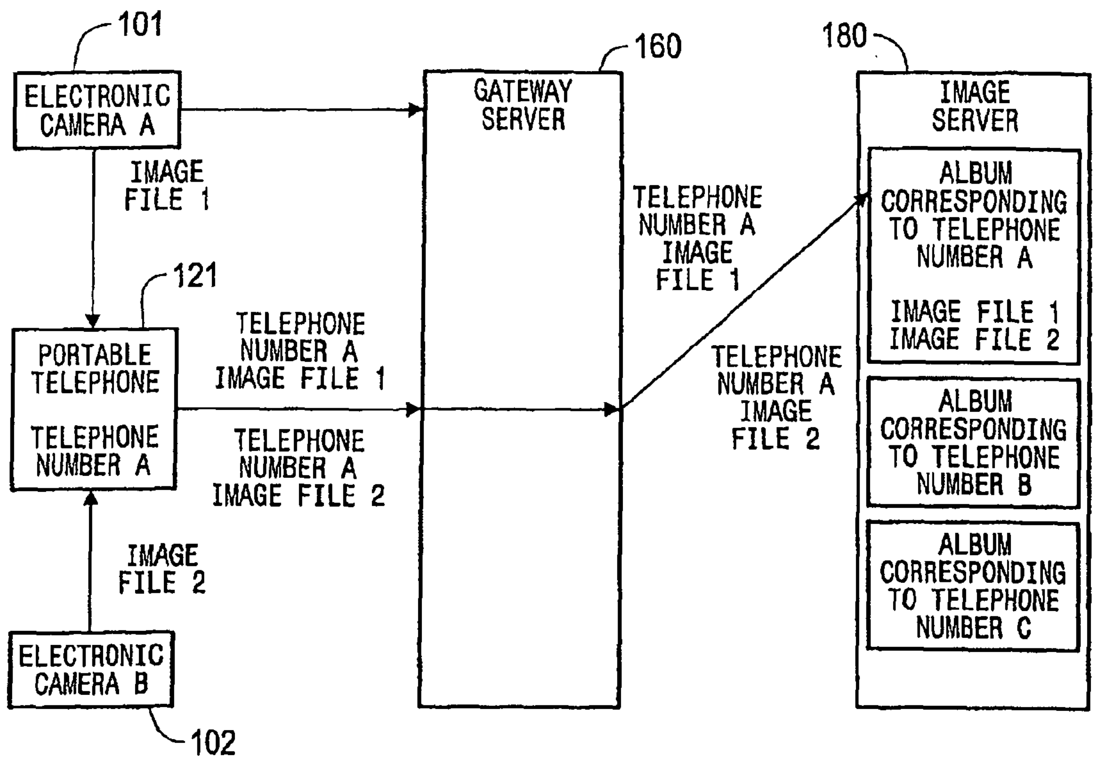

FIG. 205 is an explanatory drawing of the operation of image transmission.

DETAILED DESCRIPTION OF PREFERRED EMBODIMENTS

Figure 1:
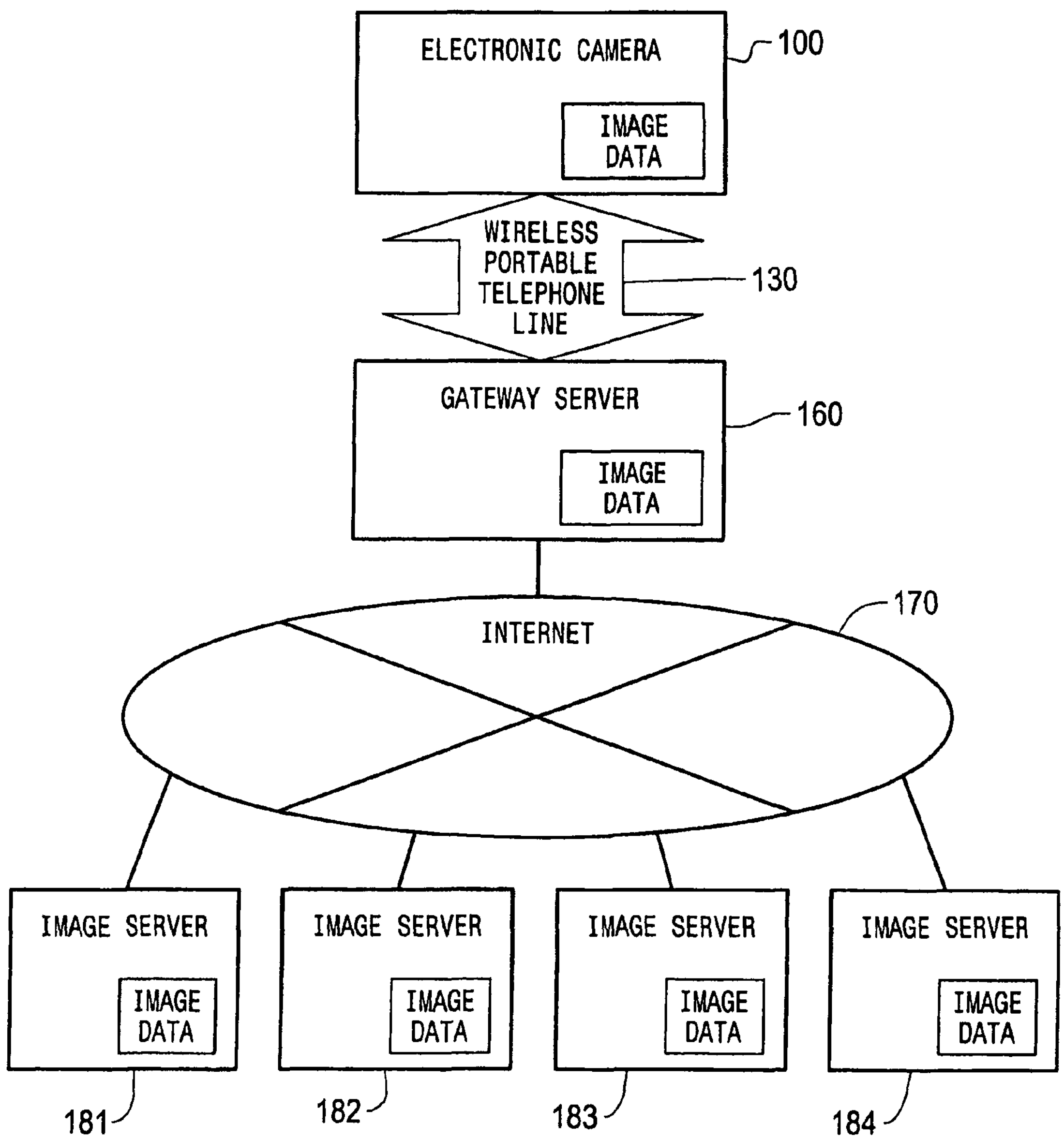
FIG. 1 is a conceptual drawing of an image transmission system.

Below, modes of embodiment of the present invention are described with reference to the drawings. FIG. 1 is a conceptual drawing of an image data transmission system applying the present invention. First, the case of transmitting image data from an electronic camera 100 to image servers 181 through 184 on the Internet 170 will be described. The electronic camera 100 has a built-in wireless portable telephone function. Using the wireless portable telephone function, the electronic camera 100 transmits image data (an image file) generated by a capture operation to a gateway server 160 via a wireless portable telephone link 130 immediately after the image is captured. Here, the electronic camera 100 sends the image file, camera identification information for identifying the individual electronic camera 100, and user identification information for identifying the user using the electronic camera 100 to the gateway server 160, and does not send the image identification information for identifying the image file or image server identification information for designating the image server 181 through 184 that will store the image file.

The gateway server 160 has a built-in wireless portable telephone function, and upon receiving the image file, camera identification information and user identification information from the electronic camera 100 by means of the wireless portable telephone function, it appends image identification information (an image file name) to the image file, selects an image server having a album with available capacity corresponding to the user identification information from among image servers 181 through 184, connects to the image server via the Internet 170, and transmits the image file received from the electronic camera 100, the user identification information and image identification information using Internet protocol. The image server selected from among image servers 181 through 184 by the gateway server 160 has an album (image file storage memory region) corresponding to the user identification information, receives the image file, user identification information and image identification information from the gateway server 160 using Internet protocol, and associates and stores the received image file and image identification information in an album corresponding to the received user identification information.

If there is no image server that has an album with available capacity corresponding to the user identification information among the image servers 181 through 184, the gateway server 160 sets up an album corresponding to the user identification information on a new image server using the personal identification data stored in association with the user identification information, and causes the received image file to be stored in that album. Furthermore, the gateway server 160 transmits the image identification information assigned to the image file and the image server identification information of the image server where the image file was stored to the electronic camera 100 using the portable wireless telephone function, and the electronic camera 100 stores the image identification information and image server identification information. Moreover, the gateway server 160 stores the image server identification information of the server where the image file was stored in association with the image identification information.

Next, the case where the electronic camera 100 receives image data (an image file) from one of the image servers 181 through 184 will be described. First, the electronic camera 100 transmits the image identification information of the image file it wishes to read, the camera identification information and the user identification information by means of the wireless portable telephone function via a wireless portable telephone link 130 to the gateway server 160. Here, image server identification information for designating an image server 181 through 184 where the image file is stored is not sent.

Upon receiving the image identification information, camera identification information and user identification information from the electronic camera 100 by means of the wireless portable telephone function, the gateway server 160 specifies the image server where the image file corresponding to the image identification information is stored based on memorized data, connects to that image server via the Internet 170, and transmits, using Internet protocol, the image identification information and user identification information received from the electronic camera 100. The image server from among image servers 181 through 184 with that the gateway server 160 established a connection identifies the image file corresponding to the received image identification information from the album corresponding to the user identification information and transmits the image file to the gateway server 160 using Internet protocol. The gateway server 160 transmits the image file received from the image server to the electronic camera 100 using the wireless telephone function, and the electronic camera 100 displays the received image file.

Figure 2:
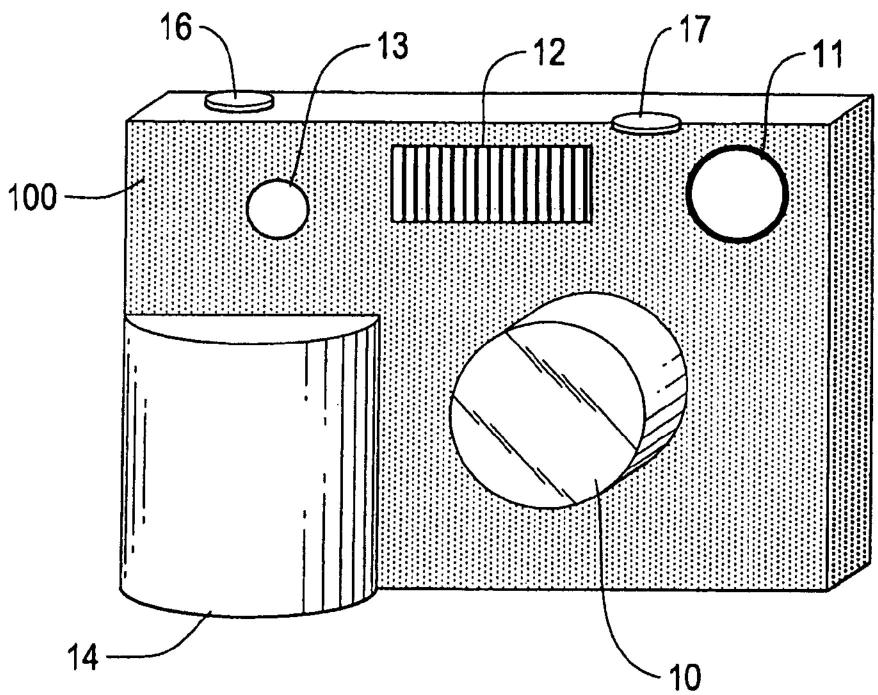
FIG. 2 is an external view (front view) of an electronic camera.
Figure 3:
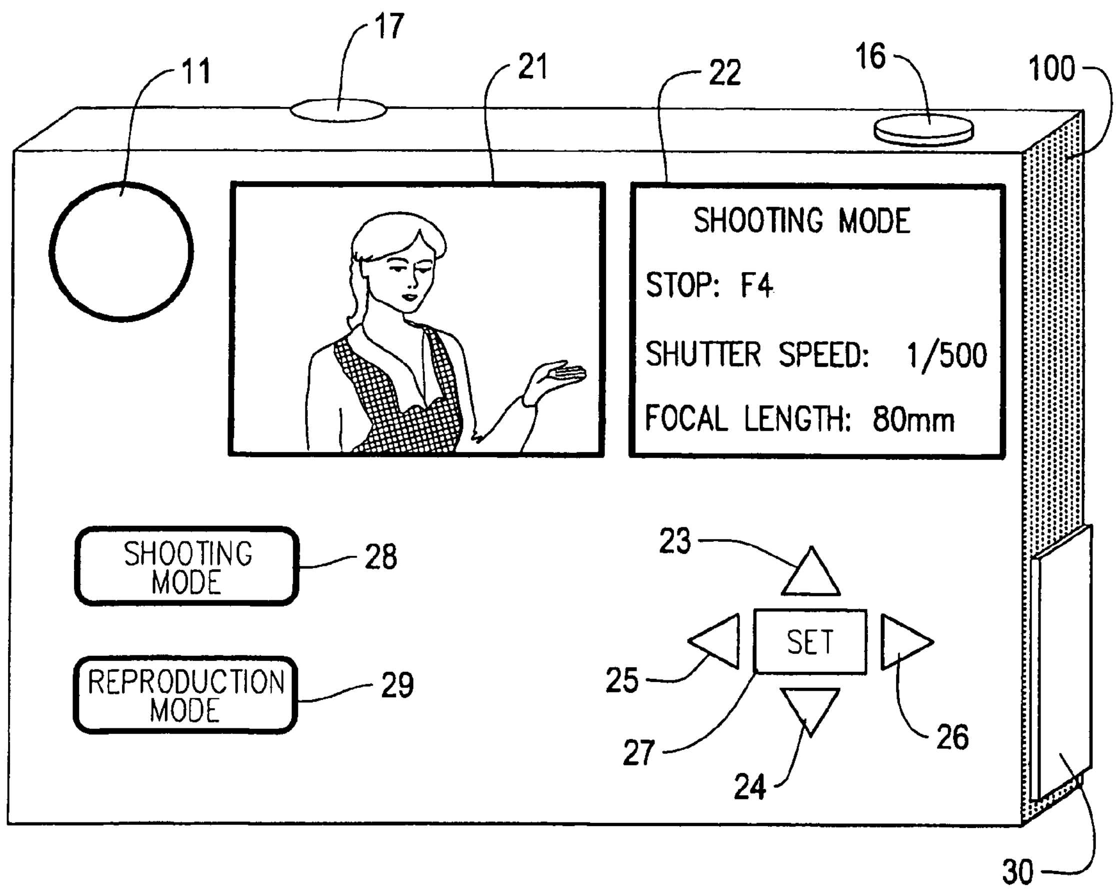
FIG. 3 is an external view (rear view) of an electronic camera.

FIG. 2 and FIG. 3 are external views (front view and rear view) of a mode of embodiment of the electronic camera 100 used in an image data transmission system applying the present invention. As shown in FIG. 2, a photographic lens 10 for forming a subject image, a finder 11 for confirming the frame, a strobe 12 for illuminating the subject when a photograph is taken, a photometric circuit 13 for detecting the brightness of the subject, and a grip 14 extending from the camera housing for making it easier for the user hold the electronic camera 100 in his or her hands are provided at the front of the electronic camera 100, and a release button 16 and a power switch 17 for turning the power supply to the electronic camera 100 on and off are provided at the top.

As shown in FIG. 3, the eyepiece of the finder 11, a left LCD (left screen) 21 comprising a substantially rectangular screen for text and image display, and a right LCD (right screen) 22 comprising a substantially rectangular screen for text and image display are arranged at the rear of the electronic camera 100; an UP button 23, a DOWN button 24, LEFT button 25, RIGHT button 26 and SELECT button 27, used for image switching and the like, are arranged below the right LCD 22, and a capture mode button 28 for putting the electronic camera 100 into capture mode and a playback mode button 29 for putting the electronic camera 100 into playback mode are arranged below the left LCD 21. A memory card slot 30 for installing memory cards 77 (removable storage media) used for storing user identification information and thumbnail images is provided at the side.

The release button 16, UP button 23, DOWN button 24, LEFT button 25, RIGHT button 26, SELECT button 27, capture mode button 28 and playback mode button 29 are all control keys operated by the user.

A so-called touch screen 66, equipped with a function of outputting contact position information corresponding to the position indicated by a finger touch operation is arranged over the left LCD 21 and the right LCD 22, which can be used for selection of image data and options displayed on the screen.

This touch screen 66 is made of a transparent material such as glass or resin, allowing the user to view the image or text formed on the inside of the touch screen 66 through the touch screen 66.

Figure 4:
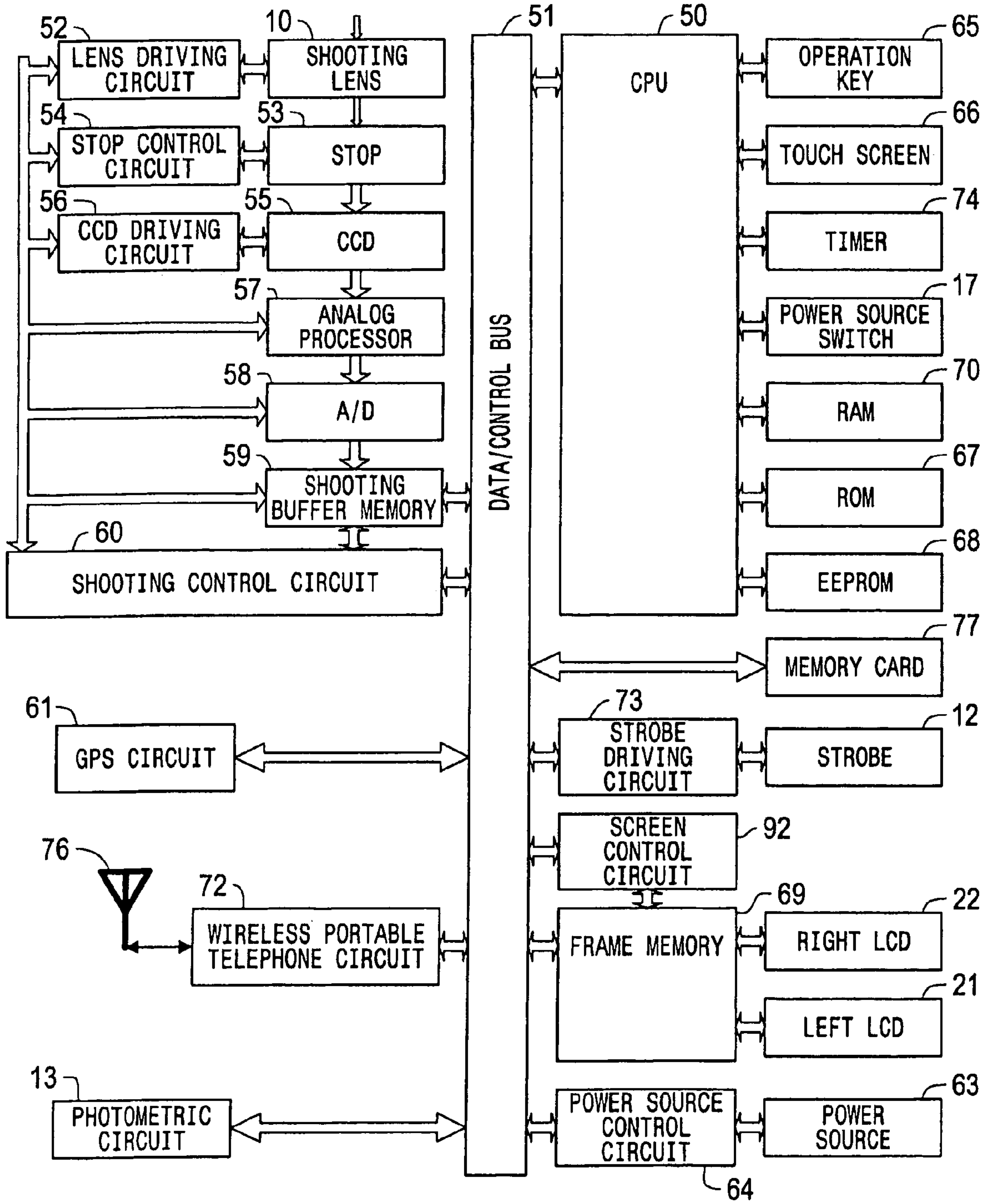
FIG. 4 is a block diagram showing the electrical configuration of an electronic camera.

FIG. 4 is a block diagram showing an example of the internal electrical configuration of the electronic camera 100 shown in FIGS. 2 and 3, whereby the constitutive elements are connected to each other via a data/control bus 51 for transmitting various types of informational data and control data. The various constitutive elements can be roughly divided into a block centered on the capture control circuit 60 that executes image data capture operations, a block of the memory card 77 that stores image files, a block centered on the screen control circuit 92 that executes the display of image data and associated information, and a block centered on the CPU 50, which performs overall control of the user interface such as the control keys 65 and of the various control circuits.

The CPU 50 (central processing unit) is the means that controls the entire electronic camera 100, issuing various instructions to the capture control circuit 60, screen control circuit 92 and power control circuit 64 in accordance with input information from the control keys 65, touch screen 66, power switch 17, timer 74 and photometric circuit 13. The photometric circuit 13 measures the brightness of the subject and outputs the photometric data that is the result of this measurement to the CPU 50. The CPU 50 sets the exposure time and sensitivity of the CCD 55 according to the photometric data by means of the CCD drive circuit 56, and controls the value of the diaphragm 53 by means of the diaphragm control circuit 54 via the capture control circuit 60 in accordance with the data of those settings.

In capture mode, the CPU 50 controls the capture operation via the capture control circuit 60 in accordance with the manipulation of the release button 16. Furthermore, if the subject is dark based on the photometric data, the CPU 50 causes the strobe 12 to emit light via the strobe drive circuit 73 when taking a picture. The timer 74 has a built-in clock circuit and finds the date and time information corresponding to the current date and time and provides the capture date and time information to the CPU 50 when a picture is taken or makes interrupt processing requests to the CPU 50 at preset intervals. The CPU 50 controls the various units according to a control program stored in ROM 67 (read-only memory). The EEPROM 68 (electrically erasable programmable ROM) is a non-volatile memory that stores settings information, etc. required for the operation of the electronic camera 100. The RAM 70 is a volatile memory that is used as a temporary working area of the CPU 50. The CPU 50 detects the state of manipulation of the power switch 17 and controls the power supply 63 via a power supply control circuit 64.

The capture control circuit 60 performs focusing and zooming of the photographic lens 10 by means of a lens drive circuit 52, controls the exposure of the CCD 55 by controlling the diaphragm 53 by means of the diaphragm control circuit 54, and controls the operation of the CCD 55 by means of a CCD control circuit 56. Light beams from the subject are formed by the photographic lens 10 into a subject image over the CCD 55 after passing through the diaphragm 53 to adjust the amount of light, and this subject image is picked up by the CCD 55. The CCD 55 (charge coupled device), which comprises a plurality of pixels, is a charge accumulation type image sensor used for picking up a subject image, and outputs electrical image signals corresponding to the strength of the subject image formed on the CCD 55 to an analog processing unit 57 in accordance with drive pulses provided by the CCD drive circuit 56.

The analog processing unit 57 samples the image signal, which has undergone photoelectric conversion by the CCD 55, with a specific timing, and amplifies the sampled signal to a specific level. An A/D conversion circuit 58 (analog/digital conversion circuit) digitizes the image signal sampled by the analog processing unit 57, thereby converting it to digital data, which is temporarily stored in capture buffer memory 59.

In capture mode, the capture control circuit 60 repeats the operation described above, while the screen control circuit 92 repeats the through-image display operation of reading out the digital data stored successively in the capture buffer memory 59 via the data/control bus 51, storing it temporarily in the frame memory 69, converting the digital data into image data for display, storing it again in frame memory 69, and displaying the image data for display on the left screen 21. Furthermore, the screen control circuit 92 obtains text display information from the CPU 50 as required, converts it to text data for display and stores it in the frame memory 69, and displays the text data for display on the left screen 21 and right screen 22. In this way, in capture mode, the image picked up by the CCD 50 is displayed in real time on the left screen 21, making it possible to use this through-image as a monitor screen to make the composition settings for taking a picture. The capture control circuit 60 analyzes the extent of the high frequency component of the digital data stored in the capture buffer memory 59 and detects the state of focus adjustment of the photographic lens 10, and performs focus adjustment of the photographic lens 10 by means of the lens drive circuit 52 in accordance with the detection results.

At the time of release, upon receiving a capture instruction from the CPU 50, the capture control circuit 60 causes the subject image to be picked up by the CCD 55 via the CCD drive circuit 56, passes the image signal generated by the image pickup through analog processor 57 and the AID conversion circuit 58 and temporarily stores it as digital data (raw data) in the capture buffer memory 59. The capture control circuit 60 converts or compresses the digital data stored temporarily in the capture buffer memory 59 into a specific recording format (JPEG, etc.) to form the image data. The CPU 50 generates thumbnail image data (image data with compressed data volume or scaled-down image information) corresponding to the aforementioned image data and stores it the memory card 77, as well as generating an image file by appending specific appended informational data to the aforementioned image data. Next, the CPU 50 connects to the gateway server 160 by means of the wireless portable telephone circuit 72 based on gateway server access information stored in the EEPROM 68, and transmits the aforementioned image file, the camera identification information stored in the EEPROM 68 and the user identification information stored in the memory card 77 to the gateway server 160 by means of the wireless portable telephone circuit 72 through the antenna 76. Subsequently the CPU 50 receives the image identification information of the image file assigned by the gateway server 160, and the image server identification information of the image server where the image file was stored, from the gateway 160 by means of the wireless portable telephone circuit 72, and stores that information in the memory card 77.

A GPS circuit 61 (global positioning system circuit) detects the location information (longitude data and latitude data) for the electronic camera 100 using information from multiple satellites orbiting around the earth, and provides the capture location information to the CPU 50 at the time of image capture. The CPU 50 appends the capture location information to the image data and stores it in the memory card 77.

In playback mode, the CPU 50 first reads the thumbnail image data stored in the memory card 77 and stores it temporarily in the frame memory 69, and displays the thumbnail image data on the left screen 21 by means of the screen control circuit 92. The CPU 50 next transmits the image identification information corresponding to the thumbnail image data selected by the user, the camera identification information and the user identification information by means of the wireless portable telephone circuit 72 through antenna 76 to the gateway server 160. Subsequently, the CPU 50 receives the image file corresponding to the image identification information transmitted to the gateway server 160 from the gateway server 160 by means of the wireless portable telephone circuit 72, temporarily stores the image data contained in the image file in the frame memory 69, and displays the image data on the left screen 21 by means of the screen control circuit 92.

Figure 5:
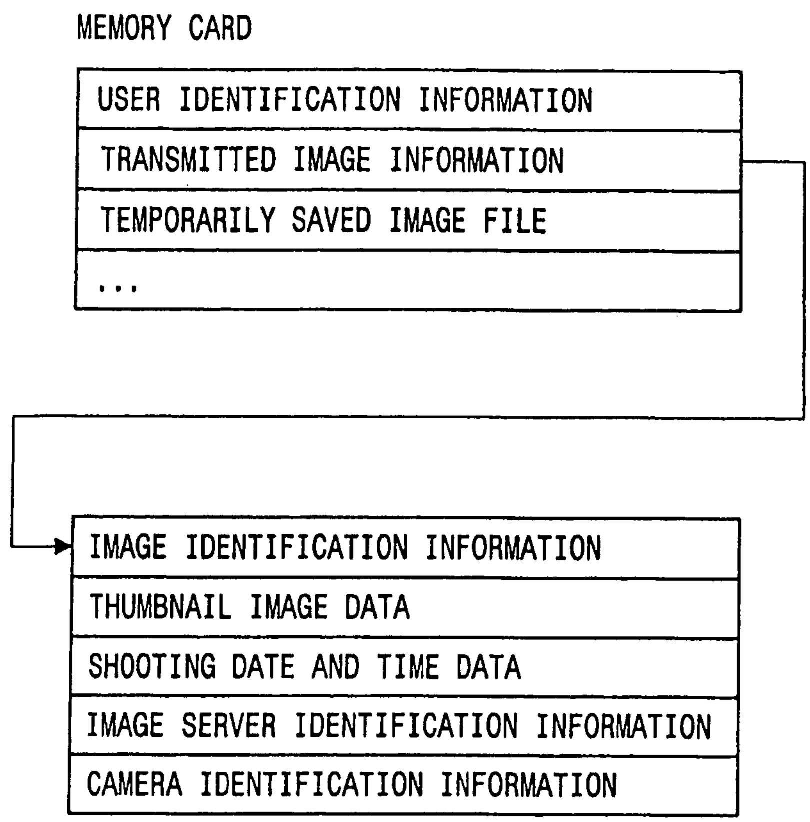
FIG. 5 is a diagram of the data of a memory card.

FIG. 5 shows the configuration of the data stored in the memory card 77. By installing a memory card 77 customized on a per-user basis into the electronic camera 100, even if the user uses different electronic cameras, it is possible to obtain a usage environment that is no different than if the same electronic camera was used. As shown in FIG. 5, the memory card 77 stores the user identification information (ID number or other information for individually identifying users), transmitted image information (information on image files transferred to an image server), and image files stored temporarily due to an impossibility of transfer to an image server. The transmitted image information, as shown in FIG. 5, consists of image identification information for transmitted image files (image file names assigned by the gateway server 160, etc.), thumbnail image data (image data obtained by compressing the volume of the original image data for small screen display) corresponding to the image data, image capture date and time data, image server identification information for identifying the image server where an image file is stored, camera identification information for identifying the electronic camera that captured an image, etc.

FIG. 6 shows the configuration of data of image files stored on an image server or held temporarily in the memory card 77. As shown in FIG. 6, each image file is made up of image data and appended informational data. The appended informational data consists of image identification information, camera identification information, user identification information, capture data that indicates the various settings at the time of image capture, capture date and time data, and capture location data. FIG. 7 is a drawing that shows the configuration of information stored in the EEPROM 68, which consists of camera identification information for identifying the individual electronic camera 100 and gateway server access information used by the electronic camera 100 to access a predetermined gateway server 160 (phone number, etc.).

Figure 8:
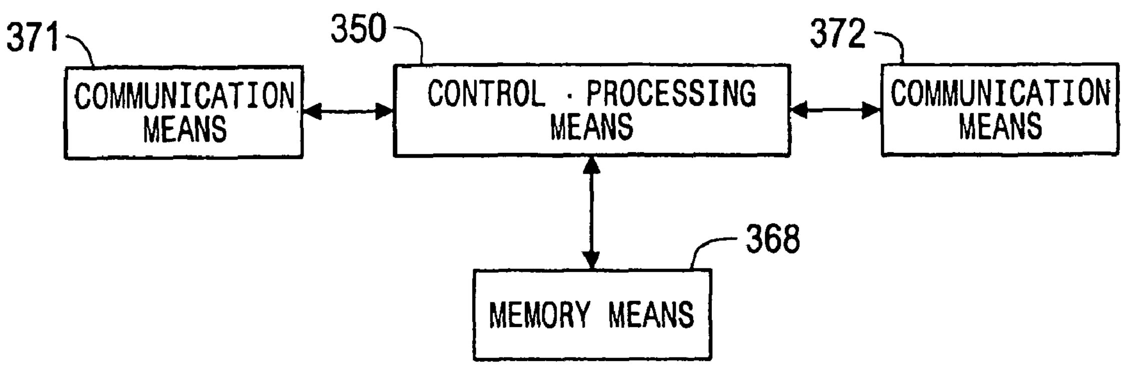
FIG. 8 is a block diagram showing the configuration of a gateway server.

FIG. 8 is a block diagram showing the internal configuration of the gateway server 160, wherein a communication means 371 comprising a wireless portable telephone function, a communication means 372 connected to the Internet, and a memory means 368 that stores various management data information are connected to a control/processing means 350 that performs overall control of the various elements of the gateway server 160. The gateway server 160 exchanges information such as image files with the electronic camera 100 using a wireless telephone link via the communication means 371, and exchanges information such as image files with the image server using Internet protocol via the communication means 372.

Figure 9:
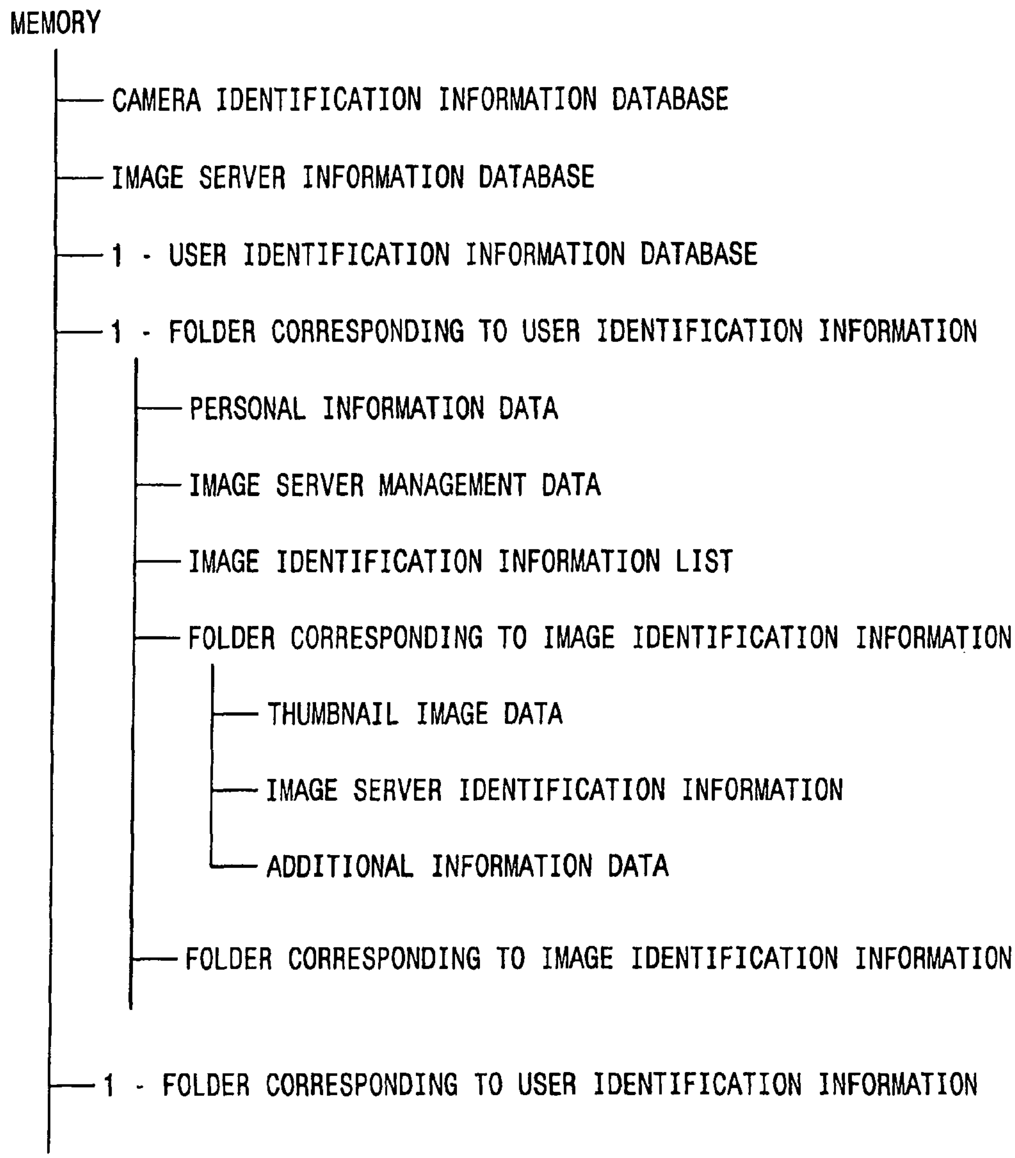
FIG. 9 is a diagram of the memory of a gateway server.

Various types of information are held in the memory means 368, as shown in FIG. 9. The camera identification information database contains the camera identification information for all electronic cameras capable of accessing the gateway server 160. The image server information database contains information relating to image servers to that the gateway server 160 can connect (URLs, conditions of use, etc.) The user identification information database contains user identification information for all users that can use the gateway server 160. User identification information is registered with the gateway server 160 from a vendor terminal or the like when the electronic camera is purchased.

Furthermore, in the memory means 368, a folder corresponding to the user identification information is prepared for each user. Each folder contains the personal information data, image server management data and an image identification information list (a list of image identification information for all image files captured by a user). Furthermore, a folder corresponding to user identification information contains separate folders for each item of image identification information corresponding to each of the image files captured by the user, and folders corresponding to an item of image identification information contain the thumbnail image data that corresponds to the image data corresponding to the item of image identification information, the image server identification information of the image server where the image file corresponding to the item of image identification information is stored, the appended informational data of the image file corresponding to the item of image identification information, etc.

Figure 10:
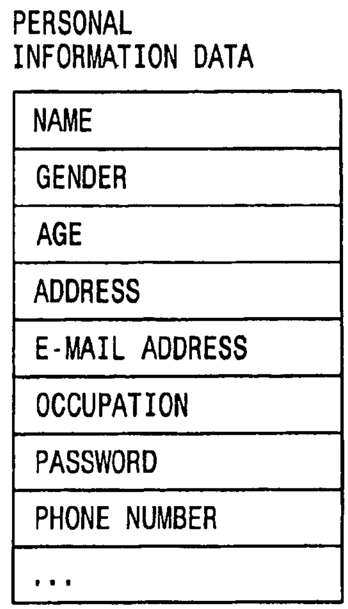
FIG. 10 is an explanatory drawing of personal identification data.
Figure 11:
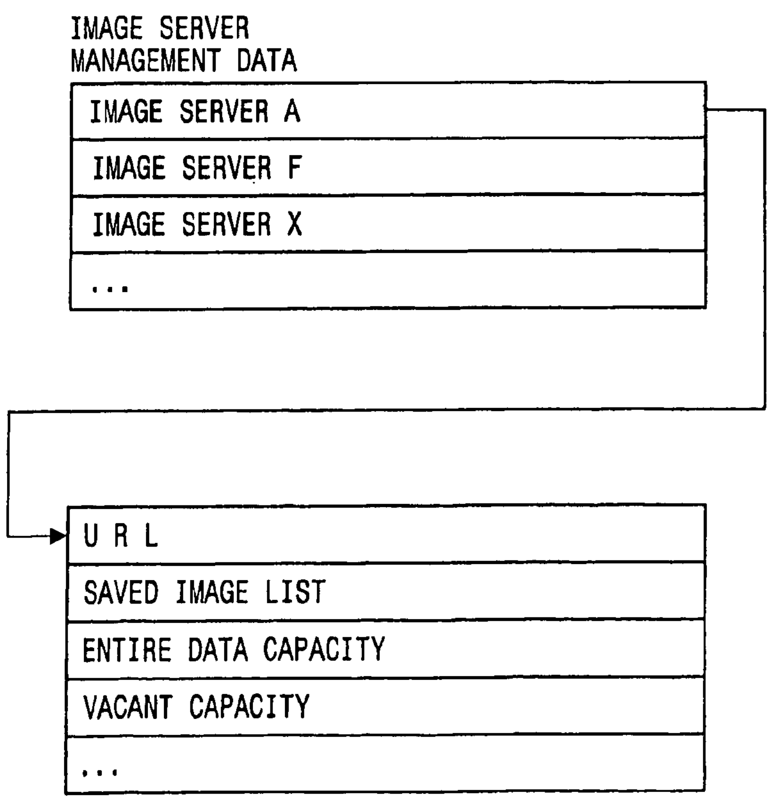
FIG. 11 is an explanatory drawing of server management data.

FIG. 10 is a diagram showing the configuration of personal information data, which consists of data needed for registering with an image server (name, sex, age, address, email address, profession, password, telephone number, etc.). It may also contain a credit card number or the like for billing for various services offered by the image server. This personal identification data can be modified as necessary from an external personal computer 190 connected to the gateway server 160. FIG. 11 is a drawing showing the configuration of image server management data, which consists of a list of image server identification information and information on individual image servers (URL: Uniform Resource Locator, a list of image identification information for image files stored in the album corresponding to the user identification information on the image server in question, total storage capacity of album corresponding to the user identification information on the image server in question, available capacity of album corresponding to the user identification information on the image server in question, and the like).

Figure 12:
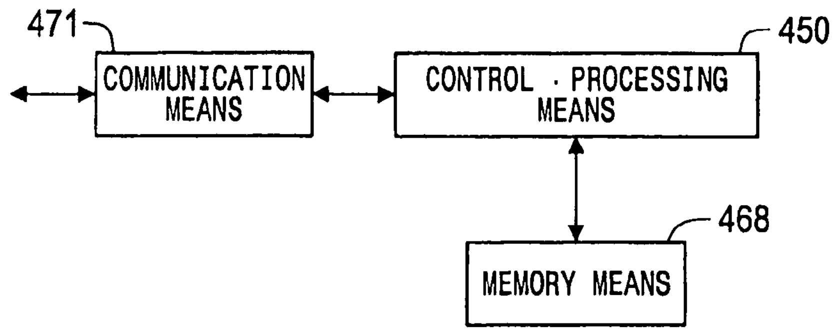
FIG. 12 is a block diagram showing the configuration of an image server.
Figure 13:
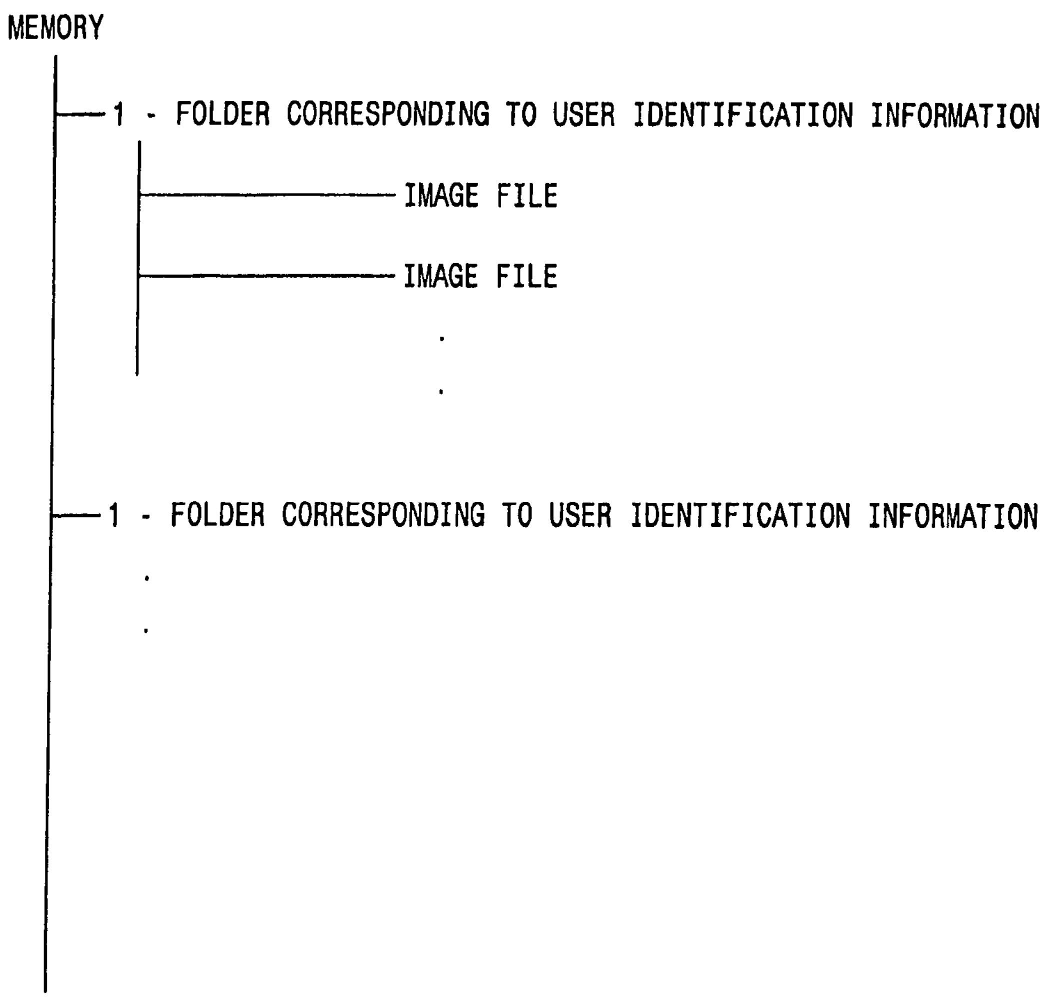
FIG. 13 is a diagram of the memory of an image server.

FIG. 12 is a block diagram showing the internal configuration of image servers 181 through 184, wherein a communication means 471 connected to the Internet and a memory means 468 that stores information such as image data are connected to the control/processing means 450 that performs overall control of the individual elements of image servers 181 through 184. Image servers 181 through 184 exchange information such as image data with the gateway server 160 via the communication means 471 using Internet protocol. In the memory means 468, a folder corresponding to each item of user identification information is prepared, as shown in FIG. 13, and image files are stored in the folders corresponding to each item of user identification information.

Figure 14:
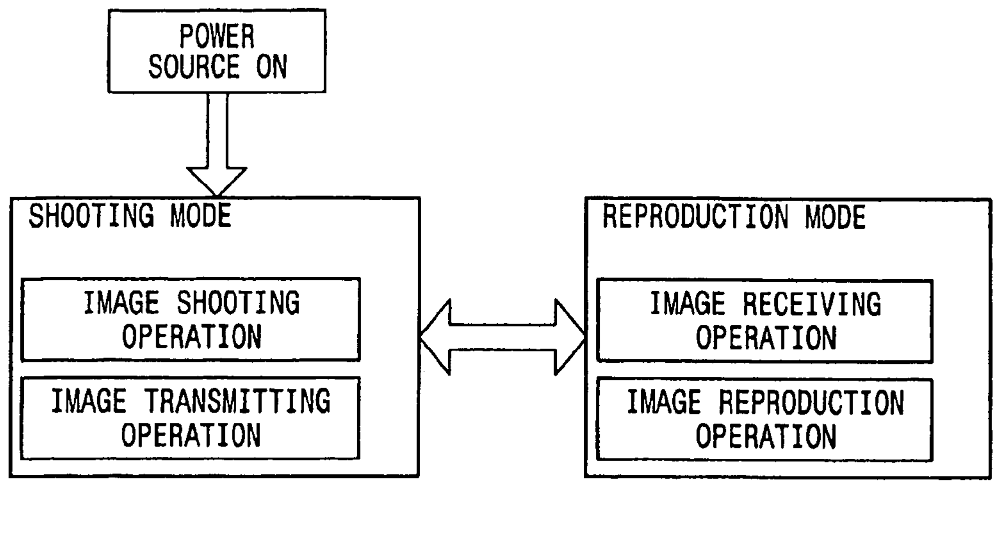
FIG. 14 is a state transition diagram for an electronic camera.

FIG. 14 is a state transition diagram for an embodiment of the electronic camera 100 according to the present invention. When power is turned on, the camera enters capture mode, and manipulating the release button 16 causes the camera to perform a capture operation and a post-capture image file creation and image transmission operation, which automatically transfers the image file via the gateway server 160 to an image server 181 through 184. In playback mode, it performs an image reception operation that downloads image files stored on image servers 181 through 184 via the gateway server 160, and an image playback operation that plays back and displays those image files. Furthermore, manipulating the capture mode button 28 causes transition from playback mode to capture mode, while manipulating the playback mode button 29 causes transition from capture mode to playback mode.

Figure 15:
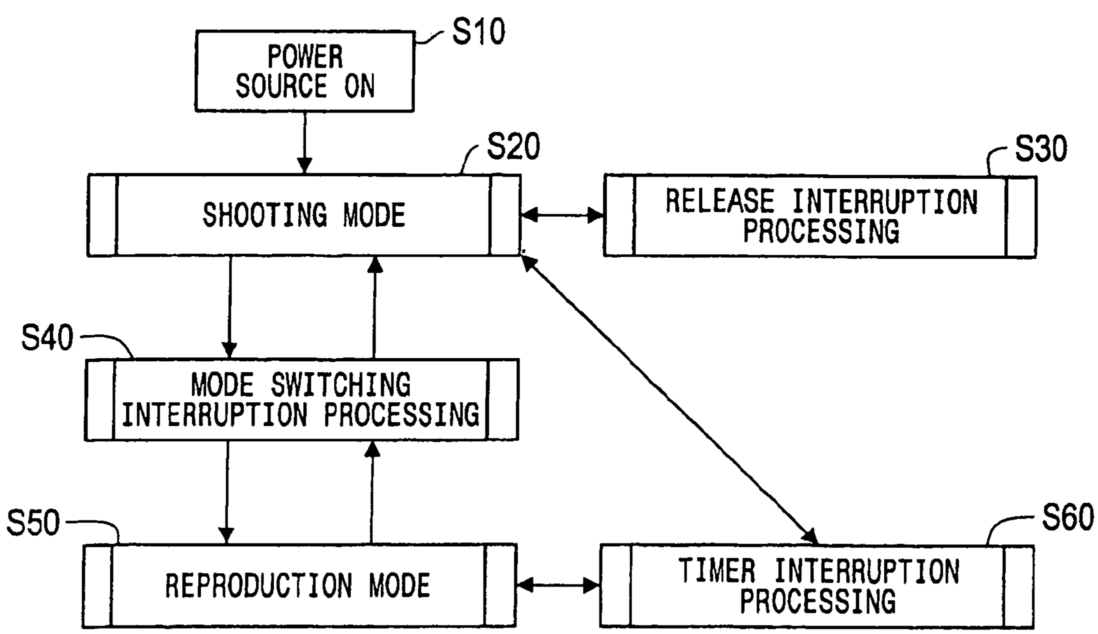
FIG. 15 is a main flow chart.

FIG. 15 is a main flow chart of the operation of the electronic camera 100 (CPU 50) in the mode of embodiment described above. First, in S10, the power supply is turned on by manipulating the power switch 17, and in S20, the capture mode subroutine is executed, leading to a capture enabled state. If the release button 16 is manipulated while in capture mode, the release interrupt handling subroutine is executed in S30, and the capture operation and image transmission operation are carried out. If the playback mode button 29 is manipulated while in capture mode, the mode switch interrupt handling subroutine is executed in S40, the playback mode subroutine is executed in S50, and an image file stored on image servers 181 through 184 is read out and played back and displayed on the left screen 21. Conversely, if the capture mode button 28 is manipulated while in playback mode, a mode switch interrupt handling subroutine is executed in S40, and the system moves to the capture mode subroutine of S20. The timer interrupt handling subroutine in S60 is executed based on interrupt requests from the timer 74, and image transmission operations are performed on the image files stored temporarily in the memory card 77.

Figure 16:
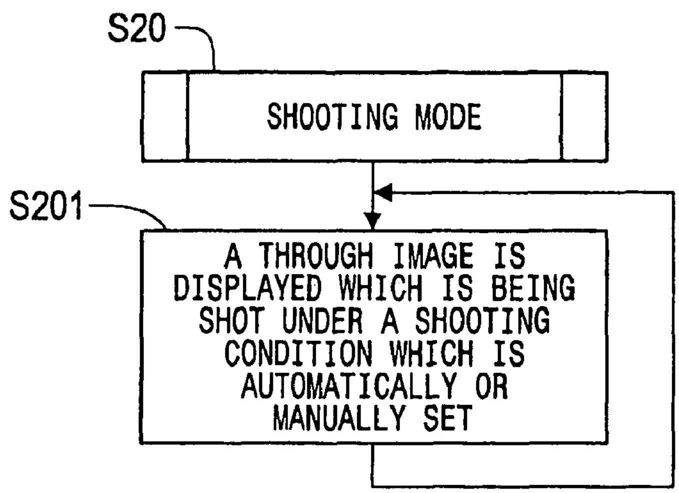
FIG. 16 is a subroutine flow chart.
Figure 17:
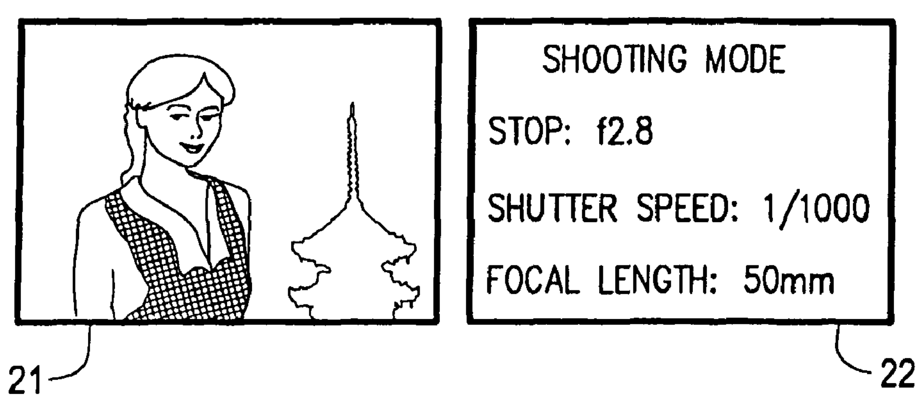
FIG. 17 is a screen display example.

FIG. 16 is a detailed flow chart of the capture mode subroutine. Starting in S30, S201 processing is repeated. The image data to be produced is, as shown in FIG. 17, displayed on left screen 21, as per the camera option conditions set by the user, by sequential CCD 55 in S201, and the photograph option conditions of that time are displayed in text on right display 22.

Figure 18:
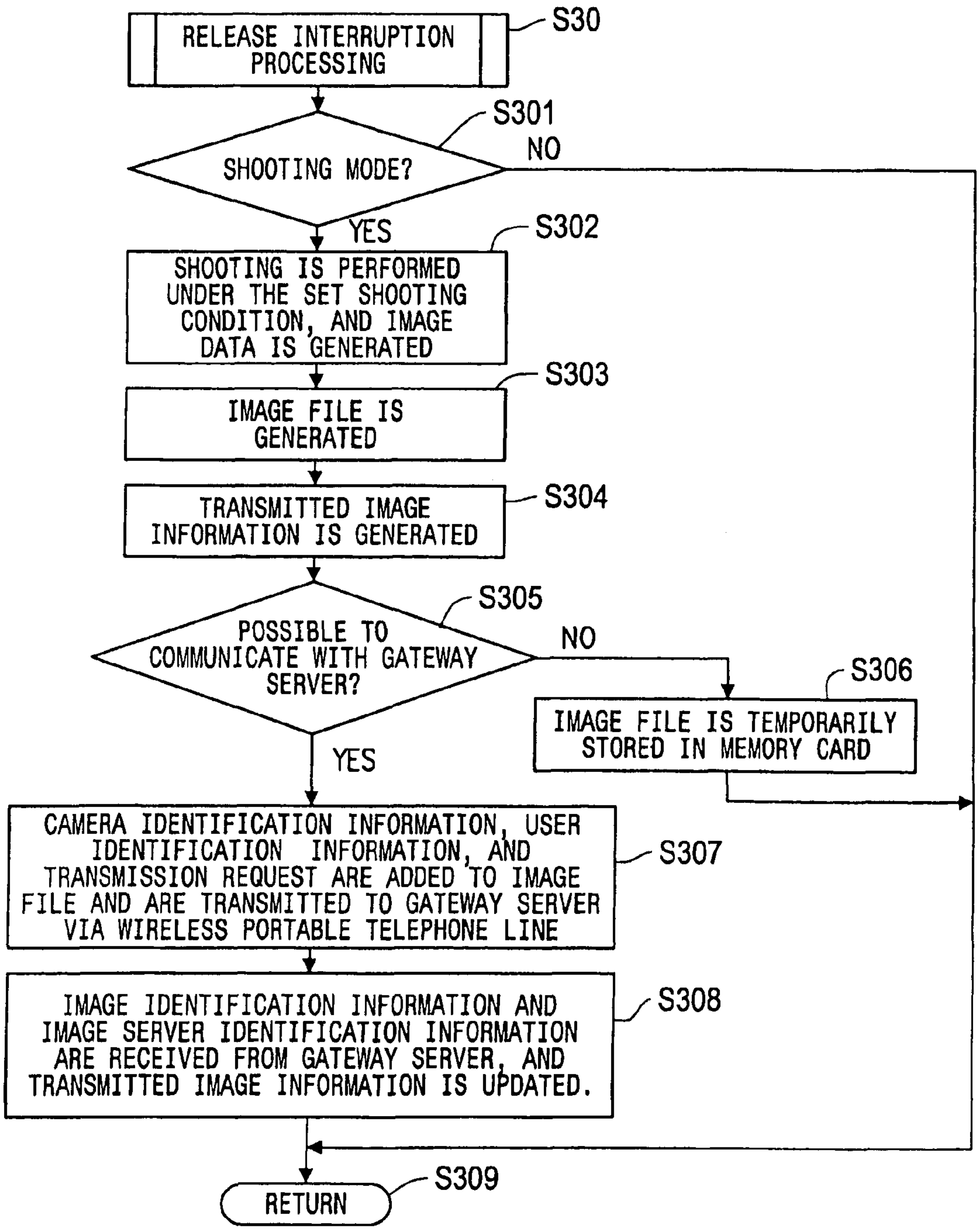
FIG. 18 is a subroutine flow chart.

FIG. 18 is a detailed flow chart of the release interrupt handling mode subroutine. Starting in S30, it is checked whether the system is in capture mode in S310, and if it is not in capture mode, the system returns in S309. If it is in capture mode, the capture operation is executed in S302 under the capture conditions set by the user or the camera to generate image data, and appended informational data (camera identification information, user identification information, capture data, time data, location data, etc.) is appended to the image data in S303 to generate an image file. In S304, transmitted image information (thumbnail image data, etc.) is generated and stored in the memory card 77. In S305, a connection to the gateway server 160 is attempted using the wireless portable telephone circuit 72 and a check is made as to whether communication is possible. If communication with the gateway server 160 is not possible, the image file is temporarily stored in the memory card 77 and the subroutine returns in S309. If communication with the gateway server 160 is possible, the image file, camera identification information, user identification information and a transmission request are transmitted to the gateway server 160 using the wireless portable telephone circuit 72 in S307. In S308, the image identification information corresponding to the image file and the image identification information of the image server where the image file was stored, transmitted from the gateway server 160, are received, the transmitted image information stored in the memory card 77 is updated based on this received information, and the subroutine returns in S309.

Figure 19:
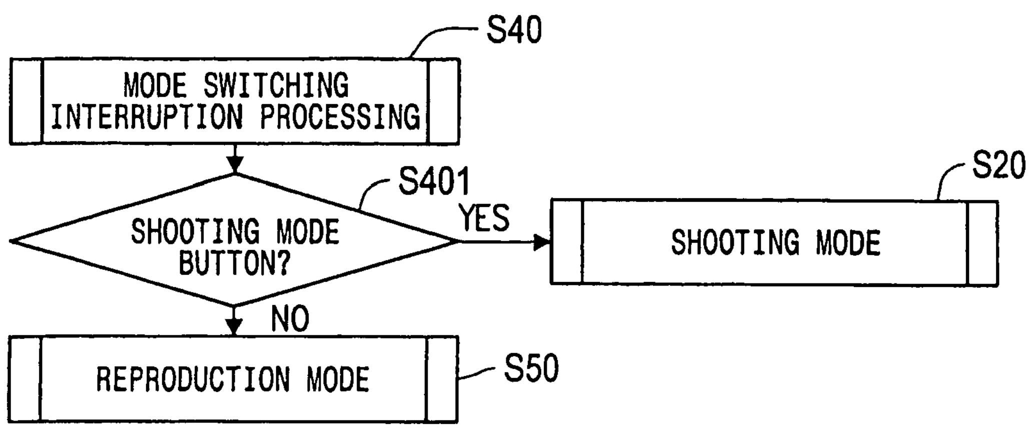
FIG. 19 is a subroutine flow chart.

FIG. 19 is a detailed flow chart of the mode switch interrupt handling subroutine. Starting in S40 upon manipulation of the capture mode button 28 or playback mode button 29, it is checked in S401 whether the manipulated button was the capture mode button 28, and if it was the capture mode button 28, playback mode is terminated and the system moves to the capture mode subroutine of S20. If the manipulated button was not the capture mode button 28, the capture mode is terminated and the system moves to the playback mode subroutine of S50.

Figure 20:
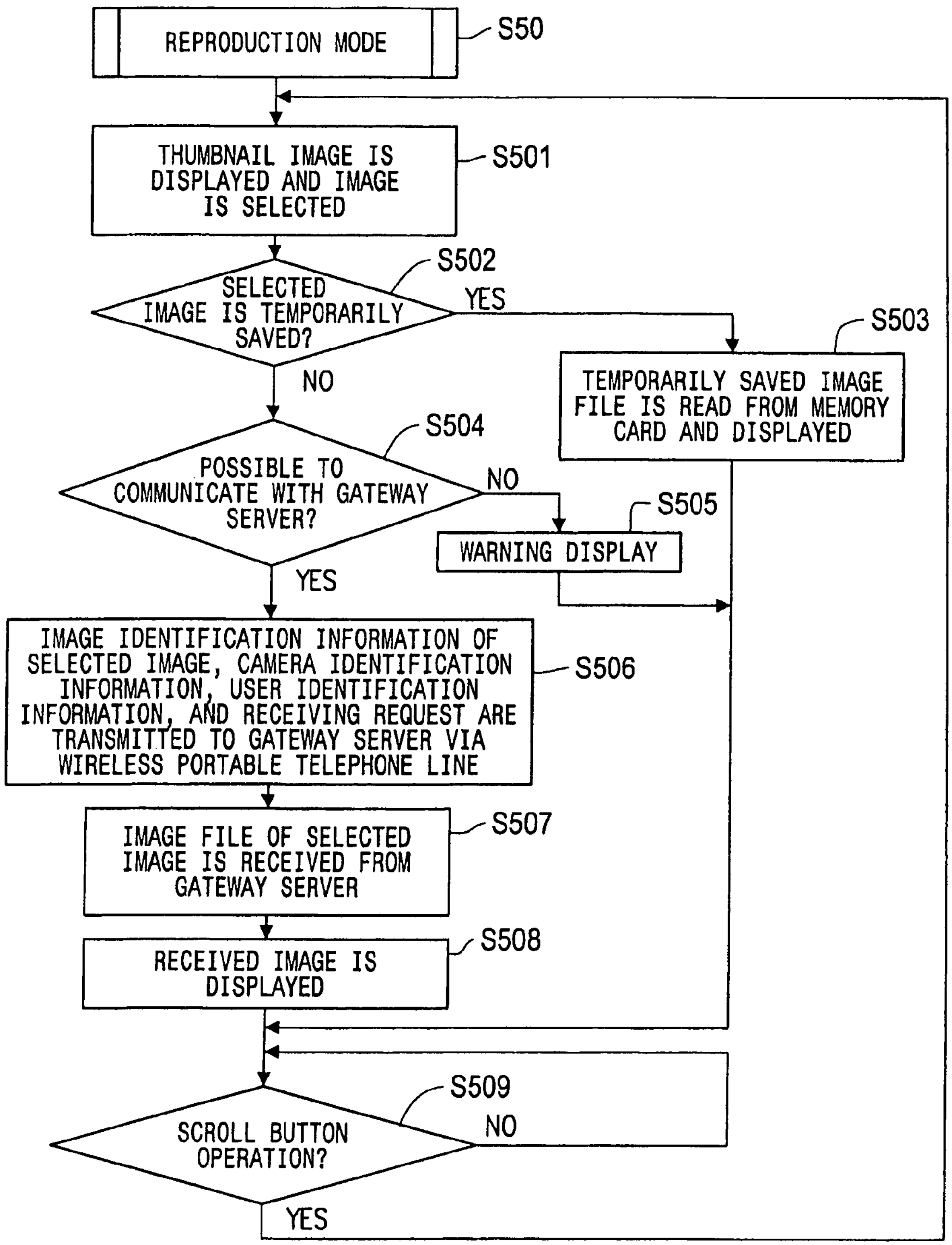
FIG. 20 is a subroutine flow chart.
Figure 21:
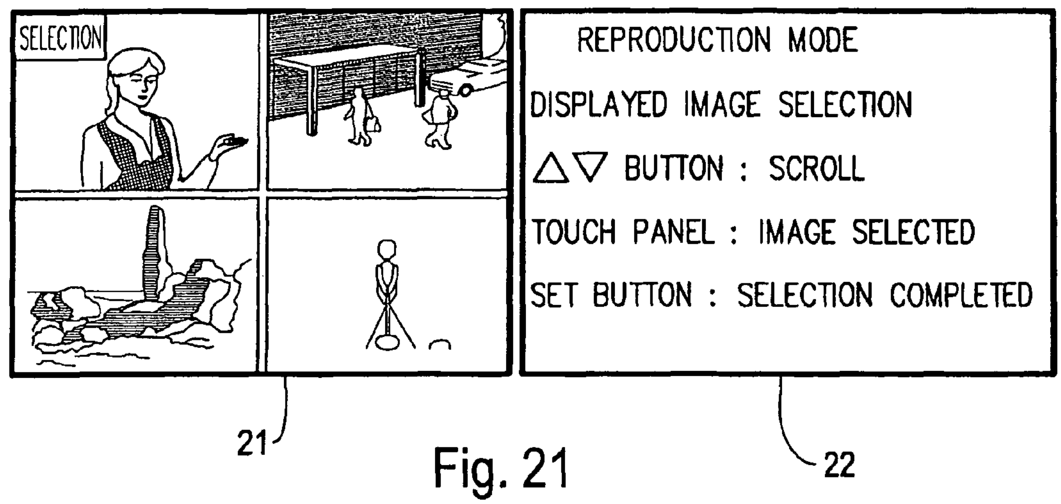
FIG. 21 is a screen display example.
Figure 22:
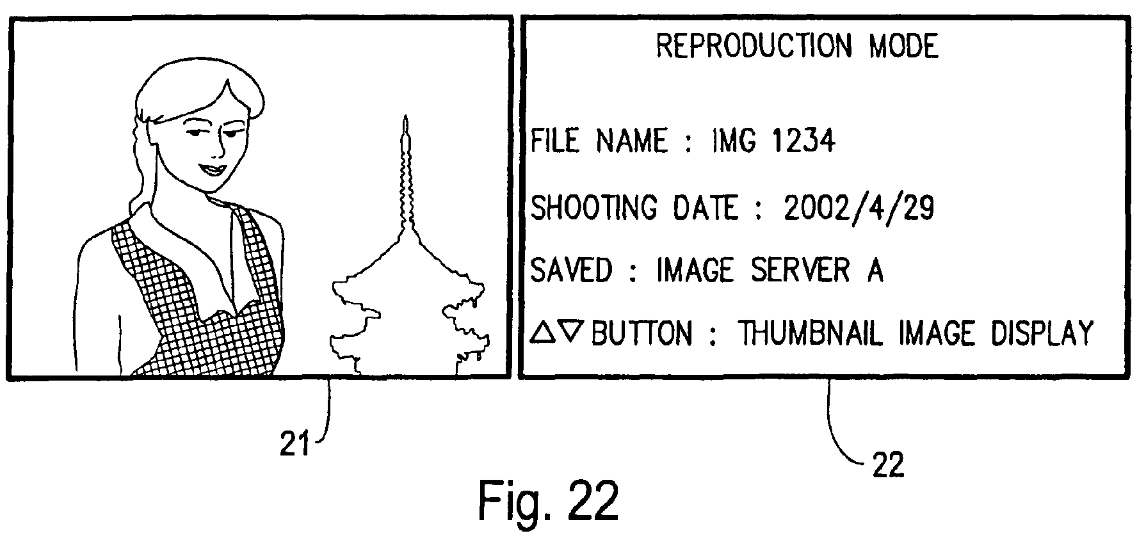
FIG. 22 is a screen display example.

FIG. 20 is detailed flow chart of the playback mode subroutine. Starting in S50, the thumbnail images stored in the memory card 77 are displayed on the left screen 21 as shown in FIG. 21, and operating instructions are displayed on the right screen 22. The user scrolls the thumbnail images displayed on the left screen 21 using the UP button 23 and DOWN button 24, selects the thumbnail image he wishes to playback and display using the touch panel 66, and confirms the selection with the SELECT button 27. In S502, it is checked whether the image file corresponding to the thumbnail image selected by the user is temporarily stored in the memory card 77, and if it is being temporarily stored there, the image file is read from the memory card 77 in S503 and is played back and displayed on the left screen 21, and the subroutine proceeds to S509. If the image file corresponding to the thumbnail image selected by the user is not being temporarily stored in the memory card 77, a connection to the gateway server 160 is attempted using the wireless portable telephone circuit 72 in S504, checking if communication is possible, and if communication with the gateway server 160 is not possible, a warning to the effect that communication is not possible is displayed on the left screen 21, and the subroutine proceeds to S509. If communication with the gateway server 160 is possible, the image identification information corresponding to the thumbnail image selected by the user, the camera identification information, user identification information and a reception request are transmitted to the gateway server 160 using the wireless portable telephone circuit 72. In S507, the image file selected by the user is received from the gateway server 160. In S508, the received image data is displayed on the left screen 21 as shown in FIG. 22 and the appended informational data for the image data is displayed on the right screen 22, and the subroutine proceeds to S509. In S509, the subroutine waits for the user to manipulate the UP button 23 or DOWN button 24, and returns to the thumbnail image display of S501 when a button is manipulated.

Figure 23:
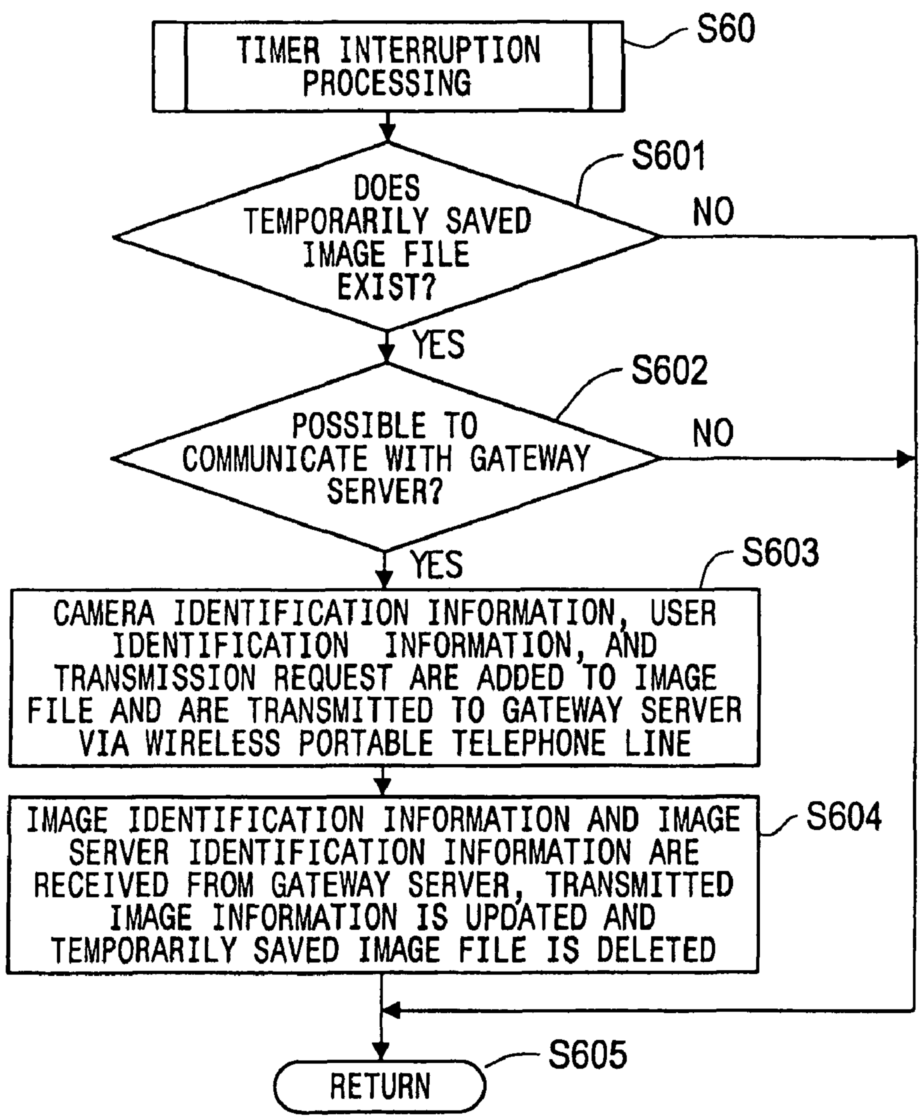
FIG. 23 is a subroutine flow chart.

FIG. 23 is a detailed flow chart of the timer interrupt handling subroutine. Starting in S60, it is checked in S601 whether there are image files temporarily stored in the memory card 77, and if there are none, the subroutine returns in S605. If there are image files being temporarily stored, in S602, connection to the gateway server 160 is attempted using the wireless portable telephone circuit 72, checking if communication is possible, and if communication with the gateway server 160 is not possible, the subroutine returns in S605. If communication with the gateway server 160 is possible, the image files stored temporarily in the memory card 77, the camera identification information, user identification information and a transmission request are transmitted to the gateway server 160 using the wireless portable telephone circuit 72 in S603. In S604, the image identification information corresponding to the image files and the image identification information of the image server where the image files were stored, transmitted from the gateway server 160, are received, the transmitted image information stored in the memory card 77 is updated based on this received information, and the subroutine returns in S309.

Figure 24:
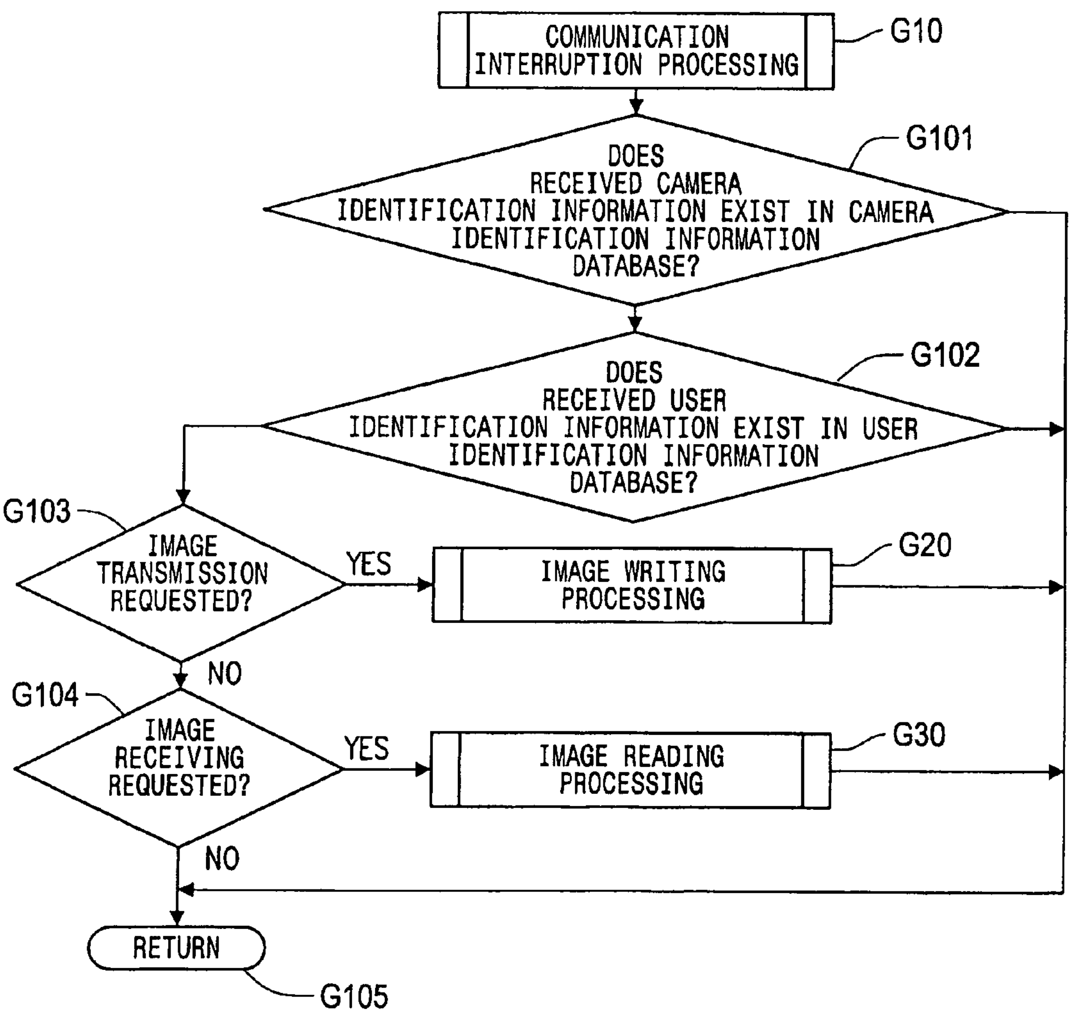
FIG. 24 is a subroutine flow chart.

Next, the operation of the gateway server 160 (control/processing means 350) in the above mode of embodiment will be described. Description of operations of the gateway server 160 other than the image relaying operation will be omitted as they have little bearing on the present invention. FIG. 24 is a detailed flow chart of the communication interrupt handling started when the gateway server 160 performs image relaying. Starting in G10 with a communication request from the electronic camera 100, in G101, it is checked whether the received camera identification information is present in the camera identification information database, and if it is not present, the subroutine returns in G105. If it is present, it is checked in G102 whether the received user identification information is present in the user identification information database, and if it is not present, the subroutine returns in G105. If it is present, it is checked in G103 whether the received request is an image file transmission request, and if it was an image file transmission request, the image write handling subroutine of G20 is executed and the system returns in G105. If it was not an image file transmission request, it is checked in G104 whether the received request is an image file reception request, and if it was an image file reception request, the image read handling subroutine is executed and the system returns in G105. If it was not an image file reception request, the system returns in G105.

Figure 25:
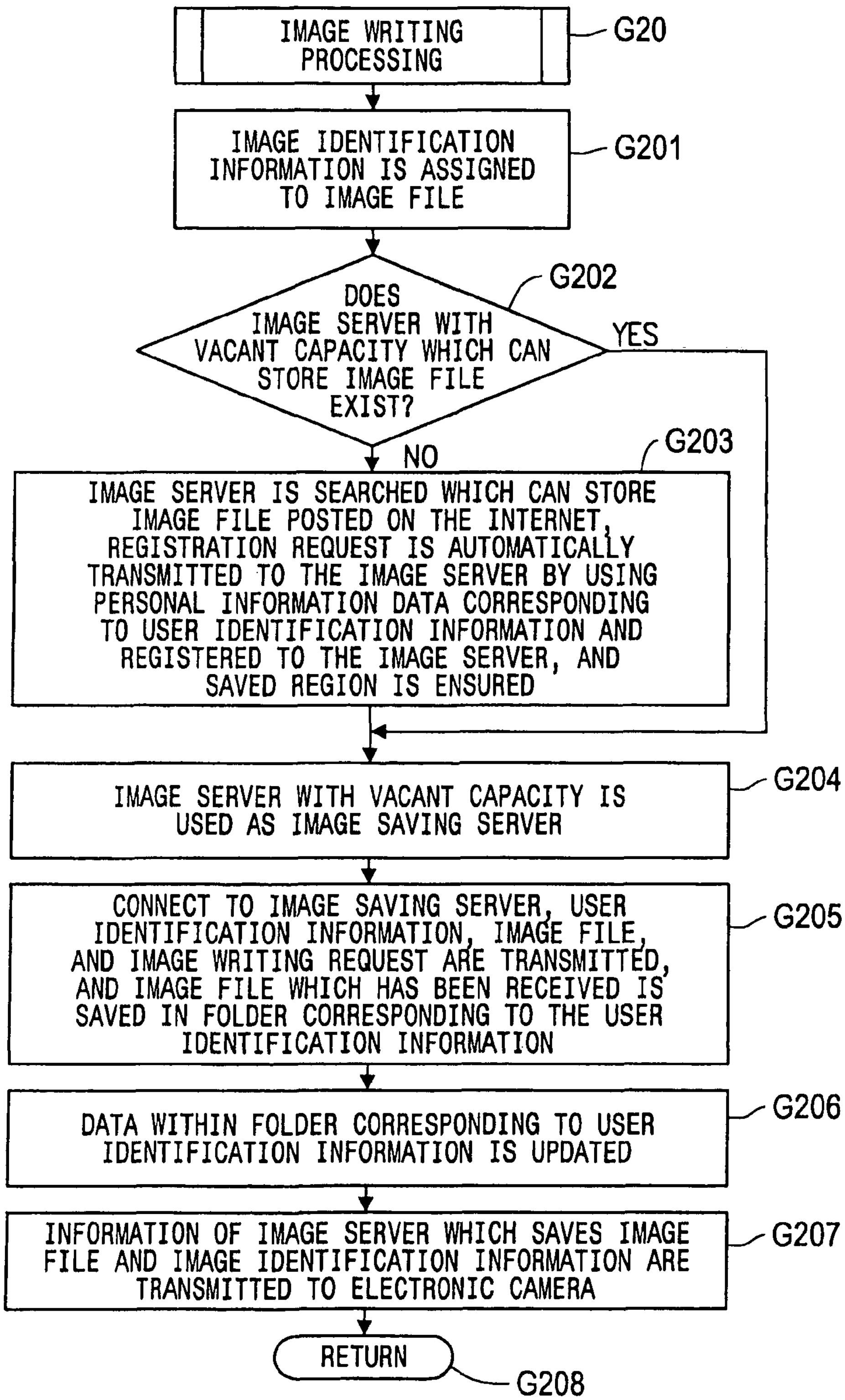
FIG. 25 is a subroutine flow chart.

FIG. 25 is a detailed flow chart of the image write handling of the gateway server 160. Starting in G20, image identification information is assigned to the received image file in G201. Here, image identification information conflicts can be avoided by having the gateway server 160 assign image identification information that is different from any image identification information stored in the image identification information list corresponding to the received user identification information. In G202, it is checked whether there is an image server with available capacity based on the image server management data corresponding to the received user identification information, and if there is an image server with available capacity, the system proceeds to G204, while if there is no image server with available capacity, a new image server with available capacity is searched for in G203. In G203, a search is conducted for open image servers on the Internet that allow image file storage, registration with the image server that is found is performed automatically using the user identification information and personal information data stored in association with the user identification information, and information on the image server in question (storage capacity, etc.) is entered into the image server management data. In G204, an image server with available capacity is designated as the image server to be used for image storage. In G205, the image file received from the electronic camera 100, the user identification information and an image write request are transmitted using Internet protocol to the image server designated as the image server to be used for image storage, and in G206, the image server management data and image identification information list in the folder corresponding to the user identification information is updated, and data (thumbnail image, etc.) is generated in the folder corresponding to the image identification information. In G207, the image file that was transmitted to the image server is deleted, the image identification information assigned to the image file and the image server identification information of the image server where the image file was stored are transmitted to the electronic camera 100, and the subroutine returns in G208.

Figure 26:
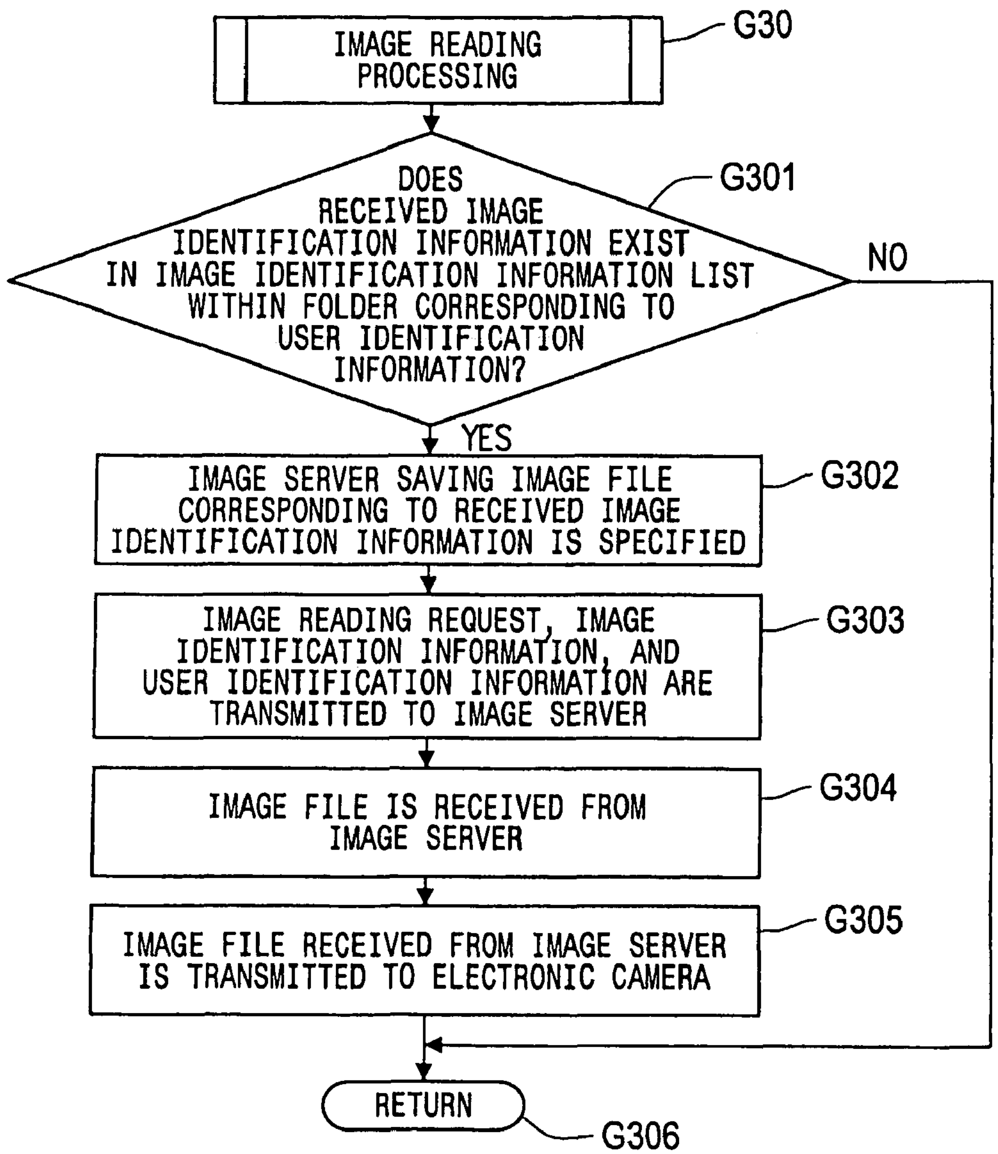
FIG. 26 is a subroutine flow chart.

FIG. 26 is a detailed flow chart of the image read handling of the gateway server 160. Starting in G30, it is checked in G301 whether the received image identification information is present in the image identification information list in the folder corresponding to the received user identification information, and if it is not present, the system returns in G306. If it is present, in G302, the image server where the image file corresponding to the received image identification information is stored is identified based on the image server identification information in the folder corresponding to the received image identification information. In G303, the image identification information, user identification information and an image read request are transmitted to the image server in question using Internet protocol, and in G304, the image file corresponding to the image identification information transmitted by the image server is received. In G305, the image file received from the image server is transmitted to the electronic camera 100, and the systems returns in G306.

Figure 27:
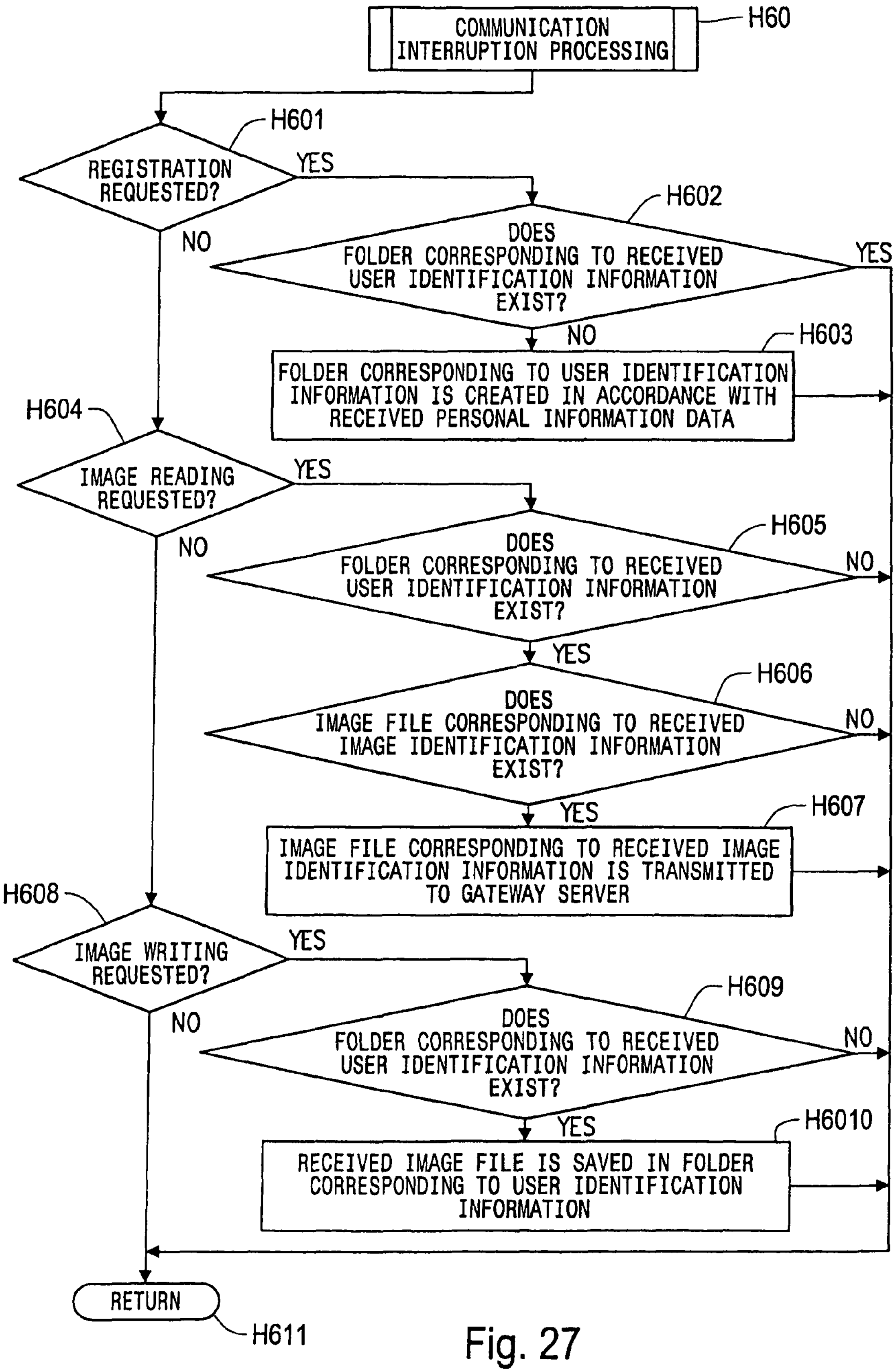
FIG. 27 is a subroutine flow chart.

Next, the operation of the image servers 181 through 184 (control/processing means 350) in the above mode of embodiment will be described. Description of operations of the image servers 181 through 184 other than the image transmission and storage operation will be omitted as it has little bearing on the present invention. FIG. 27 is a detailed flow chart of the communication interrupt handling started when a communication request is received by the image servers 181 through 184 from the gateway server 160. Starting in H60 upon receiving a communication request from the gateway server 160, it is checked in H601 whether the received request is an image server registration request, and if it was a registration request, it is checked in H602 whether a folder corresponding to the received user identification information exists, and if it already exists, the system returns in H611. If no folder corresponding to the received user identification information exists, in H603, the registration procedure is carried out based on the received user identification information and personal information data, a folder (album) corresponding to the user identification information is created, and the system returns in H611.

If the request received in H601 is not an image server registration request, it is checked in H604 whether the received request is an image read request, and if it was an image read request, it is checked in H605 whether a folder (album) corresponding to the received user identification information exists, and if it does not exist, the system returns in H611. If a folder corresponding to the received user identification information exists, it is checked in H606 whether an image file corresponding to the received image identification information exists in the folder, and if it does not exist, the system returns in H611. If an image file corresponding to the received image identification information exists, the image file in question is transmitted to the gateway server 160 using Internet protocol in H607, and the system returns in H611. If the received request in H604 is not an image read request to the image server, it is checked in H608 whether the received request is an image write request, and if it was not an image write request, the system returns in H611. If it was an image write request, it is checked in H609 whether a folder corresponding to the received user identification information exists, and if it does not exists, the system returns in H611. If a folder corresponding to the received user identification information exists, the received image file is stored in the folder in H610, and the system returns in H611.

In the mode of embodiment described above (FIG. 1 through FIG. 27), the selection of an image server that has an album with available capacity corresponding to the user identification information for storing an image file, the registration with an image server for setting up an album corresponding to the user identification information and the image file read and write operations in relation to the image server using Internet protocol are performed automatically, without human intervention, by the gateway server 160 positioned between the electronic camera 100 and the image servers 181 through 184 that store the image files, which makes it possible to transmit image files captured by the electronic camera 100 to the image server in a reliable and rapid manner, as well as allowing users with no knowledge of such image transmission systems to simply use this image transmission system and letting the user focus on taking pictures with the electronic camera 100.

In the above mode of embodiment (FIG. 1 through FIG. 27), the gateway server 160 positioned between the electronic camera 100 and the image servers 181 through 184 that store the image data assigns image identification information to identify individual image files transmitted from the electronic camera 100 and returns the image identification information to the electronic camera, so even if image files captured by the same user using different electronic cameras are transmitted to the gateway server 160, no duplication of image identification information will occur, and confusion of the image transmission system due to duplication of image identification information can be avoided.

In the above mode of embodiment (FIG. 1 through FIG. 27), the user identification information for identifying individual users is stored in the memory card 77, and the user is identified to the electronic camera 100 by installing the memory card 77, so even if the user uses multiple electronic cameras, the user can be reliably identified to the electronic camera 100 without any bothersome effort, and no confusion is caused by multiple users sharing the same electronic camera. Furthermore, since information on transmitted image files (thumbnail image data, identification information of the image server where the images are stored, image identification information, etc.) is stored in the memory card 77, when downloading and browsing image files that have been stored on an image server, the desired image files can be quickly specified from the electronic camera by displaying and selecting thumbnail images.

In the above mode of embodiment (FIG. 1 through FIG. 27), the electronic camera 100 transmits all the captured image files to the gateway server 160 immediately after they are captured and deletes them after transmission is completed, so there is no need to provide high capacity built-in memory for storing many image files, making it possible to build the electronic camera 100 inexpensively. Furthermore, the electronic camera 100 temporarily stores image files that could not be transmitted to the gateway server 160 for reasons such as being out of communication range, and such temporarily stored image files are automatically transmitted to the gateway server 160 under specific startup conditions (e.g., specific time intervals or a specific clock time or the wireless portable telephone link congestion status), making it possible to prevent cases of forgetting to transmit, and by appropriately setting the startup conditions (for instance, startup in an early time period or startup upon detecting that the data transmission rate of the wireless portable telephone link is at or above a specific value), the transmission of image files between the electronic camera 100 and gateway server 160 can be carried out quickly, making it possible to reduce communication charges.

(Description of modified embodiments) The present invention is not limited to the mode of embodiment described above, and various modifications and changes are possible.

While in the above mode of embodiment (FIG. 1 through FIG. 27), the electronic camera 100 and gateway server 160 perform image transfer directly, it is likewise permissible to connect the electronic camera 100 to a portable telephone terminal and perform transmission of image data between the electronic camera 100 and gateway server 160 via the portable telephone terminal. Doing this makes it unnecessary to provide a wireless portable telephone function in the electronic camera 100, allowing the electronic camera 100 to be made smaller and cheaper. Furthermore, one may provide a memory card slot in the portable telephone terminal and store the user identification information, transmitted image information and temporarily stored image files on a card installed in that slot. Doing this makes it unnecessary to provide a memory card installation mechanism or memory card read and write software in the electronic camera 100, allowing the electronic camera 100 to be made smaller and less expensive. Furthermore, by using the telephone number of the portable telephone terminal employed by the user instead of the user identification information, it is possible to do without the effort of registering user identification information and avoid duplication of user identification information. Furthermore, it is possible to talk using the wireless portable telephone function of the electronic camera 100, in that case the electronic camera 100 can be configured as a portable telephone with a camera.

While in the above mode of embodiment (FIG. 1 through FIG. 27), the gateway server 160 stored image files on an image server whenever it received an image file from the electronic camera 100, it is also possible to have the gateway server 160 temporarily accumulate image files received from the electronic camera 100, and transmit and store the accumulated image files on an image server with a specific timing (specific frequency, specific times, when accumulated data volume reaches a specific value, upon receiving an external transmission instruction, etc.).

Figure 28:
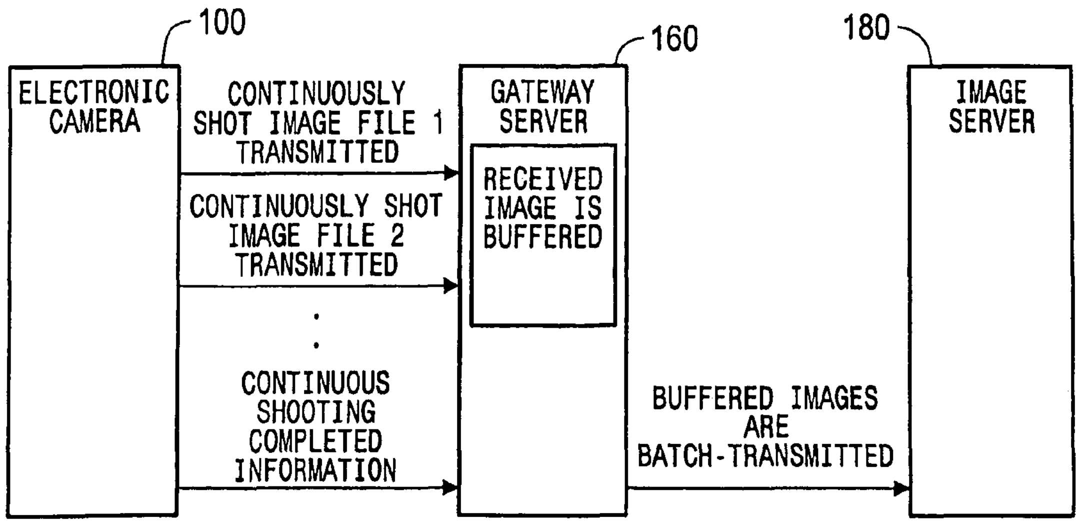
FIG. 28 is an explanatory drawing of the operation of image transmission.

For example, when transmitting image files captured with a series of capture operations (continuous capture or continuous shutter, bracket capture, panorama capture, etc.) by the electronic camera 100 from the electronic camera 100 to an image server, the image transfer may be performed by the scheme shown in FIG. 28. Here, continuous capture refers to continuously photographing the same subject at specific time intervals while tracking its movement; bracket capture refers to taking multiple photographs of the same subject while varying the capture conditions, such as exposure; and panorama capture refers to photographing a landscape or the like while shifting the capture direction by a certain amount each time. Namely, for each capture operation, the electronic camera 100 appends identification information to image files captured in series to the effect that this image is part of a series, and transmits it to the gateway server 160. The gateway server 160 temporarily stores image files with appended identification information indicating that it is part of a series of images in an image buffer folder in memory 268. Once the series of image captures is completed, the electronic camera 100 transmits information to the gateway server 160 indicating that the series of image captures has been completed, and upon receiving that information, the gateway server 160 does a batch transmission of the series of image files stored temporarily in the image buffer folder to the same image server over the Internet and stores them there. Doing this makes it possible to transmit multiple image files between the gateway server 160 and image server with a single transmission procedure, allowing the transmission time to be shortened and allowing the image transmission processing load of the gateway server 160 and image servers 181 through 184 to be reduced. Furthermore, storing image files captured in a series on the same image server makes it highly convenient when the user later connects directly to the image server 181 through 184, with a personal computer or the like, to use the series of image data. Furthermore, during the serial image capture, the electronic camera 100 just transmits image files to the gateway server 160 one-sidedly, without waiting to receive information from the gateway server 160, allowing the electronic camera 100 to perform the series of capture operations freely with a timing appropriate for the series of captures.

Instead of transmitting information indicating that a series of captures has been completed from the electronic camera 100 to the gateway server 160, is also permissible to transmit to the gateway server 160, from a personal computer or portable telephone terminal connected to the gateway server 160, an instruction to transmit a series of image files accumulated on the gateway server 160 together to an image server, in response to that instruction, the gateway server 160 will transmit the series of image files accumulated on the gateway server 160 together to an image server.

Furthermore, when transmitting image files captured in a series from the electronic camera 100 to the gateway server 160, if an image file is transmitted from the electronic camera 100 to the gateway server 160 after every capture, the communication time will become longer due to the overhead for establishing communication and the additional information, and there are cases where, during this time, the picture-taking conditions will change or where the pictures cannot be taken at the planned time intervals. In such cases, one can optionally have the electronic camera 100 store the series of captured image files in RAM 70, and once the series of captures is completed, transmit the series of image files with added identification information indicating that it is as series of images, together with information indicating that the series of captures has been completed, in a batch to the gateway server 160. Furthermore, when image files are transmitted from the electronic camera 100 to the gateway server 160 via a portable telephone terminal, one can optionally have the image files captures in a series be transmitted from the electronic camera 100 to the portable telephone terminal each time an image is captured and store them temporarily in the portable telephone terminal's built-in memory, and once the electronic camera 100 has completed the series of captures, transmit information indicating that the series of captures has been completed to the portable telephone terminal, in response to that the portable telephone terminal will transmit the series of image files, with added identification information indicating that this is a series of images, in a batch to the gateway server 160. Doing this makes it possible for the electronic camera 100 to perform a series of captures under the desired capture conditions and timing without affecting the image file transmission speed or the like.

Figure 29:
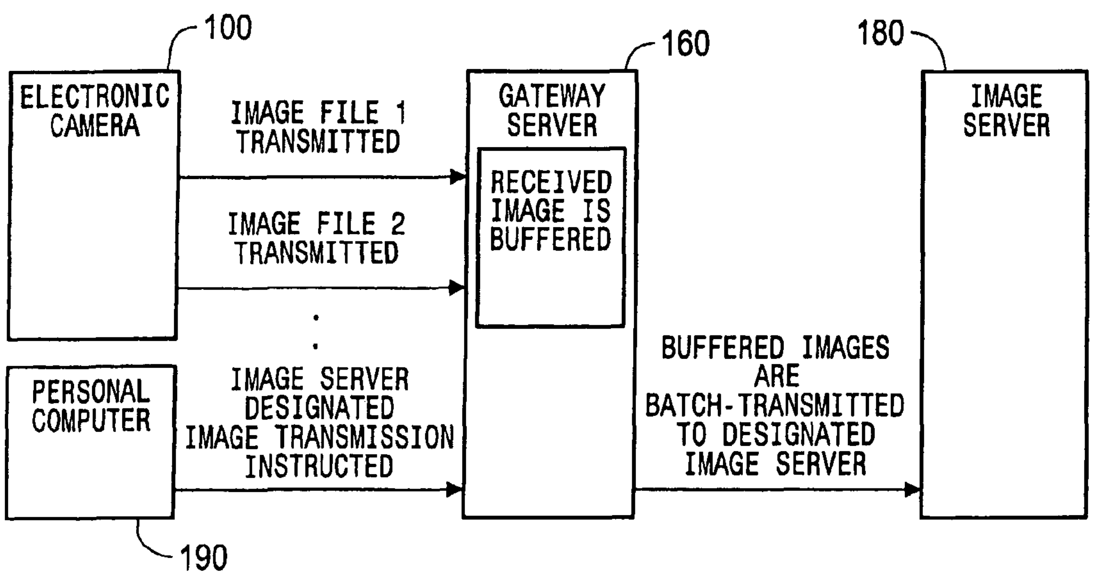
FIG. 29 is an explanatory drawing of the operation of image transmission.

Furthermore, one can for instance have the gateway server 160 buffer image files received from the electronic camera 100 in an image buffer folder in the memory means 168, and deliver the image files buffered in the image buffer folder to the image server based on an external instruction. FIG. 29 is a drawing that shows the image transmission processing for such a scheme. Multiple image files are transmitted from the electronic camera 100 to the gateway server 160, and are stored temporarily in an image buffer folder on the gateway server 160 corresponding to the user identification information. Thereafter, a personal computer 160 connects to the gateway server 160 and transmits the user identification information, the identification information of the image server to that the images are to be transferred, and an image transfer request to the gateway server 160. In response to the received user identification information, the gateway server 160 transmits the image files stored temporarily in the image buffer folder in a batch to the image server corresponding to the received image server identification information. Doing this makes it possible for the user to transmit and store image data captured with the electronic camera 100 from the gateway server 160 at a convenient time to a suitable image server.

In the above mode of embodiment (FIG. 29), the gateway server 160 buffered image files transmitted between the electronic camera 100 and the image server in an image buffer folder and transmitted the image files buffered in the image buffer folder together to the image server based on an external instruction; however, the gateway server 160 may also transmit accumulated image files to the image server by the following method. For example, the image files may be transmitted to the image server when the total data volume of the image files stored temporarily on the gateway server 160 exceeds a certain volume. Alternatively, the gateway server 160 may transmit image files to the image server once they have been accumulated for a set period or time, based on the date and time data of the start of storage of the image files in the image buffer folder. Alternatively, the gateway server 160 can transmit accumulated image files to the image server at specific clock times.

While in the above mode of embodiment (FIG. 1 through FIG. 27), the gateway server 160 performed management of the electronic camera based on camera identification information received form the electronic camera 100, it is also possible to use general identification information instead of camera identification information for individually identifying multiple electronic cameras 100. For example, using the next generation version of the IP protocol, IPV6 (Internet Protocol Version 6), the use of that on the Internet is planned, as the identification information, would make it possible for all electronic devices that handle images, besides electronic cameras, to make use of the image transmission system according to the present invention. Namely, IPV6 provides a 32-bit address space (on order of 10 to the $9^{th}$ power), so there is no concern of running out of addresses, which makes it possible for one device to have multiple addresses depending on the application, as well as eliminating the risk of duplication of camera identification information and further increasing the utility of the image transmission system according to the present invention.

While in the above mode of embodiment (FIG. 1 through FIG. 27), the user identified himself to the image transmission system by installing a memory card 77 with user identification information written therein into the electronic camera 100, it is possible to identify the user to the image transmission system by other methods as well.

For example, one can provide a password input means on the electronic camera side and identify the user to the image transmission system based on the password inputted by the user. Furthermore, instead of password input, one can provide user identification means (fingerprint detection means, iris pattern detection means, facial image detection means, etc.) on the electronic camera side and have the electronic camera automatically perform user identification without manual intervention by the user and identify the user to the image transmission system. Doing this makes it possible to automatically identify the user of the electronic camera, which eliminates the effort of inputting passwords or the operation of installing a memory card storing personal information data, and makes it possible to resolve the problem of forgotten passwords and memory card theft.

As described above, in the image transmission system according to the present invention, the image relay apparatus (gateway server), which is positioned between the electronic image device (electronic camera) and the image storage device (image server) that stores image data, automatically performs bothersome procedures and operations, such as selection of image storage device, registration with an image storage device, operations for writing and reading image data to and from the image storage device, etc., on behalf of the user, which makes it possible for the electronic image device and the user of the electronic image device to efficiently, reliably, quickly and easily process image data without being aware of the image storage device or of the bothersome procedures and operation relating to the image storage device. As a result, the application of such an image transmission system to image services aimed at general users unaccustomed to handling image data can be expected to have a substantial affect of promoting adoption.

Figure 30:
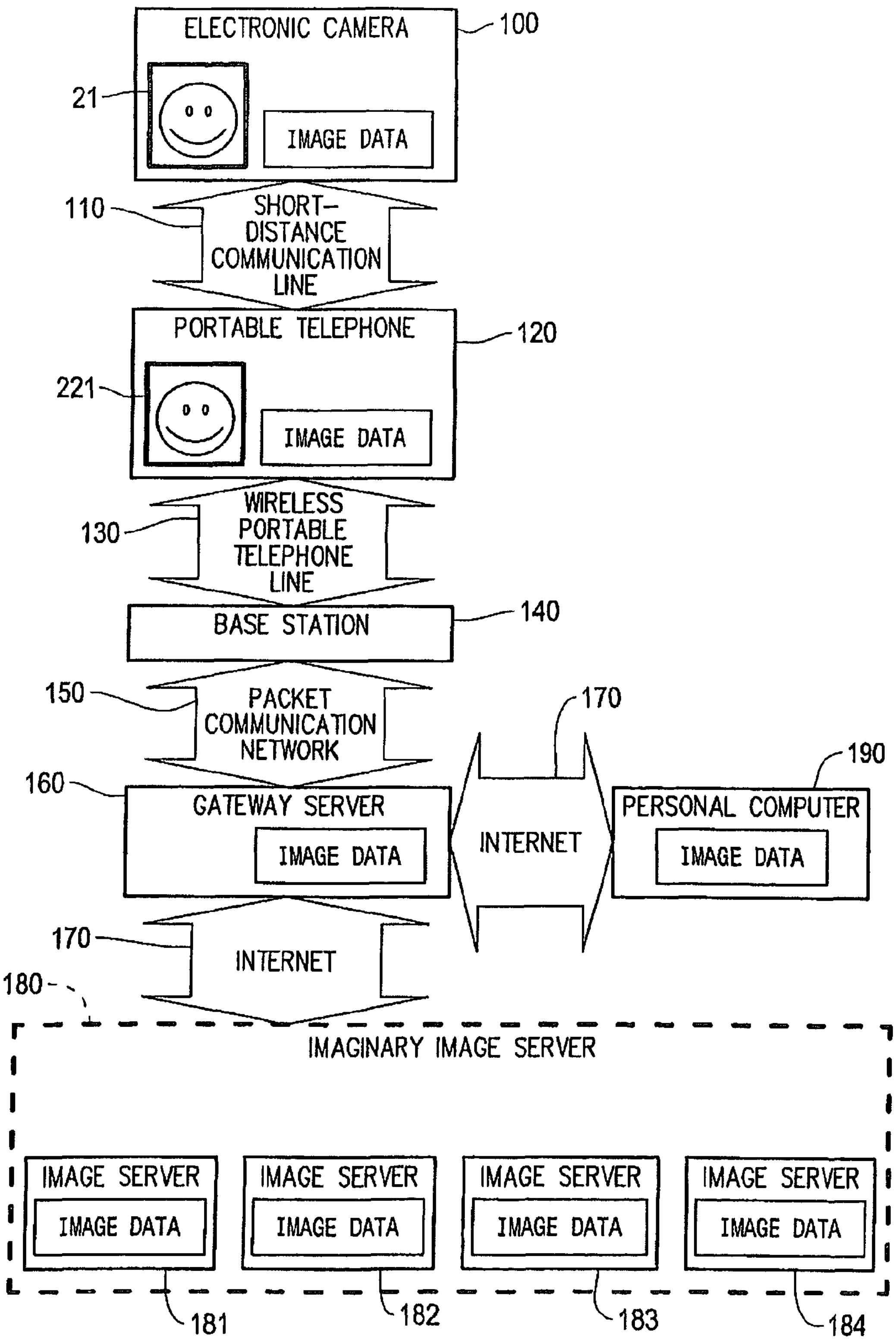
FIG. 30 is a conceptual drawing of an image transmission system.

FIG. 30 is a conceptual drawing of an image data transmission system applying the present invention. First, the case of transmitting image data from the electronic camera 100 to the image servers 181 through 184 will be described. The electronic camera 100 generates image data through capture operations. When transmitting the image data to external image servers 181 through 184, the electronic camera 100 connects to a portable telephone 120. The connection between the electronic camera 100 and the portable telephone 120 is made by means of a short-range communication link 110 (e.g., Bluetooth protocol based short-range wireless communication, short-range wired communication based on a cable connection-specific protocol, IEEE 802.11 protocol based wireless LAN communication, short-range infrared communication using the IrDA protocol, etc.). The electronic camera 100 selects the image data to transmit, displays the image data on the screen 21 and transmits it to the portable telephone 120. Since the electronic camera 100 and the portable telephone 120 are used by the user simultaneously, it suffices for the local wireless communication range to be on the order of several meters, which allows the power load on the electronic camera 100 and portable telephone 120 due to short-range wireless communication to be reduced.

The portable telephone 120 is provided with a short-range communication function for communicating with the aforementioned electronic camera 100 and a long-range communication function using a wireless portable telephone link 130, whereby the long-range communication function using the wireless portable telephone link 130 allows both conventional talk functions and packet communication protocol based digital data communication functions to be executed. The portable telephone 120 temporarily stores image data received from the electronic camera 100 via the short-range communication link 110 in an internal memory. Next, the portable telephone 120 sends the stored image data using a packet communication protocol via the wireless portable telephone link 130 to a base station 140. While transmitting image data to the base station 140, the portable telephone 120 displays the image data being transmitted on a screen 221.

The base station 140 transmits the image data, received from the portable telephone 120 using a packet communication protocol via the wireless portable telephone link 130, to a gateway server 160 via a packet communication network 150 using a packet communication protocol. The gateway server 160 stores the image data received using a packet communication protocol via the packet communication network 150 for a time in an internal memory, and transmits the stored image data at specific intervals using Internet protocol via the Internet 170 to image servers 181 through 184. The gateway server 160 keeps thumbnail image data (scaled-down image data obtained by compressing and reducing the data volume of the original image data) corresponding to the image data transmitted to the image servers in an internal memory. Image servers 181 through 184 store the image data received using Internet protocol via the Internet 170 in a high capacity memory.

When transmitting image data from the electronic camera 100 to an image server, there is no need to perform the transmission with awareness of the complicated connection and communication procedures for accessing the image server on the electronic camera 100 side; rather, on the electronic camera 100 side, it suffices to append fixed address information for specifying the gateway server 160 and camera identification information for identifying the electronic camera 100 to the image data to be transmitted, and pass it on to the portable telephone 120. The portable telephone 120 transmits the image data and camera identification information by packet communication to the designated gateway server 160 based on the received gateway server address information. The gateway server 160 manages the image data according to the camera identification information received via packet communication, and transmits the image data to a suitable image server among multiple image servers 181 through 184 on the Internet using Internet protocol. The multiple image servers 181 through 184 are treated as a single virtual image server 180 from the viewpoint of the electronic camera, and the complicated procedures for accessing each image server on the Internet are all performed by the gateway server 150.

Next, the case where the electronic camera 100 receives image data from the virtual image server 180 will be described. First, the electronic camera 100 is connected to the portable telephone 120 using the short-range communication link 110. The electronic camera 100 transmits a browse data request, camera identification information and gateway server 160 address information to the portable telephone 120. Next, the portable telephone 120 transmits the browse data request and camera identification information via the base station 140 using packet communication protocol to the designated gateway server 160 based on the received gateway server 160 address information. Upon receiving the browse data request and camera identification information, the gateway server 160, based on the camera identification information, transmits the thumbnail image data (browse data) for the image data stored on the virtual server 180 via the base station 140 using packet communication protocol to the portable telephone 120 that transmitted the browse data request. The portable telephone 120 transmits the received browse data over the short-range communication link 110 to the electronic camera 100.

The electronic camera 100 displays the received browse data (thumbnail image data) on the screen 21, from that the desired image is selected. The electronic camera 100 transmits a request for the selected image data along with image identification information (image file name, etc.) for the image data, camera identification information and gateway server 160 address information over the short-range communication link 110 to the portable telephone 120. Next, the portable telephone 120, based on the received gateway server 160 address information, transmits the image data request, image identification information and camera identification information via the base station 140 using packet communication protocol to the designated gateway server 160. Upon receiving the image data request, image identification information and camera identification information, the gateway server 160 specifies the image data stored on the virtual server 180 according to the camera identification information and image identification information, and transmits the image data request and image identification information using Internet protocol to the image server 181 through 184 on the Internet 170 that is storing the image data in question.

The image server that receives the image data request and image identification information transmits the image data corresponding to the image identification information using Internet protocol to the gateway server 160. Upon receiving the image data, the gateway server 160 transmits that image data via the base station 140 using packet communication protocol to the portable telephone 120 that transmitted the image data request. The gateway server 160 temporarily stores the image data received from the image server in an internal memory. The portable telephone 120 transmits the received image data over the short-range communication link 110 to the electronic camera 100. The electronic camera 100 displays the received image data on the screen 21.

The gateway server 160 can also be connected from a user's personal computer 190 via the Internet 170, and the user can read and use image data from the virtual server 180 via the gateway server 160 on a personal computer 190, and can modify the settings of the gateway server 160.

Figure 31:
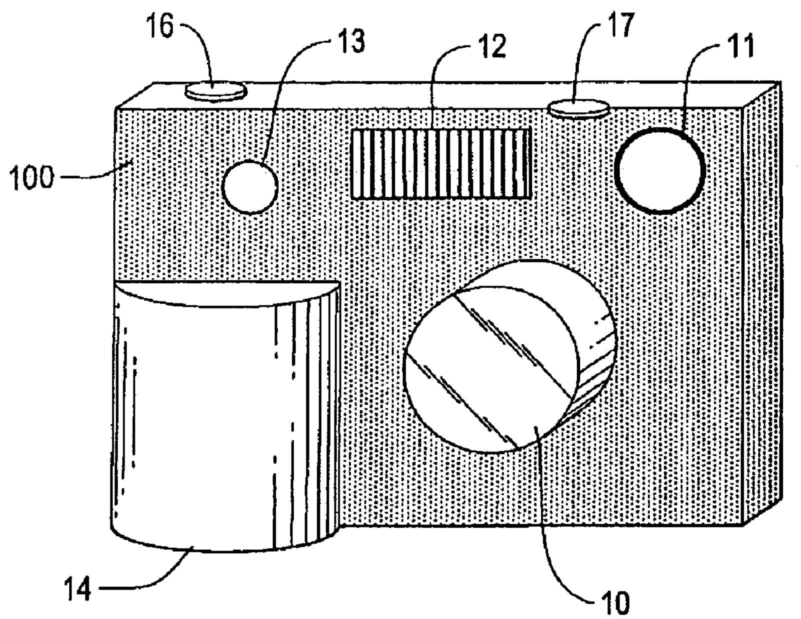
FIG. 31 is an external view (front view) of an electronic camera.
Figure 32:
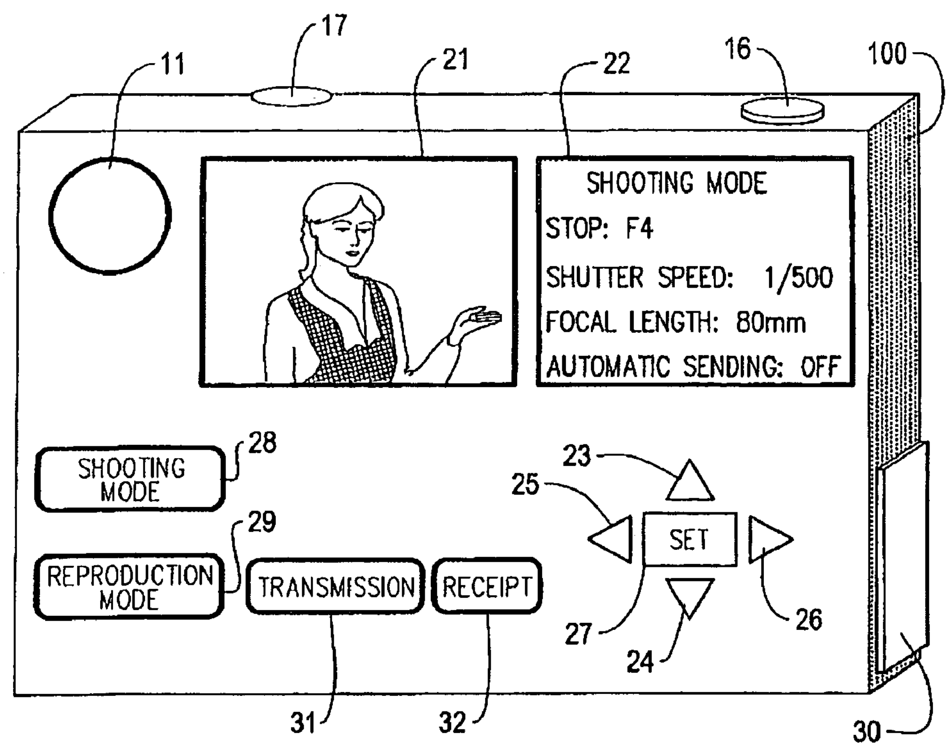
FIG. 32 is an external view (rear view) of an electronic camera.

FIG. 31 and FIG. 32 are an external view (front view and rear view) of an embodiment of the electronic camera 100 used in an image data transmission system applying the present invention. As shown in FIG. 31, a photographic lens 10 for forming a subject image, a finder 11 for confirming the frame, a strobe 12 for illuminating the subject when a photograph is taken, a photometric circuit for detecting the brightness of the subject, and a grip 14 extending from the camera housing for making it easier for the user hold the electronic camera 100 in his or her hands are provided at the front of the electronic camera 100, and a release button 16 and a power switch 17 for turning the power supply to the electronic camera 100 on and off are provided at the top.

As shown in FIG. 32, the eyepiece of the finder 11, a left LCD (left screen) 21 comprising a substantially rectangular screen for text and image display, and a right LCD (right screen) 22 comprising a substantially rectangular screen for text and image display are arranged at the rear of the electronic camera 100; an UP button 23, a DOWN button 24, LEFT button 25, RIGHT button 26 and SELECT button 27, used for image searching, are arranged below the right LCD 22, and a capture mode button 28 for putting the electronic camera 100 into capture mode and a playback mode button 29 for putting the electronic camera 100 into playback mode, a transmit button 31 for controlling image data transmission, and a receive button 32 for controlling image data reception are arranged below the left LCD 21. A memory card slot 30 for installing a memory card 77 used for image data is provided at the side.

The release button 16, UP button 23, DOWN button 24, LEFT button 25, RIGHT button 26, SELECT button 27, capture mode button 28, playback mode button 29, transmit button 31 and receive button 32 are all control keys operated by the user.

A so-called touch screen 66, equipped with a function of outputting contact position data corresponding to the position indicated by a finger touch operation is arranged over the left LCD 21 and the right LCD 22, which can be used for selection of image data and options displayed on the screen. This touch screen 66 is made of a transparent material such as glass or resin, allowing the user to view the image or text formed on the inside of the touch screen 66 through the touch screen 66.

Figure 33:
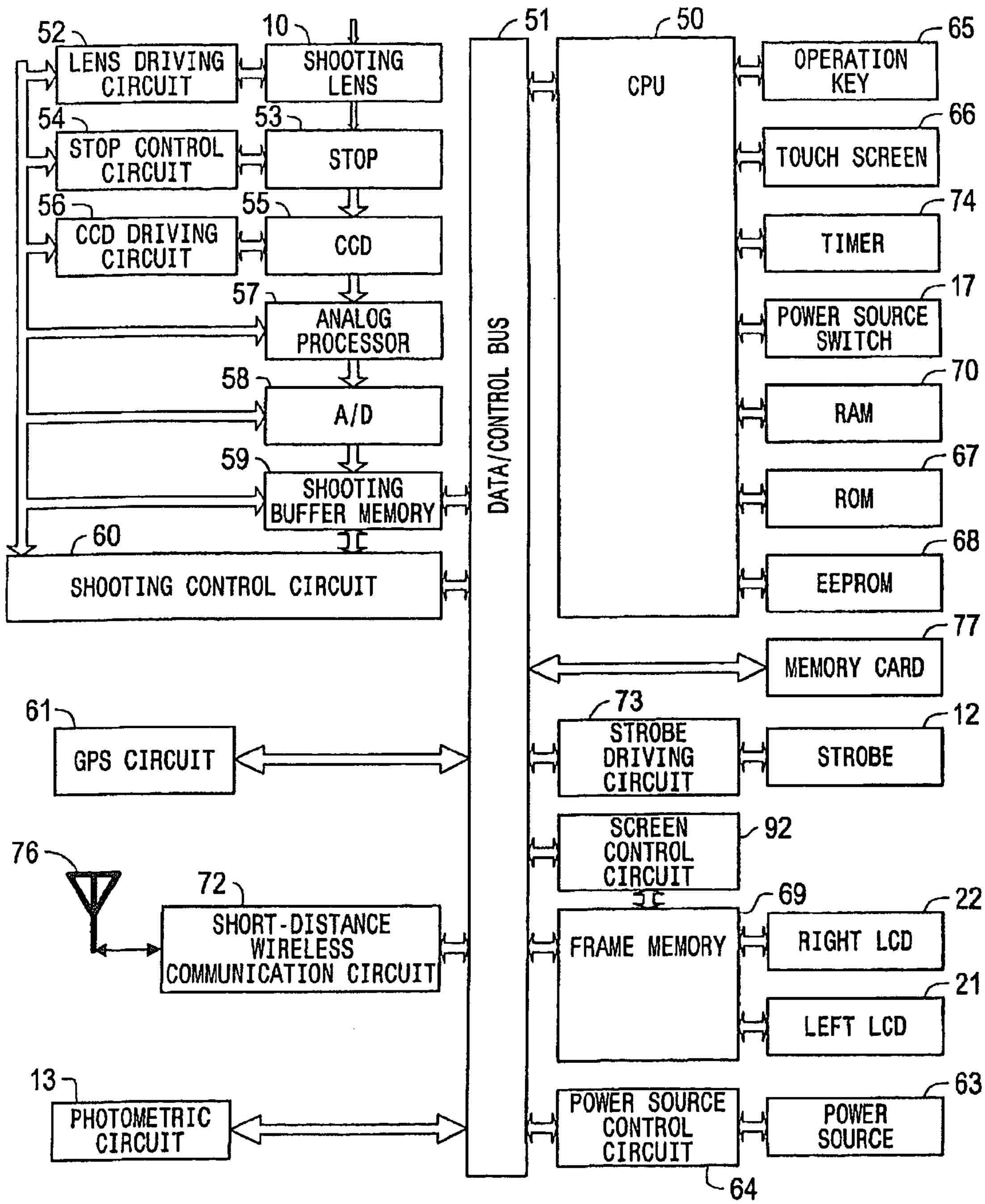
FIG. 33 is a block diagram showing the electrical configuration of an electronic camera.

FIG. 33 is a block diagram showing an example of the electric configuration of the internal part of the electronic camera 100 shown in FIGS. 31 and 32, whereby the constitutive elements are connected to each other via a data/control bus 51 for transmitting various types of informational data and control data. The various constitutive elements can be roughly divided into a block centered on the capture control circuit 60 that executes image data capture operations, a block of the memory card 77 that stores image files, a block centered on the screen control circuit 92 that executes the display of image data and associated information, and a block centered on the CPU 50, which performs overall control of the user interface such as the control keys 65 and of the various control circuits.

The CPU 50 (central processing unit) is the means that controls the entire electronic camera 100, issuing various instructions to the capture control circuit 60, screen control circuit 92 and power control circuit 64 in accordance with input information from the control keys 65, touch screen 66, power switch 17, timer 74 and photometric circuit 13. The photometric circuit 13 measures the brightness of the subject and outputs the photometric data that is the result of this measurement to the CPU 50. The CPU 50 sets the exposure time and sensitivity of the CCD 55 according to the photometric data by means of the CCD drive circuit 56, and controls the value of the diaphragm 53 by means of the diaphragm control circuit 54 via the capture control circuit 60 in accordance with the data of those settings.

In capture mode, the CPU 50 controls the capture operation via the capture control circuit 60 in accordance the manipulation of the release button 16. Furthermore, if the subject is dark based on the photometric data, the CPU 50 causes the strobe 12 to emit light via the strobe drive circuit 73 when taking a picture. The timer 74 has a built-in clock circuit and finds the date and time information corresponding to the current date and time and provides the capture date and time information to the CPU 50 when a picture is taken. The CPU 50 appends the capture date and time information to the image data and stores it in the memory card 77. The CPU 50 controls the various units according to a control program stored in ROM 67 (read-only memory). The EEPROM 68 (electrically erasable programmable ROM) is a non-volatile memory that stores settings information, etc. required for the operation of the electronic camera 100. The RAM 70 is a volatile memory that is used as a temporary working area of the CPU 50. The CPU 50 detects the manipulation state of the power switch 17 and controls the power supply 63 via a power supply control circuit 64.

The capture control circuit 60 performs focusing and zooming of the photographic lens 10 by means of a lens drive circuit 52, controls the exposure of the CCD 55 by controlling the diaphragm 53 by means of the diaphragm control circuit 54, and controls the operation of the CCD 55 by means of a CCD control circuit 56. Light beams from the subject are formed by the photographic lens 10 into a subject image over the CCD 55 after passing through the diaphragm 53 to adjust the amount of light, and this subject image is picked up by the CCD 55. The CCD 55 (charge coupled device), which comprises a plurality of pixels, is a charge accumulation type image sensor used for picking up a subject image, and outputs electrical image signals corresponding to the strength of the subject image formed on the CCD 55 to an analog processing unit 57 in accordance with drive pulses provided by the CCD drive circuit 56.

The analog processing unit 57 samples the image signal, which has undergone photoelectric conversion by the CCD 55, with a specific timing, and amplifies the sampled signal to a specific level. An A/D conversion circuit 58 (analog/digital conversion circuit) digitizes the image signal sampled by the analog processing unit 57, thereby converting it to digital data, which is temporarily stored in capture buffer memory 59.

In capture mode, the capture control circuit 60 repeats the operation described above, while the screen control circuit 92 repeats the through-image display operation of reading out the digital data stored successively in the capture buffer memory 59 via the data/control bus 51, storing it temporarily in the frame memory 69, converting the digital data into image data for display, storing it again in frame memory 69, and displaying the image data for display on the left screen 21. Furthermore, the screen control circuit 92 obtains text display information from the CPU 50 as required, converts it to text data for display and stores it in the frame memory 69, and displays the text data for display on the left screen 21 and right screen 22. In this way, in capture mode, the image picked up by the CCD 50 is displayed in real time on the left screen 21, making it possible to use this through-image as a monitor screen to make the composition settings for taking a picture. The capture control circuit 60 analyzes the extent of the high frequency component of the digital data stored in the capture buffer memory 59 and detects the state of focus adjustment of the photographic lens 10, and performs focus adjustment of the photographic lens 10 by means of the lens drive circuit 52 in accordance with the detection results.

At the time of release, upon receiving a capture instruction from the CPU 50, the capture control circuit 60 causes the subject image to be picked up by the CCD 55 via the CCD drive circuit 56, passes the image signal generated by the image pickup through the A/D conversion circuit 58 and temporarily stores it as digital data (raw data) in the capture buffer memory 59. The capture control circuit 60 converts or compresses the digital data stored temporarily in the capture buffer memory 59 into a specific recording format (JPEG, etc.) to form the image data, and stores the image data on the memory card 77.

A GPS circuit 61 (global positioning system circuit) detects the location information (longitude data and latitude data) for the electronic camera 100 using information from multiple satellites orbiting around the earth, and provides the capture location information to the CPU 50 at the time of image capture. The CPU 50 appends the capture location information to the image data and stores it in the memory card 77.

The CPU 50 can transmit the image data stored in the memory card 77 to the outside via the short-range wireless communication circuit 72 and the antenna 76, or conversely store image data received from the outside via the short-range wireless communication circuit 72 and the antenna 76 in the memory card 77 and display it on the left screen 21, as required.

In playback mode, the screen control circuit 92 reads out the image data indicated by the CPU 50 from the memory card 77 and places it temporarily into the frame memory 69, displays the image data on the left screen 21, and, following the instructions of the CPU 50, places text data such as playback mode instructions into the frame memory 69 and displays the text data on the right screen 22.

Moreover, if transmit button 31 is used in the playback mode, the data displayed on left screen 21 is transmitted to the outside via short-range wireless communication circuit 72 and antenna 76, while if receive button 32 is pressed, data is received from the outside via short-range wireless communication circuit 72 and antenna 76 and the image data is played on left screen 21.

FIG. 34 shows the data configuration of image files stored in the memory card 77. As shown in FIG. 34, multiple image files are stored in the memory card 77. Each image file is made up of image data and appended informational data. The appended informational data consists of capture data that indicates the various settings at the time of image capture, capture date and time data, and capture location data. FIG. 35 is a drawing that shows the configuration of information stored in the EEPROM 68, which consists of camera identification information for identifying the individual electronic camera 100 and gateway server access information used by the portable telephone 120 to access the gateway server 160.

Figure 36:
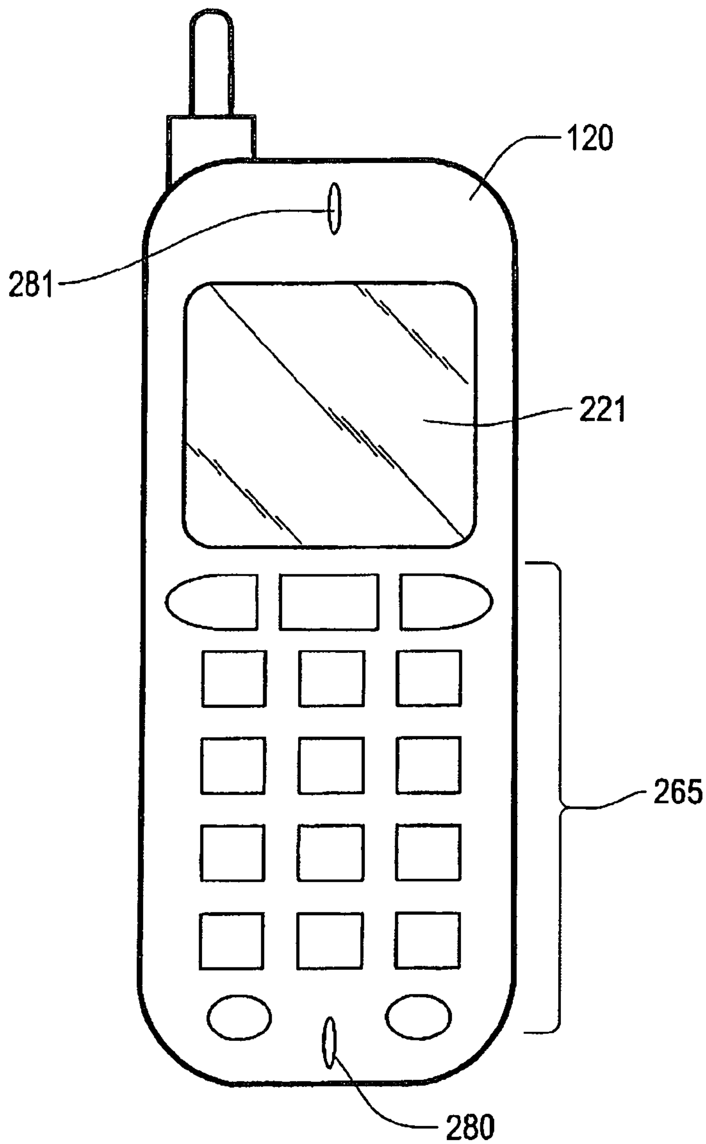
FIG. 36 is an external view of a portable telephone.
Figure 37:
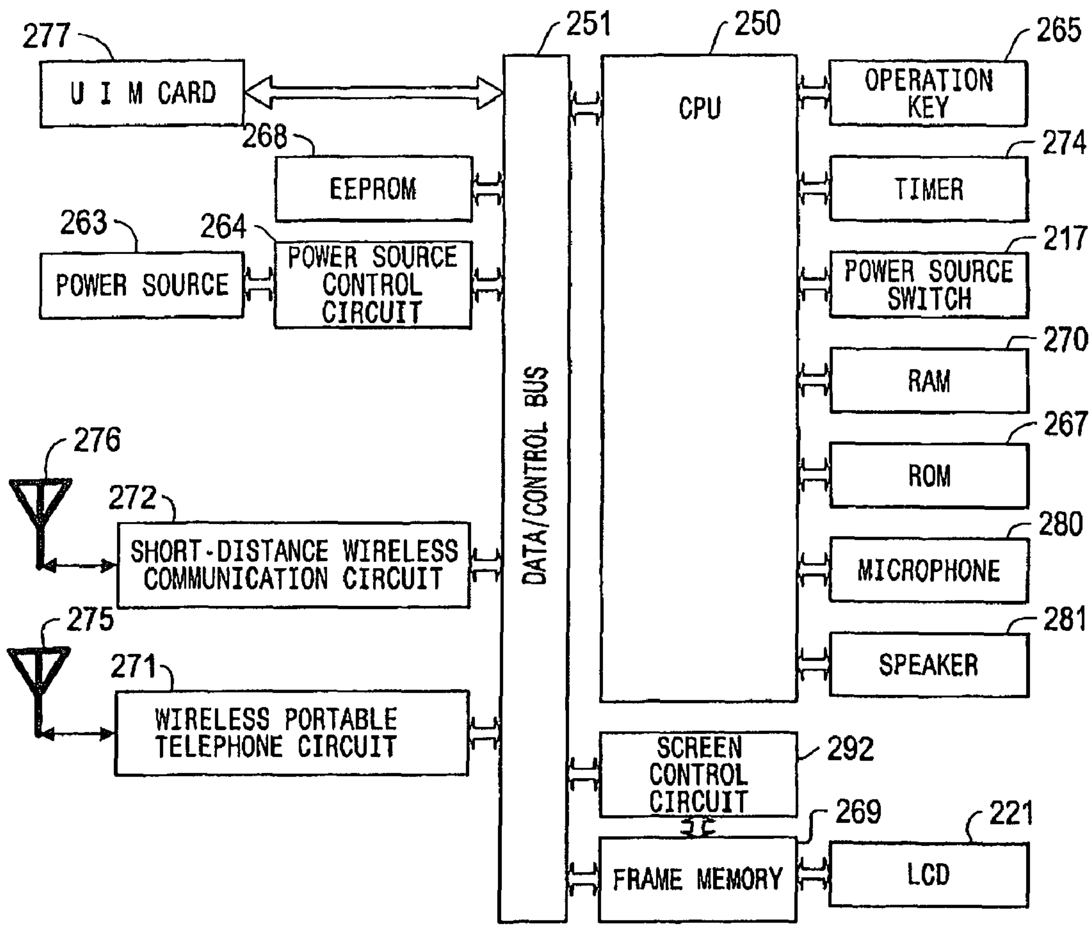
FIG. 37 is a block diagram showing the electrical configuration of a portable telephone.

FIG. 36 is an external view of the portable telephone 120, which is provided with a display screen 221 for displaying image data, various control keys 265, a microphone 280 and a speaker 281. FIG. 37 is a block diagram showing an example of the internal electrical configuration of the portable telephone 120, wherein the various elements are connected to each other via a data/control bus 251 for transmitting various types of informational data and control data. The CPU 250 (central processing unit) is the means that performs overall control of the entire portable telephone 120, issuing various instructions to the screen control circuit 292 and power supply control circuit 264 in accordance with input information from the control keys 265, power switch 217 and timer 274.

The CPU 250 controls the various units in accordance with a control program stored in ROM 267 (read-only memory). The EEPROM 268 (electrically erasable programmable ROM) is a non-volatile memory that is used for storing of settings information necessary for the operation of the portable telephone 120 and for temporary storage of image data. The RAM 270 is a volatile memory that is used as a temporary working area of the CPU 250. The UIM (User Identity Module) is a portable storage medium that can be installed in and removed from the portable telephone 120 and that stores personal information of the user of the portable telephone 120 and the like, which personal information can be used by the CPU 250 as required. The CPU 250 detects the state of manipulation of the power switch 217, and controls the power supply 263 via the power supply control circuit 264.

The CPU 250 performs processing of outgoing and incoming telephone calls using the wireless portable telephone circuit 271 and antenna 275, and performs telephone conversion processing using the microphone 280 and speaker 281. Furthermore, the CPU 250 performs exchange of digital data with the outside by means of packet communication protocol using the wireless portable telephone circuit 271 and antenna 275. Moreover, the CPU 250 performs exchange of messages with electronic devices having a short-range wireless communication capability that are in the vicinity of the portable telephone 120 via the short-range wireless communication circuit 272 and the antenna 276, and is able to exchange image information and the like. The CPU 250 reads and loads image data stored temporarily in EEPROM 268 into frame memory 269, and displays the image data on the display screen 221 using the screen control circuit 92.

Figure 38:
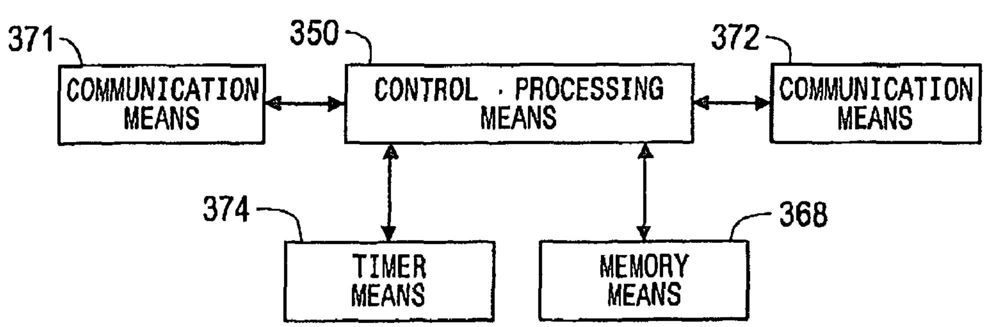
FIG. 38 is a block diagram showing the configuration of a gateway server.

FIG. 38 is a block diagram showing the internal configuration of the gateway server 160, wherein a communication means 371 connected to a packet communication network, a communication means 372 connected to the Internet, a memory means 368 that stores various information such as image data, and a timer means 374 are connected to a control/processing means 350 that performs overall control of the various elements of the gateway server 160. The gateway server 160 exchanges information such as image data with the portable telephone 120 using a packet communication protocol via the communication means 371, and exchanges information such as image data with image servers using Internet protocol via the communication means 372.

Figure 39:
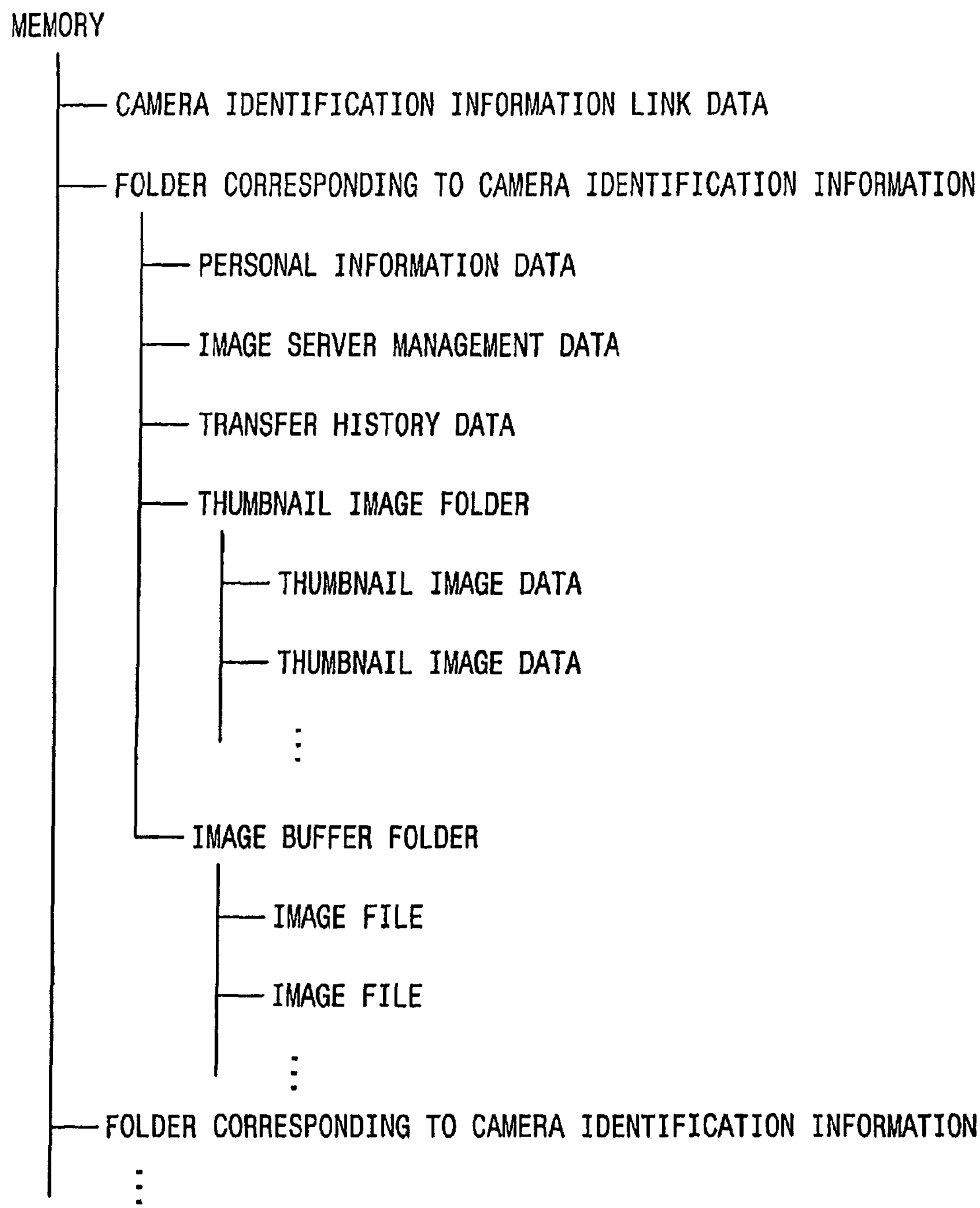
FIG. 39 is a diagram of the memory of a gateway server.

Various types of information are held in the memory means 368, as shown in FIG. 39. The camera identification information link data, as shown in FIG. 40, is data that indicates the correspondence relations of individual items of camera identification information, whereby the arrow indicates that the camera identification information on the right is the parent of the camera identification information on the left. It also represents whether a given item of camera identification information is parent camera identification information, or is single (no link) or is unused, etc. Namely, the gateway server 160 refers to this camera identification information link data, searches for parent camera identification information based on the received camera identification information, and if parent camera identification information exists, performs processing, which is described below, in accordance with the parent camera identification information. Performing such processing makes it possible to treat image data captured with different electronic cameras as image data captured with a single electronic camera. This camera identification information link data can be modified if necessary from an external personal computer 190 or the like, connected to the gateway server 160.

In the memory means 368, as shown in FIG. 39, a folder corresponding to each item of camera identification information is prepared, and each folder corresponding to an item of camera identification information holds personal identification data, image server management data, transfer history data, thumbnail image data and image file data. FIG. 41 is a drawing that shows the configuration of personal identification data, which comprises data relating to the user of the electronic camera 100 corresponding to the camera identification information; the personal identification data can be used by the gateway server 160 to register with image servers on the Internet to secure a new storage area for storing image data or when reading/writing image data to and from image servers. This personal identification data can be modified as necessary from an external personal computer 190 connected to the gateway server 160, and may optionally be made modifiable by transmission of information stored on the UIM card installed in the portable telephone 120 from the portable telephone 120 to the gateway server 160.

Figure 42:
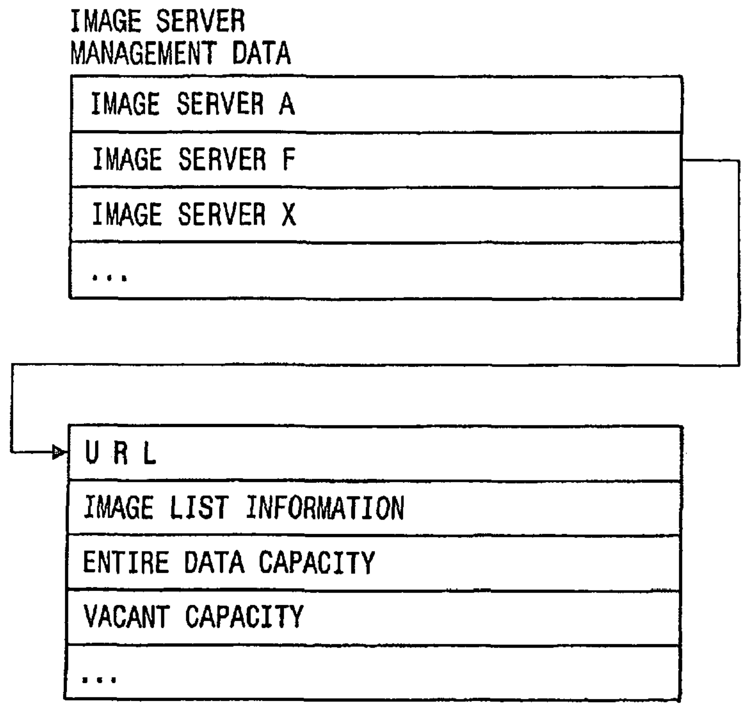
FIG. 42 is an explanatory drawing of server management data.

FIG. 42 is a drawing showing the configuration of server management data, which consists of identifying names of image servers on that the gateway server 160 stores image data according to the camera identification information, the URL (Uniform Resource Locator) of each image server, the total data capacity provided on each image server according to the camera identification information, the available capacity out total data capacity prepared provided on each image server according to the camera identification information, and list information on the image data stored on each image server based on the camera identification information (image file identification information or image file names), etc.

Figure 43:
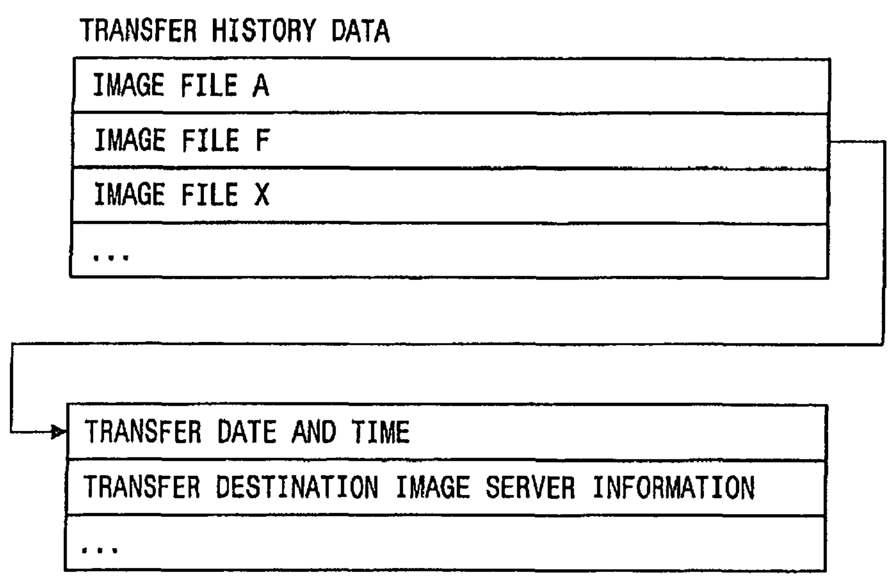
FIG. 43 is an explanatory drawing of transfer history data.

FIG. 43 is a drawing that shows the configuration of the transfer history data, which consists of list information on image data stored on the virtual image server 180 according to the camera identification information (image file identification information or image file names), information on the date and time of transfer of each item of image data to the image server, information relating to the image server to that image data is transferred, etc.

Figure 44:
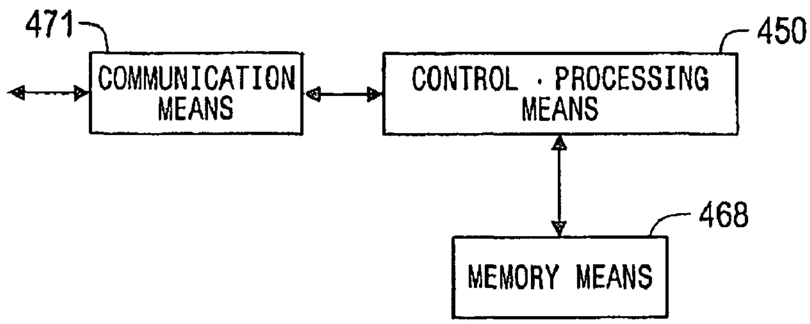
FIG. 44 is a block diagram showing the configuration of an image server.
Figure 45:
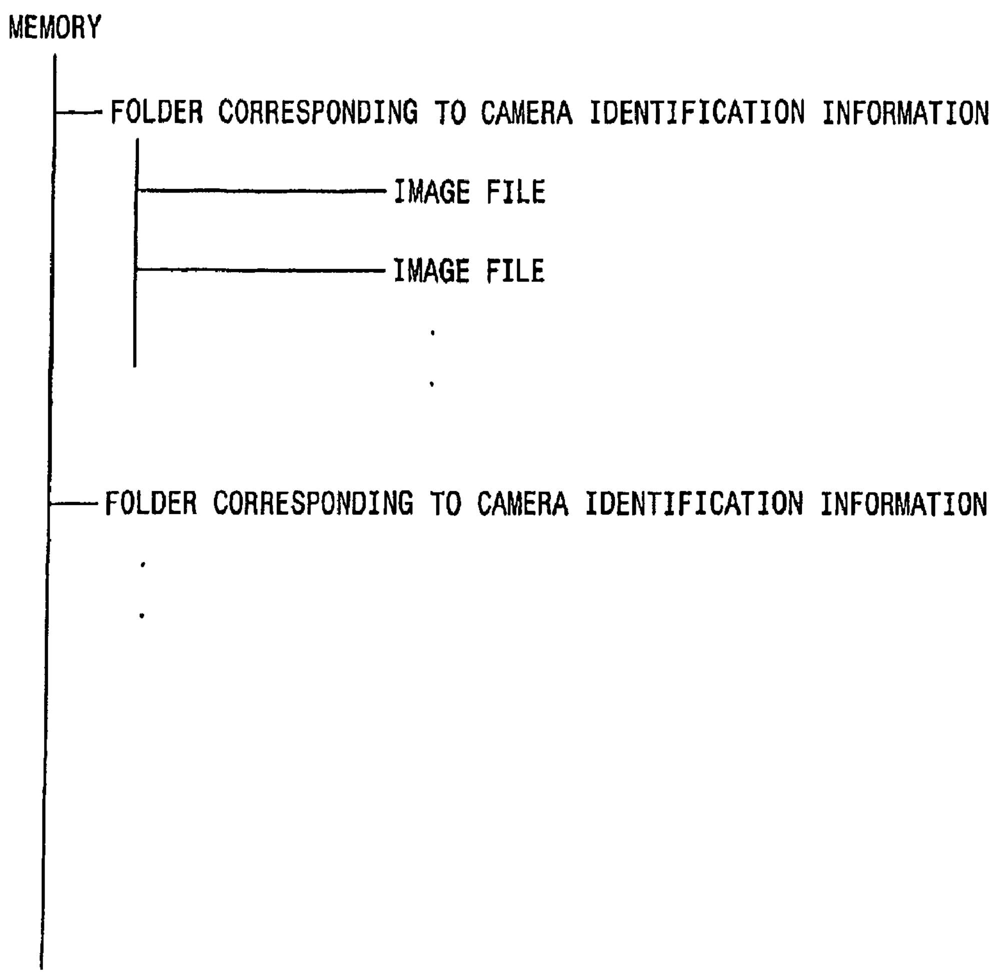
FIG. 45 is a diagram of the memory of an image server.

FIG. 44 is a block diagram showing the internal configuration of image servers 181 through 184, wherein a communication means 471 connected to the Internet and a memory means 468 that stores information such as image data are connected to the control/processing means 450 that performs overall control of the individual elements of image servers 181 through 184. Image servers 181 through 184 exchange information such as image data with the gateway server 160 via the communication means 471 using Internet protocol. In the memory means 468, a folder corresponding to each item of camera identification information is prepared, as shown in FIG. 45, and image file data is stored in the folders corresponding to each item of camera identification information.

Figure 46:
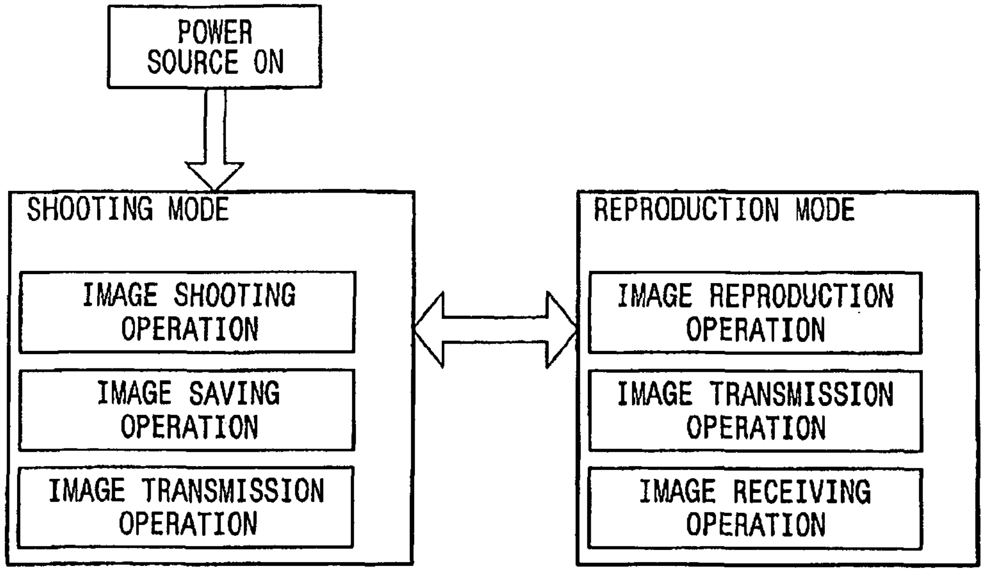
FIG. 46 is a state transition diagram for an electronic camera.

FIG. 46 is a state transition diagram for an embodiment of the electronic camera 100 according to the present invention. When power is turned on, the camera enters capture mode, and manipulating the release button 16 causes the camera to perform a capture operation and a post-capture image file creation and loading of the image file into the memory card 77. In playback mode, it performs playback and display operations on the image data stored in the memory card 77. In capture mode, if the automatic transmission function is turned on, an image transfer operation is performed, whereby captured image data is automatically transmitted and stored on an image server. Furthermore, in playback mode, manipulating the transmit button 31 causes an image transmission operation to be performed, whereby the image data displayed on the left screen 21 is transmitted and stored on an image server. Moreover, in manipulating the receive button 32 in playback mode causes an image reception operation to be performed, whereby the desired image data is received from the image server and displayed on the left screen 21. Furthermore, manipulating the capture mode button 28 causes a transition from playback mode to capture mode, and manipulating the playback mode button 29 causes a transition from capture mode to playback mode.

Figure 47:
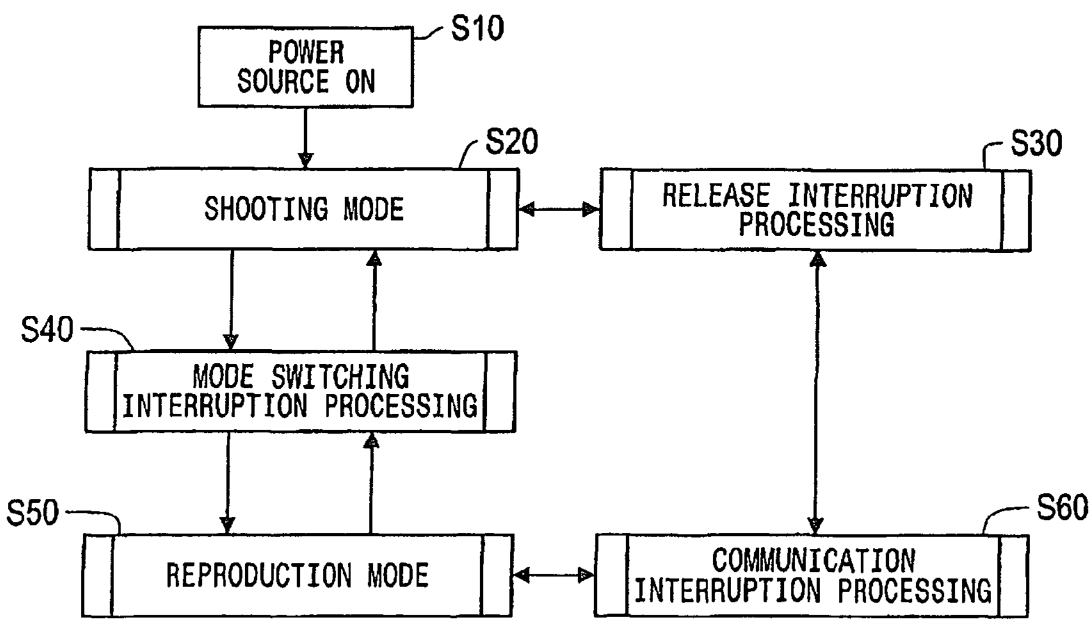
FIG. 47 is a main flow chart of a CPU.

FIG. 47 is a main flow chart of the operation of the electronic camera 100 (CPU 50) in the mode of embodiment described above. First, in S10, the power supply is turned on by manipulating the power switch 17, and in S20, the capture mode subroutine is executed, leading to a capture possible state. If the release button 16 is manipulated while in capture mode, the release interrupt handling subroutine is executed in S30, and the capture operation is carried out. If the playback mode button 29 is manipulated while in capture mode, a mode switch interrupt handling subroutine is executed in S40, the playback mode subroutine is executed in S50, and image data stored in the memory card 77 is played back and displayed on the left screen 21. Conversely, if the capture mode button 28 is manipulated while in playback mode, a mode switch interrupt handling subroutine is executed in S40, and the system moves to the capture mode subroutine of S20. If the automatic transmission function is turned on, manipulating the release button 16 causes the communication interrupt processing of S60 to be executed following the capture operation, and transmission of image data to the image server is carried out. Furthermore, manipulating the transmit button 31 or the receive button 32 while in playback mode causes the communication interrupt processing of S60 to be executed, and transmission of image data to the image server or reception of image data from the image server is carried out.

Figure 48:
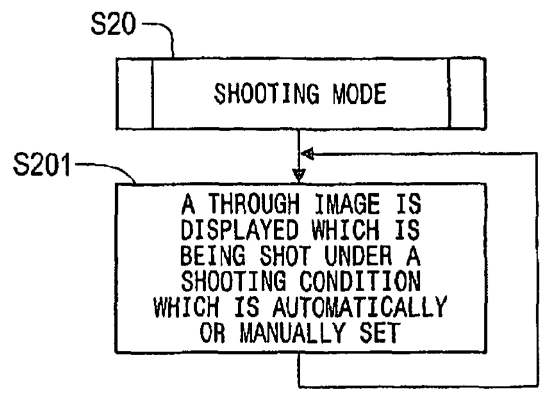
FIG. 48 is a subroutine flow chart.
Figure 49:
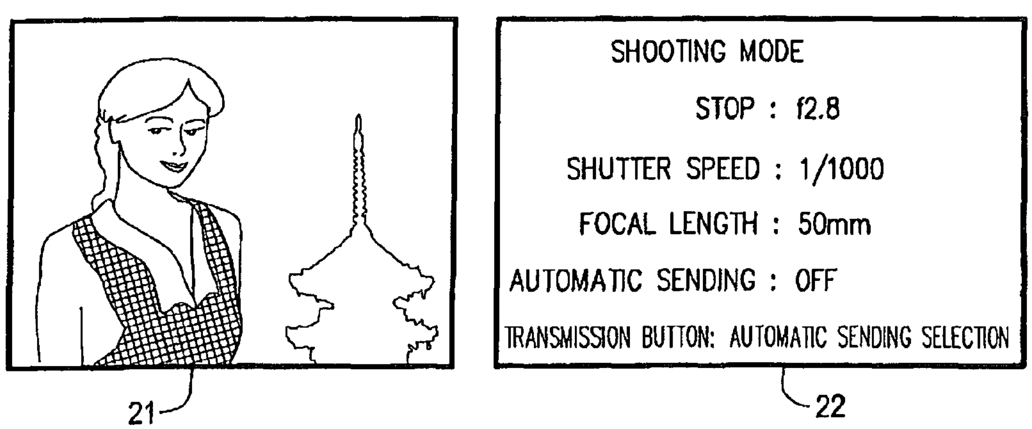
FIG. 49 is a screen display example.

FIG. 48 is a detailed flow chart of the capture mode subroutine. Starting in S20, the processing of S201 is repeated. In S201, image data successively generated by the CCD 55 under the camera settings made by the user is displayed on the left screen 21 as shown in FIG. 49, at that time the capture settings are displayed as text on the right screen 22.

Figure 50:
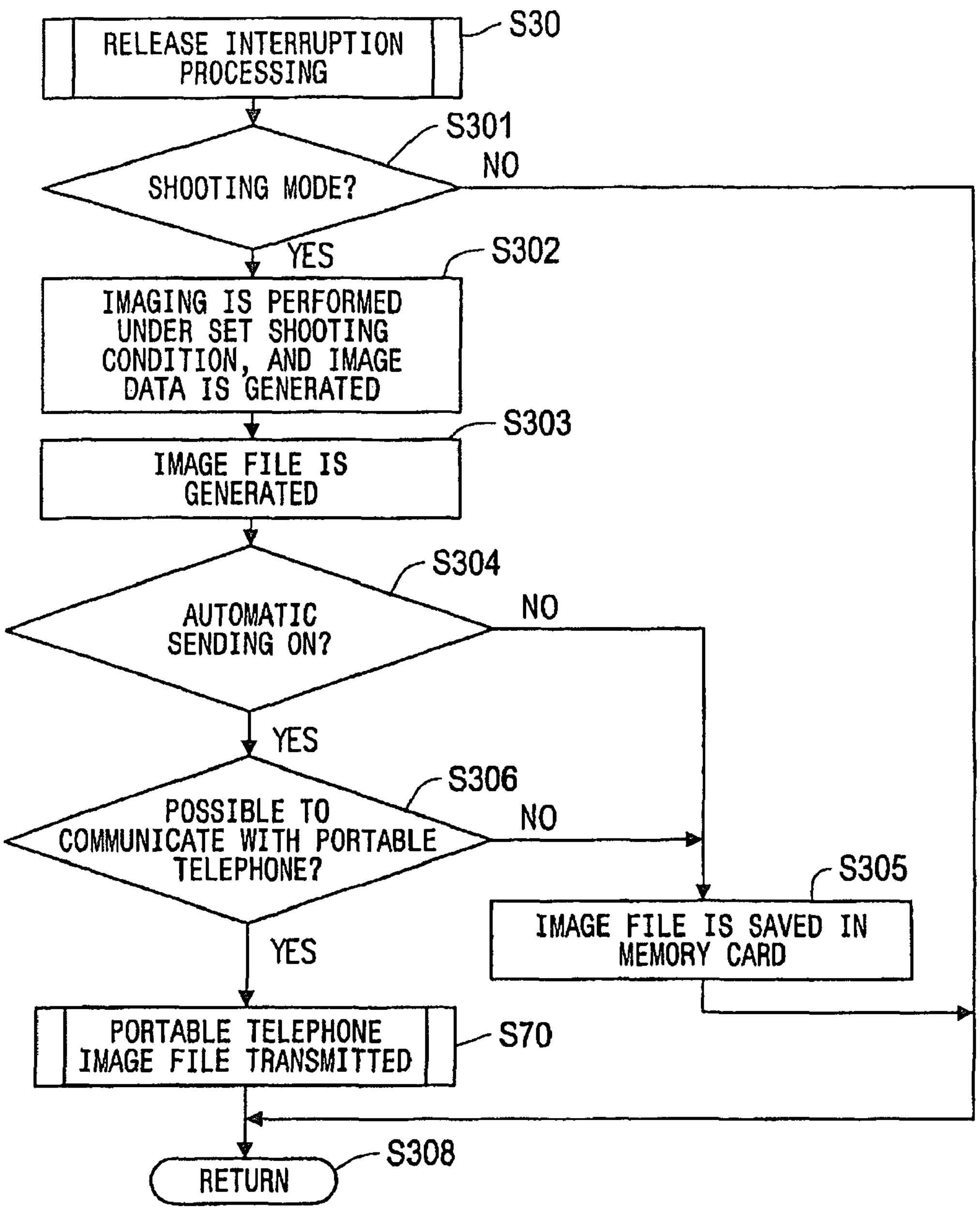
FIG. 50 is a subroutine flow chart.

FIG. 50 is a detailed flow chart of the release interrupt handling subroutine. Starting in S30, it is checked in S301 whether the system is in capture mode, and if it is not in capture mode, the system returns in S308. If it is in capture mode, the capture operation is carried out under the capture conditions set by the user or the camera to generate image data, and appended informational data (capture data, time data, location data) is appended to the image data in S303 to general an image file. In S304, it is checked whether the automatic transmit function is turned on, and if it is not turned on, the image file is loaded into the memory card 77 in S305 and the system returns in S308. If the automatic transmit function is turned on, communication with the portable telephone 120 is attempted using the short-range wireless communication circuit 72 in S306, checking whether communication is possible, and if communication with the portable telephone 120 is possible, the portable telephone image file transmission subroutine of S70 is executed, transmitting the image file to the portable telephone 120, and the system returns in S308. If communication with the portable telephone 120 is not possible, the system goes back to S305, stores the image file on the memory card 77, and returns in S308.

Figure 51:
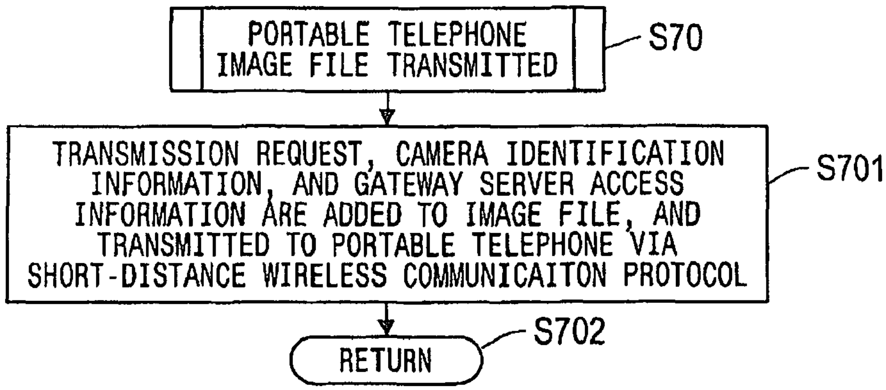
FIG. 51 is a subroutine flow chart.

FIG. 51 is detailed flow chart of the portable telephone image file transmission subroutine. Starting in S70, the image file, camera identification information, gateway server access information and an image transmit request are transmitted to the portable telephone 120 by means of the short-range wireless communication circuit 72 using a short-range wireless communication protocol (Bluetooth, etc.), and the system returns in S702.

Figure 52:
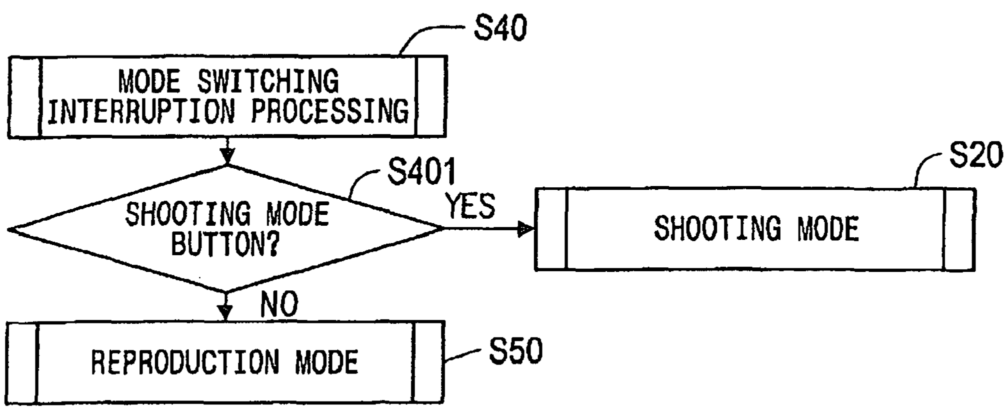
FIG. 52 is a subroutine flow chart.

FIG. 52 is a detailed flow chart of the mode switch interrupt handling subroutine. Starting in S40 upon manipulation of the capture mode button 28 or playback mode button 29, it is checked in S401 whether the manipulated button was the capture mode button 28, and if it was the capture mode button 28, playback mode is terminated and the system moves to the capture mode subroutine of S20. If the manipulated button was not the capture mode button 28, the capture mode is terminated and the system moves to the playback mode subroutine of S50.

Figure 53:
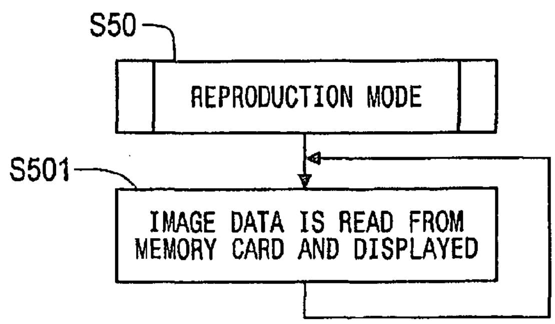
FIG. 53 is a subroutine flow chart.
Figure 54:
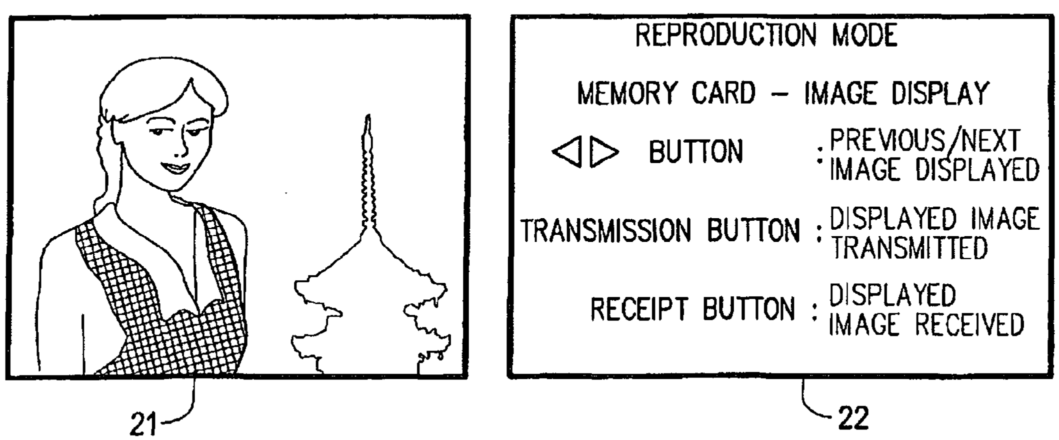
FIG. 54 is a screen display example.

FIG. 53 is detailed flow chart of the playback mode subroutine. Starting in S50, the processing of S501 is repeated. In S501, in response to the manipulation of the LEFT button 25 and RIGHT button 26, image data stored in the memory card 77 is selected and read, and is played back and displayed on the left screen 21 as shown in FIG. 54, while operating instructions are displayed on the right screen 22. After power is turned on, the most recent image data is displayed; subsequently, image data with older time data are displayed successively in response to manipulation of the LEFT button 25, and image data with newer time data are displayed successively in response to manipulation of the RIGHT button.

Figure 55:
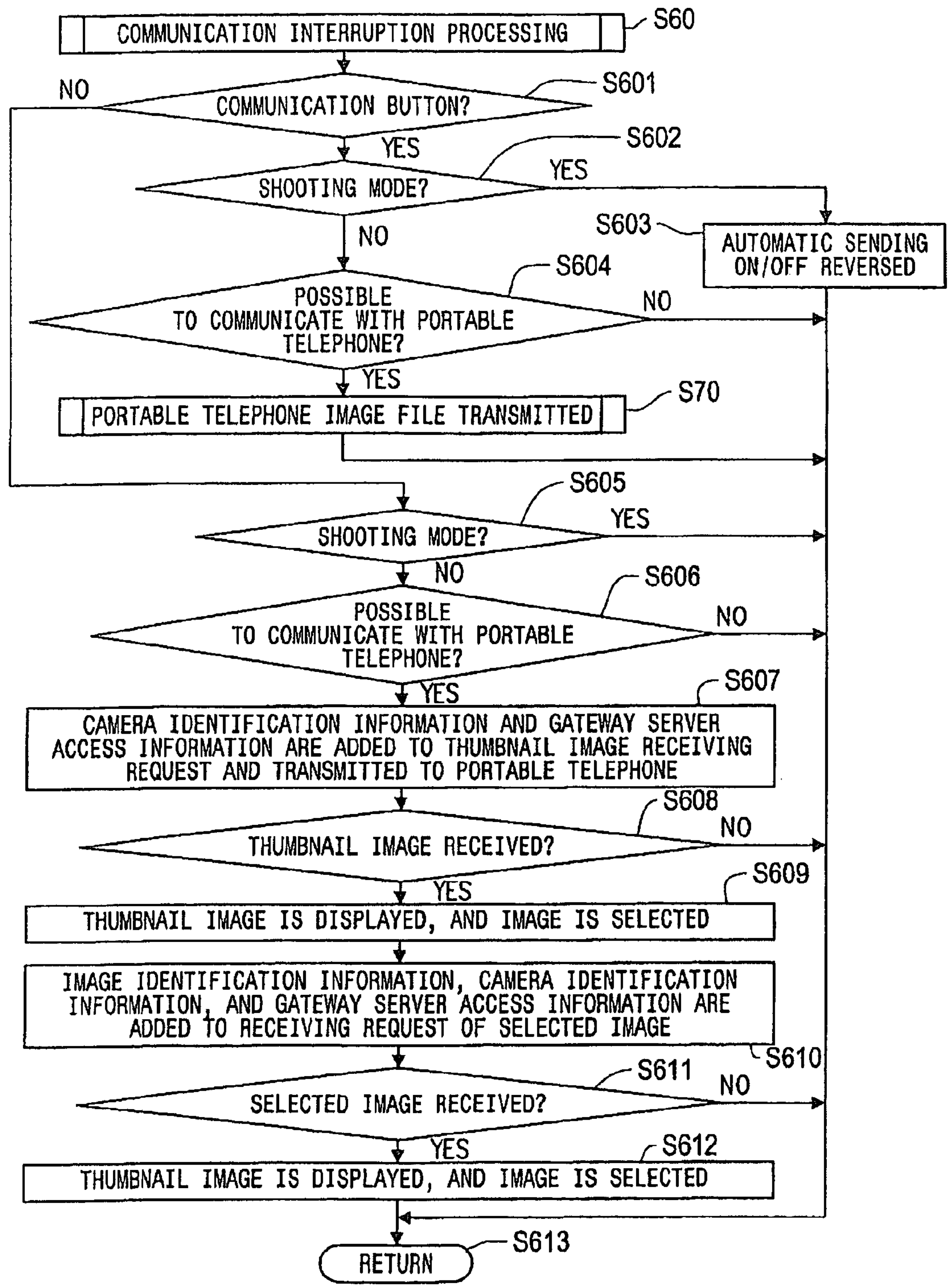
FIG. 55 is a subroutine flow chart.

FIG. 55 is a detailed flow chart of the communication interrupt handling subroutine started by manipulating the transmit button 31 or receive button 32. Starting in S60, it is checked in S601 whether the manipulated button was the transmit button 31, and if was the transmit button 31, it is checked in S602 whether the system is in capture mode, and if it is in capture mode, the current setting of the automatic transmit function is inverted in S603, and the system returns in S613. If the system was in playback mode in S602, communication with the portable telephone 120 using the short-range wireless communication circuit 72 is attempted in S604, checking whether communication is possible, and if communication with portable telephone 120 is possible, the portable telephone image file transmission subroutine of S70 is executed, transmitting the image file of the image data currently displayed on the left screen 21 to the portable telephone 120, and the system returns in S613. If communication with the portable telephone 120 is not possible, the system returns in S613.

Figure 56:
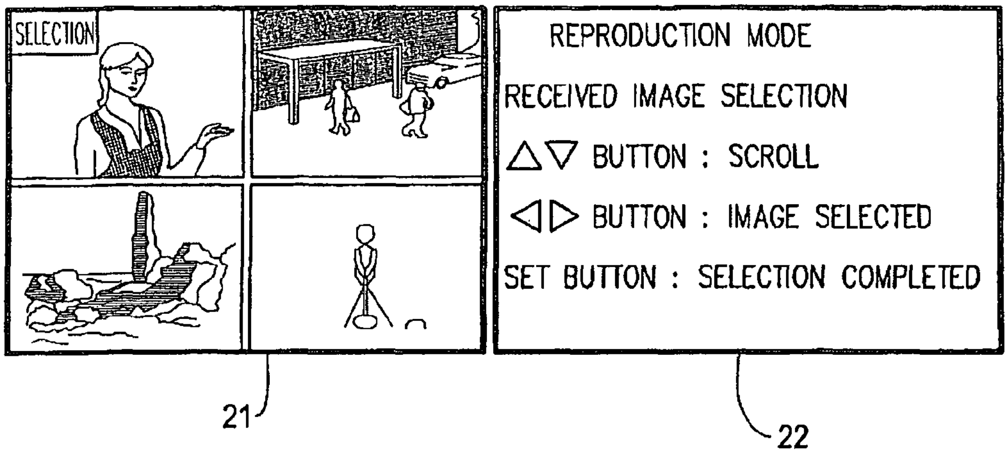
FIG. 56 is a screen display example.
Figure 57:
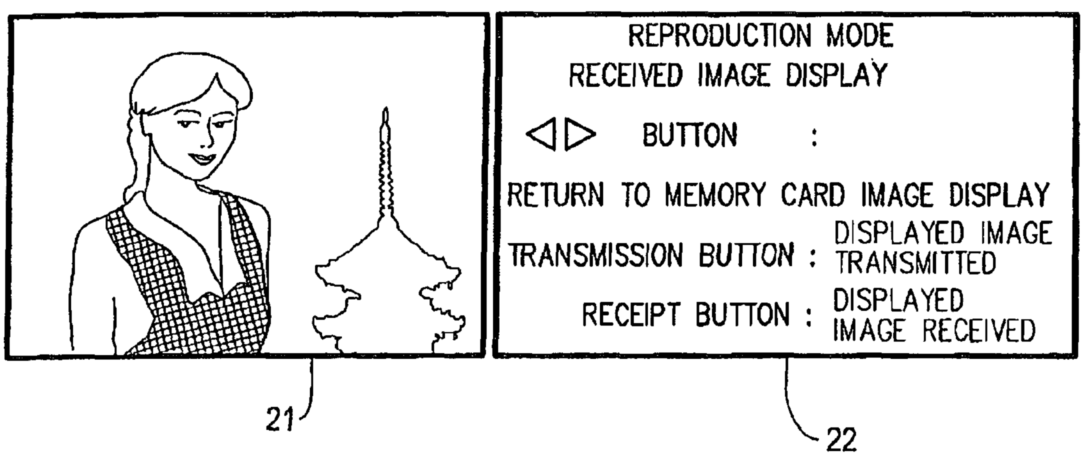
FIG. 57 is a screen display example.

If the button manipulated in S601 was the receive button 32, it is checked in S605 whether the system is in capture mode, and if it is in capture mode, the system returns in S613. If it is in playback mode, communication with the portable telephone 120 using the short-range wireless communication circuit 72 is attempted in S606, checking whether communication is possible, and if communication with the portable telephone 120 is not possible, the system returns in S613. If communication with portable telephone 120 is possible, in S607, the camera identification information, gateway server access information and a thumbnail image reception request are transmitted to the portable telephone 120 by means of the short-range wireless communication circuit 72 using a short-range wireless communication protocol (Bluetooth, etc.). In S608, the system waits to receive thumbnail images form the portable telephone 120 and returns in S613 if reception was not possible. If thumbnail images were received, in S609, as shown in FIG. 56, the received thumbnail images are displayed on the left screen 21, while operating instructions are displayed on the right screen 22. The thumbnail images are scrolled by manipulating the UP button 23 and DOWN button 24, and either the left or right thumbnail image is selected by manipulating the LEFT button 25 or RIGHT button 26. Manipulating the SELECT button 27 confirms the selected thumbnail image. In S610, the identification information appended to the selected thumbnail image, the camera identification information, gateway server access information and an image reception request are transmitted to the portable telephone 120 by means of the short-range wireless communication circuit 72 using a short-range wireless communication protocol (Bluetooth, etc.). In S611, the system waits to receive image data from the portable telephone 120 and returns in S612 if reception was not possible. If image data was received, in S612, as shown in FIG. 57, the received image data is displayed on the left screen 21 while operating instructions are displayed on the right screen 22, and the system returns in S613.

Figure 58:
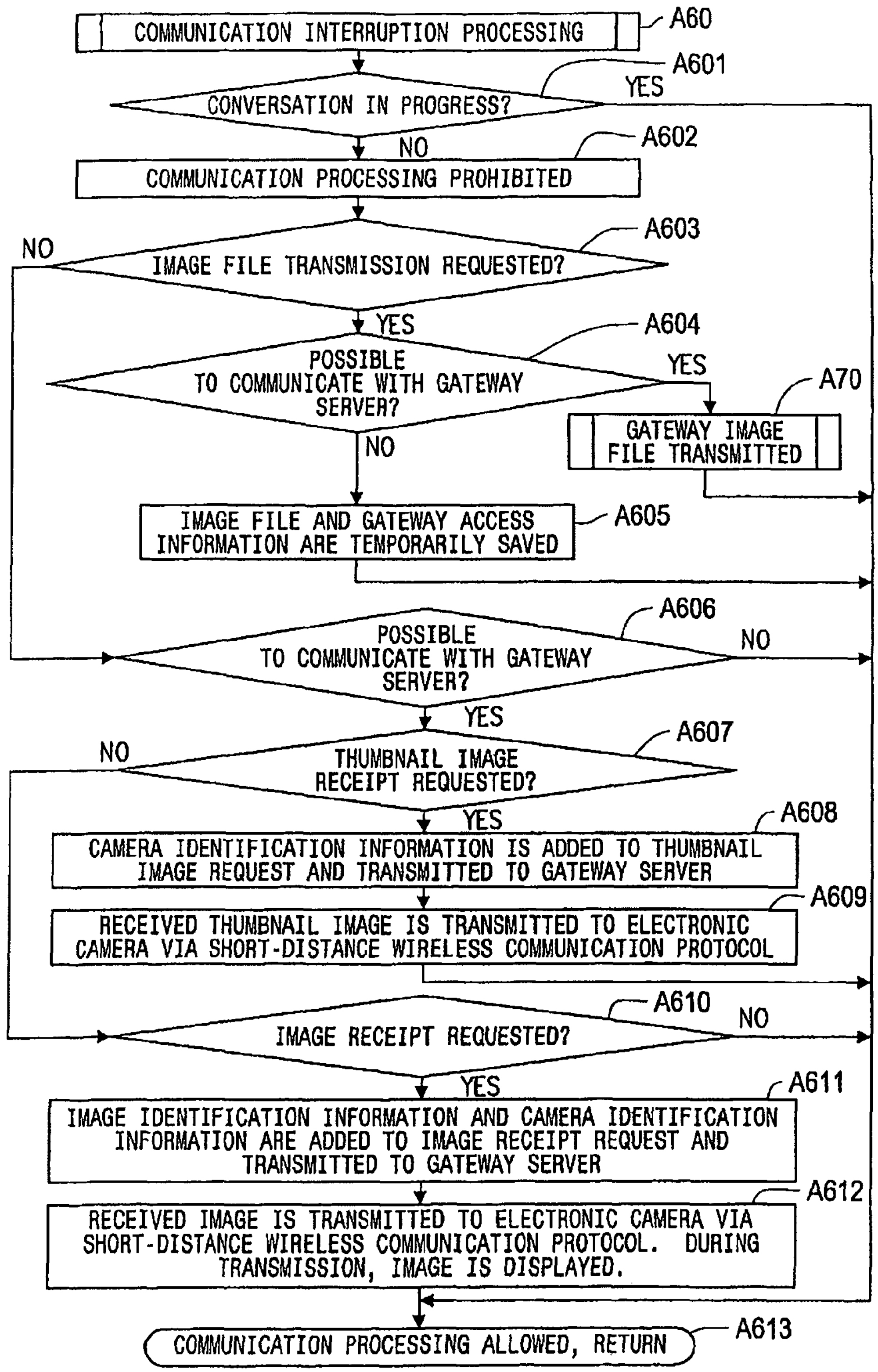
FIG. 58 is a subroutine flow chart.

Next, operation of the portable telephone 120 (CPU 250) in the above mode of embodiment will be described. Description of the operation of the portable telephone 120 relating to talk functions will be omitted as it has little bearing on the present invention. FIG. 58 is a detailed flow chart of the communication interrupt handling started when the portable telephone 120 performs image transmission. Communication interrupt handling is started in A60 when a communication request is received via short-range wireless communication from the electronic camera 100, it is checked in A601 whether the system is currently processing a voice call, and if it is processing a voice call, the system returns in A613 without responding to the communication request from the electronic camera 100. If a voice call is not being processed, voice call processing is blocked in A602, it is checked in A603 whether the request from the electronic camera 100 is an image file transmission request, and if it was an image file transmission request, in A604, communication is attempted with the gateway server 160 using the wireless portable telephone circuit 271 based on the gateway server access information, checking whether communication is possible, and if communication with the gateway server 160 is possible, the gateway image file transmission subroutine of A70 is executed, the image file received from the electronic camera 100 is transmitted to the gateway server 160, voice call processing is unblocked in A613, and the system returns. If communication with the gateway server 160 is not possible, in A605, the image file, camera identification information, gateway server access information, etc. received from the electronic camera 100, are stored temporarily in EEPROM 268, and the system unlocks voice call processing and returns in A613.

If the request from the electronic camera 100 in A603 was not an image file transfer request, in A606, communication with the gateway server 160 is attempted using the wireless portable telephone circuit 271 based on the gateway server access information, checking if communication is possible, and if communication with the gateway server 160 is not possible, the system unblocks voice call processing in A613 and returns. If communication with the gateway server 160 is possible, it is checked in A607 whether the request from the electronic camera 100 is a thumbnail image reception request, and if it was a thumbnail image reception request, in A608, a thumbnail image reception request and camera identification information are transmitted to the gateway server 160 by means of the wireless portable telephone circuit 271 using a packet communication protocol. In A609, the thumbnail images are received from the gateway server 160 and are transmitted to the electronic camera 100 by means of the short-range wireless communication circuit 272 using a short-range wireless communication protocol. While transmitting thumbnail images to the electronic camera 100, the thumbnail images are displayed on the screen 221. Once transmission of thumbnail images to the electronic camera 100 is completed, the system unblocks voice call processing and returns in A613.

Figure 61:
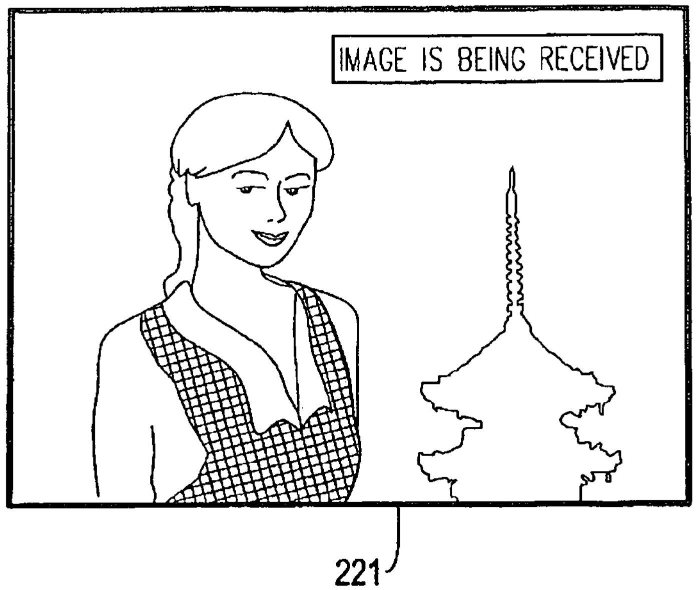
FIG. 61 is a screen display example.

If the request from the electronic camera 100 in A607 was not a thumbnail image reception request, in A610 it is checked whether the request from the electronic camera 100 is a selected image reception request, and if it was not an image reception request, the system unblocks voice call processing and returns in A613. If it was an image reception request, in A611, an image reception request, image identification information and camera identification information are transmitted to the gateway server 160 by means of the wireless portable telephone circuit 271 using a packet communication protocol. In A612, image data corresponding to the image identification information is received from the web server 160, and is transmitted to the electronic camera 100 by means of the short-range wireless communication circuit 272 using a short-range wireless communication protocol. During transmission of images to the electronic camera 100, the image data is displayed on the screen 221, as shown in FIG. 61. Once transmission of image data to the electronic camera 100 is completed, display of image data on the screen 221 is terminated, and the system unblocks voice call processing and returns in A613. To more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

Figure 59:
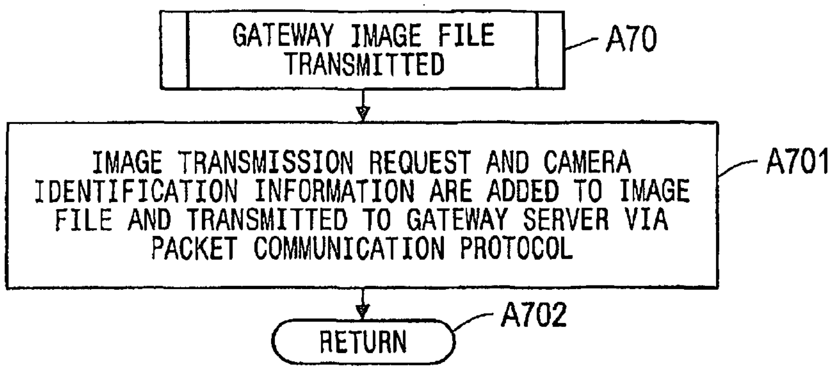
FIG. 59 is a subroutine flow chart.
Figure 60:
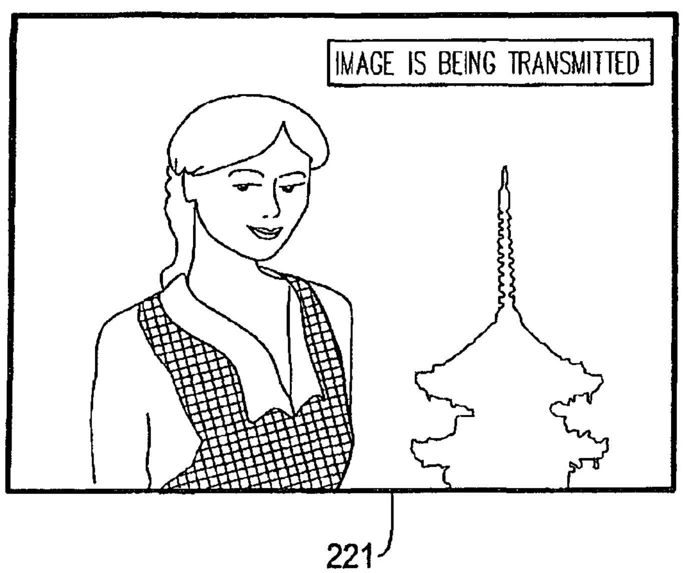
FIG. 60 is a screen display example.

FIG. 59 is a detailed flow chart of the gateway image file transmission subroutine. Starting in A70, in A701 the image file, camera identification information and an image transmission request are transmitted by packet communication protocol using the wireless portable telephone circuit 271 to the gateway server 160 designated based on the gateway access information, and the system returns in A702. While an image file is being transmitted to the gateway server 160, the image data being transmitted is displayed on the screen 221, as shown in FIG. 60, and the display is terminated once transmission is completed. Furthermore, to more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

Figure 62:
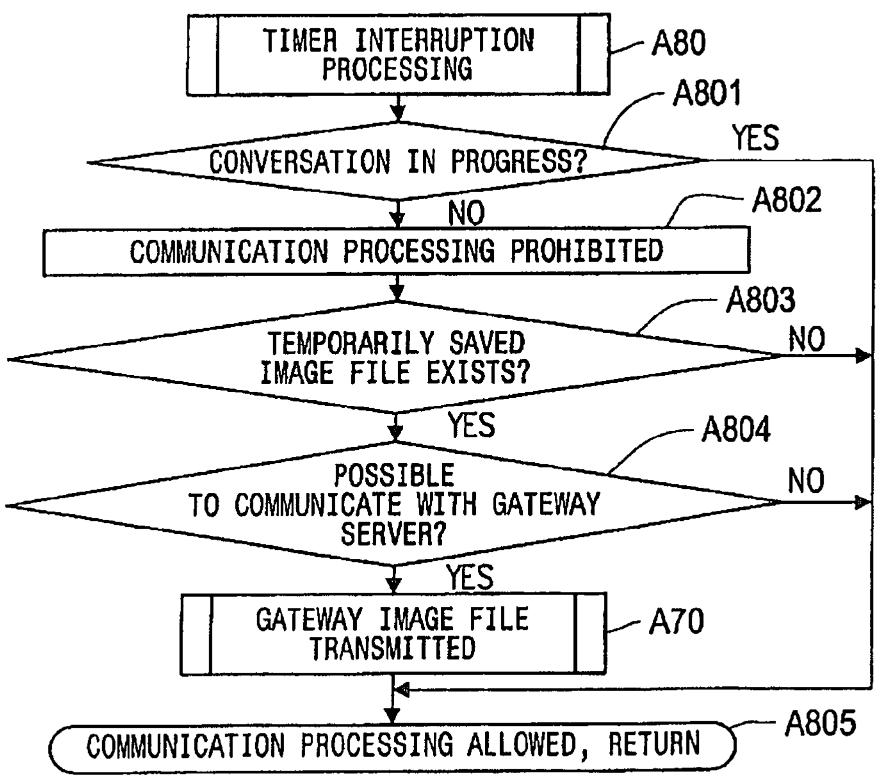
FIG. 62 is a subroutine flow chart.

FIG. 62 is a detailed flow chart of the timer interrupt handling subroutine launched at regular intervals by the timer 274 of the portable telephone 120. Starting in A80, it is checked in A801 whether the system is currently processing a voice call, and if it is currently processing a voice call, the system returns in A805. If it is not processing a voice call, voice call processing is blocked in A802, it is checked in A803 whether there are image files being temporarily stored in EEPROM 268, and if there are no image files being temporarily stored, the system unblocks voice call processing and returns in A805. If there are temporarily stored image files, communication with the gateway server 160 by means of the wireless portable telephone circuit 271 based on the gateway server access information is attempted in A804, checking whether communication is possible, and if communication with the gateway server 160 is not possible, the system unblocks voice call processing and returns in A805. If communication with the gateway server 160 is possible, the gateway image file transmission subroutine of A70 is executed, image files received from the electronic camera 100 are transmitted to the gateway server 160, and in A805, the system unblocks voice call processing and returns.

As indicated above, when communication with the gateway server 160 is not possible, the portable telephone 120 temporarily stores the image files received from the electronic camera 100, and when communication with the gateway server 160 becomes possible, it automatically transmits the temporarily stored image files to the gateway server 160. To notify the user of the fact that image files transmitted from the electronic camera 100 to the gateway server 160 are being temporarily stored by the portable telephone 120, one may optionally display a specific mark, icon or text on the screen 221 while image files are being temporarily stored by the portable telephone 120. By doing this, in a situation where the user is in a hurry to transmit the image files, the user will be able to see this display and perform image file transmission by a different method.

Furthermore, while the communication interrupt handling of FIG. 58 assumes that the connection between the electronic camera 100 and portable telephone 120 is maintained until communication is completed once the connection between the electronic camera 100 and portable telephone 120 has been established, in case the connection between the electronic camera 100 and the portable telephone 120 should be cut off (for example, if the portable telephone 120 becomes unable to transmit thumbnail images or image files received from the gateway server 160 to the electronic camera 100), one can have the thumbnail images and image files be stored temporarily in the EEPROM 268 of the portable telephone 120, have the portable telephone 120 detect when communication between the portable telephone 120 and electronic camera 100 becomes possible, and automatically transmit the thumbnail images or image files stored temporarily in EEPROM 268 to the electronic camera 100. The portable telephone 120 may optionally display the fact that that thumbnail images or image files transmitted to the electronic camera 100 from the gateway server 160 are being stored temporarily by the portable telephone 120 by displaying a special mark, icon or text on the screen 221 while the image files are being temporarily stored by the portable telephone 120. By doing this, in a situation where the user is in a hurry to transmit the image files, the user will be able to see this display, and take countermeasures such as rechecking the connection between the portable telephone 120 and electronic camera.

Next, the operation of the gateway server 160 (control/processing means 350) in the above mode of embodiment will be described. Description of operations of the gateway server

Figure 63:
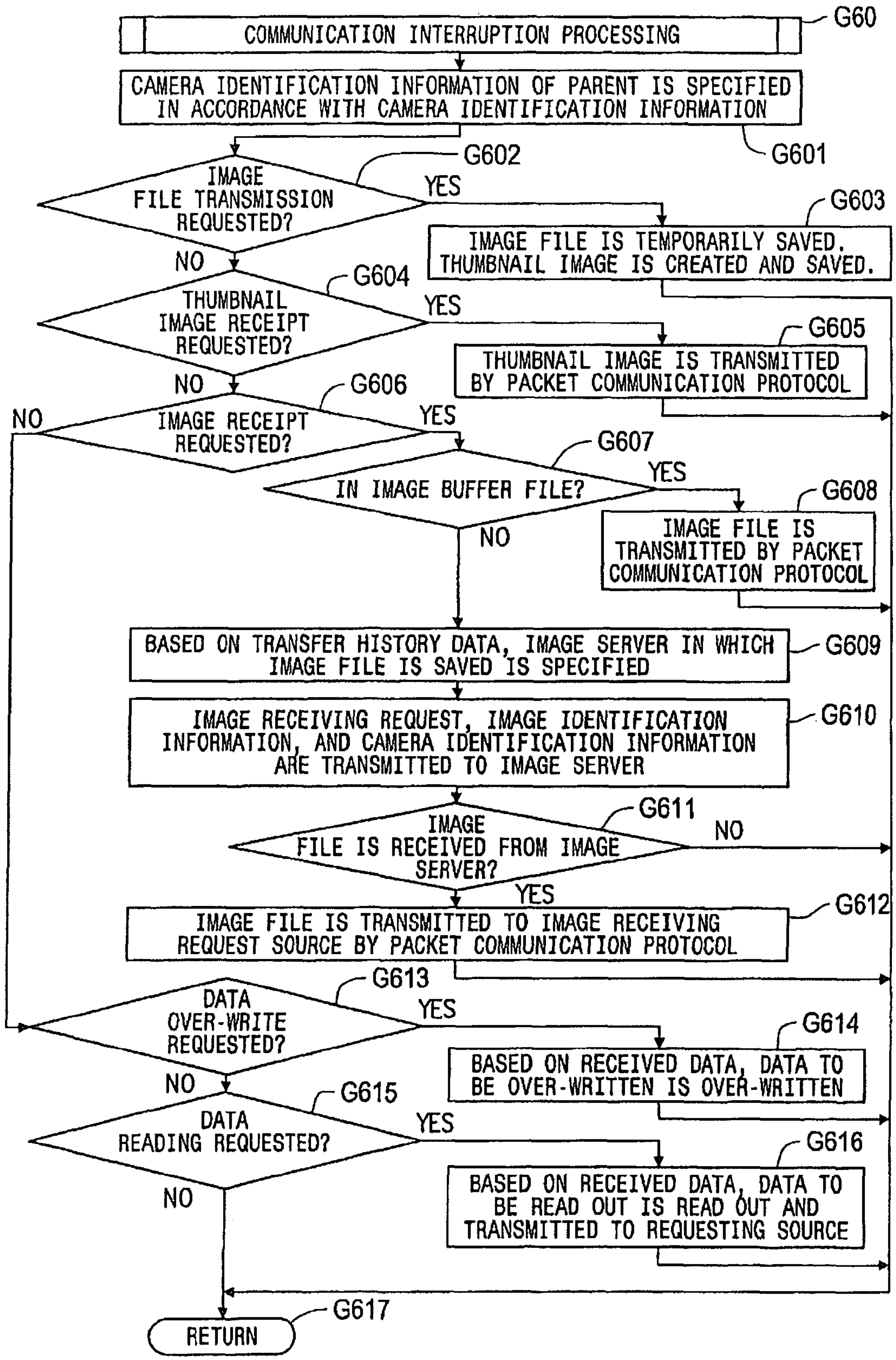
FIG. 63 is a subroutine flow chart.

160 other than the image transmission operation will be omitted as they have little bearing on the present invention. FIG. 63 is a detailed flow chart of the communication interrupt handling started when the gateway server 160 performs image transmission. Starting in G60 with a communication request from the portable telephone 120 or personal computer 190, in G601, the parent camera identification information is identified by referring to the camera identification information link data based on the received camera identification information. Subsequent image data handling is performed on the folder corresponding to the parent camera identification information. In G602, it is checked whether the received request is an image file transmission request, and if it was an image file transmission request, in G603, the received image file is stored temporarily in an image buffer folder in the folder corresponding to the camera identification information, thumbnail image data corresponding to the image data is generated and stored in a thumbnail image folder, likewise in the folder corresponding to the camera identification information, and the system returns in G617.

If the request received in G602 was not an image file transmission request, it is checked in G604 whether the received request is a thumbnail image reception request, and if it was a thumbnail image reception request, in G605 the thumbnail images stored in the thumbnail image folder inside the folder corresponding to the camera identification information are transmitted by packet communication protocol to the originator of the thumbnail image reception request (portable telephone 120), and the system returns in G617. If the request received in G604 was not a thumbnail image reception request, it is checked in G606 whether the received request is an image reception request, and if it was an image reception request, it is checked in G607 whether image data corresponding to the image identification information exists in the image buffer folder inside the folder corresponding to the camera identification information, and if image data corresponding to the image identification information exists in the image buffer folder, the image file containing the image data is transmitted to the originator of the image reception request (portable telephone 120) using a packet communication protocol in G608, and the system returns in G617.

If there is no image data corresponding to the image identification information in the image buffer folder, the image server where the image file corresponding to the image identification information is stored is determined based on the transfer history data in G609, and an image reception request and the image identification information is transmitted to that image server using Internet protocol in G610. In G611, the system waits to receive the specified image file from the image server, returning in G617 if the image file could not be received from the image server; if the image file was received from the image server, the image file is transmitted to the originator of the image reception request (portable telephone 120) in G612 using a packet communication protocol, the image file is stored temporarily in the image buffer folder in the folder corresponding to the camera identification information, and the system returns in G617.

If the received request in G606 was not an image reception request, it is checked in G613 whether the received request is a data overwrite request, and if it was a data overwrite request, personal identification data, camera identification information link data or the like in the folder corresponding to the camera identification information is overwritten according to the received data, and the system returns in G617. If the received request in G613 was not a data overwrite request, it is checked in G615 whether the received request was a data read request, and it was a data read request, the personal identification data, camera identification information link data and the like in the folder corresponding to the camera identification information is read and transmitted to the requestor in accordance with the received data, and the system returns in G617. If the received request in G615 was not a data read request, the system returns in G617.

Figure 64:
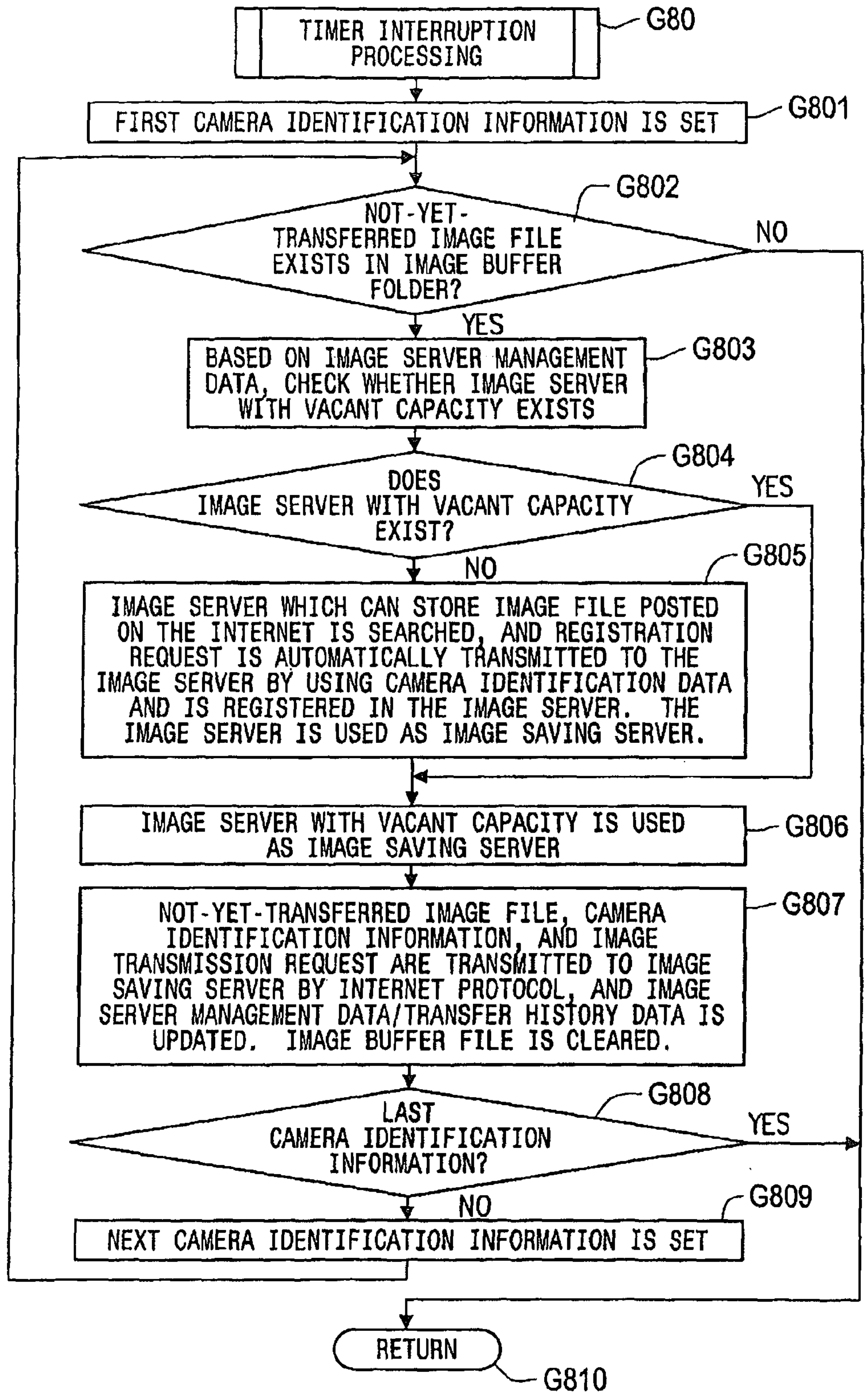
FIG. 64 is a subroutine flow chart.

FIG. 64 is a detailed flow chart of the timer interrupt handling started at specific intervals by the timer 374 of the gateway server 160. Starting at G80, the first item of camera identification information from the camera identification information list maintained by the gateway server 160 is selected in G801. In G802, it is checked based on the transfer history data whether there are image files that have not been transferred yet to the image server in the image buffer folder inside the folder corresponding to the selected camera identification information, and if there are no image files that have not been transferred yet, the system returns in G810. If there are image files that have not been transferred yet, it is checked in G803, based on image server management data, whether there is an image server with available capacity. In S804, if there is an image server with available capacity, the system proceeds to G806, and if there are no image servers with available capacity, a new image server with available capacity is searched for in G805. In G805, a search is carried out for open image servers on the Internet that are able to store image files, registration with the found image server is carried out automatically using camera identification information, and information on the image server (storage capacity, etc.) is recorded in the image server management data. In G806, an image server with available capacity is designated as the image server for storing images. In G807, image files that have not been transferred yet are transmitted using Internet protocol to the image server designated as the image server for storing images, the image server management data and transfer history data are updated, and all the image files stored temporarily in the image buffer folder are deleted. In G807, it is checked whether the currently selected camera identification information is the last item of camera identification information in the camera identification information list; if it is not the last item of camera identification information, in G809, the camera identification information is updated to the next item of camera identification information, the system goes back to G802 and repeats the processing described above, and if it is the last item of camera identification information, the system returns in G810.

Figure 65:
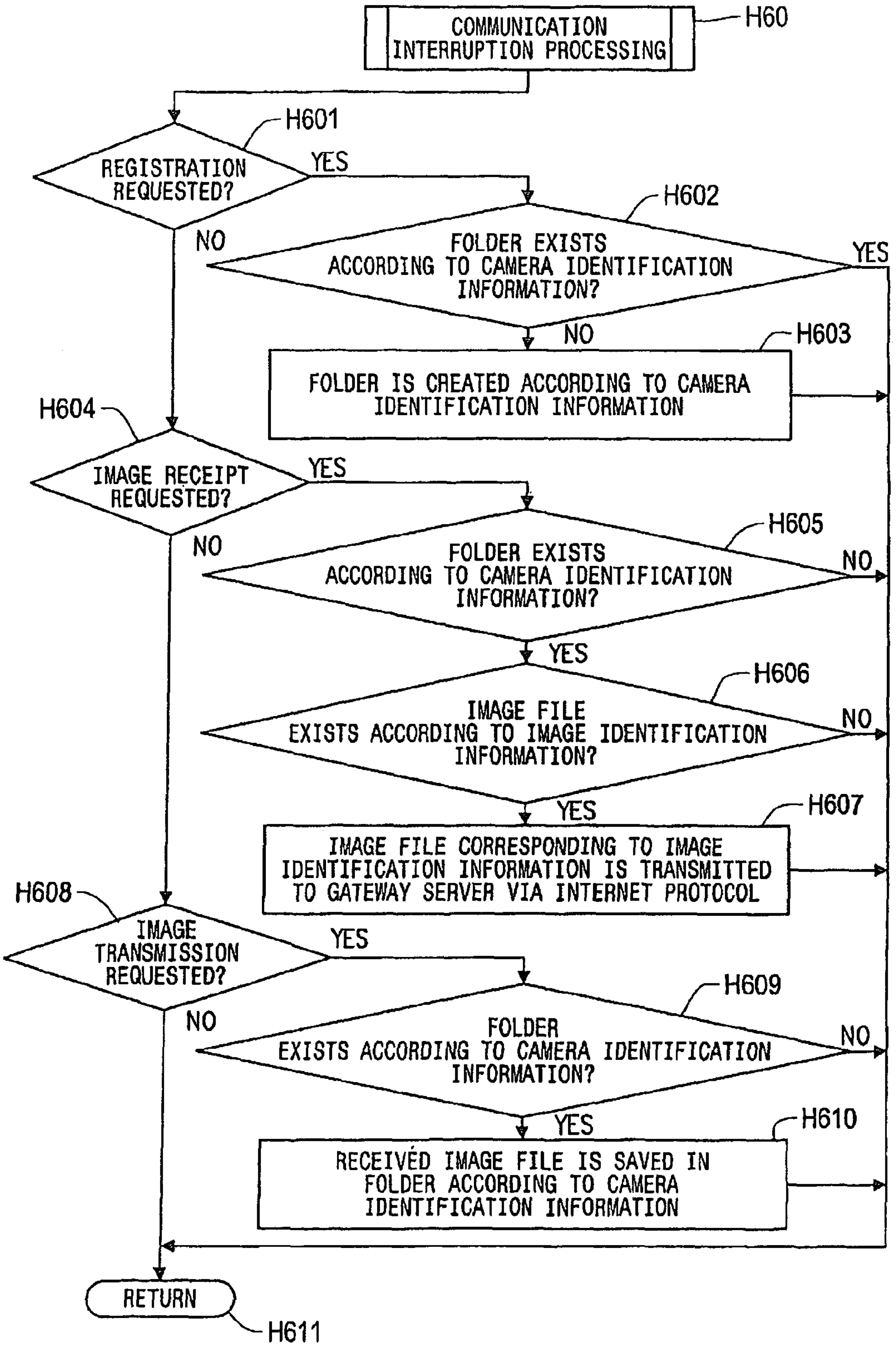
FIG. 65 is a subroutine flowchart.

Next, the operation of the image servers 181 through 184 (control/processing means 350) in the above mode of embodiment will be described. Description of operations of the image servers 181 through 184 other than the image transmission and storage operation will be omitted as it has little bearing on the present invention. FIG. 65 is a detailed flow chart of the communication interrupt handling started when a communication request is received by the image servers 181 through 184 from the gateway server 160. Starting in H60 upon receiving a communication request from the gateway server 160, it is checked in H601 whether the received request is an image server registration request, and if it was a registration request, it is checked in H602 whether a folder corresponding to the received camera identification information exists, and if it already exists, the system returns in H611. If no folder corresponding to the received camera identification information exists, in H603, a folder corresponding to the received camera identification information is created, and the system returns in H611.

If the request received in H601 is not an image server registration request, it is checked in H604 whether the received request is an image reception request (image read request), and if it was an image reception request, it is checked in H605 whether a folder corresponding to the received camera identification information exists, and if it does not exist, the system returns in H611. If a folder corresponding to the received camera identification information exists, it is checked in H606 whether an image file corresponding to the received image identification information exists in the folder, and if it does not exist, the system returns in H611. If an image file corresponding to the received image identification information exists, the image file in question is transmitted to the gateway server 160 using Internet protocol in H607, and the system returns in H611. If the received request in H604 is not an image reception request to the image server, it is checked in H608 whether the received request is an image transmission request (image write request), and if it was not an image transmission request, the system returns in H611. If it was an image transmission request, it is checked in H609 whether a folder corresponding to the received camera identification information exists, and if it does not exists, the system returns in H611. If a folder corresponding to the received camera identification information exists, the received image file is stored in the folder in H610, and the system returns in H611.

In the mode of embodiment described above (FIG. 30 through FIG. 66), while relaying image files received from the electronic camera 100 though the gateway server 160, the portable telephone 120 displays the image data being transmitted on the screen 221, as shown in FIG. 60, that allows the user to confirm based on the display of screen 221 that the image data he selected and transmitted is in fact being transmitted from the portable telephone 120 to the gateway server 160, and allows the user to confirm that transmission of image data from the portable telephone 120 to the gateway server 160 has been completed based on the fact that display of image data on the screen 221 has terminated. Furthermore, the fact that display of image data has started on the screen 221 of the portable telephone 120 allows one to confirm that transmission of image data from the electronic camera 100 to the portable telephone 120 has been completed, and that one can accordingly start taking picture with electronic camera 100.

In the above mode of embodiment (FIG. 30 through FIG. 66), while image files received from the gateway server 160 are being relayed to the electronic camera 100, the image data being transmitted is displayed on the screen 221, as shown in FIG. 61, which allows the user to get an overview of the received image data based on the display of screen 221 before displaying and browsing the image data after transmission of image data to the electronic camera 100 is completed, and allows the user to confirm that transmission of image data from the portable telephone 120 to the electronic camera 100 has been completed based on the fact that display of image data on the screen 221 has terminated.

In the above mode of embodiment (FIG. 30 through FIG. 66), if the portable telephone 120 was not able to relay image files received from the electronic camera 100 to the gateway server 160 (for example, when the portable telephone 120 is out of range of the wireless portable telephone link), those image files are stored temporarily in the EEPROM 268 of the portable telephone 120, and when transmission of image files to the gateway server 160 becomes possible, the image files stored temporarily in EEPROM 268 are automatically transmitted to the gateway server 160, so even if communication between the portable telephone 120 and the gateway server 160 is not possible, the user does not need to redo the image file transmission operation on the electronic camera 100 side, which makes it possible to avoid the risk of a user forgetting to retransmit, and allows the user to focus on taking pictures with the electronic camera 120 once image files have been transmitted from the electronic camera 100 to the portable telephone 120.

In the above mode of embodiment (FIG. 30 through FIG. 66), the gateway server 160 that relays image data between the electronic camera 100 and image servers 181 through 184 temporarily stores image data received from the electronic camera 100 or image servers 181 through 184 in the memory means 368 of the gateway server 160, and transmits the stored image data as necessary to the electronic camera 100 or image servers 181 through 184, thereby making it possible to reduce the communication traffic between the image servers 181 through 184 and gateway server 160 or between the electronic camera 100 and the gateway server 160.

In the above mode of embodiment (FIG. 30 through FIG. 66), the gateway server 160 that relays image data between the electronic camera 100 and image servers 181 through 184 stores the user's personal information in the memory means 368, and if there is no available capacity to store image data in the image server's album corresponding to the camera identification information, the gateway server connects to another image server on the Internet, automatically sets up an album (folder) corresponding to the camera identification information using the aforementioned personal information, transmits the image data received from the electronic camera 100 to the image server and causes it to be stored in the new album, thereby freeing the user from having to perform the complicated procedure of connecting to an image server and the bothersome procedure of setting up an album, which would otherwise have to be carried out directly on the electronic camera 100 side.

In the above mode of embodiment (FIG. 30 through FIG. 66), the gateway server 160 that relays image data between the electronic camera 100 and image servers 181 through 184 keeps, in the memory means 368, server management information for unified management of albums (folders) set up corresponding to camera identification information on each of the image servers 181 through 184, and based on the server management information, performs generalized storage and management of image data stored in distributed fashion across multiple image servers 181 through 184 based by combining it into one virtual album, thereby making it possible to exchange large volumes of image data between the virtual album and the electronic camera 100 by means of simple operations, without the user being aware of the multiple image servers 181 through 184 that actually the store the image data on the Internet.

In the above mode of embodiment (FIG. 30 through FIG. 66), the gateway server 160 that relays image data between the electronic camera 100 and image servers 181 through 184 keeps, in the memory means 368, link information that represents the associations of camera identification information for individually identifying electronic cameras, views multiple electronic cameras as a single group based on the link information, and transmits and stores image data received from the electronic cameras in an album on an image server corresponding to the group to that those electronic cameras belong, thereby making it possible to store image data captured with multiple electronic cameras in a single album on the image server. (Description of modified embodiments) The present invention is not limited to the mode of embodiment described above, and various modifications and changes are possible.

While in the above mode of embodiment (FIG. 30 through FIG. 66), transmission was carried out for reach image file relayed from the electronic camera 100 via the portable telephone 120 to the gateway server 160, it is also permissible to transmit multiple image files as a batch from the electronic camera 100 via the portable telephone 120 to the gateway server 160. In such cases as well, during transmission of image data from the portable telephone 120 to the gateway server 160, the portable telephone 120 displays the image data being transmitted on the screen 221. Doing this allows the user to check the progress of the processing of image file transmission from the portable telephone 120 to the gateway server 160 based on the image data being displayed. Furthermore, when multiple image files are transmitted in a batch from electronic camera 100 via the portable telephone 120 to the gateway server 160 in this manner, first all the image files to be transmitted are transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160. Doing so makes it unnecessary to transmit appended informational data (camera identification information, gateway server access information, image transmission requests etc.) for each individual image file from the electronic camera 100 to the portable telephone 120, making it possible to shorten the transmission time for image files between the electronic camera 100 and portable telephone 120. When transmitting image files from the portable telephone 120 to the gateway server 160, this also makes it unnecessary to transmit appended informational data (camera identification information, image transmission requests, etc.) for each individual image file from the portable telephone 120 to the gateway server 160, making it possible to reduce the transmitted data volume passing through the wireless portable telephone link 130 and packet communication network 150 and shorten the image file transmission time, as well as to reduce communication fees.

Furthermore, when transmitting multiple image files in a batch from the electronic camera 100 via the portable telephone 120 to the gateway server 160, if all the image files to be transmitted are first transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160, then if problems occur with the wireless portable telephone link 130 or packet communication network 150 during transmission of image files from the portable telephone 120 to the gateway server 160, the portable telephone 120 will leave the image files that have not been completely transmitted in the EEPROM 268, and will automatically transmit the image files remaining in EEPROM 268 to the gateway server 160 once transmission of image files to the gateway server 160 becomes possible. Doing so makes it unnecessary for the user to redo the image file transmission operation on the electronic camera 100 side from the beginning even if communication between the portable telephone 120 and gateway server 160 becomes impossible midway during image transmission, allowing the user to focus on taking pictures with the electronic camera 120 once image files have been transmitted from the electronic camera 100 to the portable telephone 120, as well as making it possible to reduce the transmitted data volume passing through the wireless portable telephone link 130 and the packet communication network 150 compared to if file transfer from the electronic camera 100 to the gateway server 160 were redone from the beginning, and allowing one to shorten the image file transmission time and to reduce communication charges.

Figure 66:
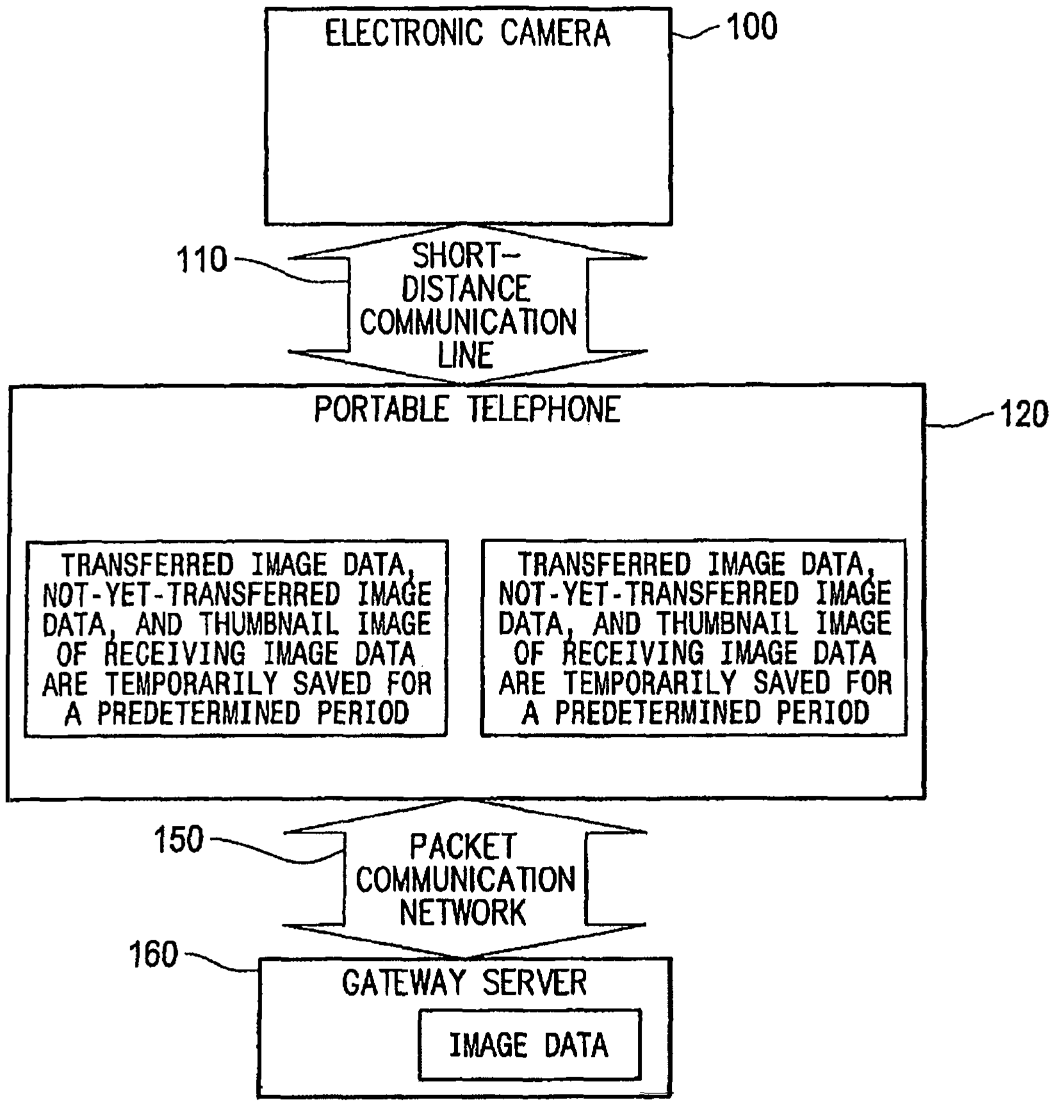
FIG. 66 is a conceptual drawing of an image transmission system.

While in the above mode of embodiment (FIG. 30 through FIG. 66), greater data communication efficiency of the image transmission system was achieved by having the gateway server 160 temporarily store image files transmitted between the electronic camera 100 and the image server in an image buffer folder and make use of the image files stored temporarily in the image buffer folder as necessary, and by storing thumbnail image data corresponding to the image files in a thumbnail image folder and making use of that thumbnail image data as necessary, it is also possible, as shown in FIG. 66, to provide the same sort of image buffer folder and thumbnail image folder in the EEPROM 268 of the portable telephone 120 and temporarily store thumbnail image data and image files transmitted between the electronic camera 100 and the image server in the image buffer folder or thumbnail image folder, and, when the image file or thumbnail image data requested by the electronic camera 100 is present in the image buffer folder or thumbnail image folder, to have the portable telephone 120 transmit those image files and thumbnail image data to the electronic camera 100. In such cases, the image files or thumbnail image data stored temporarily in the image buffer folder and thumbnail image folder in the EEPROM 268 may be cleared periodically in their entirety, or the image files and thumbnail image data may be deleted in the order of their age according to the storage start date and time data of the image file or thumbnail image data, so as to keep the total data volume of the temporarily stored image files and thumbnail image data at or below a specific volume. Alternatively, image files kept for more than a specific period of time may be deleted based on the storage start date and time data of the image files or thumbnail image data, or else stored image files or thumbnail image data may be deleted at specific clock times.

Figure 67:
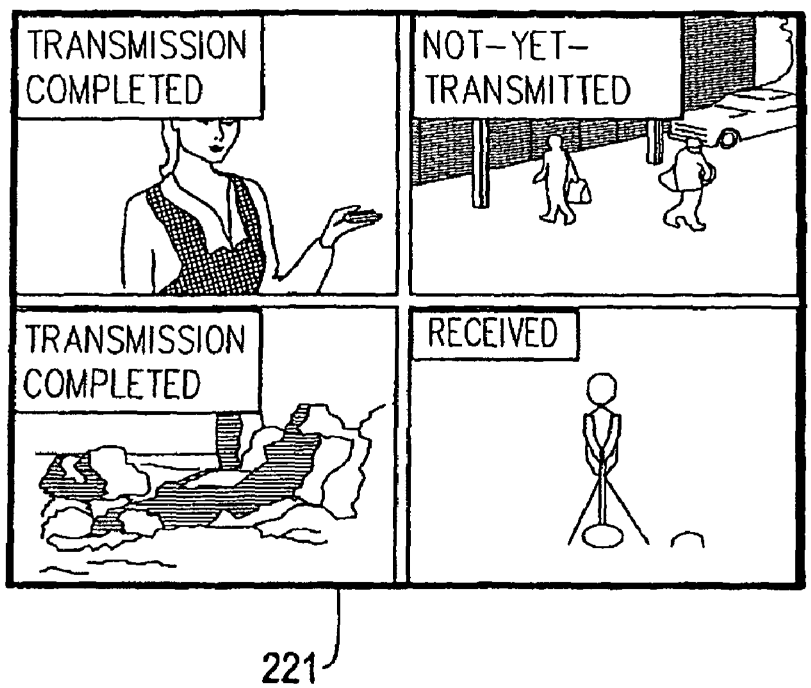
FIG. 67 is a screen display example.

If this is done, then when the user wishes to reconfirm the image data most recently transmitted or received via the portable telephone 120, it will be possible to display a summary of the status of temporarily stored images on the screen 221 of the portable telephone 120, as shown in FIG. 67, to transmit the image files or corresponding thumbnail image data temporarily stored in the portable telephone 120 from the portable telephone 120 to the electronic camera 100 and make use of them, thereby making it unnecessary to make inquiries via the portable telephone 120 to the gateway server 160 regarding the image files or thumbnail image data and making it possible to quickly read image files or thumbnail image data into the electronic camera 100, as well as allowing the communication data volume between the portable telephone 120 and gateway server 160 to be reduced and correspondingly reduce the communication line usage fees.

While in the above mode of embodiment (FIG. 30 through FIG. 66), the electronic camera 100 transmits image data via a single portable telephone 120 to a single gateway server 160, it is also permissible to have the electronic camera 100 transmit image data via a single portable telephone 120 to multiple gateway servers. In such an image transmission system, the portable telephone 120 can store image files transmitted from the electronic camera 100 in EEPROM 268 under predetermined conditions (for a specific period of time from the start of storage, etc.) and transmit the stored image files to multiple gateway servers based on instructions from the electronic camera 100. Doing this makes it unnecessary to transmit image files from the electronic camera 100 to the portable telephone 120 every time the electronic camera 100 transmits image files to multiple servers, allowing the transmission of image files to the gateway servers to be carried out more quickly. For example, if an image file was transmitted from the electronic camera 100 to one gateway server and the user then wants to transfer the same image file to a different gateway server, the image identification information of the image file and the destination gateway server access information are sent from the electronic camera 100 to the portable telephone 120, whereupon, if an image file corresponding to the received image identification information is present in the EEPROM 268, the portable telephone 120 reads that image file from the EEPROM 268 and transmits it to the gateway server corresponding to the received gateway server access information. If the image file corresponding to the image identification information is not present in the EEPROM 268, the portable telephone 120 informs the electronic camera 100 that no image file corresponding to the received image identification information is present in the portable telephone 120, in response to that the electronic camera transmits the image file to the portable telephone 120.

Figure 68:
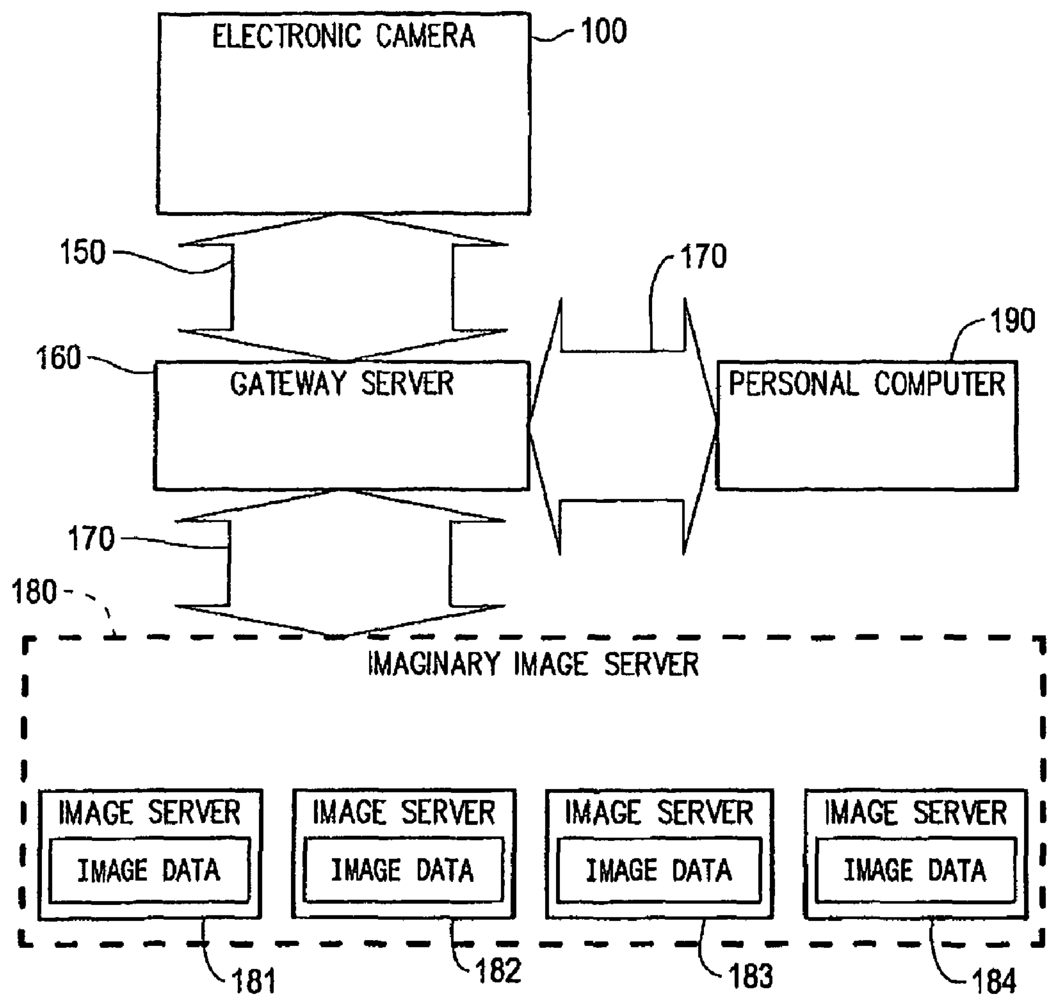
FIG. 68 is a conceptual drawing of an image transmission system.

While in the above mode of embodiment (FIG. 30 through FIG. 66), the portable telephone 120 performs relaying of image data in the transmission of image data between the electronic camera 100 and the gateway server 160, if the electronic camera 100 itself has a built-in wireless portable telephone function, it is also permissible to omit the portable telephone 120, as shown in FIG. 68, and to have the electronic camera 100 communicate directly with the gateway server 160 using a packet communication protocol. In FIG. 68, the base station 140 has been left out of the illustration.

In the above mode of embodiment (FIG. 30 through FIG. 66), the gateway server 160 provides the electronic camera 100 with a single virtual album that combines the albums secured according to the camera identification information on multiple image servers 181 through 184, and increases the available capacity of the virtual album by automatically setting up a new album corresponding to the camera identification information by registering with a new image server when the available capacity of the virtual album becomes insufficient; however, instead of setting up a new album on a new image server, a new album may also be set up on an existing server on that an album has already been set up. For example, if the gateway server 160 has unused camera identification information and the available capacity of the virtual album has become insufficient, the gateway server 160 can register with an image server, on that an album forming part of the virtual album has already been established, using one item of the unused camera identification information, and set up a new album corresponding to the unused item of camera identification information. Furthermore, the gateway server 160 can link the camera identification information used for setting up albums to the camera identification information corresponding to the virtual album, so as to incorporate the newly created album in the virtual album. Doing this makes it possible to deal with insufficient available capacity of the virtual album when the number of image servers is limited.

Figure 69:
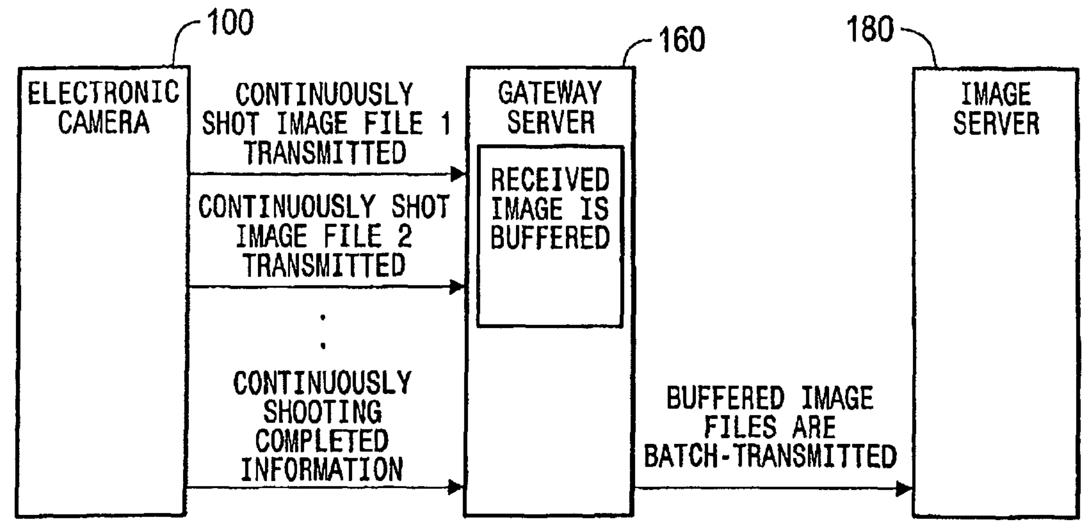
FIG. 69 is an explanatory drawing of the operation of image transmission.

While in the above mode of embodiment (FIG. 30 through FIG. 66), the gateway server 160 buffers image files received from the electronic camera 100 in an image buffer folder and delivers the image files buffered in the image buffer folder at specific intervals, when transmitting image files captured with a series of capture operations (continuous capture or continuous shutter, bracket capture, panorama capture, etc.) from the electronic camera 100 in automatic transfer mode to the gateway server 160, the image transfer may be performed by the scheme shown in FIG. 69. Here, continuous capture refers to continuously photographic the same subject at specific time intervals while tracking its movement; bracket capture refers to taking multiple photographs of the same subject while varying the capture conditions, such as exposure; and panorama capture refers to photographing a landscape or the like while shifting the capture direction by a certain amount each time. Namely, for each capture operation, the electronic camera 100 appends identification information to image files captured in series to the effect that this image is part of a series, and transmits it to the gateway server 160. The gateway server 160 temporarily stores image files with appended identification information indicating that it is part of a series of images in an image buffer folder. Once the series of image captures is completed, the electronic camera 100 transmits information to the gateway server 160 indicating that the series of image captures has been completed, and upon receiving that information, the gateway server 160 does a batch transmission of the series of image files stored temporarily in the image buffer folder to the same image server over the Internet and stores them there. Doing this makes it possible to transmit multiple image files between the gateway server 160 and image server with a single transmission procedure, allowing the transmission time to be shortened and allowing the image transmission processing load of the gateway server 160 and image servers 181 through 184 to be reduced. Furthermore, storing image files captured in a series on the same image server makes it highly convenient when the user later connects directly to the image server 181 through 184, with a personal computer or the like, to use the series of image data.

Instead of transmitting information indicating that a series of captures has been completed from the electronic camera 100 to the gateway server 160, is also permissible to transmit to the gateway server 160, from a terminal such as a personal computer 190 connected to the gateway server 160, an instruction to transmit a series of image files accumulated on the gateway server 160 together to an image server, in response to that instruction, the gateway server 160 will transmit the series of image files accumulated on the gateway server 160 together to an image server.

Furthermore, when transmitting image files captured in a series from the electronic camera 100 to the gateway server 160 in automatic transmission mode, if an image file is transmitted from the electronic camera 100 to the gateway server 160 after every capture, the communication time will become longer due to the overhead for establishing communication and the additional information, and there are cases where, during this time, the picture-taking conditions will change or where the pictures cannot be taken at the planned time intervals. In such cases, one can optionally have the electronic camera 100 temporarily store the series of captured image files in RAM 70, and once the series of captures is completed, transmit the series of image files with added identification information indicating that it is as series of images, together with information indicating that the series of captures has been completed, in a batch to the gateway server 160. Furthermore, when the data transfer rate of short-range wireless communication between the electronic camera 100 and portable telephone 120 is fast, one may optionally have the image files captured in a series be transmitted from the electronic camera 100 to the portable telephone 120 each time an image is captured, storing them temporarily in the EEPROM 268 of the portable telephone 120, and have the electronic camera 100 transmit information indicating that the series of captures has been completed to the portable telephone 120 once the series of captures has been completed, and in response to that information, have the portable telephone 120 transmit a series of image files with appended identification information indicating that this is a series of images to the gateway server 160. Doing this makes it possible for the electronic camera 100 to perform a series of captures under the desired capture conditions and timing without affecting the image file transmission speed or the like, even in automatic transmission mode (a mode where captured image files are automatically transmitted to and stored on an image server).

Furthermore, when the electronic camera 100 selects image files captured in series, which have been saved on the memory card 77, and transmits those selected image files to an image server, by transmitting those image files with appended identification information indicating that they are a series of images, the gateway server 160 will be able recognize that these are image files captured in series and perform processing such as storing them on the same image server.

Figure 70:
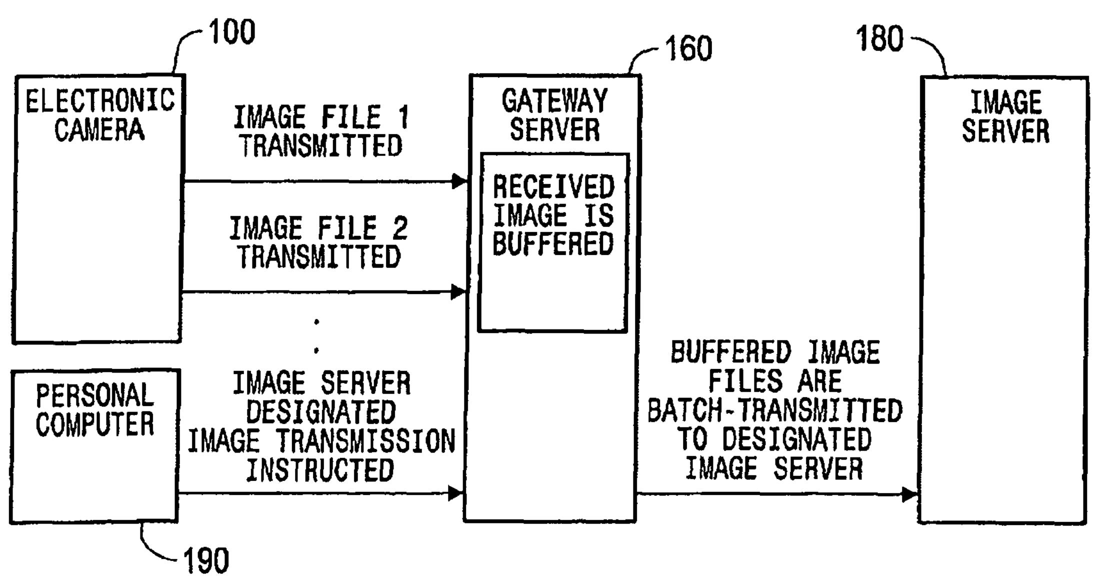
FIG. 70 is an explanatory drawing of the operation of image transmission.

While in the above mode of embodiment (FIG. 30 through FIG. 66), the gateway server 160 buffers image files received from the electronic camera 100 in an image buffer folder and delivers the image files buffered in the image buffer folder to the image server at specific intervals, one can also have the image files buffered in the image buffer folder be delivered to the image server based on an external instruction. FIG. 70 is a drawing that shows the image transmission processing for such a scheme. Multiple image files are transmitted from the electronic camera 100 to the gateway server 160, and are stored temporarily in an image buffer folder in a folder corresponding to the camera identification information on the gateway server 160. Thereafter, a personal computer 190 connects to the gateway server 160 and transmits the camera identification information, the identification information of the image server to that the images are to be transferred, and an image transfer instruction to the gateway server 160. In response to the received camera identification information, the gateway server 160 transmits the image files, which are stored temporarily in the image buffer folder in the folder corresponding to the received camera identification information, in a batch to the image server corresponding to the received image server identification information. Doing this makes it possible for the user to transmit and store image data captured with the electronic camera 100 from the gateway server 160 at a convenient time to a suitable image server.

In the above mode of embodiment (FIG. 30 through FIG. 66), the gateway server 160 buffered image files transmitted between the electronic camera 100 and the image server in an image buffer folder and transmitted the image files buffered in the image buffer folder together to the image server at specific intervals; however, the gateway server 160 may also transmit accumulated image files to the image server by the following method. For example, the image files may be transmitted to the image server when the total data volume of the image files stored temporarily on the gateway server 160 exceeds a certain volume. Alternatively, the gateway server 160 may transmit image files to the image server once they have been accumulated for a set period or time, based on the date and time data of the start of storage of the image files in the image buffer folder. Alternatively, the gateway server 160 can transmit accumulated image files to the image server at specific clock times.

While in the above mode of embodiment (FIG. 30 through FIG. 66), the gateway server 160 buffers image files transmitted between the electronic camera 100 and the image server in an image buffer folder and clears the entirety of the image files buffered in the image buffer folder at specific intervals, the gateway server 160 may also delete image files by the following method. For example, the gateway server 160 may delete image files in the order of oldest to newest based on date and time information on the start of storage of the image files in the image buffer folder, so as to keep the total data volume of the image files stored temporarily in the image buffer folder at or below a specific volume. Alternatively, the gateway server 160 may delete image files stored for more than a specific period of time based on date and time information on the start of storage of the image files in the image buffer folder. Or the gateway server 160 may delete stored image files at specific clock times.

While in the above mode of embodiment (FIG. 30 through FIG. 66), the gateway server 160 buffers image files transmitted between the electronic camera 100 and the image server in an image buffer folder and transmits them as necessary to the electronic camera 100, the gateway server 160 may also transmit image files accumulated in the image buffer folder (image files transmitted by the electronic camera 100 to an image server or image files read by the electronic camera 100 from an image server) to another image server or electronic camera based on instructions from the electronic camera 100. Doing this makes it unnecessary to transmit every single image files from the electronic camera 100 to the gateway server 160, thereby making it possible to shorten the image file transmission time and reduce transmission charges.

While in the above mode of embodiment (FIG. 30 through FIG. 66), the gateway server 160 performed management of individual albums on image servers according to the camera identification information received from the electronic camera 100, it is also possible to use general identification information instead of camera identification information for individually identifying multiple electronic cameras 100. For example, using the next generation version of the IP protocol, IPV6 (Internet Protocol Version 6), the use of that on the Internet is planned, as the identification information, would make it possible for all electronic devices that handle images, besides electronic cameras, to make use of the image transmission system according to the present invention. Namely, IPV6 provides a 32-bit address space (on order of 10 to the $9^{th}$ power), so there is practically no concern of running out of addresses, which makes it possible for one device to have multiple addresses depending on the application and further increases the utility of the image transmission system according to the present invention.

In the above mode of embodiment (FIG. 30 through FIG. 66), the image servers 181 through 184 had individual albums (folders) corresponding to the camera identification information set individually for each electronic camera 100, the electronic camera 100 would transmit the camera identification information set in the camera in question to the gateway server 160, and the gateway server 160, based on the received camera identification information, would create a new album corresponding to the received camera identification information on the image server 181 through 184 or perform reading and writing of image data to and from an album corresponding to the received camera identification information present on the image server 181 through 184; however, it is also permissible to manage image data transmission and storage between the electronic camera 100 and image servers 181 through 184 using identification information other than camera identification information.

Figure 71:
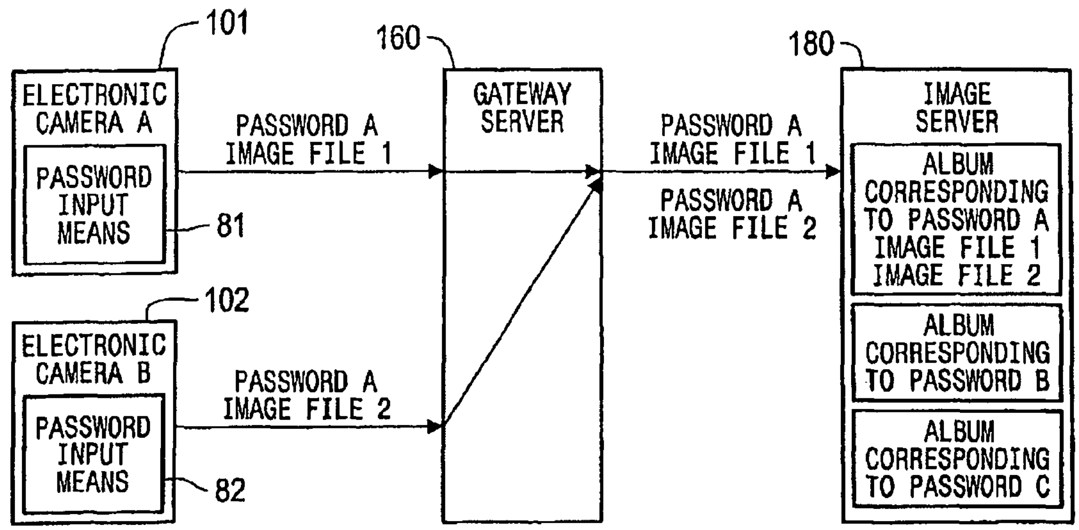
FIG. 71 is an explanatory drawing of the operation of image transmission.

For example, in FIG. 71, a password input means is provided on the electronic camera side and image data transmission and storage is managed according to the password inputted by the user. In FIG. 71, electronic camera A101 and electronic camera B102 are each equipped with a password input means 81 and 82, and when transmitting a captured image file, electronic camera A101 and electronic camera B102 transmit the password inputted by the user and the image file as a pair to the gateway server 160. Meanwhile, the image server 181 has a folder prepared that corresponds to the password, and the gateway server 160 transmits the received image file and stores it in an album on the image server 181 corresponding to the received password. The gateway server 160 can also create a new album on the image server corresponding to the received password. Furthermore, when downloading image files from the image server 181, the electronic camera A101 and electronic camera B102 transmit image identification information and a password to the gateway server 160, and the gateway server 160 transmits the received image identification information and password to the image server 181. The image server 181 reads the image file corresponding to the received image identification information from the album corresponding to the received password, and transmits that image file to via the gateway server 160 to the electronic camera A101 and B102. Instead of password input, the electronic camera can obtain user identification information by installing a UIM card on that personal identification data has been stored in advance into the electronic camera.

If this is done, then when the same user uses multiple electronic cameras or when multiple users use the same camera, the image files captured by the electronic camera will be stored in an album on an image server corresponding to the password inputted by the user, so there is no inconvenience of having to later separate image files stored in the same album on an image server for different users, or collect image files stored in different albums on an image server for each user, allowing image files to be stored efficiently on a per-user basis and making it possible to protect the privacy of the stored image data.

Figure 72:
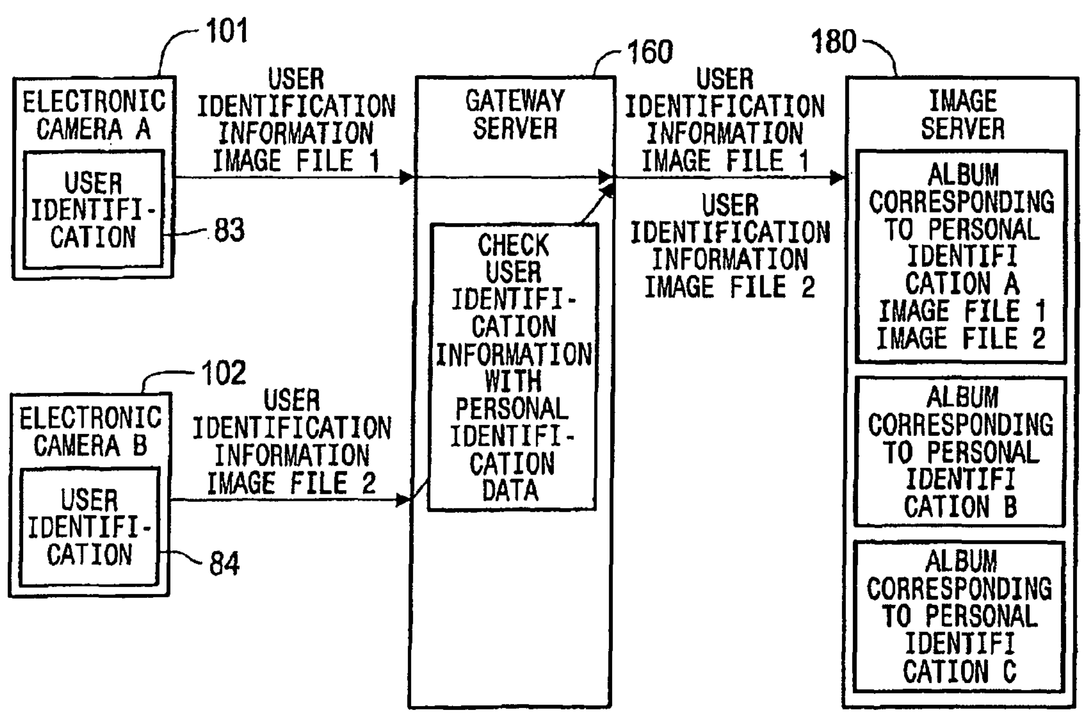
FIG. 72 is an explanatory drawing of the operation of image transmission.

While in FIG. 71, control and management of image data transmission and storage operations between the electronic camera 100 and image servers 181 through 184 is carried out based on the password inputted by the user into the electronic camera, in FIG. 72, instead of a password, a user identification means is provided on the electronic camera side, the electronic camera performs user identification automatically without manual intervention by the user, and image data transmission and storage is management based on that user identification information. In FIG. 72, electronic cameras A101 and B102 are equipped with user identification means 83 and 84 (fingerprint detection means, iris pattern detection means, facial image detection means, etc.), and when transmitting a captured image file, the electronic cameras A101 and B102 transmit the image file paired with the user identification information detected by the user identification means 83 and 84 (fingerprint pattern characteristics information, iris pattern characteristics information, facial image pattern characteristics information, etc.) to the gateway server 160. The gateway server 160 compares the received user identification information with user identification information contained in the personal identification data that is stored in advance to identify the user. Meanwhile, the image server 181 has an album prepared that corresponds to the personal identification data, and the gateway server 160 transmits and stores received image files in the album on the image server corresponding to the personal identification data of the identified user. The gateway server 160 can also create a new album on the image server corresponding to the personal identification data of the identified user. Furthermore, when downloading image files from the image server 181, electronic cameras A101 and B102 transmit image identification information and user identification information to the gateway server 160, the gateway server 160 identifies the users based on the received user identification information, and transmits the personal identification data corresponding to the user along with the image identification information to the image server 181. The image server 181 reads image files corresponding to the received image identification information from the album corresponding to the received personal identification data, and transmits those image files via the gateway server 160 to the electronic cameras A101 and B102.

Doing this makes it possible to automatically perform user identification at the electronic camera, which eliminates the effort or inputting passwords for individual identification and resolves the problems of forgotten passwords and password theft.

Figure 73:
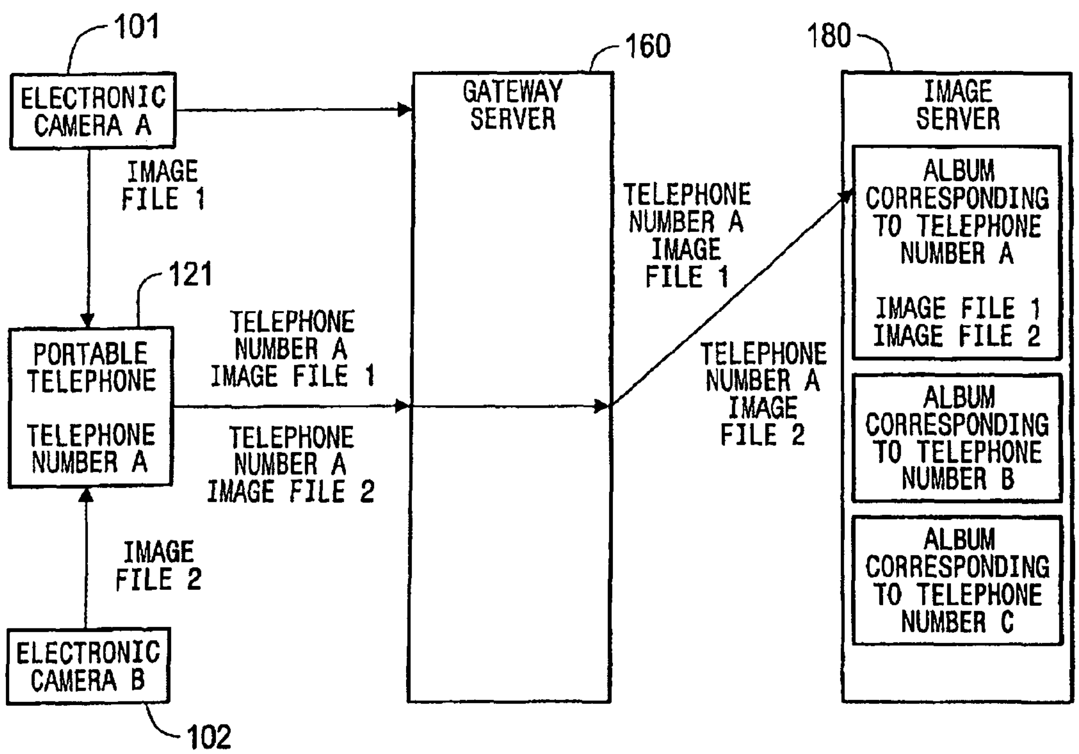
FIG. 73 is an explanatory drawing of the operation of image transmission.

The means of personal identification described above in FIG. 71 and FIG. 72 (password input means, UIM card, fingerprint detection or other user identification means) can also be provided on the portable telephone side, if the gateway server is connected to from the electronic camera via the portable telephone. In FIG. 73, when connecting from the electronic camera to the gateway server via the portable telephone, image data transmission and storage are managed based on the telephone number of the portable telephone. In FIG. 73, when transmitting a captured image file, the electronic cameras A101 and B102 connect to the portable telephone 121 (telephone number A) and transmit the image file to the portable telephone 121. The portable telephone 121 transmits the received image file paired with the telephone number to the gateway server 160. Meanwhile, the image server 181 has an album prepared corresponding to the telephone number of the portable telephone, and the gateway server 160 transmits and stores the received image file in an album on the image server 181 corresponding to the telephone number. The gateway server 160 can also create a new album on an image server corresponding to the telephone number. Furthermore, when downloading image files from the image server 181, the electronic cameras A101 and B102 send image identification information to the portable telephone 121, the portable telephone 121 transmits the telephone number and image identification information to the gateway server 160, and the gateway server 160 transmits the telephone number and image identification information to the image server 181. The image server 181 reads the image file corresponding to the received image identification information from the album corresponding to the received telephone number, and transmits that image file to the electronic cameras A101 and B102 via the gateway server 160 and the portable telephone 121.

Doing this allows the user to store image files separated on a per individual basis in a per-individual album on an image server or read image files from one's own exclusive album on an image server by performing image transmission and reception using his portable telephone, even when using multiple electronic cameras or when multiple persons use the same electronic camera.

Furthermore, by combining the electronic camera's camera identification information with multiple personal identification means, the user identification precision can be increased and a higher level of image information security can be attained.

As described above, in the image transmission system and image relay device according to the present invention, while image data is being transmitted from the portable telephone (image relay device) to external devices, which image data is displayed on the display means provided on the portable telephone, allowing the user to confirm the operating state of the portable telephone (is image data that was transmitted from the electronic camera to the portable telephone being transmitted from the portable telephone to an image server or not), so upon confirming that transmission of image data that one has instructed to be transmitted has been initiated from the portable telephone, the user can disconnect the portable telephone from the electronic camera and take pictures with the electronic camera. Furthermore, when transmitting multiple items of image data in a batch from the electronic camera via the portable telephone, one can find out that item of image data is currently being transmitted from the portable telephone to the external device, allowing one to also confirm the progress of transmission of image data from the portable telephone to the external device.

Moreover, in the image transmission system and image relay device according to the present invention, when transmission of data from the portable telephone (image relay device) to the external device is not possible, the image data is stored temporarily in the portable telephone, and is automatically transmitted to the external device once transmission of image data to the external device becomes possible, thereby making it unnecessary for the user to redo the image data transmission operation from the beginning, allowing the user to focus on taking picture with the electronic camera once image data has been transmitted form the electronic camera to the portable telephone.

Moreover, in the image transmission system and image relay device according to the present invention, the image data relayed through the portable telephone (image relay device) or the corresponding thumbnail image data is stored temporarily in the portable telephone, so when the user wishes to check the image data most recently transmitted or received via the portable telephone, the user can display the image data stored temporarily in the portable telephone or the corresponding thumbnail image data on the display means provided on the portable telephone, or read it into the electronic camera for use, making it possible to quickly check the image data, which is used by relaying it through the portable telephone, without making inquiries to the originator of the image data transmission (the image server), and allowing communication line usage fees to be reduced.

Figure 74:
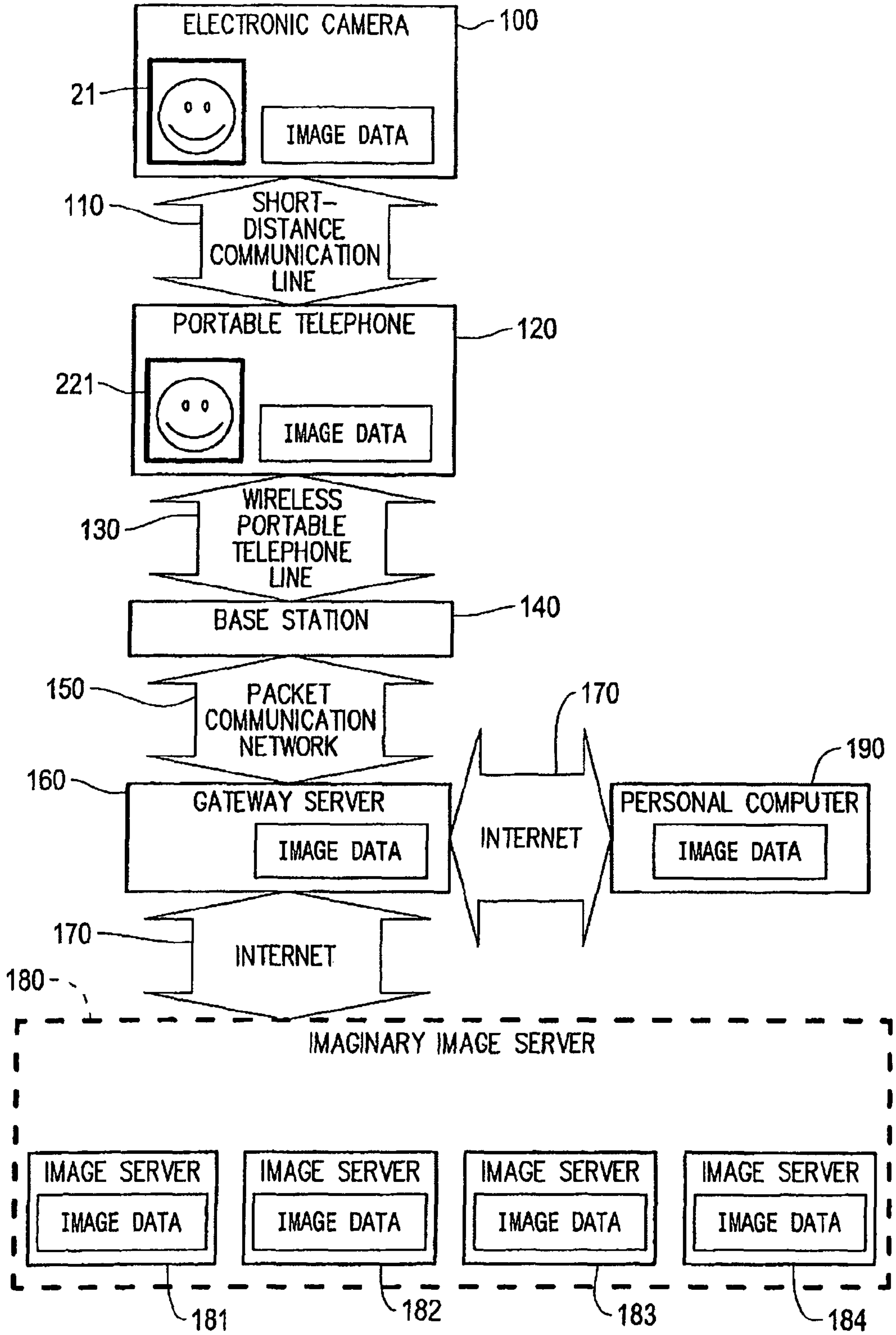
FIG. 74 is a conceptual drawing of an image transmission system.

FIG. 74 is a conceptual drawing of an image data transmission system applying the present invention. First, the case of transmitting image data from the electronic camera 100 to the image servers 181 through 184 will be described. The electronic camera 100 generates image data through capture operations. When transmitting the image data to external image servers 181 through 184, the electronic camera 100 connects to a portable telephone 120. The connection between the electronic camera 100 and the portable telephone 120 is made by means of a short-range communication link 110 (e.g., Bluetooth protocol based short-range wireless communication, short-range wired communication based on a cable connection-specific protocol, IEEE 802.11 protocol based wireless LAN communication, short-range infrared communication using the IrDA protocol, etc.). The electronic camera 100 selects the image data to transmit, displays the image data on the screen 21 and transmits it to the portable telephone 120. Since the electronic camera 100 and the portable telephone 120 are used by the user simultaneously, it suffices for the local wireless communication range to be on the order of several meters, which allows the power load on the electronic camera 100 and portable telephone 120 due to short-range wireless communication to be reduced.

The portable telephone 120 is provided with a short-range communication function for communicating with the aforementioned electronic camera 100 and a long-range communication function using a wireless portable telephone link 130, whereby the long-range communication function using the wireless portable telephone link 130 allows both conventional talk functions and packet communication protocol based digital data communication functions to be executed. The portable telephone 120 temporarily stores image data received from the electronic camera 100 via the short-range communication link 110 in an internal memory. Next, the portable telephone 120 sends the stored image data using a packet communication protocol via the wireless portable telephone link 130 to a base station 140. While transmitting image data to the base station 140, the portable telephone 120 displays the image data being transmitted on a screen 221.

The base station 140 transmits the image data, received from the portable telephone 120 using a packet communication protocol via the wireless portable telephone link 130, to a gateway server 160 via a packet communication network 150 using a packet communication protocol. The gateway server 160 stores the image data received from the base station 140 using a packet communication protocol via the packet communication network 150 for a time in an internal memory, and transmits the stored image data at specific intervals using Internet protocol via the Internet 170 to image servers 181 through 184. The gateway server 160 keeps thumbnail image data (scaled-down image data obtained by compressing and reducing the data volume of the original image data) corresponding to the image data transmitted to the image servers in an internal memory. Image servers 181 through 184 store the image data received using Internet protocol via the Internet 170 in a high capacity memory.

When transmitting image data from the electronic camera 100 to an image server, there is no need to perform the transmission with awareness of the complicated connection and communication procedures for accessing the image server on the electronic camera 100 side; rather, on the electronic camera 100 side, it suffices to append fixed address information for specifying the gateway server 160 and camera identification information for identifying the electronic camera 100 to the image data to be transmitted, and pass it on to the portable telephone 120. The portable telephone 120 transmits the image data and camera identification information by packet communication to the designated gateway server 160 based on the received gateway server address information. The gateway server 160 manages the image data according to the camera identification information received via packet communication, and transmits the image data to a suitable image server among multiple image servers 181 through 184 on the Internet 170 using Internet protocol. The multiple image servers 181 through 184 are treated as a single virtual image server 180 from the viewpoint of the electronic camera, and the complicated procedures for accessing each image server on the Internet 170 are all performed by the gateway server 150.

Next, the case where the electronic camera 100 receives image data from the virtual image server 180 will be described. First, the electronic camera 100 is connected to the portable telephone 120 by means of the short-range communication link 110. The electronic camera 100 transmits a browse data request, camera identification information and gateway server 160 address information to the portable telephone 120. Next, the portable telephone 120 transmits the browse data request and camera identification information via the base station 140 using packet communication protocol to the designated gateway server 160 based on the received gateway server 160 address information. Upon receiving the browse data request and camera identification information, the gateway server 160 transmits the thumbnail image data (browse data) for the image data corresponding to the camera identification information stored on the virtual server 180 via the base station 140 using packet communication protocol to the portable telephone 120 that transmitted the browse data request. The portable telephone 120 transmits the received browse data over the short-range communication link 110 to the electronic camera 100.

The electronic camera 100 displays the received browse data (thumbnail image data) on the screen 21, from that the desired image is selected. The electronic camera 100 transmits a request for the selected image data along with image identification information (image file name, etc.) for the image data, camera identification information and gateway server 160 address information over the short-range communication link 110 to the portable telephone 120. Next, the portable telephone 120, based on the received gateway server 160 address information, transmits the image data request, image identification information and camera identification information via the base station 140 using packet communication protocol to the designated gateway server 160. Upon receiving the image data request, image identification information and camera identification information, the gateway server 160 specifies the image data stored on the virtual server 180 according to the camera identification information and image identification information, and transmits the image data request and image identification information using Internet protocol to the image server 181 through 184 on the Internet 170 that is storing the image data in question.

The image server, which receives the image data request and image identification information, transmits the image data corresponding to the image identification information using Internet protocol to the gateway server 160. Upon receiving the image data, the gateway server 160 transmits that image data via the base station 140 using packet communication protocol to the portable telephone 120 that transmitted the image data request. The gateway server 160 temporarily stores the image data received from the image server in an internal memory. The portable telephone 120 transmits the received image data over the short-range communication link 110 to the electronic camera 100. The electronic camera 100 displays the received image data on the screen 21.

The gateway server 160 can also be connected to from a user's personal computer 190 via the Internet 170, and the user can read and use image data from the virtual server 180 via the gateway server 160 on a personal computer 190, and can modify the settings of the gateway server 160.

Figure 75:
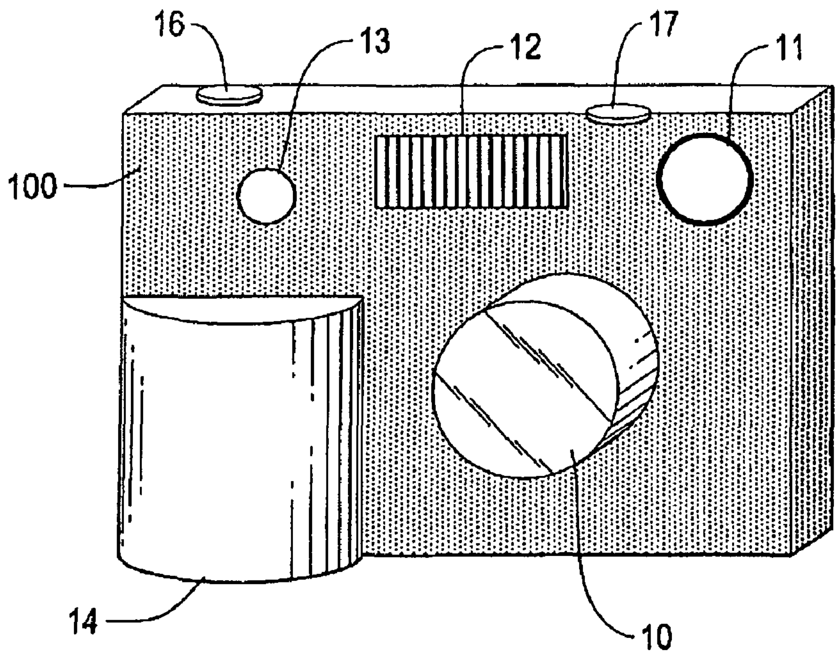
FIG. 75 is an external view (front view) of an electronic camera.
Figure 76:
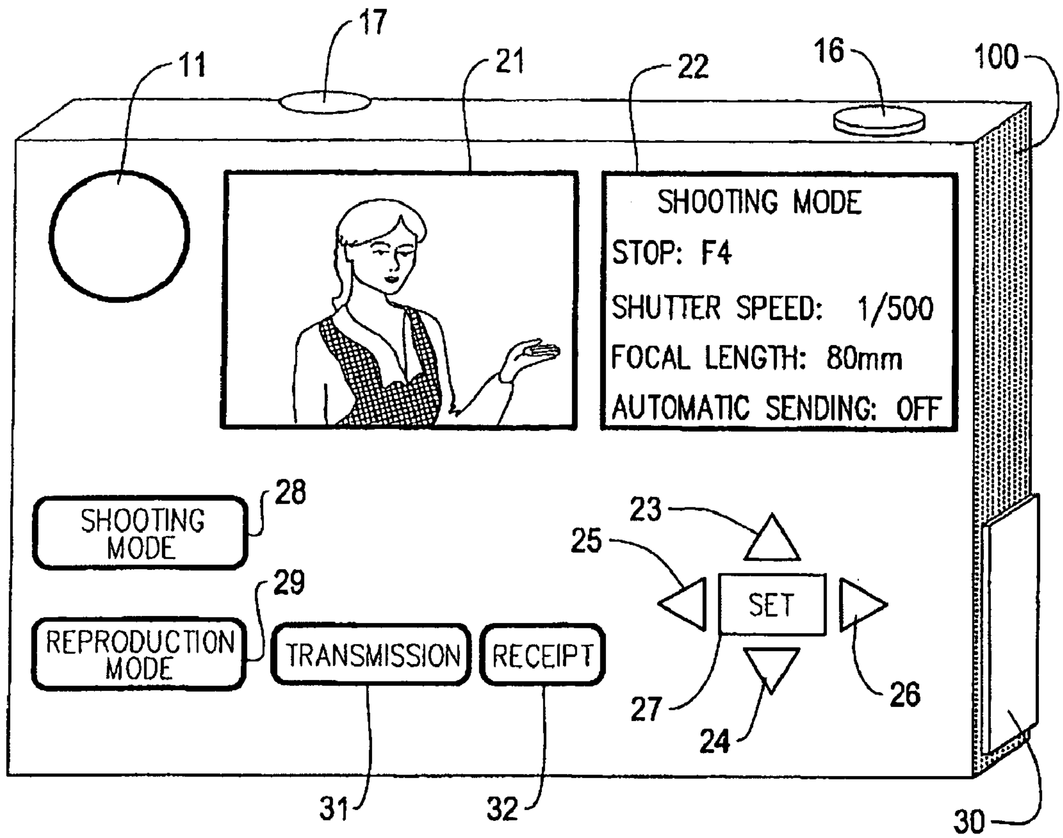
FIG. 76 is an external view (rear view) of an electronic camera.

FIG. 75 and FIG. 76 are an external view (front view and rear view) of an embodiment of the electronic camera 100 used in an image data transmission system applying the present invention. As shown in FIG. 75, a photographic lens 10 for forming a subject image, a finder 11 for confirming the frame, a strobe 12 for illuminating the subject when a photograph is taken, a photometric circuit 13 for detecting the brightness of the subject, and a grip 14 extending from the camera housing for making it easier for the user hold the electronic camera 100 in his or her hands are provided at the front of the electronic camera 100, and a release button 16 and a power switch 17 for turning the power supply to the electronic camera 100 on and off are provided at the top.

As shown in FIG. 76, the eyepiece of the finder 11, a left LCD (left screen) 21 comprising a substantially rectangular screen for text and image display, and a right LCD (right screen) 22 comprising a substantially rectangular screen for text and image display are arranged at the rear of the electronic camera 100; an UP button 23, a DOWN button 24, LEFT button 25, RIGHT button 26 and SELECT button 27, used for image searching, are arranged below the right LCD 22, and a capture mode button 28 for putting the electronic camera 100 into capture mode, a playback mode button 29 for putting the electronic camera 100 into playback mode, a transmit button 31 for controlling image data transmission, and a receive button 32 for controlling image data reception are arranged below the left LCD 21. A memory card slot 30 for installing a memory card 77 used for storing image data is provided at the side.

The release button 16, UP button 23, DOWN button 24, LEFT button 25, RIGHT button 26, SELECT button 27, capture mode button 28, playback mode button 29, transmit button 31 and receive button 32 are all control keys operated by the user.

A so-called touch screen 66, equipped with a function of outputting contact position data corresponding to the position indicated by a finger touch operation is arranged over the left LCD 21 and the right LCD 22, which touch screen can be used for selection of image data and options displayed on the screen. This touch screen 66 is made of a transparent material such as glass or resin, allowing the user to view the image or text formed on the inside of the touch screen 66 through the touch screen 66.

Figure 77:
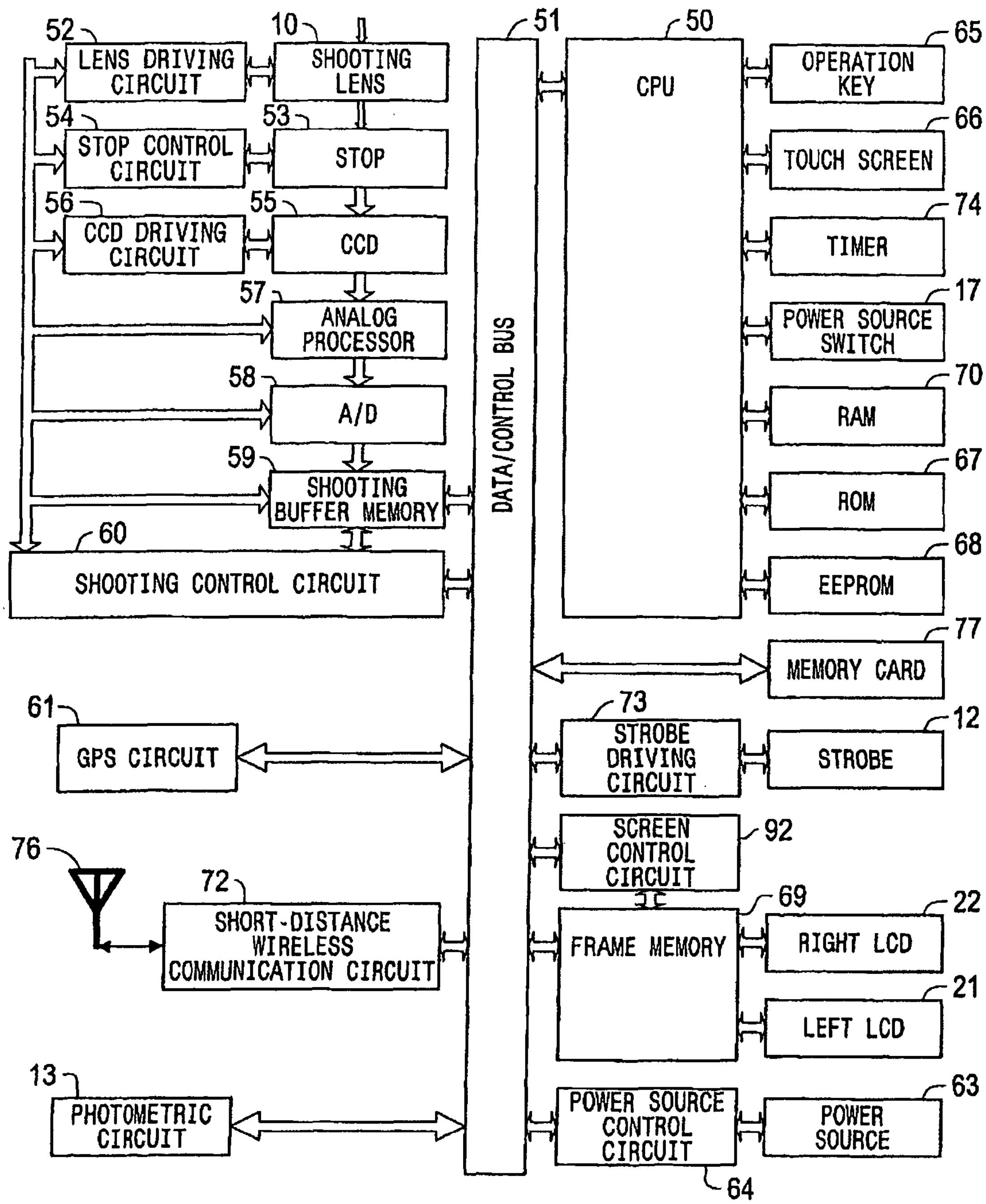
FIG. 77 is a block diagram showing the electrical configuration of an electronic camera.

FIG. 77 is a block diagram showing an example of the internal electrical configuration of the electronic camera 100 shown in FIGS. 75 and 76, whereby the constitutive elements are connected to each other via a data/control bus 51 for transmitting various types of informational data and control data. The various constitutive elements can be roughly divided into a block centered on the capture control circuit 60 that executes image data capture operations, a block of the memory card 77 that stores and saves image files, a block centered on the screen control circuit 92 that executes the display of image data and associated information, and a block centered on the CPU 50, which performs overall control of the user interface such as the control keys 65 and of the various control circuits.

The CPU 50 (central processing unit) is the means that controls the entire electronic camera 100, issuing various instructions to the capture control circuit 60, screen control circuit 92 and power control circuit 64 in accordance with input information from the control keys 65, touch screen 66, power switch 17, timer 74 and photometric circuit 13. The photometric circuit 13 measures the brightness of the subject and outputs the photometric data that is the result of this measurement to the CPU 50. The CPU 50 sets the exposure time and sensitivity of the CCD 55 according to the photometric data by means of a CCD drive circuit 56, and controls the value of the diaphragm 53 by means of a diaphragm control circuit 54 via the capture control circuit 60 in accordance with the data of those settings.

In capture mode, the CPU 50 controls the capture operation via the capture control circuit 60 in accordance the manipulation of the release button 16. Furthermore, if the subject is dark based on the photometric data, the CPU 50 causes the strobe 12 to emit light via the strobe drive circuit 73 when taking a picture. The timer 74 has a built-in clock circuit and finds the date and time information corresponding to the current date and time and provides the capture date and time information to the CPU 50 when a picture is taken. The CPU 50 appends the capture date and time information to the image data and stores it in the memory card 77. The CPU 50 controls the various units according to a control program stored in ROM 67 (read-only memory). The EEPROM 68 (electrically erasable programmable ROM) is a non-volatile memory that stores settings information, etc. required for the operation of the electronic camera 100. The RAM 70 is a volatile memory that is used as a temporary working area of the CPU 50. The CPU 50 detects the manipulation state of the power switch 17 and controls the power supply 63 via a power supply control circuit 64.

The capture control circuit 60 performs focusing and zooming of the photographic lens 10 by means of a lens drive circuit 52, controls the exposure of the CCD 55 by controlling the diaphragm 53 by means of the diaphragm control circuit 54, and controls the operation of the CCD 55 by means of a CCD drive circuit 56. Light beams from the subject are formed by the photographic lens 10 into a subject image over the CCD 55 after passing through the diaphragm 53 to adjust the amount of light, and this subject image is picked up by the CCD 55. The CCD 55 (charge coupled device), which comprises a plurality of pixels, is a charge accumulation type image sensor used for picking up a subject image, and outputs electrical image signals corresponding to the strength of the subject image formed on the CCD 55 to an analog processing unit 57 in accordance with drive pulses provided by the CCD drive circuit 56.

The analog processing unit 57 samples the image signal, which has undergone photoelectric conversion by the CCD 55, with a specific timing, and amplifies the sampled signal to a specific level. An A/D conversion circuit 58 (analog/digital conversion circuit) digitizes the image signal sampled by the analog processing unit 57, thereby converting it to digital data, which is temporarily stored in capture buffer memory 59.

In capture mode, the capture control circuit 60 repeats the operation described above, while the screen control circuit 92 repeats the through-image display operation of reading out the digital data stored successively in the capture buffer memory 59 via the data/control bus 51, loading it once into the frame memory 69, converting the digital data into image data for display, loading it again into the frame memory 69, and displaying the image data for display on the left screen 21. Furthermore, the screen control circuit 92 obtains text display information from the CPU 50 as required, converts it to text data for display and stores it in the frame memory 69, and displays the text data for display on the left screen 21 and right screen 22. In this way, in capture mode, the image picked up by the CCD 50 is displayed in real time on the left screen 21, making it possible to use this through-image as a monitor screen to make the composition settings for taking a picture. The capture control circuit 60 analyzes the extent of the high frequency component of the digital data stored in the capture buffer memory 59 and detects the state of focus adjustment of the photographic lens 10, and performs focus adjustment of the photographic lens 10 by means of the lens drive circuit 52 in accordance with the detection results.

At the time of release, upon receiving a capture instruction from the CPU 50, the capture control circuit 60 causes the subject image to be picked up by the CCD 55 via the CCD drive circuit 56, passes the image signal generated by the image pickup through the analog processing unit 57 and A/D conversion circuit 58 and temporarily stores it as digital data (raw data) in the capture buffer memory 59. The capture control circuit 60 converts or compresses the digital data stored temporarily in the capture buffer memory 59 into a specific recording format (JPEG, etc.) to form the image data, and stores the image data on the memory card 77.

A GPS circuit 61 (global positioning system circuit) detects the location information (longitude data and latitude data) for the electronic camera 100 using information from multiple satellites orbiting around the earth, and provides the capture location information to the CPU 50 at the time of image capture. The CPU 50 appends the capture location information to the image data and stores it in the memory card 77.

The CPU 50 can transmit the image data stored in the memory card 77 to the outside via the short-range wireless communication circuit 72 and the antenna 76, or conversely store image data received from the outside via the short-range wireless communication circuit 72 and the antenna 76 in the memory card 77 and display it on the left screen 21, as required.

In playback mode, the screen control circuit 92 reads out the image data indicated by the CPU 50 from the memory card 77 and places it temporarily into the frame memory 69, displays the image data on the left screen 21, and, following the instructions of the CPU 50, places text data such as playback mode instructions into the frame memory 69 and displays the text data on the right screen 22.

Moreover, in playback mode, manipulating the transmit button 31 causes the image data being played back and displayed on the left screen 21 to be transmitted to the outside via the short-range wireless communication circuit 72 and antenna 76, and manipulating the receive button 32 causes image data to be received from the outside via the short-range wireless communication circuit 72 and antenna 76 and played back and displayed on the left screen 21.

FIG. 78 shows the data configuration of image files stored in the memory card 77. As shown in FIG. 78, multiple image files are stored in the memory card 77. Each image file is made up of image data and appended informational data. The appended informational data consists of capture data that indicates the various settings at the time of image capture, capture date and time data, and capture location data. FIG. 79 is a drawing that shows the configuration of information stored in the EEPROM 68, which consists of camera identification information for identifying the individual electronic camera 100 and gateway server access information used by the portable telephone 120 to access the gateway server 160.

Figure 80:
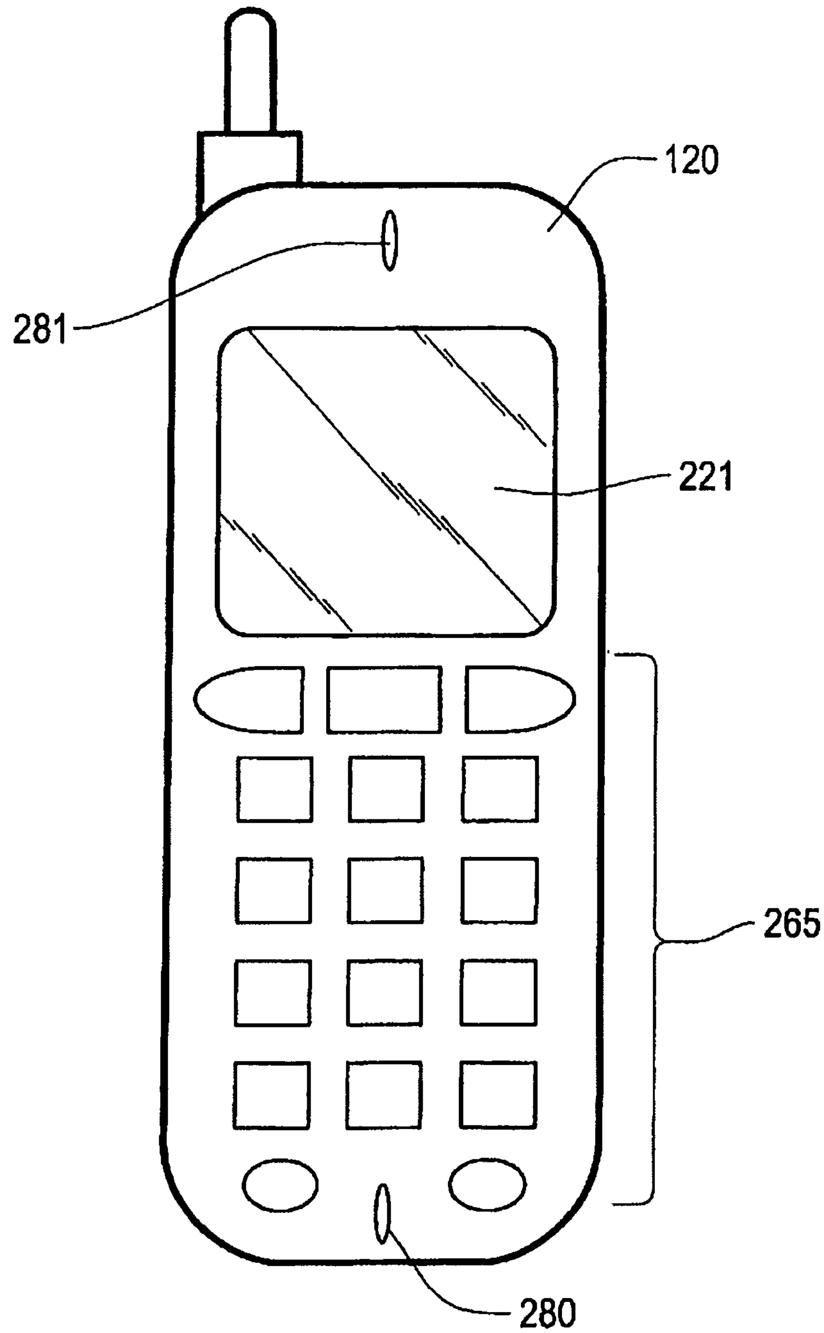
FIG. 80 is an external view of a portable telephone.
Figure 81:
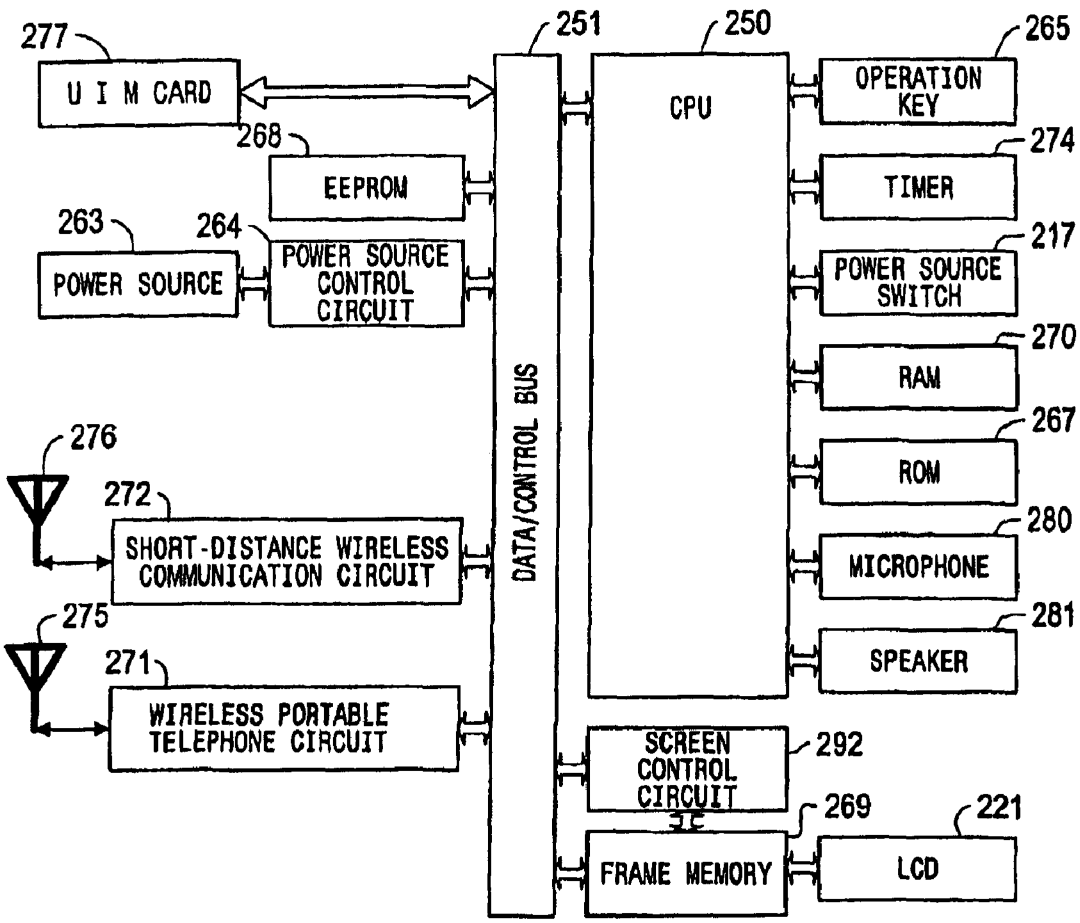
FIG. 81 is a block diagram showing the electrical configuration of a portable telephone.

FIG. 80 is an external view of the portable telephone 120, which is provided with a display screen 221 for displaying image data, various control keys 265, a microphone 280 and a speaker 281. FIG. 81 is a block diagram showing an example of the internal electrical configuration of the portable telephone 120 shown in FIG. 80, wherein the various elements are connected to each other via a data/control bus 251 for transmitting various types of informational data and control data. The CPU 250 (central processing unit) is the means that performs overall control of the entire portable telephone 120, issuing various instructions to the screen control circuit 292 and power supply control circuit 264 in accordance with input information from the control keys 265, power switch 217 and timer 274.

The CPU 250 controls the various units in accordance with a control program stored in ROM 267 (read-only memory). The EEPROM 268 (electrically erasable programmable ROM) is a non-volatile memory that is used for storage of settings information necessary for the operation of the portable telephone 120 and for temporary storage of image data. The RAM 270 is a volatile memory that is used as a temporary working area of the CPU 250. The UIM card (User Identity Module) is a portable storage medium that can be installed in and removed from the portable telephone 120 and that stores personal information of the user of the portable telephone 120 and the like, which personal information can be used by the CPU 250 as required. The CPU 250 detects the state of manipulation of the power switch 217, and controls the power supply 263 via the power supply control circuit 264.

The CPU 250 performs processing of outgoing and incoming telephone calls using the wireless portable telephone circuit 271 and antenna 275, and performs voice call processing using the microphone 280 and speaker 281. Furthermore, the CPU 250 performs exchange of digital data with the outside by means of packet communication protocol using the wireless portable telephone circuit 271 and antenna 275. Moreover, the CPU 250 performs exchange of messages with electronic devices having a short-range wireless communication capability that are in the vicinity of the portable telephone 120 via the short-range wireless communication circuit 272 and the antenna 276, and is able to exchange image information and the like. The CPU 250 reads and loads image data stored temporarily in EEPROM 268 into frame memory 269, and displays the image data on the display screen 221 using the screen control circuit 92.

Figure 82:
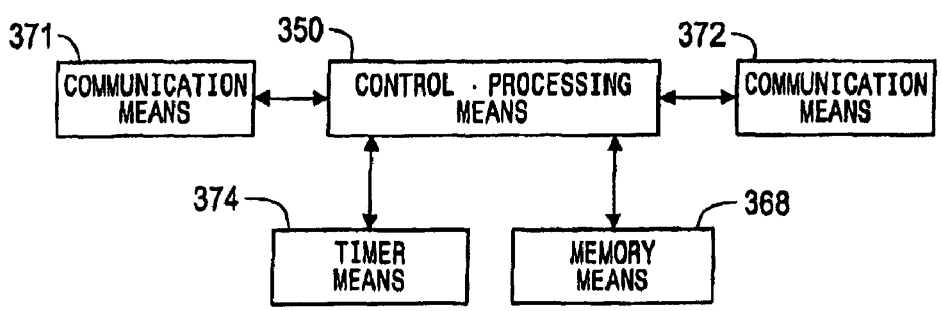
FIG. 82 is a block diagram showing the configuration of a gateway server.

FIG. 82 is a block diagram showing the internal configuration of the gateway server 160, wherein a communication means 371 connected to a packet communication network, a communication means 372 connected to the Internet, a memory means 368 that stores information such as image data, and a timer means 374 are connected to a control/processing means 350 that performs overall control of the various elements of the gateway server 160. The gateway server 160 exchanges information such as image data with the portable telephone 120 using a packet communication protocol via the communication means 371, and exchanges information such as image data with image servers using Internet protocol via the communication means 372.

Figure 83:
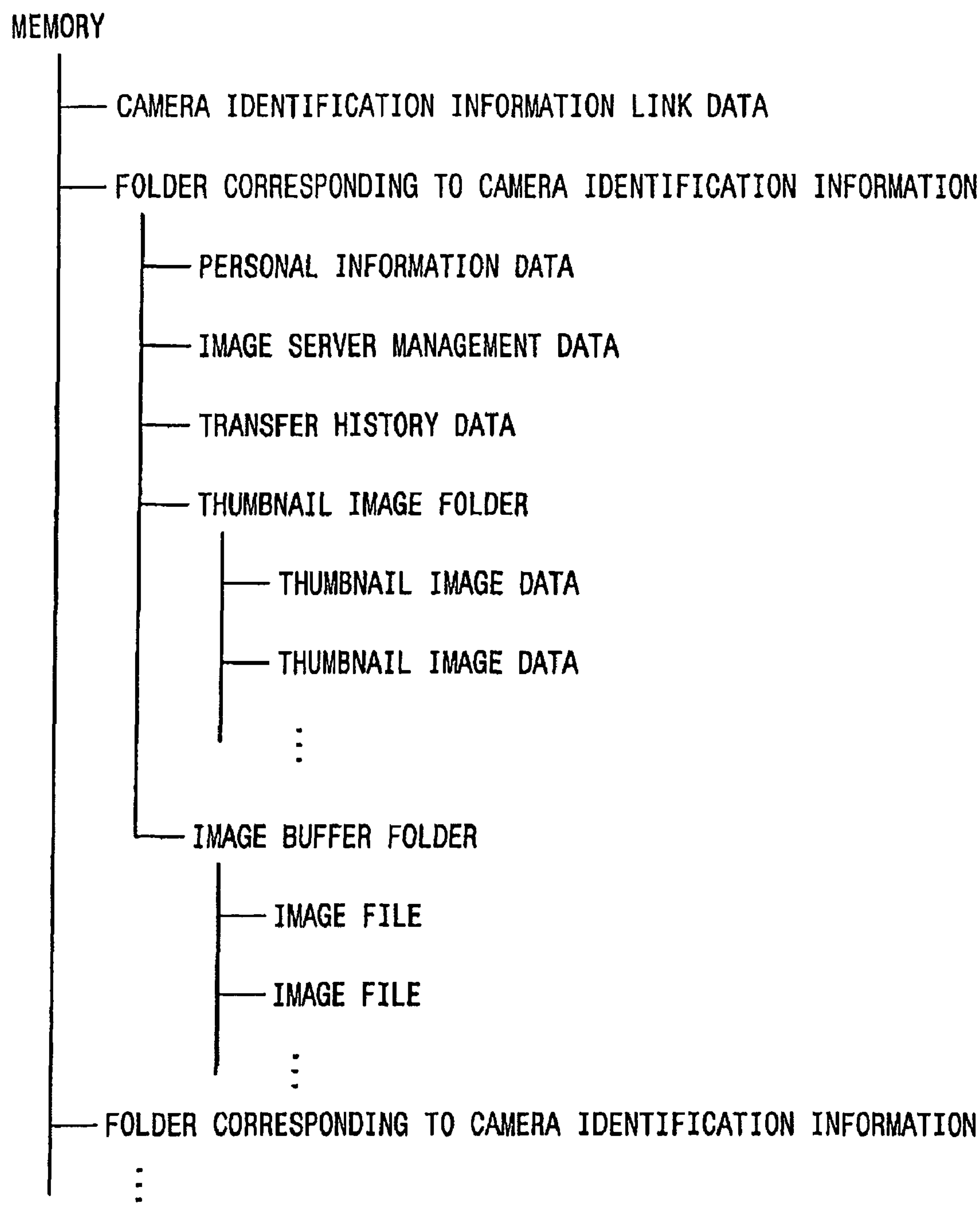
FIG. 83 is a diagram of the memory of a gateway server.

Various types of information are held in the memory means 368, as shown in FIG. 83. The camera identification information link data, as shown in FIG. 84, is data that indicates the correspondence relations of individual items of camera identification information, whereby the arrow indicates that the camera identification information on the right is the parent of the camera identification information on the left. It also represents whether a given item of camera identification information is parent camera identification information, or is single (no link) or is unused, etc. Namely, the gateway server 160 refers to this camera identification information link data, searches for parent camera identification information based on the received camera identification information, and if parent camera identification information exists, performs processing, which is described below, in accordance with the parent camera identification information. Performing such processing makes it possible to treat image data captured with different electronic cameras as image data captured with a single electronic camera. This camera identification information link data can be modified if necessary from an external personal computer 190 or the like, connected to the gateway server 160.

In the memory means 368, as shown in FIG. 83, a folder corresponding to each item of camera identification information is prepared, and each folder corresponding to an item of camera identification information holds personal identification data, image server management data, transfer history data, thumbnail image data and image file data. FIG. 85 is a drawing that shows the configuration of personal identification data, which comprises data relating to the user of the electronic camera 100 corresponding to the camera identification information; the personal identification data can be used by the gateway server 160 to register with image servers on the Internet to secure a new storage area for storing image data or when reading/writing image data to and from image servers. This personal identification data can be modified as necessary from an external personal computer 190, etc., connected to the gateway server 160, and may optionally be made modifiable by transmission of information stored on the UIM card installed in the portable telephone 120 from the portable telephone 120 to the gateway server 160.

Figure 86:
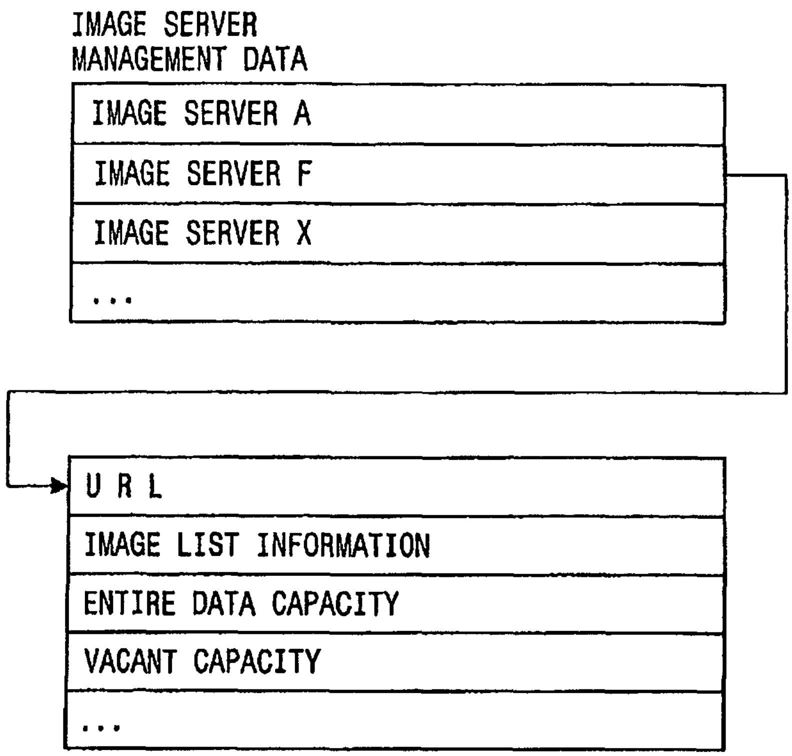
FIG. 86 is an explanatory drawing of server management data.

FIG. 86 is a drawing showing the configuration of server management data, which consists of identifying names of image servers on that the gateway server 160 stores image data according to the camera identification information, the URL (Uniform Resource Locator) of each image server, the total data capacity provided on each image server according to the camera identification information, the available capacity out of the total data capacity provided on each image server according to the camera identification information, and list information on the image data stored on each image server based on the camera identification information (image file identification information or image file names), etc.

Figure 87:
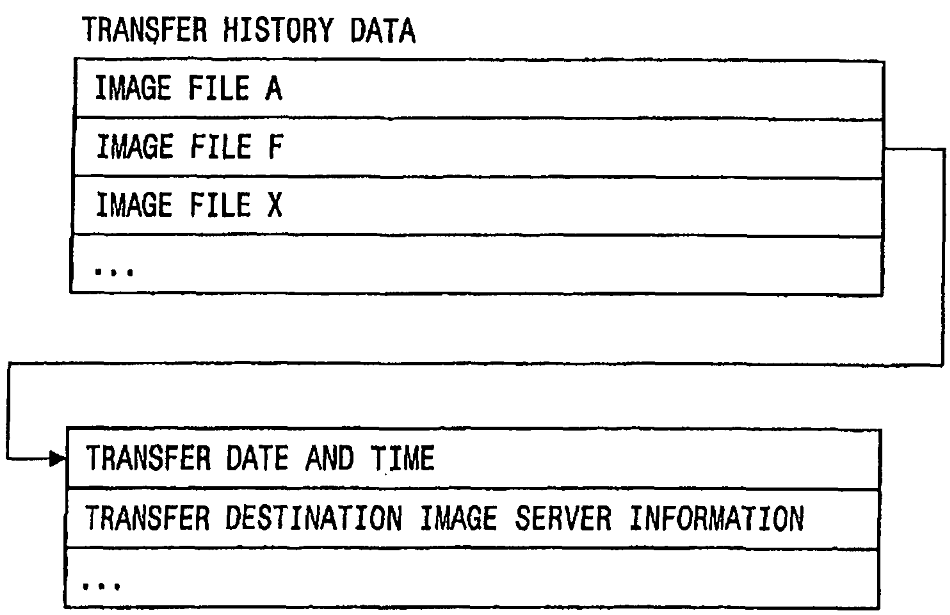
FIG. 87 is an explanatory drawing of transfer history data.

FIG. 87 is a drawing that shows the configuration of the transfer history data, which consists of list information on image data stored on the virtual image server 180 according to the camera identification information (image file identification information or image file names), information on the date and time of transfer of each item of image data to the image server, information relating to the image server to that image data is transferred, etc.

Figure 88:
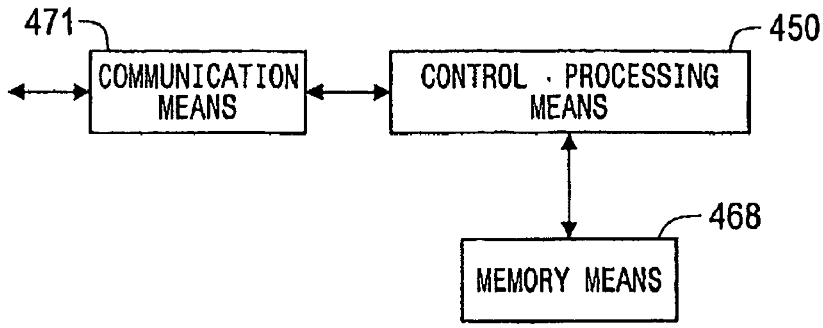
FIG. 88 is a block diagram showing the configuration of an image server.
Figure 89:
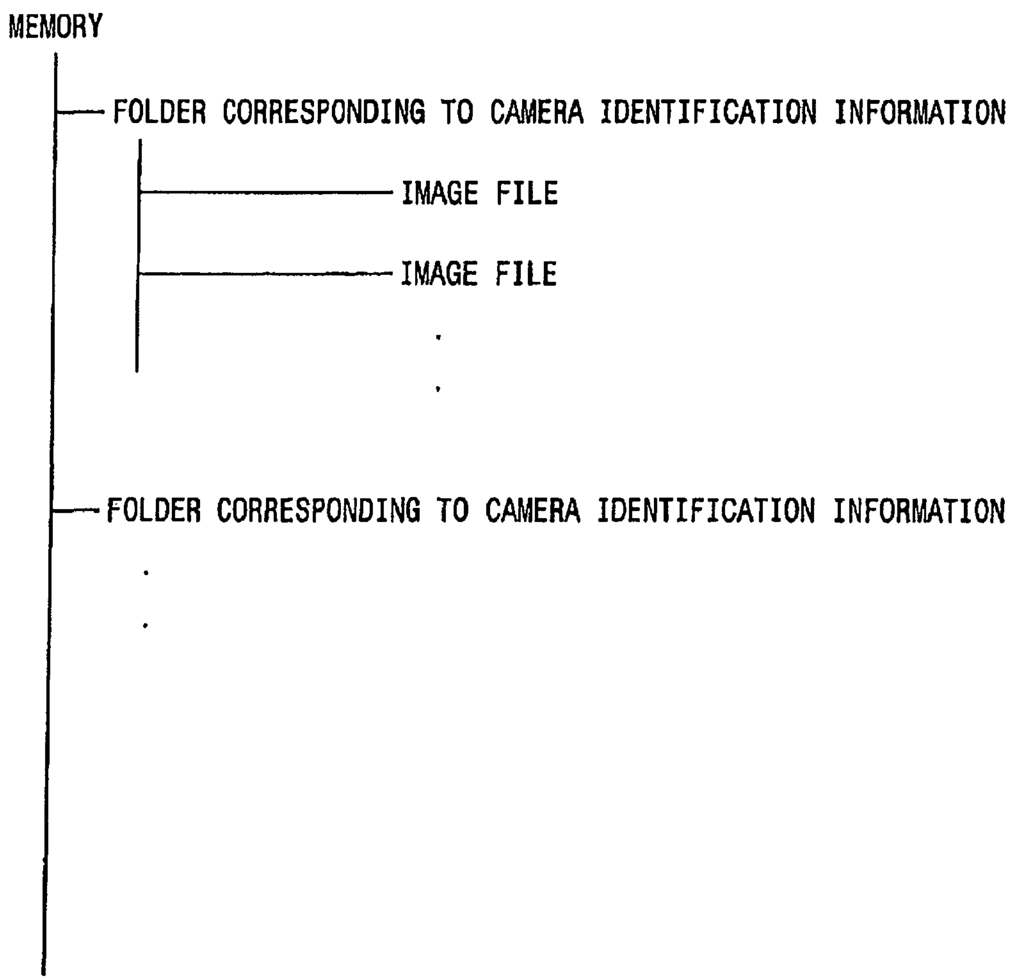
FIG. 89 is diagram of the memory of an image server.

FIG. 88 is a block diagram showing the internal configuration of image servers 181 through 184, wherein a communication means 471 connected to the Internet and a memory means 468 that stores information such as image data are connected to the control/processing means 450 that performs overall control of the individual elements of image servers 181 through 184. Image servers 181 through 184 exchange information such as image data with the gateway server 160 via the communication means 471 using Internet protocol. In the memory means 468, a folder corresponding to each item of camera identification information is prepared, as shown in FIG. 89, and image file data is stored in the folders corresponding to each item of camera identification information.

Figure 90:
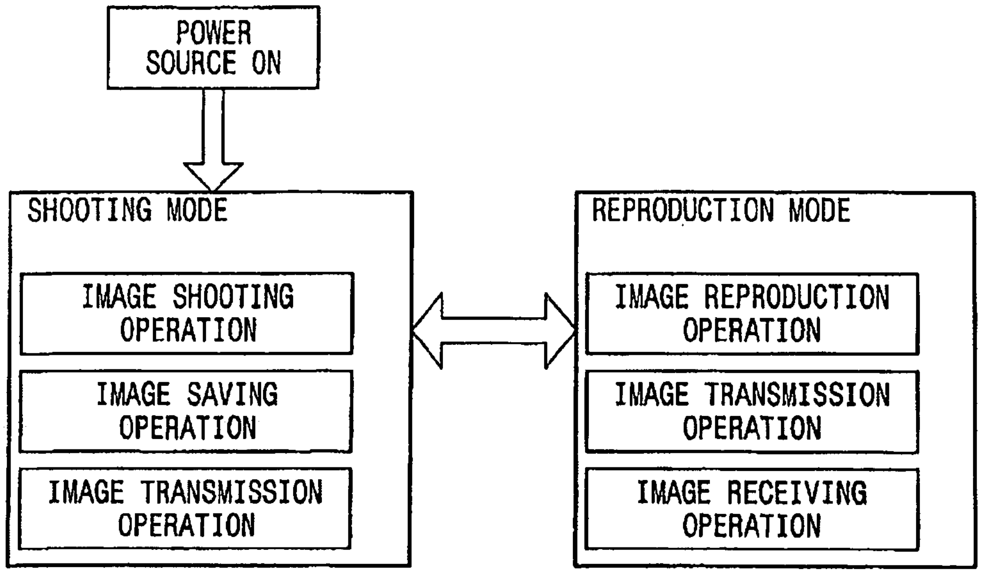
FIG. 90 is a state transition diagram for an electronic camera.

FIG. 90 is a state transition diagram for an embodiment of the electronic camera 100 according to the present invention. When power is turned on, the camera enters capture mode, and manipulating the release button 16 causes the camera to perform a capture operation and a post-capture image file creation and loading of the image file into the memory card 77. In playback mode, it performs playback and display operations on the image data stored in the memory card 77. In capture mode, if the automatic transmission function is turned on, an image transfer operation is performed, whereby captured image data is automatically transmitted and stored on an image server. Furthermore, in playback mode, manipulating the transmit button 31 causes an image transmission operation to be performed, whereby the image data displayed on the left screen 21 is transmitted and stored on an image server. Moreover, manipulating the receive button 32 in playback mode causes an image reception operation to be performed, whereby the desired image data is received from the image server and displayed on the left screen 21. Furthermore, manipulating the capture mode button 28 causes a transition from playback mode to capture mode, and manipulating the playback mode button 29 causes a transition from capture mode to playback mode.

Figure 91:
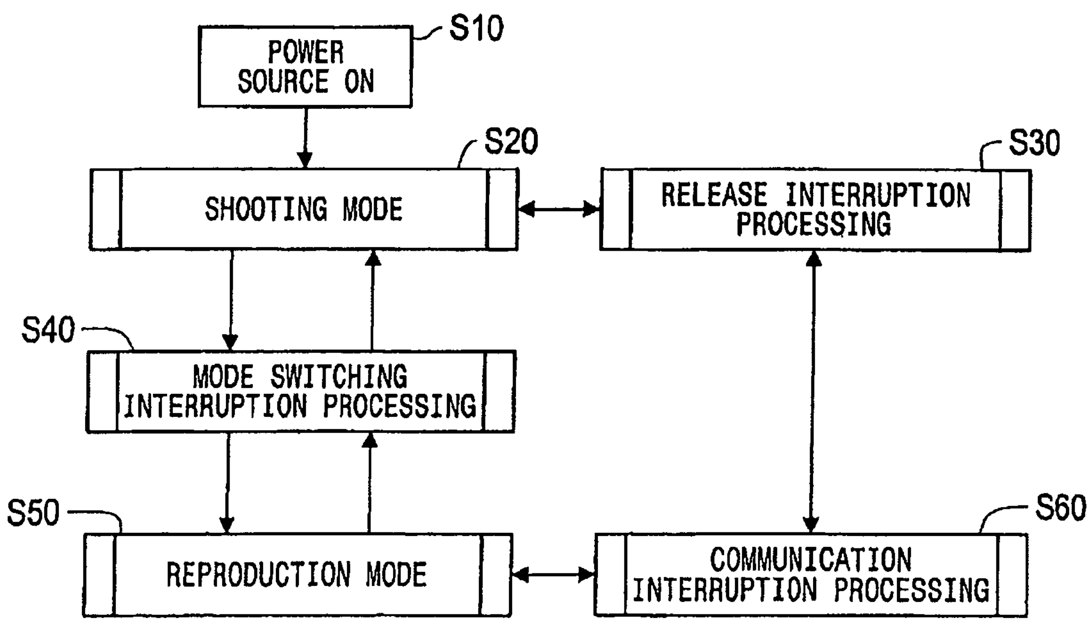
FIG. 91 is a main flow chart of a CPU.

FIG. 91 is a main flow chart of the operation of the electronic camera 100 (CPU 50) in the mode of embodiment described above. First, in S10, the power supply is turned on by manipulating the power switch 17, and in S20, the capture mode subroutine is executed, leading to a capture enabled state. If the release button 16 is manipulated while in capture mode, the release interrupt handling subroutine is executed in S30, and the capture operation is carried out. If the playback mode button 29 is manipulated while in capture mode, a mode switch interrupt handling subroutine is executed in S40, the playback mode subroutine is executed in S50, and image data stored in the memory card 77 is played back and displayed on the left screen 21. Conversely, if the capture mode button 28 is manipulated while in playback mode, a mode switch interrupt handling subroutine is executed in S40, and the system moves to the capture mode subroutine of S20. If the automatic transmission function is turned on, manipulating the release button 16 causes the communication interrupt processing of S60 to be executed following the capture operation, and transmission of image data to the image server is carried out. Furthermore, manipulating the transmit button 31 or the receive button 32 while in playback mode causes the communication interrupt processing of S60 to be executed, and transmission of image data to the image server or reception of image data from the image server is carried out.

Figure 92:
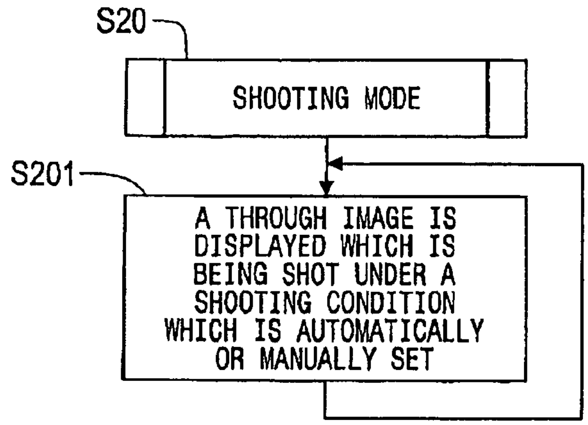
FIG. 92 is subroutine flow chart.
Figure 93:
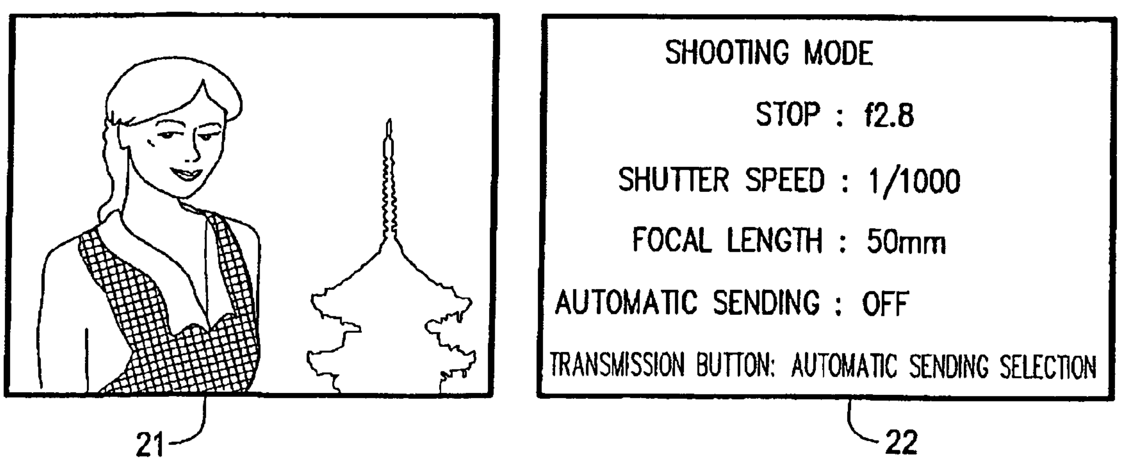
FIG. 93 is a screen display example.

FIG. 92 is a detailed flow chart of the capture mode subroutine. Starting in S20, the processing of S201 is repeated. In S201, image data successively generated by the CCD 55 under the camera settings made by the user is displayed on the left screen 21 as shown in FIG. 93, at that time the capture settings are displayed as text on the right screen 22.

Figure 94:
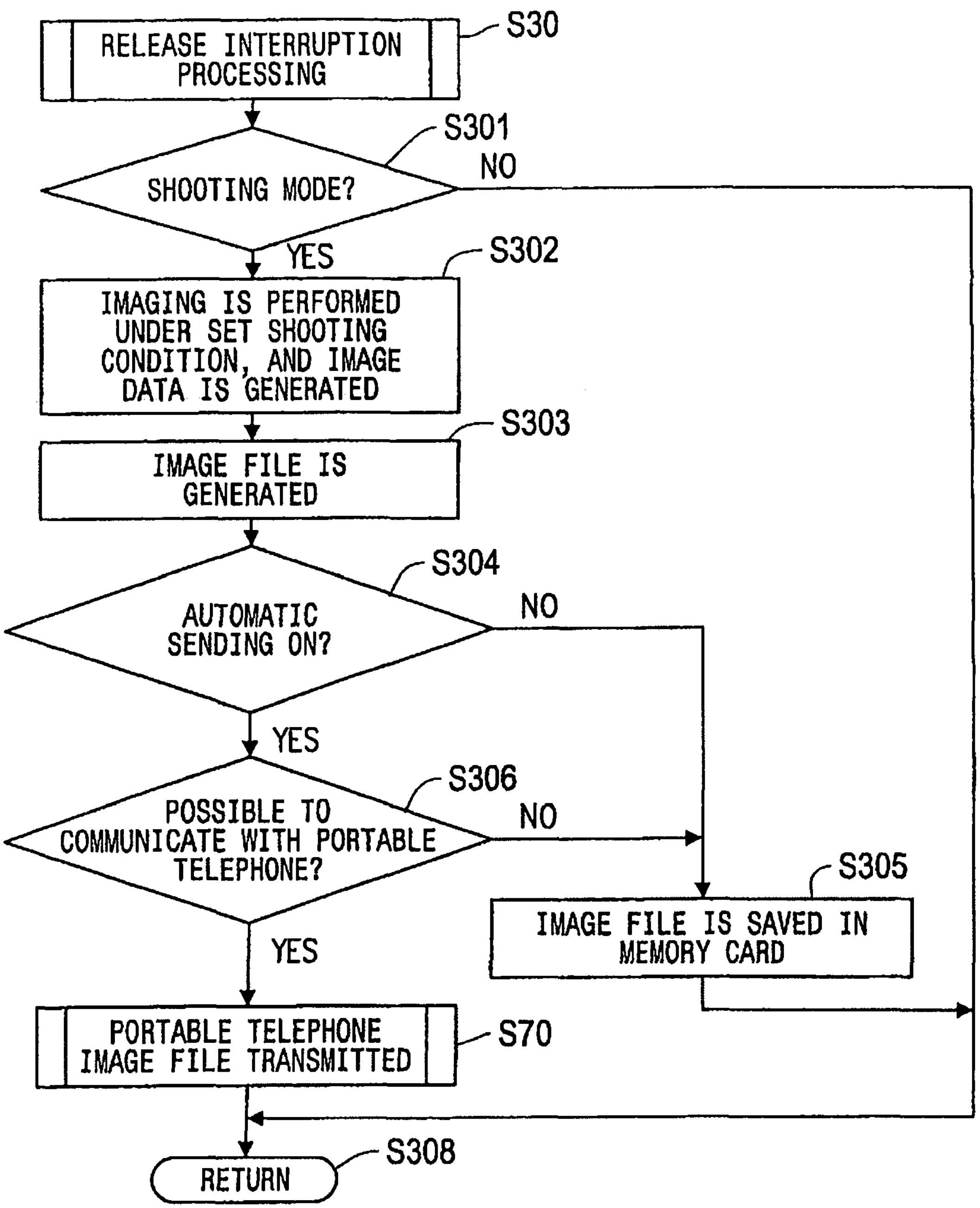
FIG. 94 is subroutine flow chart.

FIG. 94 is a detailed flow chart of the release interrupt handling subroutine. Starting in S30, it is checked in S301 whether the system is in capture mode, and if it is not in capture mode, the system returns in S308. If it is in capture mode, the capture operation is carried out under the capture conditions set by the user or the camera to generate image data, and appended informational data (capture data, time data, location data) is appended to the image data in S303 to generate an image file. In S304, it is checked whether the automatic transmit function is turned on, and if it is not turned on, the image file is loaded into the memory card 77 in S305 and the system returns in S308. If the automatic transmit function is turned on, communication with the portable telephone 120 is attempted using the short-range wireless communication circuit 72 in S306, checking whether communication is possible, and if communication with the portable telephone 120 is possible, the portable telephone image file transmission subroutine of S70 is executed, transmitting the image file to the portable telephone 120, and the system returns in S308. If communication with the portable telephone 120 is not possible, the system goes back to S305, stores the image file on the memory card 77, and returns in S308.

Figure 95:
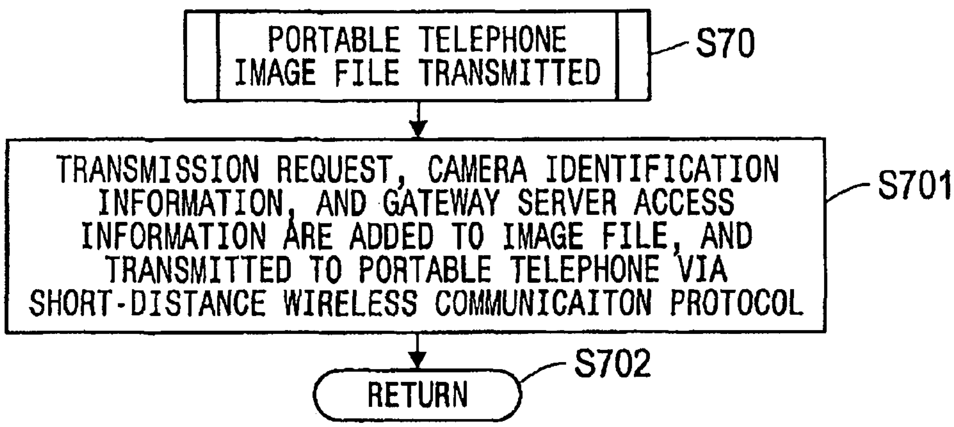
FIG. 95 is subroutine flow chart.

FIG. 95 is a detailed flow chart of the portable telephone image file transmission subroutine. Starting in S70, the image file, camera identification information, gateway server access information and an image transmission request are transmitted to the portable telephone 120 by means of the short-range wireless communication circuit 72 using a short-range wireless communication protocol (Bluetooth, etc.) in S701, and the system returns in S702.

Figure 96:
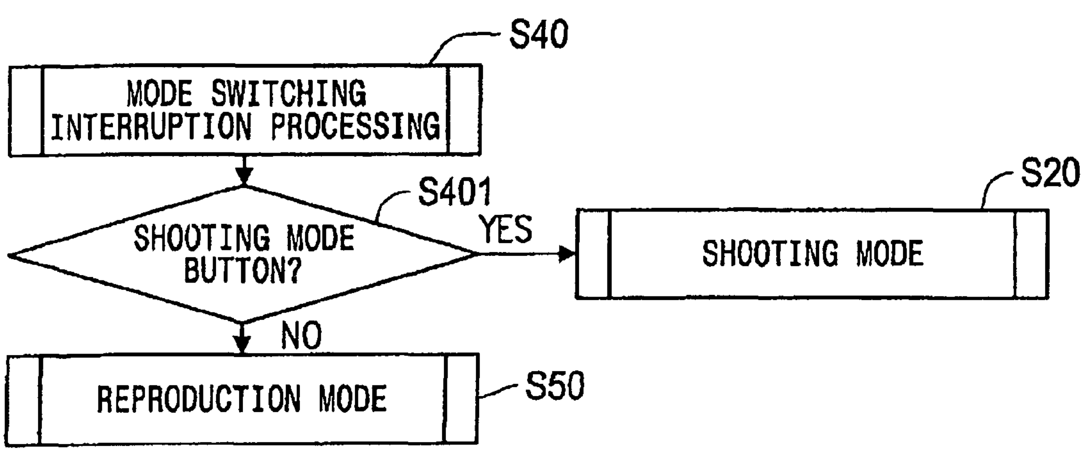
FIG. 96 is subroutine flow chart.

FIG. 96 is a detailed flow chart of the mode switch interrupt handling subroutine. Starting in S40 upon manipulation of the capture mode button 28 or playback mode button 29, it is checked in S401 whether the manipulated button was the capture mode button 28, and if it was the capture mode button 28, playback mode is terminated and the system moves to the capture mode subroutine of S20. If the manipulated button was not the capture mode button 28, the capture mode is terminated and the system moves to the playback mode subroutine of S50.

Figure 97:
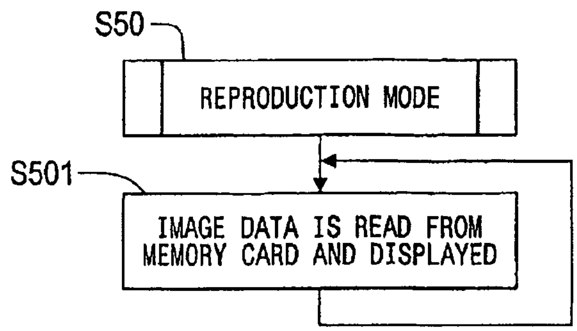
FIG. 97 is subroutine flow chart.
Figure 98:
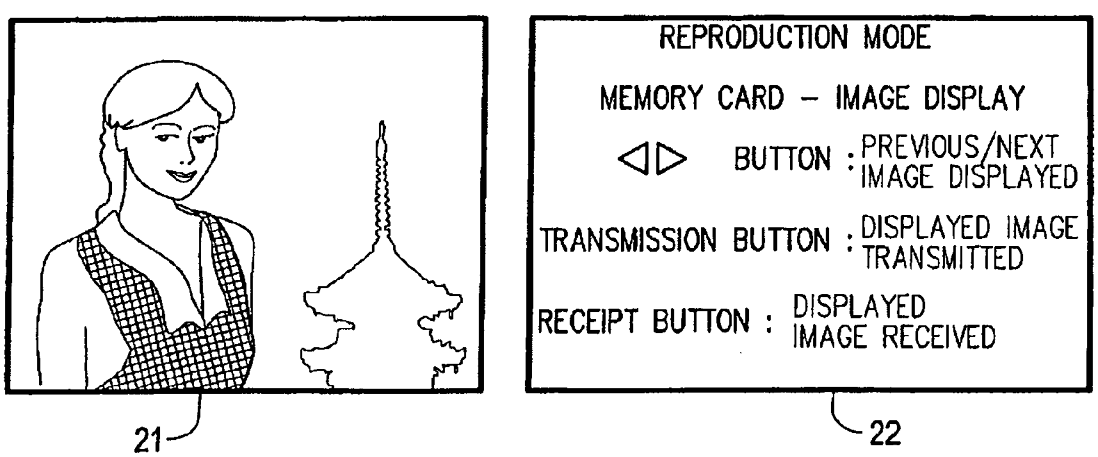
FIG. 98 is a screen display example.

FIG. 97 is detailed flow chart of the playback mode subroutine. Starting in S50, the processing of S501 is repeated. In S501, in response to the manipulation of the LEFT button 25 and RIGHT button 26, image data stored in the memory card 77 is selected and read, and is played back and displayed on the left screen 21 as shown in FIG. 98, while operating instructions are displayed on the right screen 22. Immediately after power is turned on, the most recent image data is displayed; subsequently, image data with older time data are displayed successively in response to manipulation of the LEFT button 25, and image data with newer time data are displayed successively in response to manipulation of the RIGHT button 26.

Figure 99:
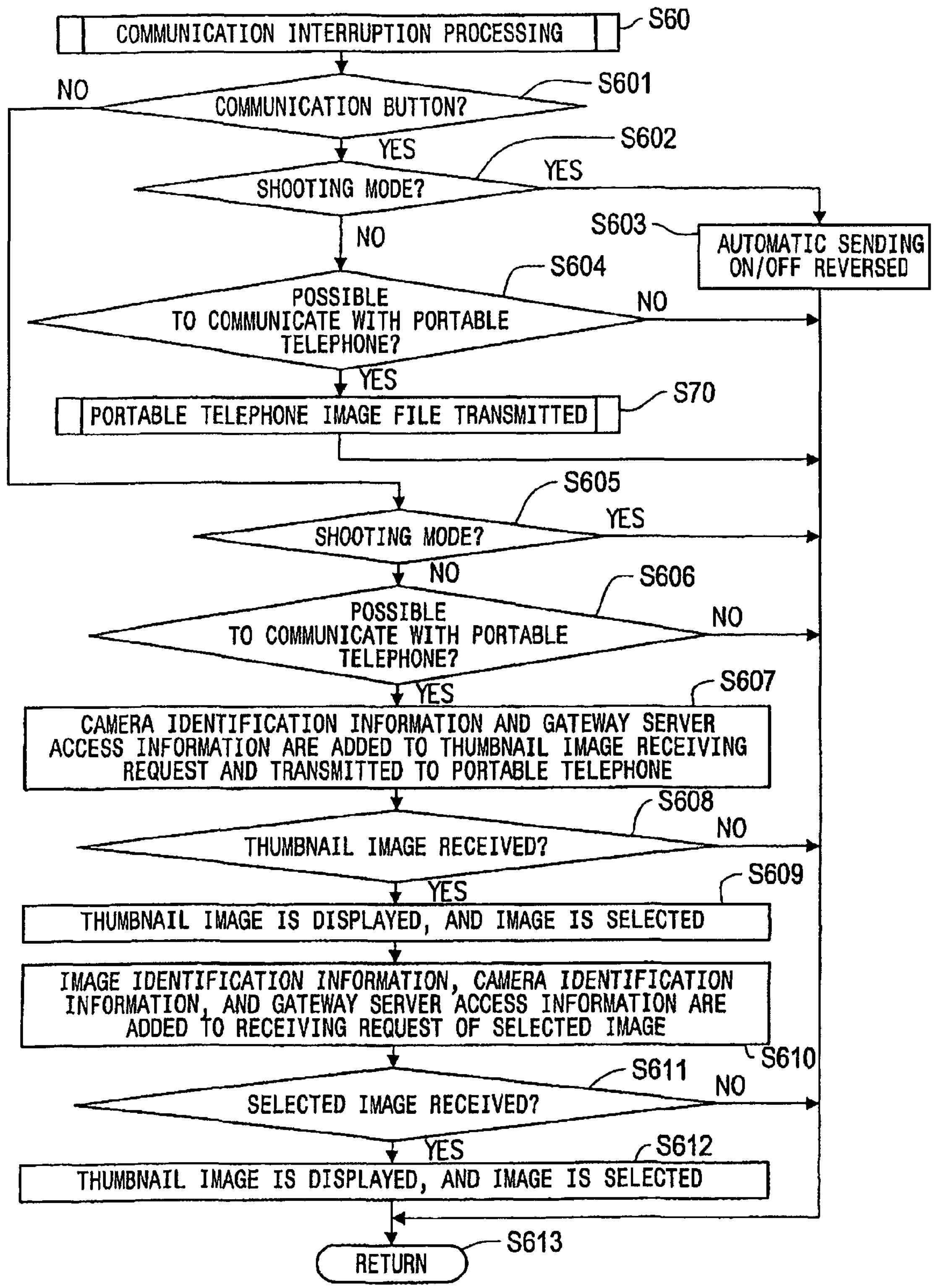
FIG. 99 is subroutine flow chart.

FIG. 99 is a detailed flow chart of the communication interrupt handling subroutine started by manipulating the transmit button 31 or receive button 32. Starting in S60, it is checked in S601 whether the manipulated button was the transmit button 31, and if was the transmit button 31, it is checked in S602 whether the system is in capture mode, and if it is in capture mode, the current setting of the automatic transmit function is inverted in S603, and the system returns in S613. If the system was in playback mode in S602, communication with the portable telephone 120 using the short-range wireless communication circuit 72 is attempted in S604, checking whether communication is possible, and if communication with portable telephone 120 is possible, the portable telephone image file transmission subroutine of S70 is executed, transmitting the image file of the image data currently displayed on the left screen 21 to the portable telephone 120, and the system returns in S613. If communication with the portable telephone 120 is not possible, the system returns in S613.

Figure 100:
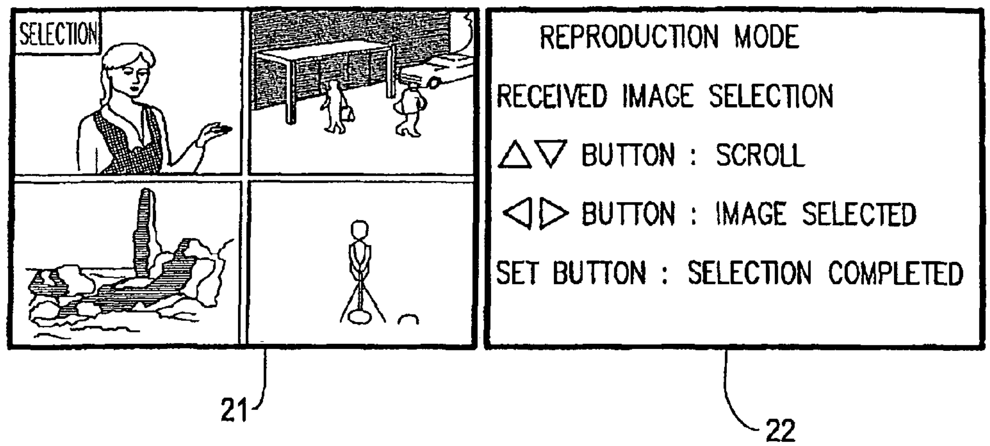
FIG. 100 is a screen display example.
Figure 101:
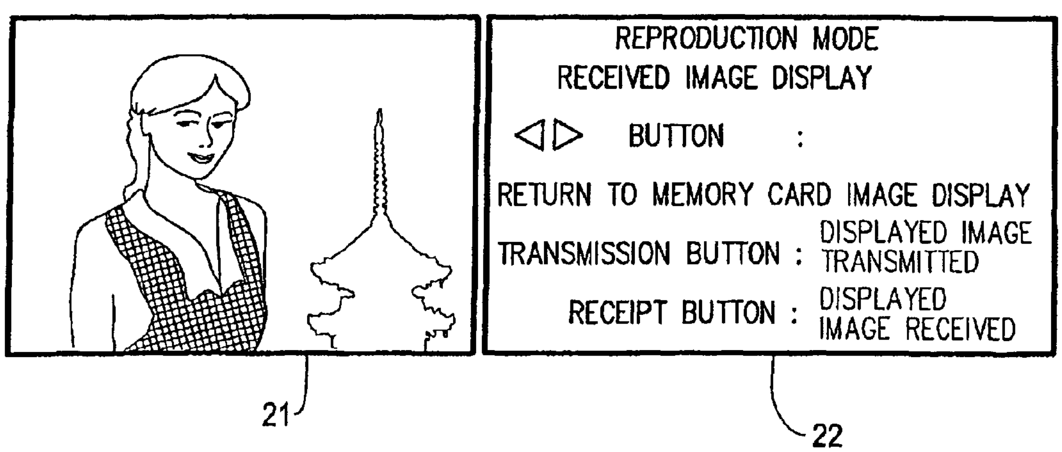
FIG. 101 is a screen display example.

If the button manipulated in S601 was the receive button 32, it is checked in S605 whether the system is in capture mode, and if it is in capture mode, the system returns in S613. If it is in playback mode, communication with the portable telephone 120 using the short-range wireless communication circuit 72 is attempted in S606, checking whether communication is possible, and if communication with the portable telephone 120 is not possible, the system returns in S613. If communication with portable telephone 120 is possible, in S607, the camera identification information, gateway server access information and a thumbnail image reception request are transmitted to the portable telephone 120 by means of the short-range wireless communication circuit 72 using a short-range wireless communication protocol (Bluetooth, etc.). In S608, the system waits to receive thumbnail images form the portable telephone 120 and returns in S613 if reception was not possible. If thumbnail images were received, in S609, as shown in FIG. 100, the received thumbnail images are displayed on the left screen 21, while operating instructions are displayed on the right screen 22. The thumbnail images are scrolled by manipulating the UP button 23 and DOWN button 24, and either the left or right thumbnail image is selected by manipulating the LEFT button 25 or RIGHT button 26. Manipulating the SELECT button 27 confirms the selected thumbnail image. In S610, the image identification information appended to the selected thumbnail image, the camera identification information, gateway server access information and an image reception request are transmitted to the portable telephone 120 by means of the short-range wireless communication circuit 72 using a short-range wireless communication protocol (Bluetooth, etc.). In S611, the system waits to receive image data from the portable telephone 120 and returns in S613 if reception was not possible. If image data was received, in S612, as shown in FIG. 101, the received image data is displayed on the left screen 21 while operating instructions are displayed on the right screen 22, and the system returns in S613.

Figure 102:
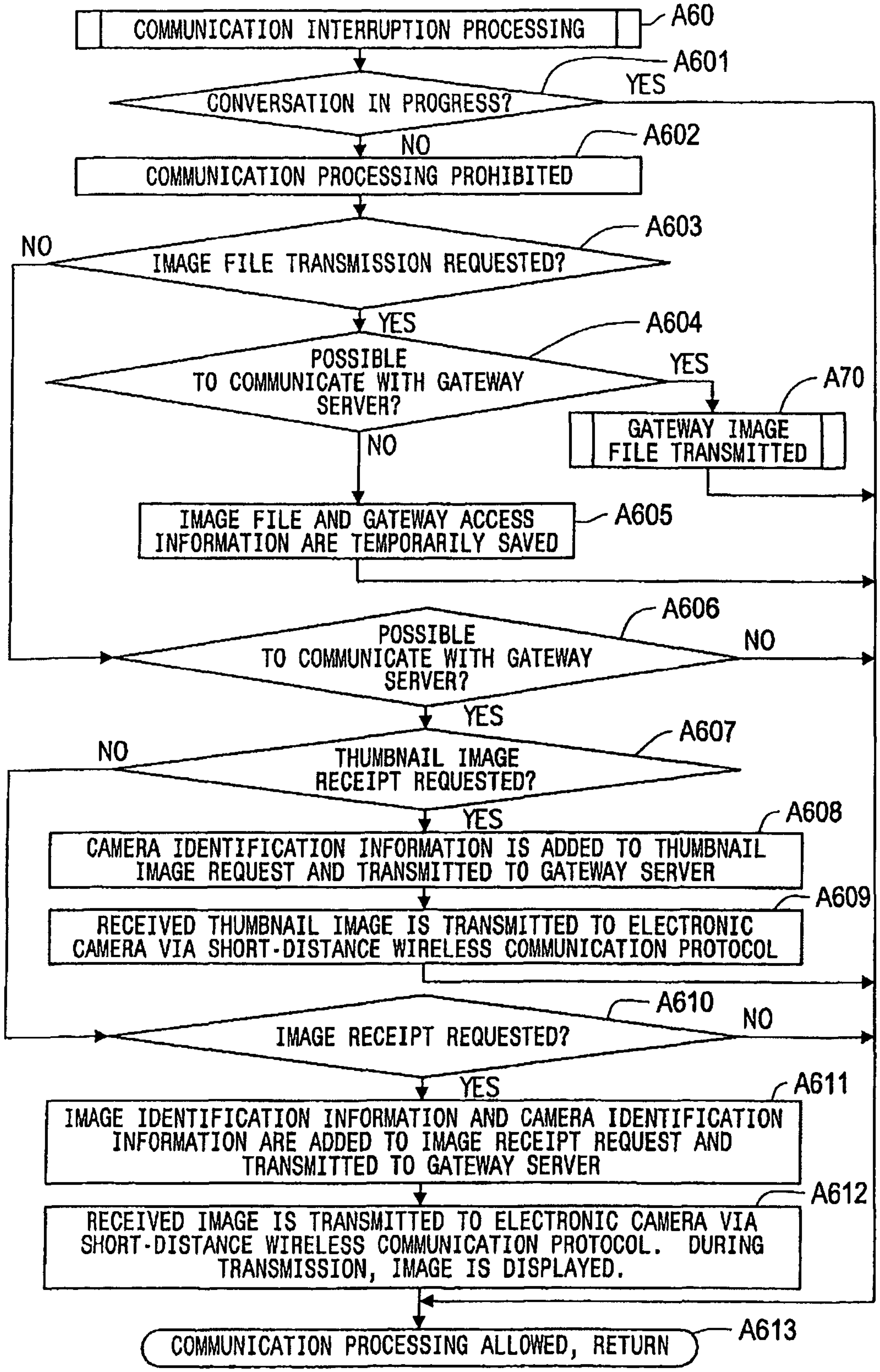
FIG. 102 is subroutine flow chart.

Next, operation of the portable telephone 120 (CPU 250) in the above mode of embodiment will be described. Description of the operation of the portable telephone 120 relating to talk functions will be omitted as it has little bearing on the present invention. FIG. 102 is a detailed flow chart of the communication interrupt handling started when the portable telephone 120 performs image transmission.

Communication interrupt handling is started in A60 when a communication request is received via short-range wireless communication from the electronic camera 100, it is checked in A601 whether the system is currently processing a voice call, and if it is processing a voice call, the system returns in A613 without responding to the communication request from the electronic camera 100. If a voice call is not being processed, voice call processing is blocked in A602, it is checked in A603 whether the request from the electronic camera 100 is an image file transmission request, and if it was an image file transmission request, in A604, communication is attempted with the gateway server 160 using the wireless portable telephone circuit 271 based on the gateway server access information, checking whether communication is possible, and if communication with the gateway server 160 is possible, the gateway image file transmission subroutine of A70 is executed, the image file received from the electronic camera 100 is transmitted to the gateway server 160, voice call processing is unblocked in A613, and the system returns. If communication with the gateway server 160 is not possible, in A605, the image file, camera identification information, gateway server access information, etc. received from the electronic camera 100, are stored temporarily in EEPROM 268, and the system unlocks voice call processing and returns in A613.

If the request from the electronic camera 100 in A603 was not an image file transfer request, in A606, communication with the gateway server 160 is attempted using the wireless portable telephone circuit 271 based on the gateway server access information, checking if communication is possible, and if communication with the gateway server 160 is not possible, the system unblocks voice call processing in A613 and returns. If communication with the gateway server 160 is possible, it is checked in A607 whether the request from the electronic camera 100 is a thumbnail image reception request, and if it was a thumbnail image reception request, in A608, a thumbnail image reception request and camera identification information are transmitted to the gateway server 160 by means of the wireless portable telephone circuit 271 using a packet communication protocol. In A609, the thumbnail images are received from the gateway server 160 and are transmitted to the electronic camera 100 by means of the short-range wireless communication circuit 272 using a short-range wireless communication protocol. While transmitting thumbnail images to the electronic camera 100, the thumbnail images are displayed on the screen 221. Once transmission of thumbnail images to the electronic camera 100 is completed, the system unblocks voice call processing and returns in A613.

Figure 105:
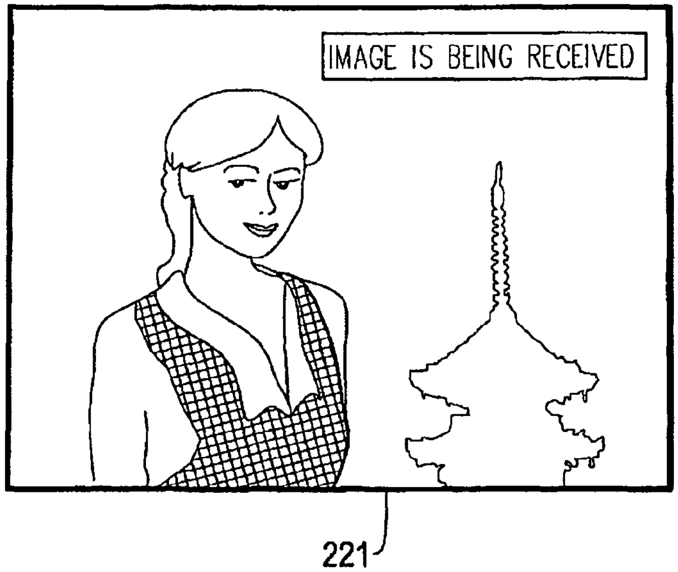
FIG. 105 is a screen display example.

If the request from the electronic camera 100 in A607 was not a thumbnail image reception request, in A610 it is checked whether the request from the electronic camera 100 is a selected image reception request, and if it was not an image reception request, the system unblocks voice call processing and returns in A613. If it was an image reception request, in A611, an image reception request, image identification information and camera identification information are transmitted to the gateway server 160 by means of the wireless portable telephone circuit 271 using a packet communication protocol. In A612, image data corresponding to the image identification information is received from the gateway server 160, and is transmitted to the electronic camera 100 by means of the short-range wireless communication circuit 272 using a short-range wireless communication protocol. During transmission of images to the electronic camera 100, the image data is displayed on the screen 221, as shown in FIG. 105. Once transmission of image data to the electronic camera 100 is completed, display of image data on the screen 221 is terminated, and the system unblocks voice call processing and returns in A613. To more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

Figure 103:
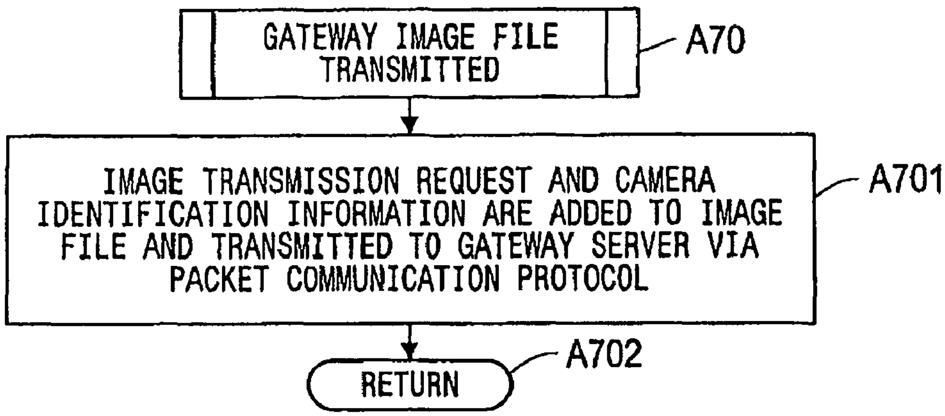
FIG. 103 is subroutine flow chart.
Figure 104:
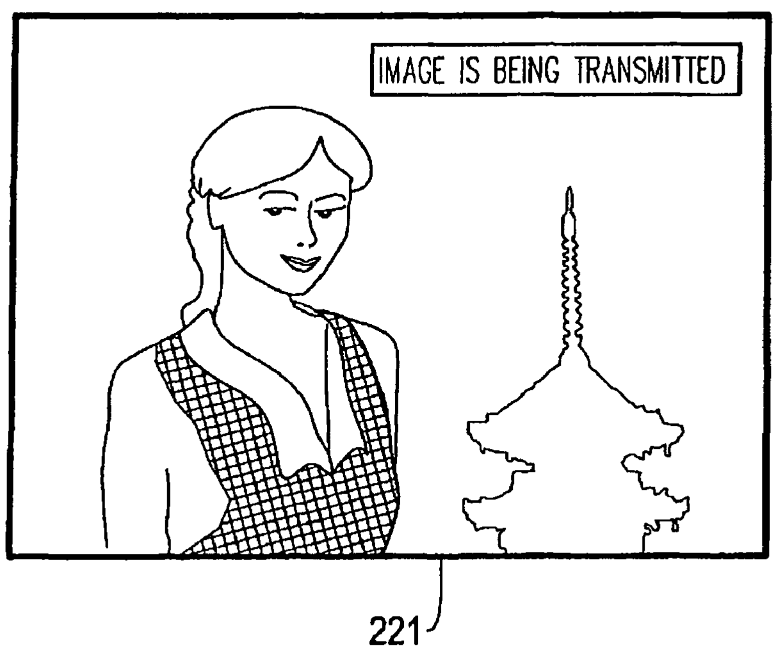
FIG. 104 is a screen display example.

FIG. 103 is a detailed flow chart of the gateway image file transmission subroutine. Starting in A70, in A701 the image file, camera identification information and an image transmission request are transmitted by packet communication protocol using the wireless portable telephone circuit 271 to the gateway server 160 designated based on the gateway access information, and the system returns in A702. While an image file is being transmitted to the gateway server 160, the image data being transmitted is displayed on the screen 221, as shown in FIG. 104, and the display is terminated once transmission is completed. Furthermore, to more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

Figure 106:
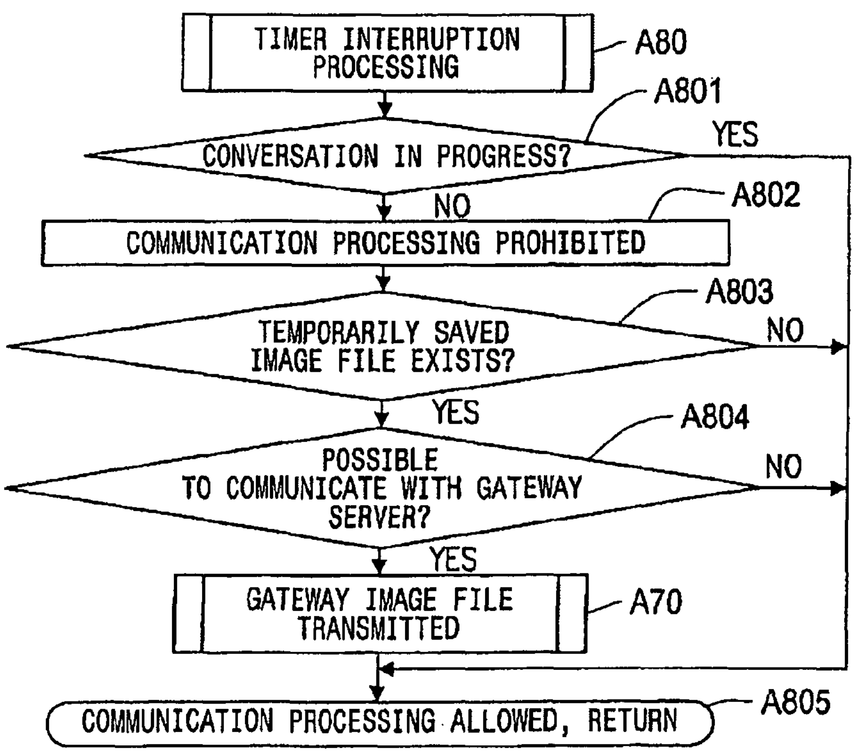
FIG. 106 is subroutine flow chart.

FIG. 106 is a detailed flow chart of the timer interrupt handling started at regular intervals by the timer 274 of the portable telephone 120. Starting in A80, it is checked in A801 whether the system is currently processing a voice call, and if it is currently processing a voice call, the system returns in A805. If it is not processing a voice call, voice call processing is blocked in A802, it is checked in A803 whether there are image files being temporarily stored in EEPROM 268, and if there are no image files being temporarily stored, the system unblocks voice call processing and returns in A805. If there are temporarily stored image files, communication with the gateway server 160 by means of the wireless portable telephone circuit 271 based on the gateway server access information is attempted in A804, checking whether communication is possible, and if communication with the gateway server 160 is not possible, the system unblocks voice call processing and returns in A805. If communication with the gateway server 160 is possible, the gateway image file transmission subroutine of A70 is executed, image files received from the electronic camera 100 are transmitted to the gateway server 160, and in A805, the system unblocks voice call processing and returns.

As indicated above, when communication with the gateway server 160 is not possible, the portable telephone 120 temporarily stores the image files received from the electronic camera 100, and when communication with the gateway server 160 becomes possible, it automatically transmits the temporarily stored image files to the gateway server 160. To notify the user of the fact that image files transmitted from the electronic camera 100 to the gateway server 160 are being temporarily stored by the portable telephone 120, one may optionally display a specific mark, icon or text on the screen 221 while image files are being temporarily stored by the portable telephone 120. By doing this, in a situation where the user is in a hurry to transmit the image files, the user will be able to see this display and perform image file transmission by a different method.

Furthermore, while the communication interrupt handling of FIG. 102 assumes that the connection between the electronic camera 100 and portable telephone 120 is maintained until communication is completed once the connection between the electronic camera 100 and portable telephone 120 has been established, in case the connection between the electronic camera 100 and the portable telephone 120 should be cut off (for example, if the portable telephone 120 becomes unable to transmit thumbnail images or image files received from the gateway server 160 to the electronic camera 100), one can have the thumbnail images and image files be stored temporarily in the EEPROM 268 of the portable telephone 120, have the portable telephone 120 detect when communication between the portable telephone 120 and electronic camera 100 becomes possible, and automatically transmit the thumbnail images or image files stored temporarily in EEPROM 268 to the electronic camera 100. The portable telephone 120 may optionally display the fact that that thumbnail images or image files transmitted to the electronic camera 100 from the gateway server 160 are being stored temporarily by the portable telephone 120 by displaying a special mark, icon or text on the screen 221 while the image files are being temporarily stored by the portable telephone 120. By doing this, in a situation where the user is in a hurry to transmit the image files, the user will be able to see this display, and take countermeasures such as rechecking the connection between the portable telephone 120 and electronic camera.

Figure 107:
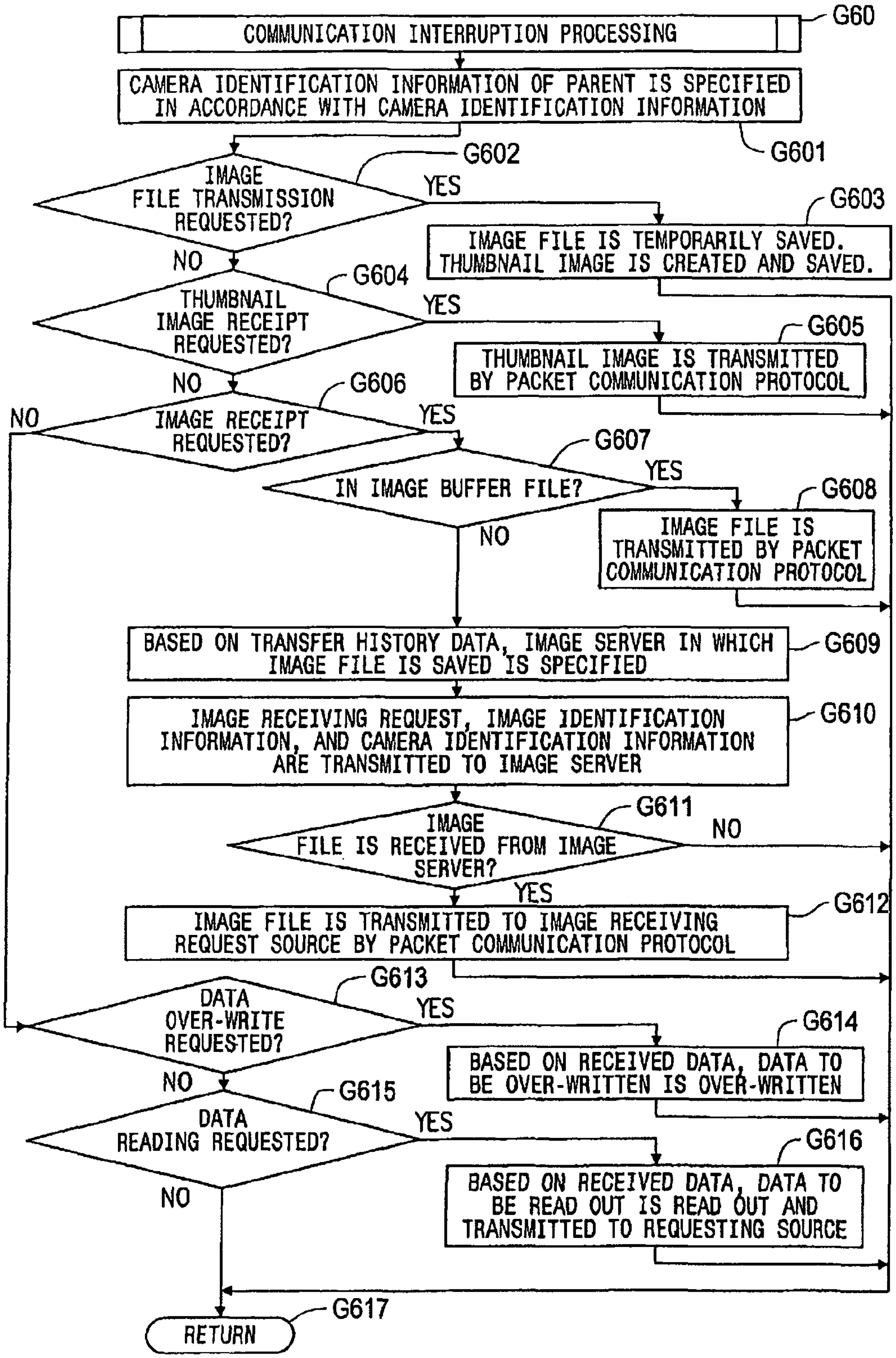
FIG. 107 is subroutine flow chart.

Next, the operation of the gateway server 160 (control/processing means 350) in the above mode of embodiment will be described. Description of operations of the gateway server 160 other than the image transmission operation will be omitted as they have little bearing on the present invention. FIG. 107 is a detailed flow chart of the communication interrupt handling started when the gateway server 160 performs image transmission. Starting in G60 with a communication request from the portable telephone 120 or personal computer 190, in G601, the parent camera identification information is identified by referring to the camera identification information link data based on the received camera identification information. Subsequent image data handling is performed on the folder corresponding to the parent camera identification information. In G602, it is checked whether the received request is an image file transmission request, and if it was an image file transmission request, in G603, the received image file is stored temporarily in an image buffer folder in the folder corresponding to the camera identification information, thumbnail image data corresponding to the image data is generated and stored in a thumbnail image folder, likewise in the folder corresponding to the camera identification information, and the system returns in G617.

If the request received in G602 was not an image file transmission request, it is checked in G604 whether the received request is a thumbnail image reception request, and if it was a thumbnail image reception request, in G605 the thumbnail images stored in the thumbnail image folder inside the folder corresponding to the camera identification information are transmitted by packet communication protocol to the originator of the thumbnail image reception request (portable telephone 120), and the system returns in G617. If the request received in G604 was not a thumbnail image reception request, it is checked in G606 whether the received request is an image reception request, and if it was an image reception request, it is checked in G607 whether image data corresponding to the image identification information exists in the image buffer folder inside the folder corresponding to the camera identification information, and if image data corresponding to the image identification information exists in the image buffer folder, the image file containing the image data is transmitted to the originator of the image reception request (portable telephone 120) using a packet communication protocol in G608, and the system returns in G617.

If there is no image data corresponding to the image identification information in the image buffer folder, the image server where the image file corresponding to the image identification information is stored is determined based on the transfer history data in G609, and an image reception request and the image identification information are transmitted to that image server using Internet protocol in G610. In G611, the system waits to receive the specified image file from the image server, returning in G617 if the image file could not be received from the image server; if the image file was received from the image server, the image file is transmitted to the originator of the image reception request (portable telephone 120) in G612 using a packet communication protocol, the image file is stored temporarily in the image buffer folder in the folder corresponding to the camera identification information, and the system returns in G617.

If the received request in G606 was not an image reception request, it is checked in G613 whether the received request is a data overwrite request, and if it was a data overwrite request, personal identification data in the folder corresponding to the camera identification information, camera identification information link data, etc., is overwritten according to the received data, and the system returns in G617. If the received request in G613 was not a data overwrite request, it is checked in G615 whether the received request was a data read request, and if it was a data read request, the personal identification data in the folder corresponding to the camera identification information, camera identification information link data, etc., is read and transmitted to the requestor in accordance with the received data, and the system returns in G617. If the received request in G615 was not a data read request, the system returns in G617.

Figure 108:
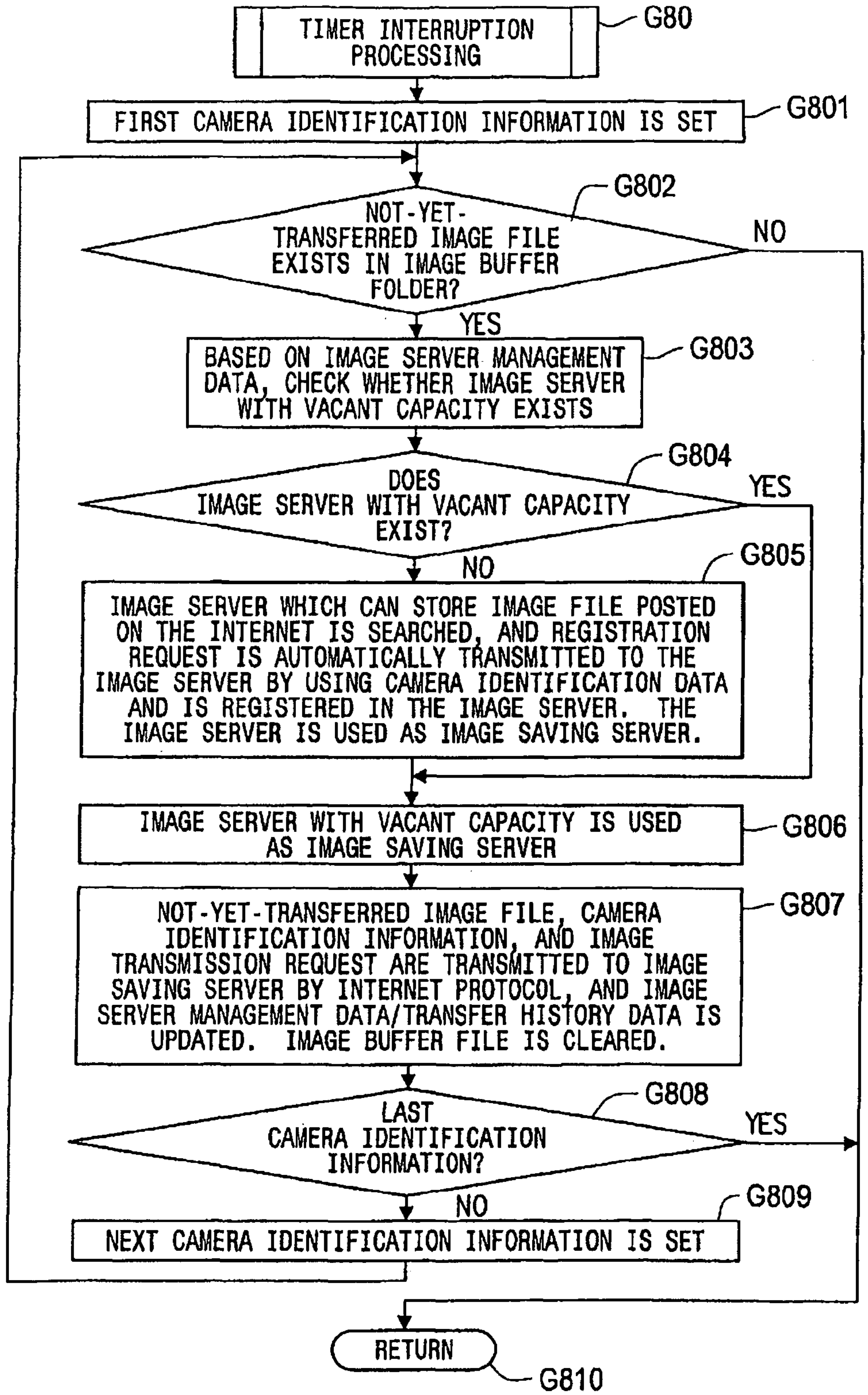
FIG. 108 is subroutine flow chart.
Figure 109:
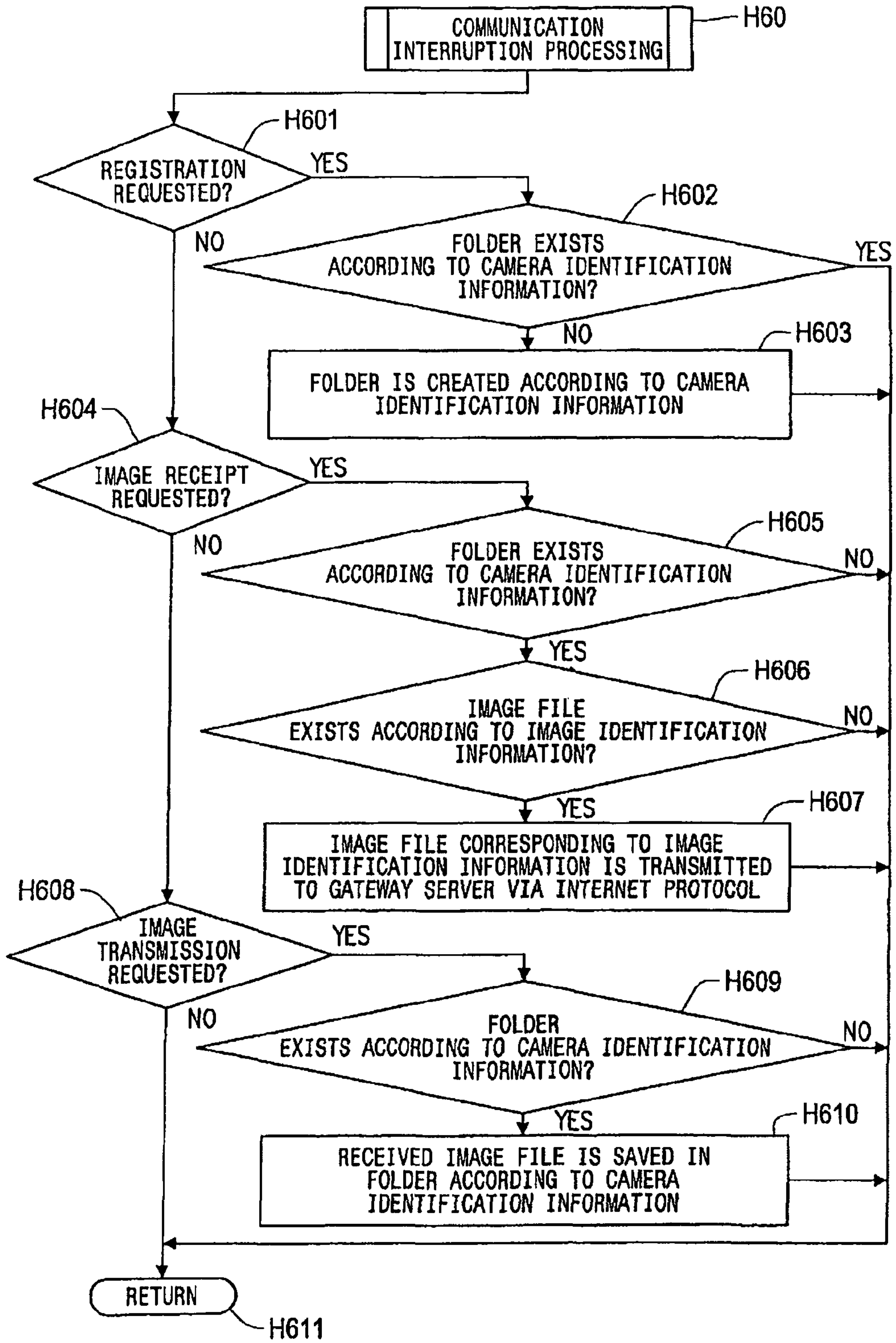
FIG. 109 is subroutine flow chart.

FIG. 108 is a detailed flow chart of the timer interrupt handling started at specific intervals by the timer means 374 of the gateway server 160. Starting in G80, the first item of camera identification information from the camera identification information list maintained by the gateway server 160 is selected in G801. In G802, it is checked based on the transfer history data whether there are image files that have not been transferred yet to the image server in the image buffer folder inside the folder corresponding to the selected camera identification information, and if there are no image files that have not been transferred yet, the system returns in G810. If there are image files that have not been transferred yet, it is checked in G803, based on image server management data, whether there is an image server with available capacity. In S804, if there is an image server with available capacity, the system proceeds to G806, and if there are no image servers with available capacity, a new image server with available capacity is searched for in G805. In G805, a search is carried out for open image servers on the Internet that are able to store image files, registration with the found image server is carried out automatically using camera identification information, and information on the image server (storage capacity, etc.) is recorded in the image server management data. In G806, an image server with available capacity is designated as the image server for storing images. In G807, image files that have not been transferred yet are transmitted using Internet protocol to the image server designated as the image server for storing images, the image server management data and transfer history data are updated, and all the image files stored temporarily in the image buffer folder are deleted. In G808, it is checked whether the currently selected camera identification information is the last item of camera identification information in the camera identification information list; if it is not the last item of camera identification information, in G809, the camera identification information is changed to the next item of camera identification information, the system goes back to G802 and repeats the processing described above, and if it is the last item of camera identification information, the system returns in G810.

Next, the operation of the image servers 181 through 184 (control/processing means 350) in the above mode of embodiment will be described. Description of operations of the image servers 181 through 184 other than the image transmission and storage operation will be omitted as they have little bearing on the present invention. FIG. 99 is a detailed flow chart of the communication interrupt handling started when a communication request is received by the image servers 181 through 184 from the gateway server 160. Starting in H60 upon receiving a communication request from the gateway server 160, it is checked in H601 whether the received request is an image server registration request, and if it was a registration request, it is checked in H602 whether a folder corresponding to the received camera identification information exists, and if it already exists, the system returns in H611. If no folder corresponding to the received camera identification information exists, in H603, a folder corresponding to the received camera identification information is created, and the system returns in H611.

If the request received in H601 is not an image server registration request, it is checked in H604 whether the received request is an image reception request (image read request), and if it was an image reception request, it is checked in H605 whether a folder corresponding to the received camera identification information exists, and if it does not exist, the system returns in H611. If a folder corresponding to the received camera identification information exists, it is checked in H606 whether an image file corresponding to the received image identification information exists in the folder, and if it does not exist, the system returns in H611. If an image file corresponding to the received image identification information exists, the image file in question is transmitted to the gateway server 160 using Internet protocol in H607, and the system returns in H611. If the received request in H604 is not an image reception request to the image server, it is checked in H608 whether the received request is an image transmission request (image write request), and if it was not an image transmission request, the system returns in H611. If it was an image transmission request, it is checked in H609 whether a folder corresponding to the received camera identification information exists, and if it does not exists, the system returns in H611. If a folder corresponding to the received camera identification information exists, the received image file is stored in the folder in H610, and the system returns in H611.

In the mode of embodiment described above (FIG. 74 through FIG. 109), while relaying image files received from the electronic camera 100 though the gateway server 160, the portable telephone 120 displays the image data being transmitted on the screen 221, as shown in FIG. 104, which allows the user to confirm based on the display of screen 221 that the image data he selected and transmitted is in fact being transmitted from the portable telephone 120 to the gateway server 160, and allows the user to confirm that transmission of image data from the portable telephone 120 to the gateway server 160 has been completed based on the fact that display of image data on the screen 221 has terminated. Furthermore, the fact that display of image data has started on the screen 221 of the portable telephone 120 allows one to confirm that transmission of image data from the electronic camera 100 to the portable telephone 120 has been completed, and one can accordingly start taking picture with the electronic camera 100.

In the above mode of embodiment (FIG. 74 through FIG. 109), while image files received from the gateway server 160 are being relayed to the electronic camera 100, the portable telephone 120 displays the image data being transmitted on the screen 221, as shown in FIG. 105, which allows the user to get an overview of the received image data based on the display of screen 221 before displaying and browsing the image data on the screen after transmission of the image data to the electronic camera 100 is completed, and allows the user to confirm that transmission of image data from the portable telephone 120 to the electronic camera 100 has been completed based on the fact that display of image data on the screen 221 has terminated.

In the above mode of embodiment (FIG. 74 through FIG. 109), if the portable telephone 120 was not able to relay image files received from the electronic camera 100 to the gateway server 160 (for example, when the portable telephone 120 is out of range of the wireless portable telephone link), those image files are stored temporarily in the EEPROM 268 of the portable telephone 120, and when transmission of image files to the gateway server 160 becomes possible, the image files stored temporarily in EEPROM 268 are automatically transmitted to the gateway server 160, so even if communication between the portable telephone 120 and the gateway server 160 is not possible, the user does not need to redo the image file transmission operation on the electronic camera 100 side, which makes it possible to avoid the risk of the user forgetting to retransmit, and allows the user to focus on taking pictures with the electronic camera 120 once image files have been transmitted from the electronic camera 100 to the portable telephone 120.

In the above mode of embodiment (FIG. 74 through FIG. 109), the gateway server 160 that relays image data between the electronic camera 100 and image servers 181 through 184 temporarily stores image data received from the electronic camera 100 or image servers 181 through 184 in the memory means 368 of the gateway server 160, and transmits the stored image data as necessary to the electronic camera 100 or image servers 181 through 184, thereby making it possible to reduce the communication traffic between the image servers 181 through 184 and gateway server 160 or between the electronic camera 100 and the gateway server 160.

In the above mode of embodiment (FIG. 74 through FIG. 109), the gateway server 160 that relays image data between the electronic camera 100 and image servers 181 through 184 stores the user's personal information in the memory means 368, and if there is no available capacity to store image data in the image server's album corresponding to the camera identification information, the gateway server connects to another image server on the Internet, automatically sets up an album (folder) corresponding to the camera identification information using the aforementioned personal information, transmits the image data received from the electronic camera 100 to the image server and causes it to be stored in the new album, thereby freeing the user from having to perform the complicated procedure of connecting to an image server and the bothersome procedure of setting up an album, which the user would otherwise have to carry out directly on the electronic camera 100 side.

In the above mode of embodiment (FIG. 74 through FIG. 109), the gateway server 160 that relays image data between the electronic camera 100 and image servers 181 through 184 keeps, in the memory means 368, server management information for unified management of albums (folders) set up corresponding to camera identification information on each of the image servers 181 through 184, and based on the server management information, performs generalized storage and management of image data stored in distributed fashion across multiple image servers 181 through 184 by combining it into one virtual album, thereby making it possible to exchange large volumes of image data between the virtual album and the electronic camera 100 by means of simple operations, without the user being aware of the multiple image servers 181 through 184 that actually store the image data on the Internet.

In the above mode of embodiment (FIG. 74 through FIG. 109), the gateway server 160 that relays image data between the electronic camera 100 and image servers 181 through 184 keeps, in the memory means 368, link information that represents the associations of camera identification information for individually identifying electronic cameras, views multiple electronic cameras as a single group based on the link information, and transmits and stores image data received from the electronic cameras in an album on an image server corresponding to the group to that those electronic cameras belong, thereby making it possible to store image data captured with multiple electronic cameras in a single album on the image server.

(Description of modified embodiments) The present invention is not limited to the mode of embodiment described above, and various modifications and changes are possible.

While in the above mode of embodiment (FIG. 74 through FIG. 109), transmission was carried out individually for reach image file relayed from the electronic camera 100 via the portable telephone 120 to the gateway server 160, it is also permissible to transmit multiple image files as a batch from the electronic camera 100 via the portable telephone 120 to the gateway server 160. In such cases as well, during transmission of image data from the portable telephone 120 to the gateway server 160, the portable telephone 120 displays the image data being transmitted on the screen 221. Doing this allows the user to check the progress of the processing of image file transmission from the portable telephone 120 to the gateway server 160 based on the image data being displayed. Furthermore, when multiple image files are transmitted in a batch from the electronic camera 100 via the portable telephone 120 to the gateway server 160 in this manner, first all the image files to be transmitted are transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160. Doing so makes it unnecessary to transmit appended informational data (camera identification information, gateway server access information, image transmission requests etc.) for each individual image file from the electronic camera 100 to the portable telephone 120, making it possible to shorten the transmission time for image files between the electronic camera 100 and portable telephone 120. When transmitting image files from the portable telephone 120 to the gateway server 160, this also makes it unnecessary to transmit appended informational data (camera identification information, image transmission requests, etc.) for each individual image file from the portable telephone 120 to the gateway server 160, making it possible to reduce the transmitted data volume passing through the wireless portable telephone link 130 and packet communication network 150 and to shorten the image file transmission time, as well as to reduce communication fees.

Furthermore, when transmitting multiple image files in a batch from the electronic camera 100 via the portable telephone 120 to the gateway server 160, if all the image files to be transmitted are first transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160, then if problems occur with the wireless portable telephone link 130 or packet communication network 150 during transmission of image files from the portable telephone 120 to the gateway server 160 and transmission of image files becomes impossible, the portable telephone 120 will leave the image files that it has not finished transmitting in the EEPROM 268, and will automatically transmit the image files remaining in EEPROM 268 to the gateway server 160 once transmission of image files to the gateway server 160 becomes possible. Doing so makes it unnecessary for the user to redo the image file transmission operation on the electronic camera 100 side from the beginning even if communication between the portable telephone 120 and gateway server 160 becomes impossible midway during image transmission, allowing the user to focus on taking pictures with the electronic camera 120 once image files have been transmitted from the electronic camera 100 to the portable telephone 120, as well as making it possible to reduce the transmitted data volume passing through the wireless portable telephone link 130 and the packet communication network 150 compared to if file transfer from the electronic camera 100 to the gateway server 160 were redone from the beginning, and allowing one to shorten the image file transmission time and to reduce communication charges.

Figure 110:
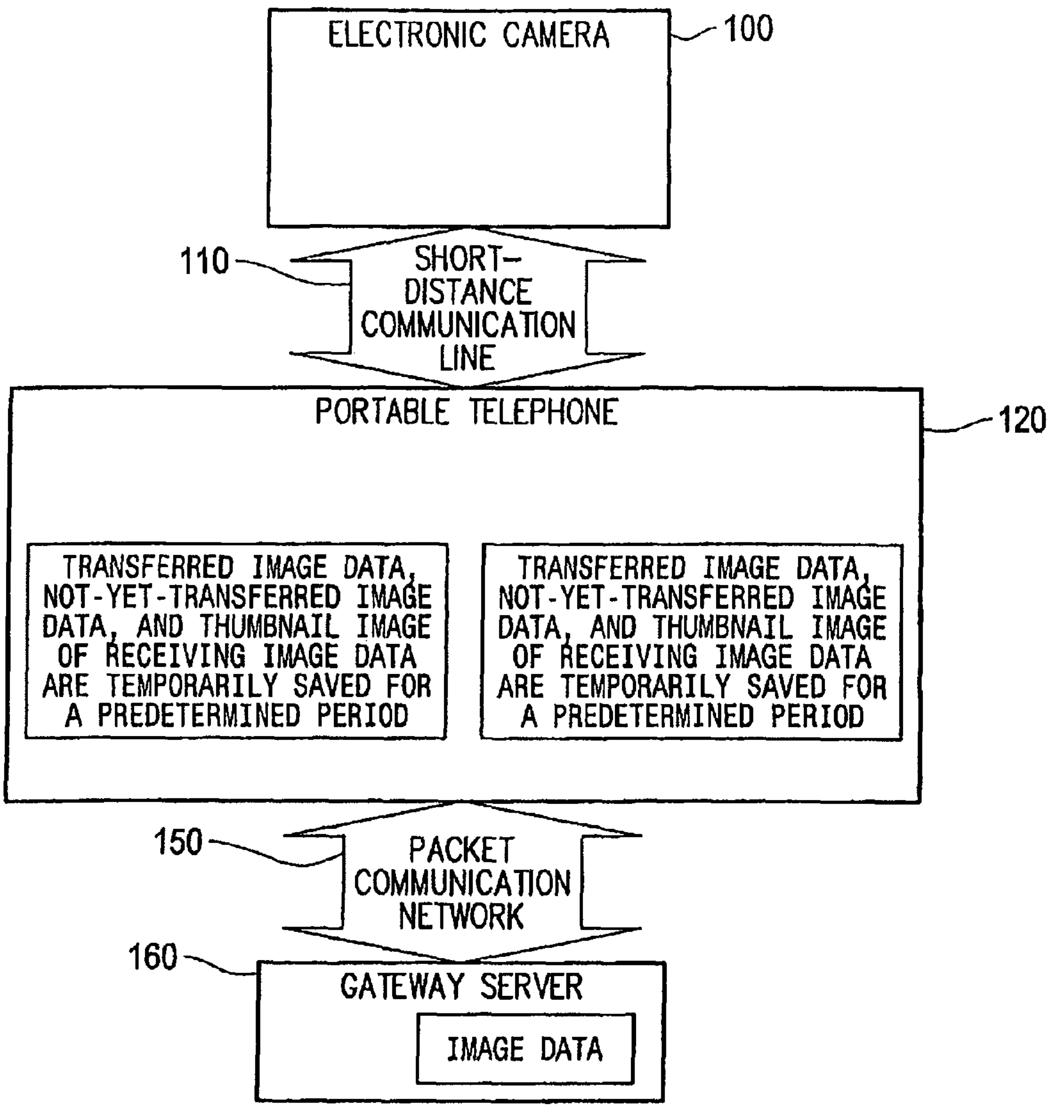
FIG. 110 is a conceptual drawing of an image transmission system.

While in the above mode of embodiment (FIG. 74 through FIG. 109), greater data communication efficiency of the image transmission system was achieved by having the gateway server 160 temporarily store image files transmitted between the electronic camera 100 and the image server in an image buffer folder and make use of the image files stored temporarily in the image buffer folder as necessary, and by storing thumbnail image data corresponding to the image files in a thumbnail image folder and making use of that thumbnail image data as necessary, it is also possible, as shown in FIG. 110, to provide the same sort of image buffer folder and thumbnail image folder in the EEPROM 268 of the portable telephone 120 and temporarily store thumbnail image data and image files transmitted between the electronic camera 100 and the image server in the image buffer folder and thumbnail image folder, and, when the image file or thumbnail image data requested by the electronic camera 100 is present in the image buffer folder or thumbnail image folder, to have the portable telephone 120 transmit those image files and thumbnail image data to the electronic camera 100. In such cases, the image files or thumbnail image data stored temporarily in the image buffer folder and thumbnail image folder in the EEPROM 268 may be cleared periodically in their entirety, or the image files and thumbnail image data may be deleted in the order of their age according to the storage start date and time data of the image file or thumbnail image data, so as to keep the total data volume of the temporarily stored image files and thumbnail image data at or below a specific volume. Alternatively, image files kept for more than a specific period of time may be deleted based on the storage start date and time data of the image files or thumbnail image data, or else stored image files or thumbnail image data may be deleted at specific clock times.

Figure 111:
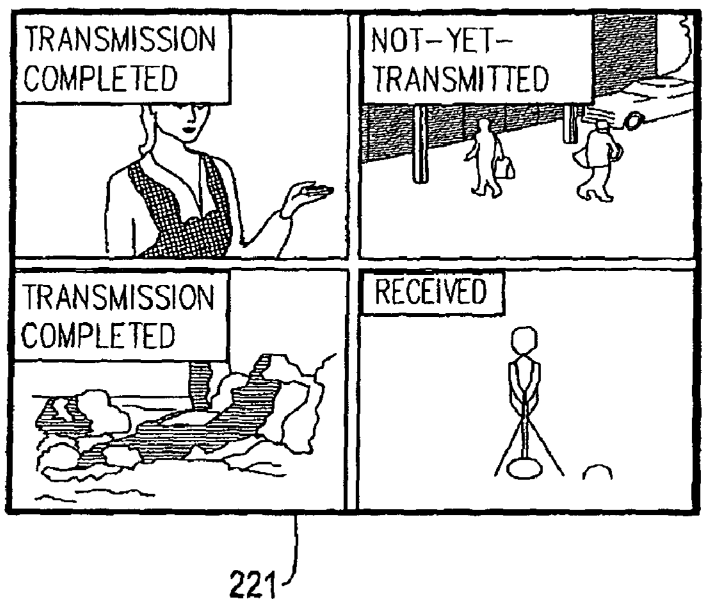
FIG. 111 is a screen display example.

If this is done, then when the user wishes to reconfirm the image data most recently transmitted or received via the portable telephone 120, it will be possible to display a summary of the status of temporarily stored images on the screen 221 of the portable telephone 120, as shown in FIG. 111, and to transmit the image files or corresponding thumbnail image data temporarily stored in the portable telephone 120 from the portable telephone 120 to the electronic camera 100 and make use of them, thereby making it unnecessary to make inquiries via the portable telephone 120 to the gateway server 160 regarding the image files or thumbnail image data and making it possible to quickly read image files or thumbnail image data into the electronic camera 100, as well as allowing the communication data volume between the portable telephone 120 and gateway server 160 to be reduced and correspondingly reduce the communication line usage fees.

While in the above mode of embodiment (FIG. 74 through FIG. 109), the electronic camera 100 transmits image data via a single portable telephone 120 to a single gateway server 160, it is also permissible to have the electronic camera 100 transmit image data via a single portable telephone 120 to multiple gateway servers. In such an image transmission system, the portable telephone 120 can store image files transmitted from the electronic camera 100 in EEPROM 268 under predetermined conditions (for a specific period of time from the start of storage, etc.) and transmit the stored image files to multiple gateway servers based on instructions from the electronic camera 100. When the electronic camera 100 transmits image files to multiple gateway servers, doing this will make it unnecessary to transmit image files from the electronic camera 100 to the portable telephone 120 every time an image file is to be transmitted, allowing the transmission of image files to the gateway servers to be carried out more quickly. For example, if an image file was transmitted from the electronic camera 100 to one gateway server and the user then wants to transmit the same image file to a different gateway server, the image identification information of the image file and the destination gateway server access information are sent from the electronic camera 100 to the portable telephone 120, whereupon, if an image file corresponding to the received image identification information is present in the EEPROM 268, the portable telephone 120 reads that image file from the EEPROM 268 and transmits it to the gateway server corresponding to the received gateway server access information. If no image file corresponding to the received image identification information is present in the EEPROM 268, the portable telephone 120 informs the electronic camera 100 that no image file corresponding to the received image identification information is present in the portable telephone 120, in response to that the electronic camera transmits the image file to the portable telephone 120.

Figure 112:
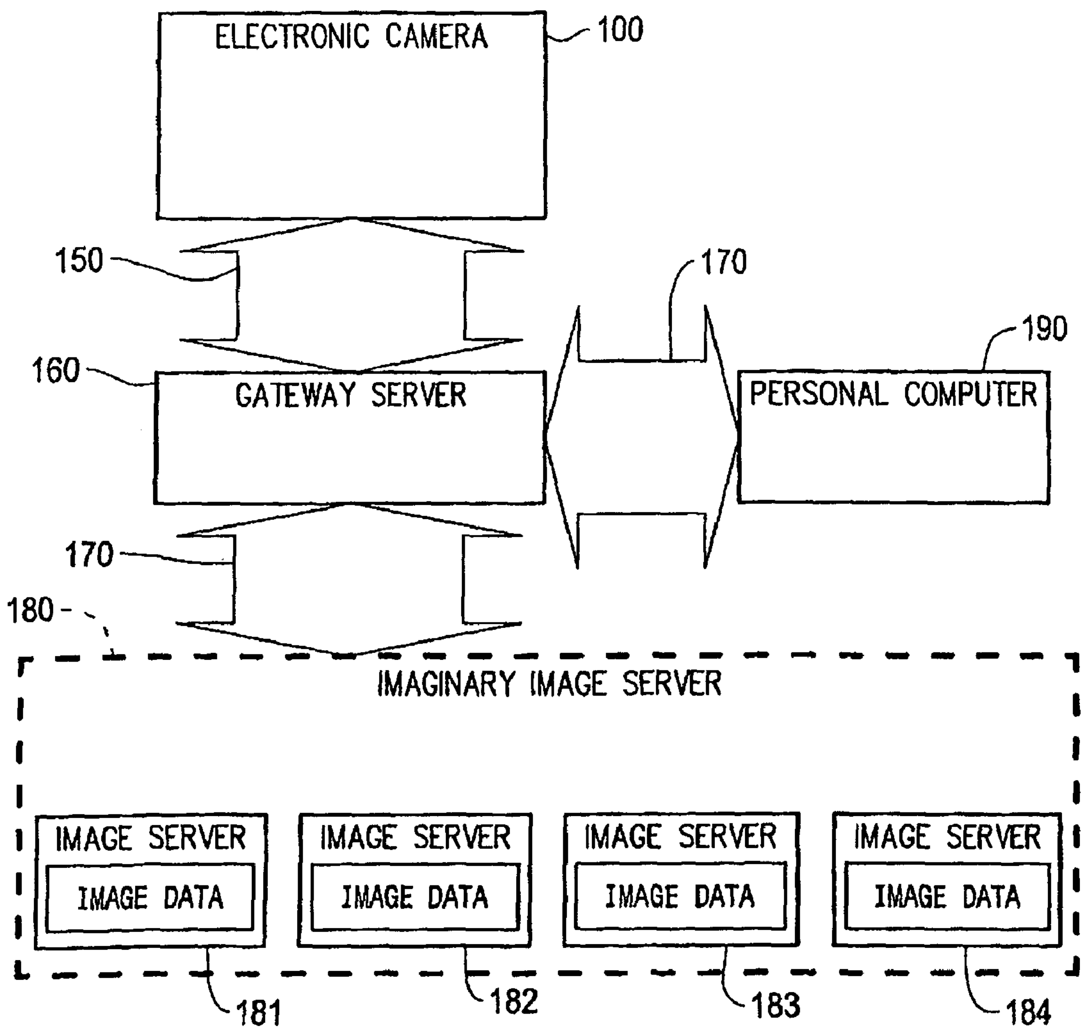
FIG. 112 is a conceptual drawing of an image transmission system.

While in the above mode of embodiment (FIG. 74 through FIG. 109), the portable telephone 120 performs relaying of image data in the transmission of image data between the electronic camera 100 and the gateway server 160, if the electronic camera 100 itself has a built-in wireless portable telephone function, it is also permissible to omit the portable telephone 120, as shown in FIG. 112, and to have the electronic camera 100 communicate directly with the gateway server 160 using a packet communication protocol. In FIG. 112, the base station 140 has been left out of the illustration.

In the above mode of embodiment (FIG. 74 through FIG. 109), the gateway server 160 provides the electronic camera 100 with a single virtual album that combines the albums secured according to the camera identification information on multiple image servers 181 through 184, and increases the available capacity of the virtual album by automatically setting up a new album corresponding to the camera identification information by registering with a new image server when the available capacity of the virtual album becomes insufficient; however, instead of setting up a new album on a new image server, a new album may also be set up on an existing server on that an album has already been set up. For example, if the gateway server 160 has unused camera identification information and the available capacity of the virtual album has become insufficient, the gateway server 160 can register with an image server, on that an album forming part of the virtual album has already been established, using one item of the unused camera identification information, and set up a new album corresponding to the unused item of camera identification information. Furthermore, the gateway server 160 can link the camera identification information used for setting up new albums to the camera identification information corresponding to the virtual album, so as to incorporate the newly created album into the virtual album. Doing this makes it possible to deal with insufficient available capacity of the virtual album when the number of image servers is limited.

Figure 113:
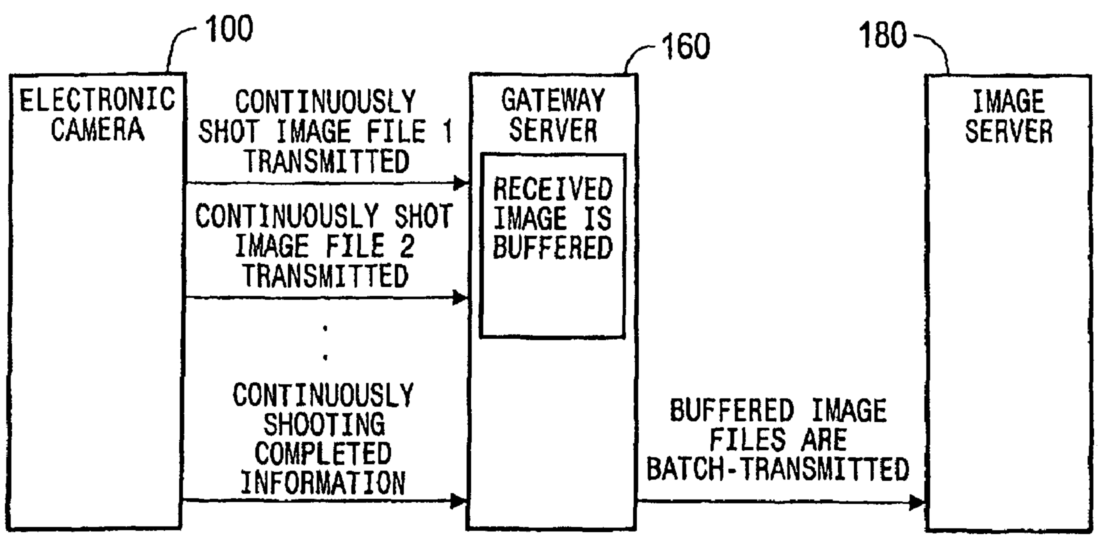
FIG. 113 is an explanatory drawing of the operation of image transmission.

While in the above mode of embodiment (FIG. 74 through FIG. 109), the gateway server 160 buffers image files received from the electronic camera 100 in an image buffer folder and delivers the image files buffered in the image buffer folder to image servers at specific intervals, when transmitting image files captured with a series of capture operations (continuous capture or continuous shutter, bracket capture, panorama capture, etc.) from the electronic camera in automatic transfer mode to the gateway server 160, the image transfer may also be performed by the scheme shown in FIG. 113. Here, continuous capture refers to continuously photographic the same subject at specific time intervals while tracking its movement; bracket capture refers to taking multiple photographs of the same subject while varying the capture conditions, such as exposure; and panorama capture refers to photographing a landscape or the like while shifting the capture direction by a certain amount each time. Namely, for each capture operation, the electronic camera 100 appends identification information to image files captured in series to the effect that this image is part of a series, and transmits it to the gateway server 160. The gateway server 160 temporarily stores image files with appended identification information indicating that it is part of a series of images in an image buffer folder. Once the series of image captures is completed, the electronic camera 100 transmits information to the gateway server 160 indicating that the series of image captures has been completed, and upon receiving that information, the gateway server 160 does a batch transmission of the series of image files stored temporarily in the image buffer folder to the same image server over the Internet and stores them there. Doing this makes it possible to transmit multiple image files between the gateway server 160 and image server with a single transmission procedure, allowing the transmission time to be shortened and allowing the image transmission processing load on the gateway server 160 and image servers 181 through 184 to be reduced. Furthermore, storing image files captured in a series on the same image server makes it highly convenient when the user later connects directly to the image server 181 through 184, with a personal computer or the like, to use the series of image data.

Instead of transmitting information indicating that a series of captures has been completed from the electronic camera 100 to the gateway server 160, it is also permissible to transmit to the gateway server 160, from a terminal such as a personal computer 190 connected to the gateway server 160, an instruction to transmit a series of image files accumulated on the gateway server 160 together to an image server, in response to that instruction, the gateway server 160 will transmit the series of image files accumulated on the gateway server 160 together to an image server.

Furthermore, when transmitting image files captured in a series from the electronic camera 100 to the gateway server 160 in automatic transmission mode, if an image file is transmitted from the electronic camera 100 to the gateway server 160 after every capture, the communication time will become longer due to the overhead for establishing communication and the appended information, and there are cases where, during this time, the picture-taking conditions will change or where the pictures cannot be taken at the planned time intervals. In such cases, one can optionally have the electronic camera 100 temporarily store the series of captured image files in RAM 70, and once the series of captures is completed, transmit the series of image files with appended identification information indicating that it is a series of images, together with information indicating that the series of captures has been completed, in a batch to the gateway server 160. Furthermore, when the data transfer rate of short-range wireless communication between the electronic camera 100 and portable telephone 120 is fast, one may optionally have the image files captured in a series be transmitted from the electronic camera 100 to the portable telephone 120 each time an image is captured, storing them temporarily in the EEPROM 268 of the portable telephone 120, and have the electronic camera 100 transmit information indicating that the series of captures has been completed to the portable telephone 120 once the series of captures has been completed, and in response to that information, have the portable telephone 120 transmit a series of image files with appended identification information indicating that this is a series of images in a batch to the gateway server 160. Doing this makes it possible for the electronic camera 100 to perform a series of captures under the desired capture conditions without affecting the image file transmission speed or the like, even in automatic transmission mode (a mode where captured image files are automatically transmitted to and stored on an image server).

Furthermore, when the electronic camera 100 selects image files captured in series, which have been saved on the memory card 77, and transmits those selected image files to an image server, by transmitting those image files with appended identification information indicating that they are a series of images, the gateway server 160 will be able recognize that these are image files captured in series and perform processing such as storing them on the same image server.

Figure 114:
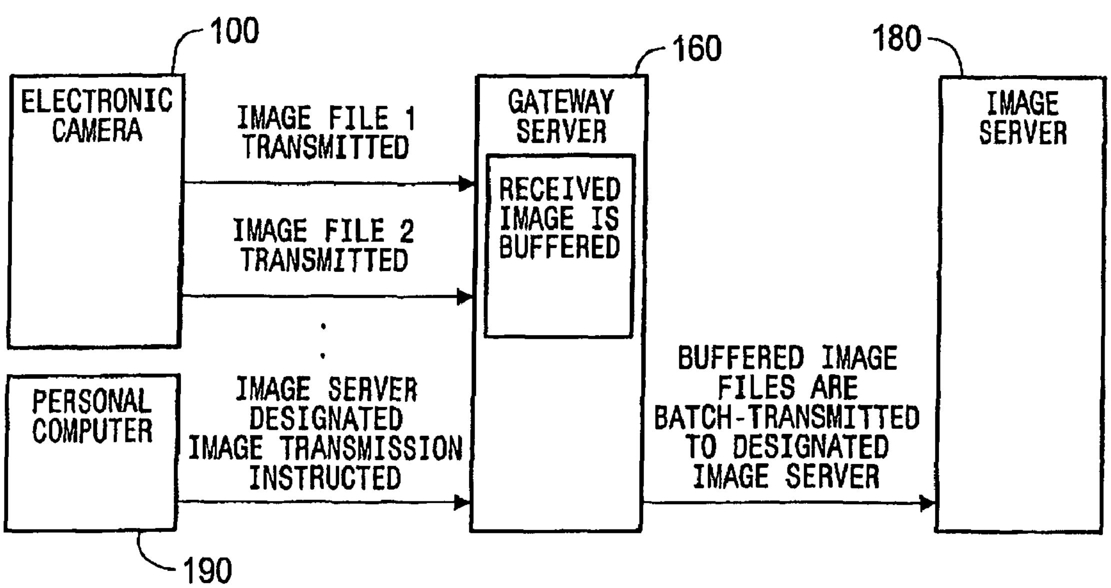
FIG. 114 is an explanatory drawing of the operation of image transmission.

While in the above mode of embodiment (FIG. 74 through FIG. 109), the gateway server 160 buffers image files received from the electronic camera 100 in an image buffer folder and delivers the image files buffered in the image buffer folder to the image server at specific intervals, one can also have the image files buffered in the image buffer folder be delivered to the image server based on an external instruction. FIG. 114 is a drawing that shows the image transmission processing for such a scheme. Multiple image files are transmitted from the electronic camera 100 to the gateway server 160, and are stored temporarily in an image buffer folder in a folder corresponding to the camera identification information on the gateway server 160. Thereafter, a personal computer 190 connects to the gateway server 160 and transmits the camera identification information, the identification information of the image server to that the images are to be transferred, and an image transmission instruction to the gateway server 160. In response to the received camera identification information, the gateway server 160 transmits the image files, which are stored temporarily in the image buffer folder in the folder corresponding to the received camera identification information, in a batch to the image server corresponding to the received image server identification information. Doing this makes it possible for the user to transmit and store image data captured with the electronic camera 100 from the gateway server 160 at a convenient time to a suitable image server.

In the above mode of embodiment (FIG. 74 through FIG. 109), the gateway server 160 buffered image files transmitted between the electronic camera 100 and the image server in an image buffer folder and transmitted the image files buffered in the image buffer folder together to the image server at specific intervals; however, the gateway server 160 may also transmit accumulated image files to the image server by the following method. For example, the image files may be transmitted to the image server when the total data volume of the image files stored temporarily on the gateway server 160 exceeds a certain volume. Alternatively, the gateway server 160 may transmit image files to the image server once they have been accumulated for a set period or time, based on the date and time data of the start of storage of the image files in the image buffer folder. Alternatively, the gateway server 160 can transmit accumulated image files to the image server at specific clock times.

While in the above mode of embodiment (FIG. 74 through FIG. 109), the gateway server 160 buffers image files transmitted between the electronic camera 100 and the image server in an image buffer folder and clears the entirety of the image files buffered in the image buffer folder at specific intervals, the gateway server 160 may also delete image files by the following method. For example, the gateway server 160 may delete image files in the order of oldest to newest based on date and time information on the start of storage of the image files in the image buffer folder, so as to keep the total data volume of the image files stored temporarily in the image buffer folder at or below a specific volume. Alternatively, the gateway server 160 may delete image files stored for more than a specific period of time based on date and time information on the start of storage of the image files in the image buffer folder. Or the gateway server 160 may delete stored image files at specific clock times.

While in the above mode of embodiment (FIG. 74 through FIG. 109), the gateway server 160 buffers image files transmitted between the electronic camera 100 and the image server in an image buffer folder and transmits them as necessary to the electronic camera 100, the gateway server 160 may also transmit image files accumulated in the image buffer folder (image files transmitted by the electronic camera 100 to an image server or image files read by the electronic camera 100 from an image server) to another image server or electronic camera based on instructions from the electronic camera 100. Doing this makes it unnecessary to transmit each image file one by one from the electronic camera 100 to the gateway server 160, thereby making it possible to shorten the image file transmission time and reduce transmission charges.

While in the above mode of embodiment (FIG. 74 through FIG. 109), the gateway server 160 performed management of individual albums on image servers according to the camera identification information received from the electronic camera 100, it is also possible to use general identification information instead of camera identification information for individually identifying multiple electronic cameras 100. For example, using the next generation version of the IP protocol, IPV6 (Internet Protocol Version 6), the use of that on the Internet is planned, as the identification information, would make it possible for all electronic devices that handle images, besides electronic cameras, to make use of the image transmission system according to the present invention. Namely, IPV6 provides a 32-bit address space (on order of 10 to the $9^{th}$ power), so there is practically no concern of running out of addresses, which makes it possible for one device to have multiple addresses depending on the application, and can further increase the utility of the image transmission system according to the present invention.

In the above mode of embodiment (FIG. 74 through FIG. 109), the image servers 181 through 184 had individual albums (folders) corresponding to the camera identification information set individually for each electronic camera 100, the electronic camera 100 would transmit the camera identification information set in the camera in question to the gateway server 160, and the gateway server 160, based on the received camera identification information, would create new albums corresponding to the received camera identification information on the image servers 181 through 184 or perform reading and writing of image data to and from an album corresponding to the received camera identification information present on the image servers 181 through 184; however, it is also permissible to manage image data transmission and storage between the electronic camera 100 and image servers 181 through 184 using identification information other than camera identification information.

Figure 115:
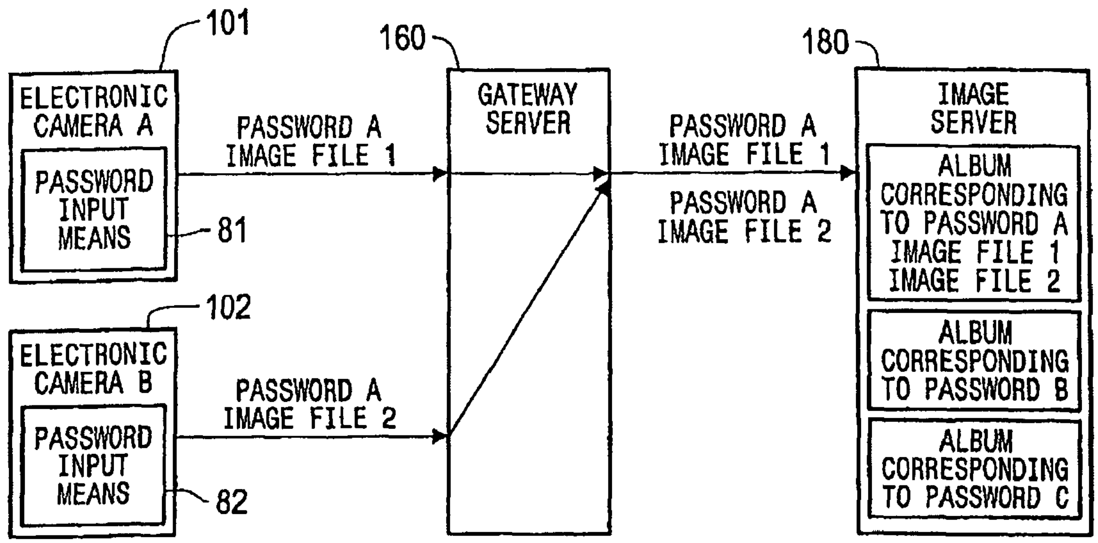
FIG. 115 is an explanatory drawing of the operation of image transmission.

For example, in FIG. 115, a password input means is provided on the electronic camera side and image data transmission and storage is managed according to the password inputted by the user. In FIG. 115, electronic cameras A101 and B102 are equipped with password input means 81 and 82, and when transmitting a captured image file, electronic cameras A101 and B102 transmit the password inputted by the user and the image file as a pair to the gateway server 160. Meanwhile, the image server 181 has an album prepared that corresponds to the password, and the gateway server 160 transmits the received image file and stores it in the album on the image server 181 corresponding to the received password. The gateway server 160 can also create a new album on the image server corresponding to the received password. Furthermore, when downloading image files from the image server 181, the electronic cameras A101 and B102 transmit image identification information and a password to the gateway server 160, and the gateway server 160 transmits the received image identification information and password to the image server 181. The image server 181 reads the image file corresponding to the received image identification information from the album corresponding to the received password, and transmits that image file to via the gateway server 160 to the electronic cameras A101 and B102. Instead of password input, the electronic camera can obtain user identification information by installing a UIM card on that personal identification data has been stored in advance into the electronic camera.

If this is done, then when the same user uses multiple electronic cameras or when multiple users use the same camera, the image files captured by the electronic camera will be stored in an album on an image server corresponding to the password inputted by the user, so there is no inconvenience of having to later separate image files stored in the same album on an image server for different users, or collect image files stored in different albums on an image server for each user, allowing image files to be stored efficiently on a per-user basis and making it possible to protect the privacy of the stored image data.

Figure 116:
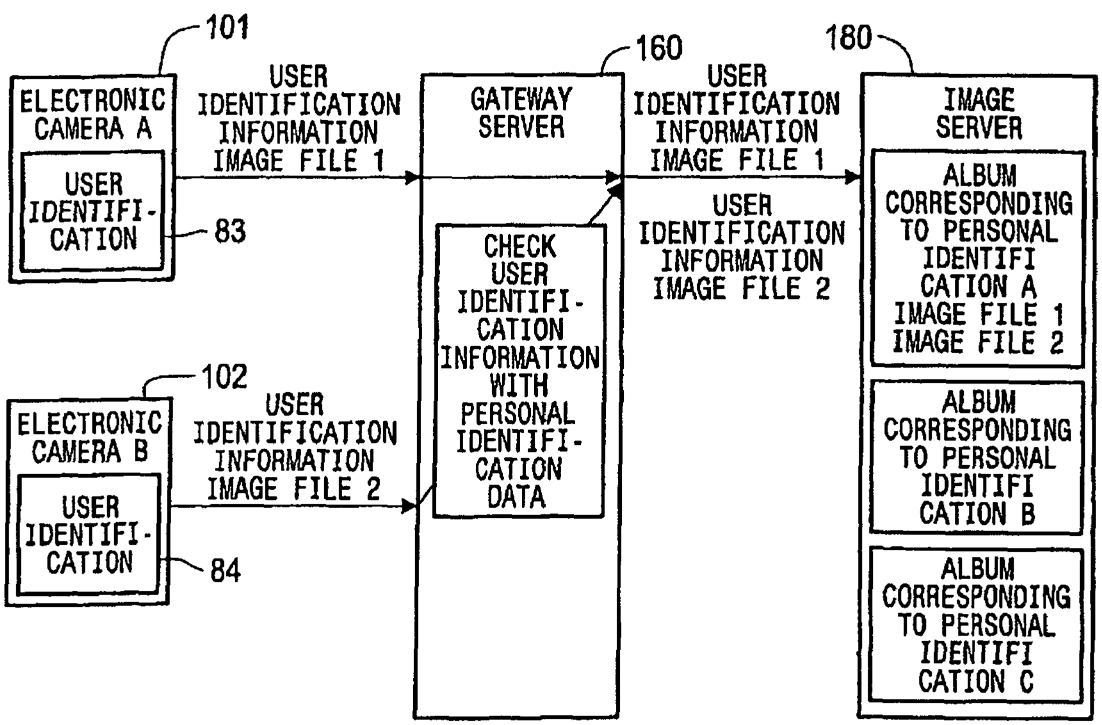
FIG. 116 is an explanatory drawing of the operation of image transmission.

While in FIG. 115, control and management of image data transmission and storage operations between the electronic camera 100 and image servers 181 through 184 is carried out based on the password inputted by the user into the electronic camera, in FIG. 116, instead of a password, a user identification means is provided on the electronic camera side, the electronic camera performs user identification automatically without manual intervention by the user, and image data transmission and storage is managed based on that user identification information. In FIG. 116, electronic cameras A101 and B102 are equipped with user identification means 83 and 84 (fingerprint detection means, iris pattern detection means, facial image detection means, etc.), and when transmitting a captured image file, the electronic cameras A101 and B102 transmit the image file paired with the user identification information detected by the user identification means 83 and 84 (fingerprint pattern characteristics information, iris pattern characteristics information, facial image pattern characteristics information, etc.) to the gateway server 160. The gateway server 160 compares the received user identification information with user identification information contained in the personal identification data that is stored in advance to identify the user. Meanwhile, the image server 181 has an album prepared that corresponds to the personal identification data, and the gateway server 160 transmits and stores received image files in the album on the image server corresponding to the personal identification data of the identified user. The gateway server 160 can also create a new album on the image server corresponding to the personal identification data of the identified user. Furthermore, when downloading image files from the image server 181, electronic cameras A101 and B102 transmit image identification information and user identification information to the gateway server 160, the gateway server 160 identifies the users based on the received user identification information, and transmits the personal identification data corresponding to the user along with the image identification information to the image server 181. The image server 181 reads image files corresponding to the received image identification information from the album corresponding to the received personal identification data, and transmits those image files via the gateway server 160 to the electronic cameras A101 and B102.

Doing this makes it possible to automatically perform user identification at the electronic camera, which eliminates the effort of inputting passwords for individual identification and resolves the problems of forgotten passwords and password theft.

Figure 117:
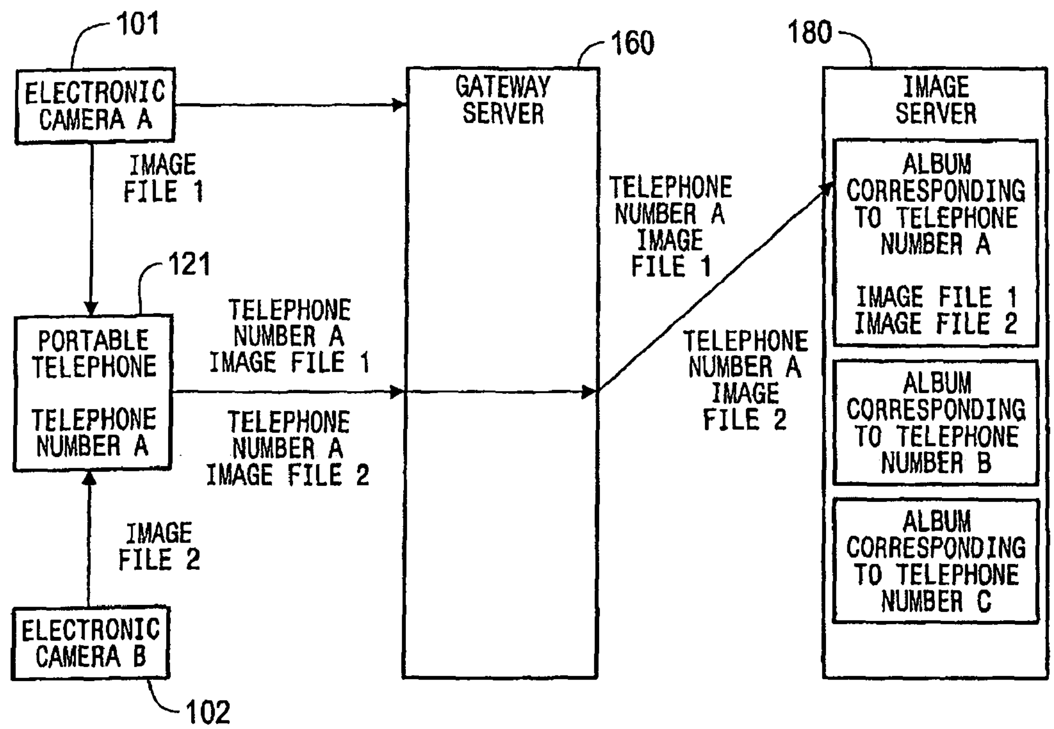
FIG. 117 is an explanatory drawing of the operation of image transmission.

The means of personal identification described above in FIG. 115 and FIG. 116 (password input means, UIM card, fingerprint detection or other user identification means) can also be provided on the portable telephone side, if the gateway server is connected to from the electronic camera via the portable telephone. In FIG. 117, when connecting from the electronic camera to the gateway server via the portable telephone, image data transmission and storage are managed based on the telephone number of the portable telephone. In FIG. 117, when transmitting a captured image file, the electronic cameras A101 and B102 connect to the portable telephone 121 (telephone number A) and transmit the image file to the portable telephone 121. The portable telephone 121 transmits the received image file paired with the telephone number to the gateway server 160. Meanwhile, the image server 181 has an album prepared corresponding to the telephone number of the portable telephone, and the gateway server 160 transmits and stores the received image file in an album on the image server 181 corresponding to the telephone number. The gateway server 160 can also create a new album on an image server corresponding to the telephone number. Furthermore, when downloading image files from the image server 181, the electronic cameras A101 and B102 send image identification information to the portable telephone 121, the portable telephone 121 transmits the telephone number and image identification information to the gateway server 160, and the gateway server 160 transmits the telephone number and image identification information to the image server 181. The image server 181 reads the image file corresponding to the received image identification information from the album corresponding to the received telephone number, and transmits that image file to the electronic cameras A101 and B102 via the gateway server 160 and the portable telephone 121.

Doing this allows the user to store image files separated on a per individual basis in a per-individual album on an image server or read image files from one's own exclusive album on an image server by performing image transmission and reception using his portable telephone, even when using multiple electronic cameras or when multiple persons use the same electronic camera.

Furthermore, by combining the electronic camera's camera identification information with multiple personal identification means, the user identification precision can be increased and a higher level of image information security can be attained.

As described above, in the image transmission system and image relay apparatus according to the present invention, the image relay apparatus temporarily stores image data transmitted from the electronic image device to the image storage device, or image data transmitted from the image storage device to the electronic image device, and transmits the stored image data individually or together to the electronic image device or image storage device as required, thereby making it possible to reduce the communication traffic between the image relay apparatus and electronic image device or between the image relay apparatus and the image storage device, and thus allowing the image data communication time to be shortened and allowing the communication charges to be reduced.

Moreover, in the image transmission system and image relay apparatus according to the present invention, when transmitting a series of image data from the electronic image device to the image storage device and storing them there, the series of image data is first stored in the image relay apparatus, and is transmitted together from the image relay apparatus to the image storage device and stored there, thereby making it possible to transmit and store image data on an image server while maintaining the serial nature of the image data.

Figure 118:
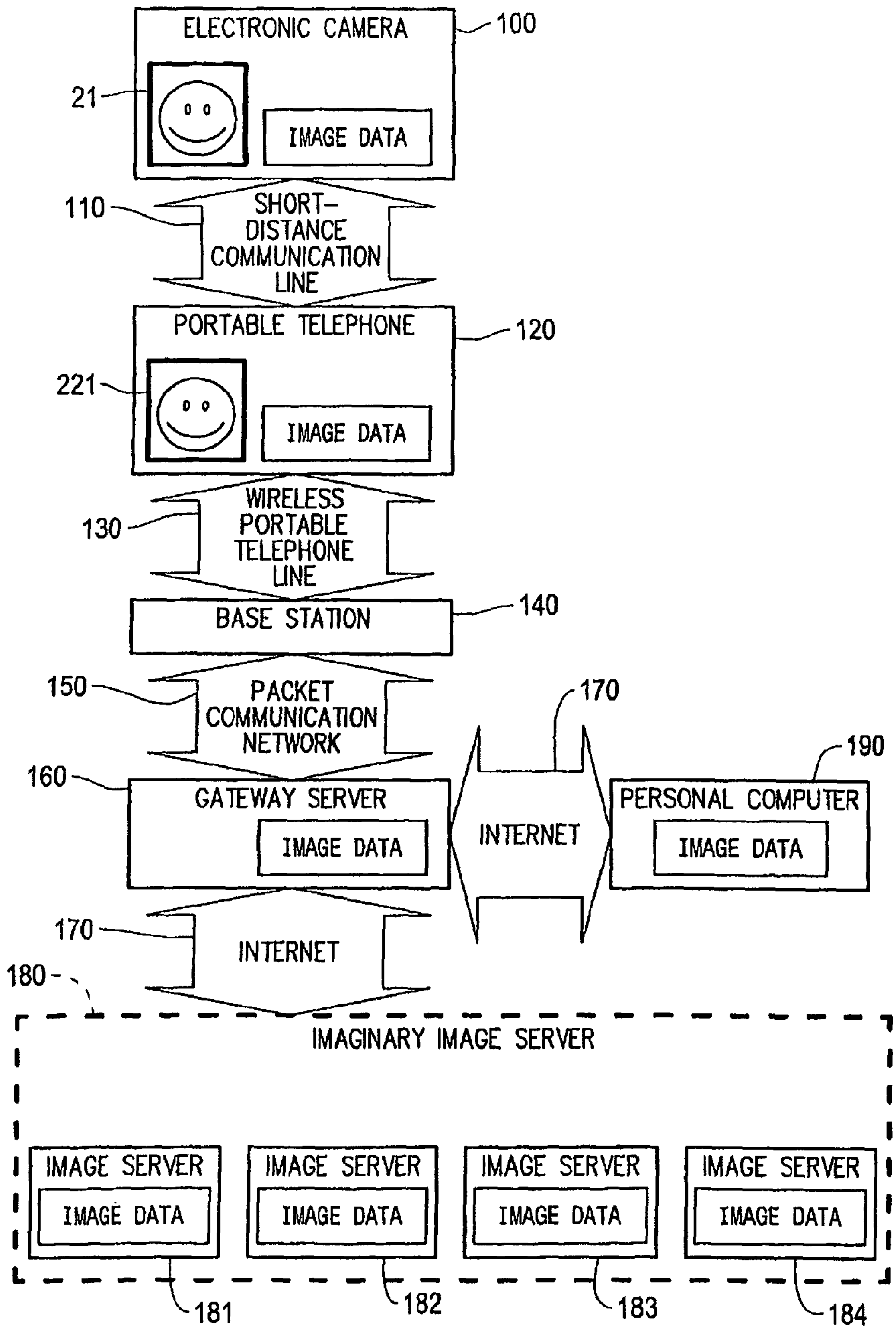
FIG. 118 is a conceptual drawing of an image transmission system.

FIG. 118 is a conceptual drawing of an image data transmission system applying the present invention. First, the case of transmitting image data from the electronic camera 100 to the image servers 181 through 184 will be described. The electronic camera 100 generates image data through capture operations. When transmitting the image data to external image servers 181 through 184, the electronic camera 100 connects to a portable telephone 120. The connection between the electronic camera 100 and the portable telephone 120 is made by means of a short-range communication link 110 (e.g., Bluetooth protocol based short-range wireless communication, short-range wired communication based on a cable connection-specific protocol, IEEE 802.11 protocol based wireless LAN communication, short-range infrared communication using the IrDA protocol, etc.). The electronic camera 100 selects the image data to transmit, displays the image data on the screen 21 and transmits it to the portable telephone 120. Since the electronic camera 100 and the portable telephone 120 are used by the user simultaneously, it suffices for the local wireless communication range to be on the order of several meters, which allows the power load on the electronic camera 100 and portable telephone 120 due to short-range wireless communication to be reduced.

The portable telephone 120 is provided with a short-range communication function for communicating with the aforementioned electronic camera 100 and a long-range communication function using a wireless portable telephone link 130, whereby the long-range communication function using the wireless portable telephone link 130 allows both conventional talk functions and packet communication protocol based digital data communication functions to be executed. The portable telephone 120 temporarily stores image data received from the electronic camera 100 via the short-range communication link 110 in an internal memory. Next, the portable telephone 120 sends the stored image data using a packet communication protocol via the wireless portable telephone link 130 to a base station 140. While transmitting image data to the base station 140, the portable telephone 120 displays the image data being transmitted on a screen 221.

The base station 140 transmits the image data, received from the portable telephone 120 using a packet communication protocol via the wireless portable telephone link 130, to a gateway server 160 via a packet communication network 150 using a packet communication protocol. The gateway server 160 stores the image data received from the base station 140 using a packet communication protocol via the packet communication network 150 for a time in an internal memory, and transmits the stored image data at specific intervals using Internet protocol via the Internet 170 to image servers 181 through 184. The gateway server 160 keeps thumbnail image data (scaled-down image data obtained by compressing and reducing the data volume of the original image data) corresponding to the image data transmitted to the image servers in an internal memory. Image servers 181 through 184 store the image data received using Internet protocol via the Internet 170 in a high capacity memory.

When transmitting image data from the electronic camera 100 to an image server, there is no need to perform the transmission with awareness of the complicated connection and communication procedures for accessing the image server on the electronic camera 100 side; rather, on the electronic camera 100 side, it suffices to append fixed address information for specifying the gateway server 160 and camera identification information for identifying the electronic camera 100 to the image data to be transmitted, and pass it on to the portable telephone 120. The portable telephone 120 transmits the image data and camera identification information by packet communication to the designated gateway server 160 based on the received gateway server address information. The gateway server 160 manages the image data according to the camera identification information received via packet communication, and transmits the image data to a suitable image server among multiple image servers 181 through 184 on the Internet 170 using Internet protocol. The multiple image servers 181 through 184 are treated as a single virtual image server 180 from the viewpoint of the electronic camera, and the complicated procedures for accessing each image server on the Internet 170 are all performed by the gateway server 150.

Next, the case where the electronic camera 100 receives image data from the virtual image server 180 will be described. First, the electronic camera 100 is connected to the portable telephone 120 by means of the short-range communication link 110. The electronic camera 100 transmits a browse data request, camera identification information and gateway server 160 address information to the portable telephone 120. Next, the portable telephone 120 transmits the browse data request and camera identification information via the base station 140 using packet communication protocol to the designated gateway server 160 based on the received gateway server 160 address information. Upon receiving the browse data request and camera identification information, the gateway server 160 transmits the thumbnail image data (browse data) for the image data corresponding to the camera identification information stored on the virtual server 180 via the base station 140 using packet communication protocol to the portable telephone 120 that transmitted the browse data request. The portable telephone 120 transmits the received browse data over the short-range communication link 110 to the electronic camera 100.

The electronic camera 100 displays the received browse data (thumbnail image data) on the screen 21, from that the desired image is selected. The electronic camera 100 transmits a request for the selected image data along with image identification information (image file name, etc.) for the image data, camera identification information and gateway server 160 address information over the short-range communication link 110 to the portable telephone 120. Next, the portable telephone 120, based on the received gateway server 160 address information, transmits the image data request, image identification information and camera identification information via the base station 140 using packet communication protocol to the designated gateway server 160. Upon receiving the image data request, image identification information and camera identification information, the gateway server 160 specifies the image data stored on the virtual server 180 according to the camera identification information and image identification information, and transmits the image data request and image identification information using Internet protocol to the image server 181 through 184 on the Internet 170 that is storing the image data in question.

The image server, which receives the image data request and image identification information, transmits the image data corresponding to the image identification information using Internet protocol to the gateway server 160. Upon receiving the image data, the gateway server 160 transmits that image data via the base station 140 using packet communication protocol to the portable telephone 120 that transmitted the image data request. The gateway server 160 temporarily stores the image data received from the image server in an internal memory. The portable telephone 120 transmits the received image data over the short-range communication link 110 to the electronic camera 100. The electronic camera 100 displays the received image data on the screen 21.

The gateway server 160 can also be connected to from a user's personal computer 190 via the Internet 170, and the user can read and use image data from the virtual server 180 via the gateway server 160 on a personal computer 190, and can modify the settings of the gateway server 160.

Figure 119:
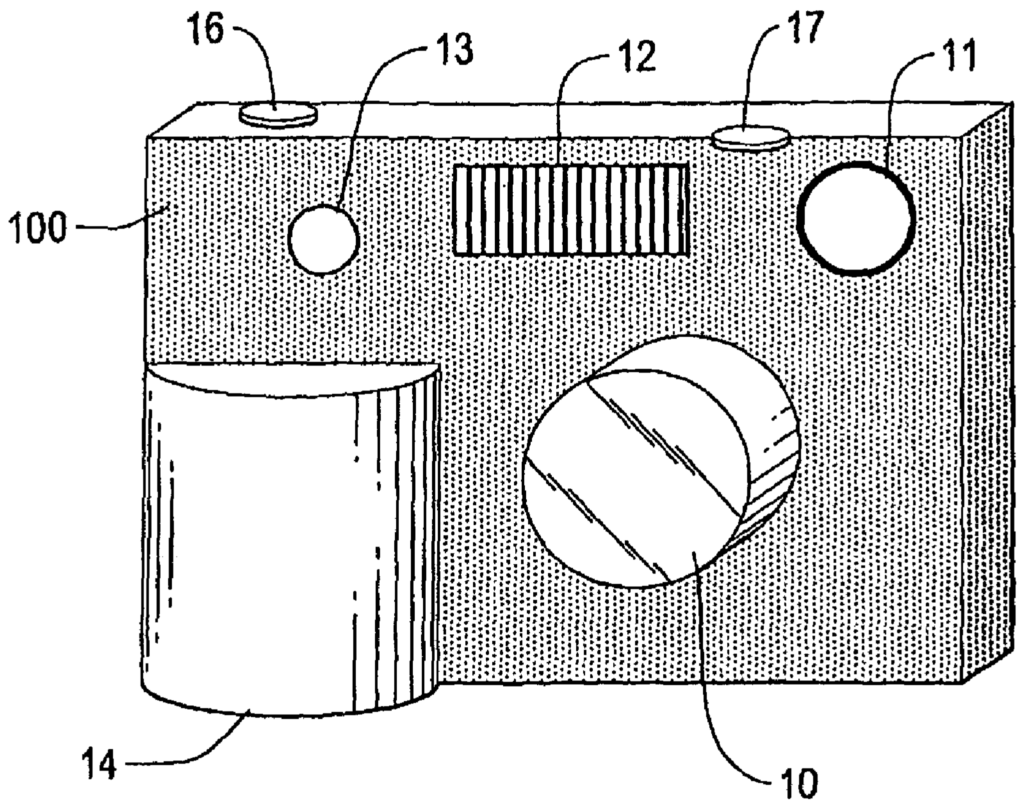
FIG. 119 is an external view (front view) of an electronic camera.
Figure 120:
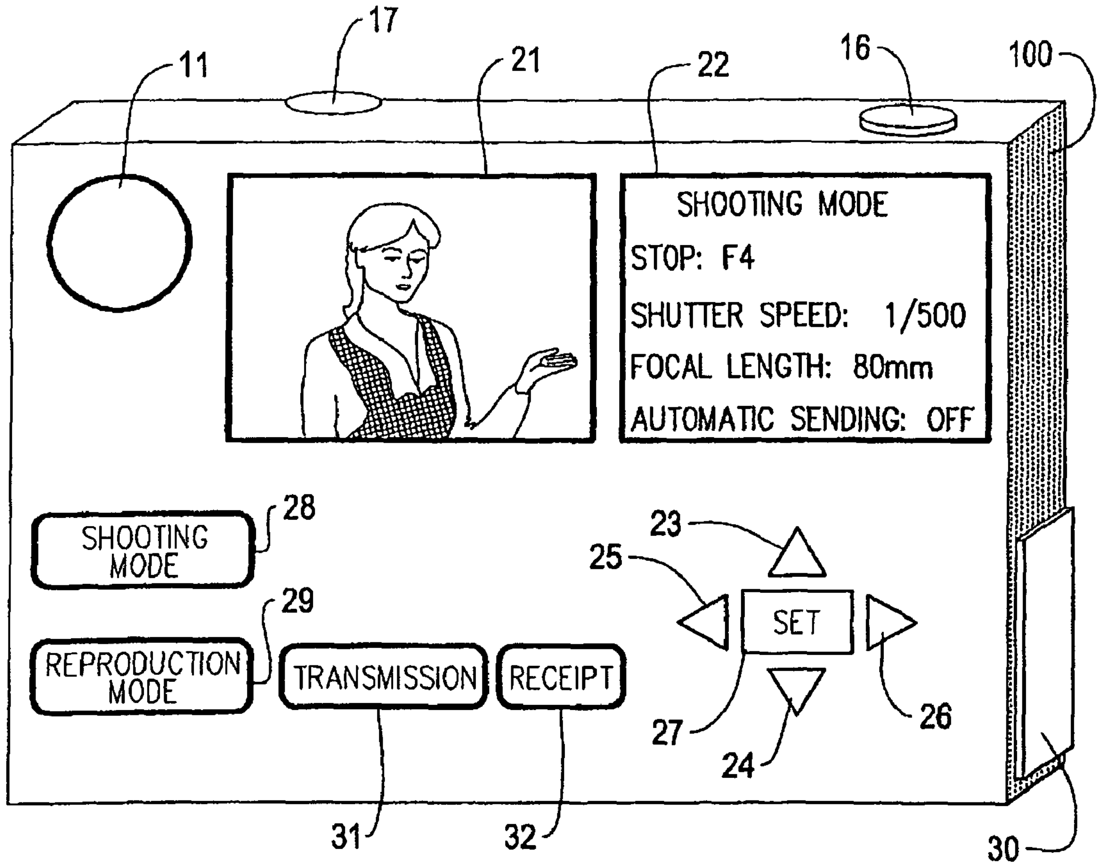

FIG. 119 and FIG. 120 are an external view (front view and rear view) of an embodiment of the electronic camera 100 used in an image data transmission system applying the present invention. As shown in FIG. 119, a photographic lens 10 for forming a subject image, a finder 11 for confirming the frame, a strobe 12 for illuminating the subject when a photograph is taken, a photometric circuit 13 for detecting the brightness of the subject, and a grip 14 extending from the camera housing for making it easier for the user hold the electronic camera 100 in his or her hands are provided at the front of the electronic camera 100, and a release button 16 and a power switch 17 for turning the power supply to the electronic camera 100 on and off are provided at the top.

As shown in FIG. 120, the eyepiece of the finder 11, a left LCD (left screen) 21 comprising a substantially rectangular screen for text and image display, and a right LCD (right screen) 22 comprising a substantially rectangular screen for text and image display are arranged at the rear of the electronic camera 100; an UP button 23, a DOWN button 24, LEFT button 25, RIGHT button 26 and SELECT button 27, used for image manipulation and the like, are arranged below the right LCD 22, and a capture mode button 28 for putting the electronic camera 100 into capture mode, a playback mode button 29 for putting the electronic camera 100 into playback mode, a transmit button 31 for controlling image data transmission, and a receive button 32 for controlling image data reception are arranged below the left LCD 21. A memory card slot 30 for installing a memory card 77 used for storing image data is provided at the side.

The release button 16, UP button 23, DOWN button 24, LEFT button 25, RIGHT button 26, SELECT button 27, capture mode button 28, playback mode button 29, transmit button 31 and receive button 32 are all control keys operated by the user.

A so-called touch screen 66, equipped with a function of outputting contact position data corresponding to the position indicated by a finger touch operation is arranged over the left LCD 21 and the right LCD 22, which touch screen can be used for selection of image data and options displayed on the screen. This touch screen 66 is made of a transparent material such as glass or resin, allowing the user to view the image or text formed on the inside of the touch screen 66 through the touch screen 66.

Figure 121:
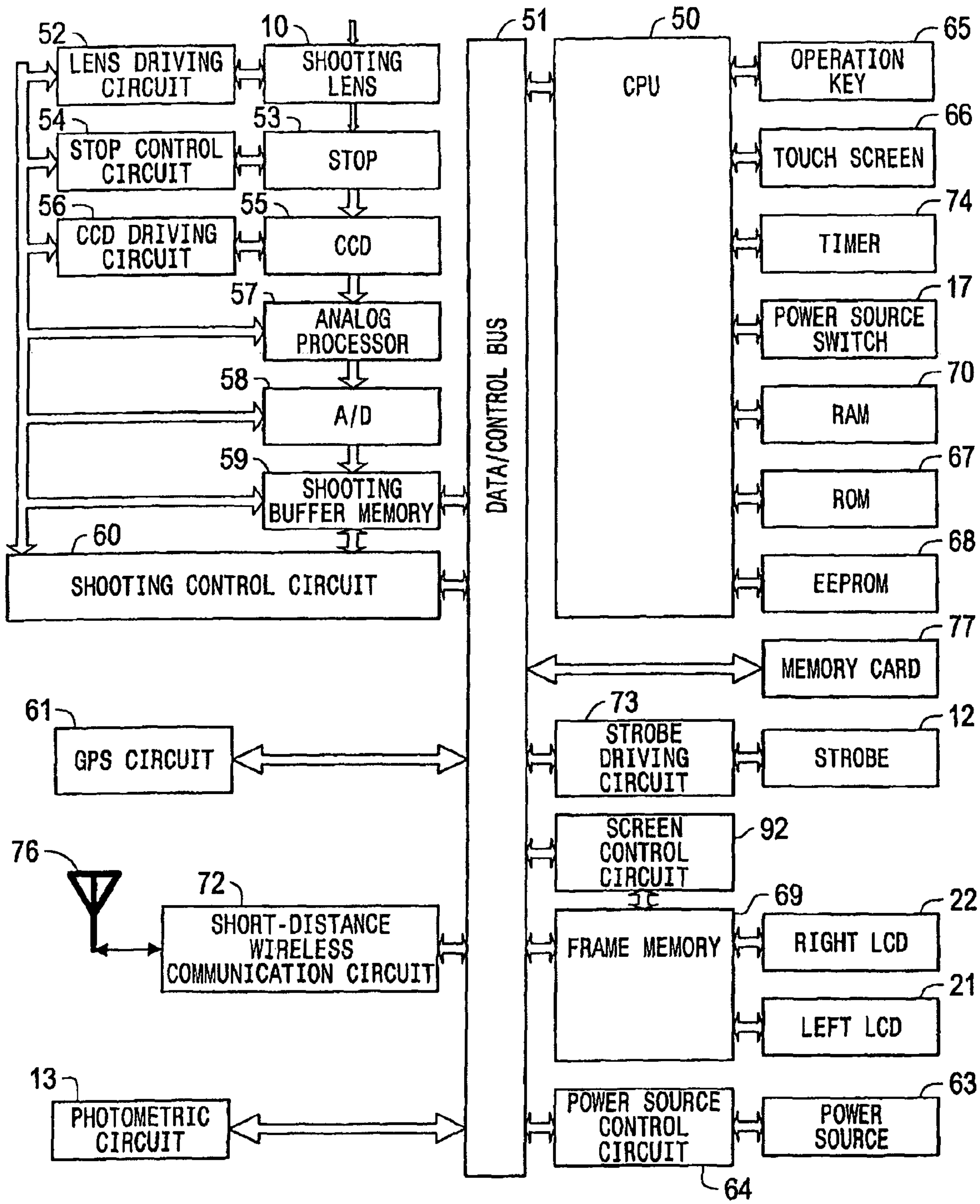

FIG. 121 is a block diagram showing an example of the internal electrical configuration of the electronic camera 100 shown in FIGS. 119 and 121, whereby the constitutive elements are connected to each other via a data/control bus 51 for transmitting various types of informational data and control data. The various constitutive elements can be roughly divided into a block centered on the capture control circuit 60 that executes image data capture operations, a block of the memory card 77 that stores and saves image files, a block centered on the screen control circuit 92 that executes the display of image data and associated information, and a block centered on the CPU 50, which performs overall control of the user interface such as the control keys 65 and of the various control circuits.

The CPU 50 (central processing unit) is the means that controls the entire electronic camera 100, issuing various instructions to the capture control circuit 60, screen control circuit 92 and power control circuit 64 in accordance with input information from the control keys 65, touch screen 66, power switch 17, timer 74 and photometric circuit 13. The photometric circuit 13 measures the brightness of the subject and outputs the photometric data that is the result of this measurement to the CPU 50. The CPU 50 sets the exposure time and sensitivity of the CCD 55 according to the photometric data by means of a CCD drive circuit 56, and controls the value of the diaphragm 53 by means of a diaphragm control circuit 54 via the capture control circuit 60 in accordance with the data of those settings.

In capture mode, the CPU 50 controls the capture operation via the capture control circuit 60 in accordance the manipulation of the release button 16. Furthermore, if the subject is dark based on the photometric data, the CPU 50 causes the strobe 12 to emit light via the strobe drive circuit 73 when taking a picture. The timer 74 has a built-in clock circuit and finds the date and time information corresponding to the current date and time and provides the capture date and time information to the CPU 50 when a picture is taken. The CPU 50 appends the capture date and time information to the image data and stores it in the memory card 77. The CPU 50 controls the various units according to a control program stored in ROM 67 (read-only memory). The EEPROM 68 (electrically erasable programmable ROM) is a non-volatile memory that stores settings information, etc. required for the operation of the electronic camera 100. The RAM 70 is a volatile memory that is used as a temporary working area of the CPU 50. The CPU 50 detects the manipulation state of the power switch 17 and controls the power supply 63 via a power supply control circuit 64.

The capture control circuit 60 performs focusing and zooming of the photographic lens 10 by means of a lens drive circuit 52, controls the exposure of the CCD 55 by controlling the diaphragm 53 by means of the diaphragm control circuit 54, and controls the operation of the CCD 55 by means of a CCD drive circuit 56. Light beams from the subject are formed by the photographic lens 10 into a subject image over the CCD 55 after passing through the diaphragm 53 to adjust the amount of light, and this subject image is picked up by the CCD 55. The CCD 55 (charge coupled device), which comprises a plurality of pixels, is a charge accumulation type image sensor used for picking up a subject image, and outputs electrical image signals corresponding to the strength of the subject image formed on the CCD 55 to an analog processing unit 57 in accordance with drive pulses provided by the CCD drive circuit 56.

The analog processing unit 57 samples the image signal, which has undergone photoelectric conversion by the CCD 55, with a specific timing, and amplifies the sampled signal to a specific level. An A/D conversion circuit 58 (analog/digital conversion circuit) digitizes the image signal sampled by the analog processing unit 57, thereby converting it to digital data, which is temporarily stored in capture buffer memory 59.

In capture mode, the capture control circuit 60 repeats-the operation described above, while the screen control circuit 92 repeats the through-image display operation of reading out the digital data stored successively in the capture buffer memory 59 via the data/control bus 51, loading it once into the frame memory 69, converting the digital data into image data for display, loading it again into the frame memory 69, and displaying the image data for display on the left screen 21. Furthermore, the screen control circuit 92 obtains text display information from the CPU 50 as required, converts it to text data for display and stores it in the frame memory 69, and displays the text data for display on the left screen 21 and right screen 22. In this way, in capture mode, the image picked up by the CCD 50 is displayed in real time on the left screen 21, making it possible to use this through-image as a monitor screen to make the composition settings for taking a picture. The capture control circuit 60 analyzes the extent of the high frequency component of the digital data stored in the capture buffer memory 59 and detects the state of focus adjustment of the photographic lens 10, and performs focus adjustment of the photographic lens 10 by means of the lens drive circuit 52 in accordance with the detection results.

At the time of release, upon receiving a capture instruction from the CPU 50, the capture control circuit 60 causes the subject image to be picked up by the CCD 55 via the CCD drive circuit 56, passes the image signal generated by the image pickup through the analog processing unit 57 and A/D conversion circuit 58 and temporarily stores it as digital data (raw data) in the capture buffer memory 59. The capture control circuit 60 converts or compresses the digital data stored temporarily in the capture buffer memory 59 into a specific recording format (JPEG, etc.) to form the image data, and stores the image data on the memory card 77.

A GPS circuit 61 (global positioning system circuit) detects the location information (longitude data and latitude data) for the electronic camera 100 using information from multiple satellites orbiting around the earth, and provides the capture location information to the CPU 50 at the time of image capture. The CPU 50 appends the capture location information to the image data and stores it in the memory card 77.

The CPU 50 can transmit the image data stored in the memory card 77 to the outside via the short-range wireless communication circuit 72 and the antenna 76, or conversely store image data received from the outside via the short-range wireless communication circuit 72 and the antenna 76 in the memory card 77 and display it on the left screen 21, as required.

In playback mode, the screen control circuit 92 reads out the image data indicated by the CPU 50 from the memory card 77 and places it temporarily into the frame memory 69, displays the image data on the left screen 21, and, following the instructions of the CPU 50, places text data such as playback mode instructions into the frame memory 69 and displays the text data on the right screen 22.

Moreover, in playback mode, manipulating the transmit button 31 causes the image data being played back and displayed on the left screen 21 to be transmitted to the outside via the short-range wireless communication circuit 72 and antenna 76, and manipulating the receive button 32 causes image data to be received from the outside via the short-range wireless communication circuit 72 and antenna 76 and played back and displayed on the left screen 21.

FIG. 122 shows the data configuration of image files stored in the memory card 77. As shown in FIG. 122, multiple image files are stored in the memory card 77. Each image file is made up of image data and appended informational data. The appended informational data consists of capture data that indicates the various settings at the time of image capture, capture date and time data, and capture location data. FIG. 123 is a drawing that shows the configuration of information stored in the EEPROM 68, which consists of camera identification information for identifying the individual electronic camera 100 and gateway server access information used by the portable telephone 120 to access the gateway server 160.

Figure 124:
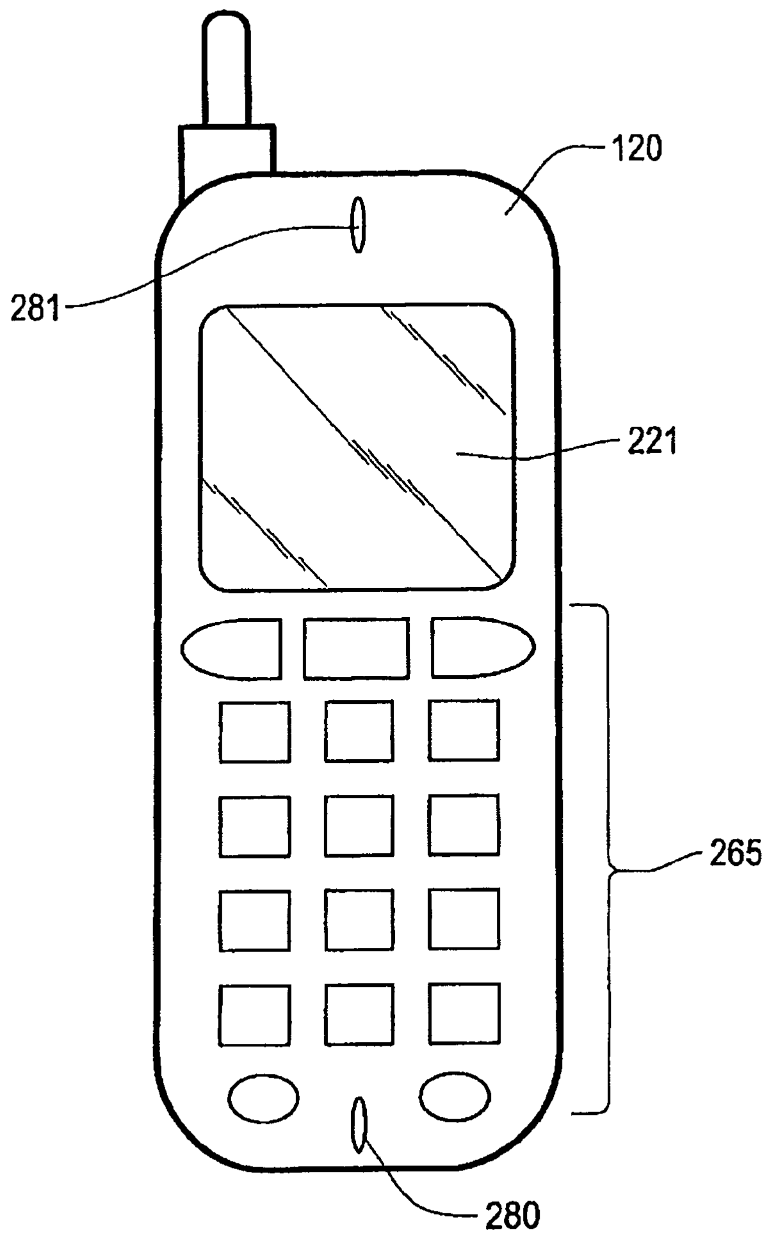
Figure 125:
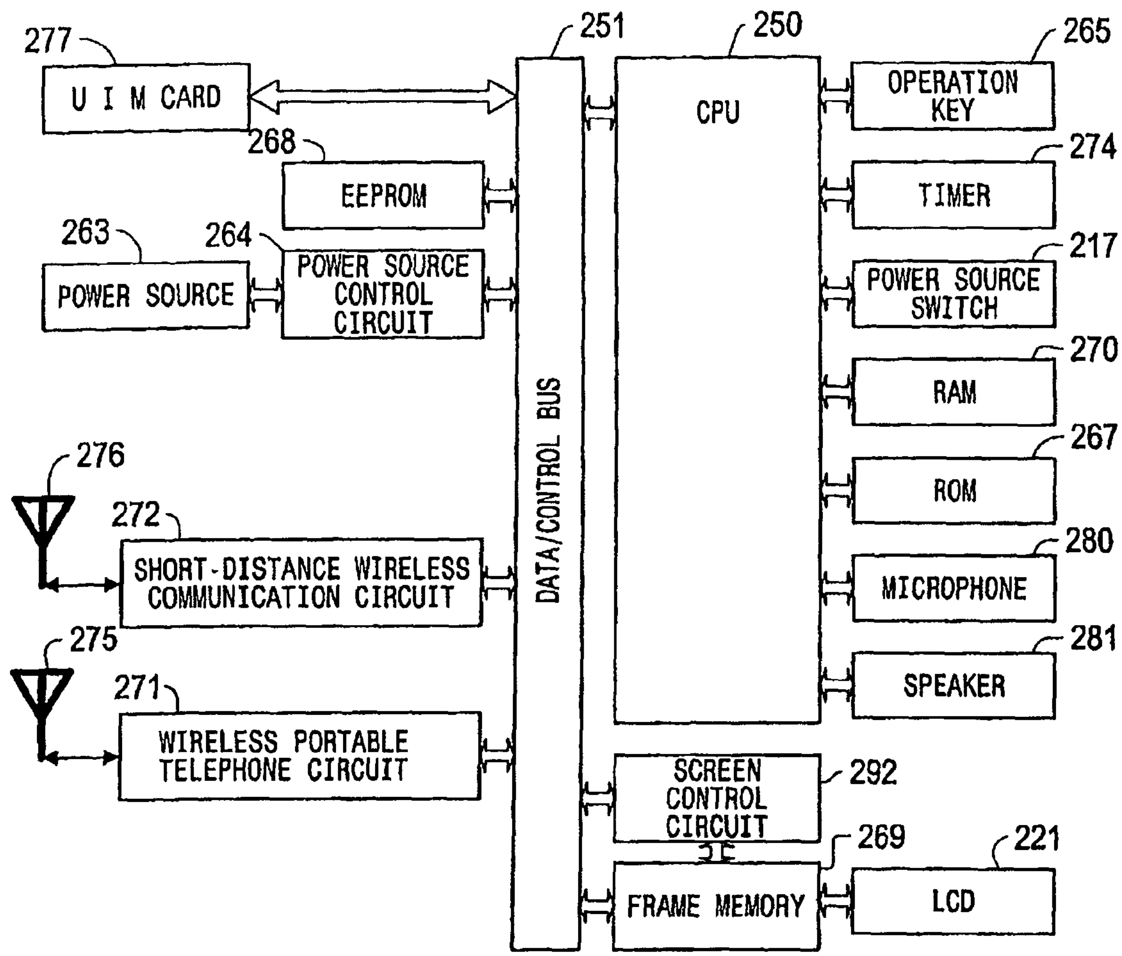

FIG. 124 is an external view of the portable telephone 120, which is provided with a display screen 221 for displaying image data, various control keys 265, a microphone 280 and a speaker 281. FIG. 125 is a block diagram showing an example of the internal electrical configuration of the portable telephone 120 shown in FIG. 124, wherein the various elements are connected to each other via a data/control bus 251 for transmitting various types of informational data and control data. The CPU 250 (central processing unit) is the means that performs overall control of the entire portable telephone 120, issuing various instructions to the screen control circuit 292 and power supply control circuit 264 in accordance with input information from the control keys 265, power switch 217 and timer 274.

The CPU 250 controls the various units in accordance with a control program stored in ROM 267 (read-only memory). The EEPROM 268 (electrically erasable programmable ROM) is a non-volatile memory that is used for storage of settings information necessary for the operation of the portable telephone 120 and for temporary storage of image data. The RAM 270 is a volatile memory that is used as a temporary working area of the CPU 250. The UIM card (User Identity Module) 277 is a portable storage medium that can be installed in and removed from the portable telephone 120 and that stores personal information of the user of the portable telephone 120 and the like, which personal information can be used by the CPU 250 as required. The CPU 250 detects the state of manipulation of the power switch 217, and controls the power supply 263 via the power supply control circuit 264.

The CPU 250 performs processing of outgoing and incoming telephone calls using the wireless portable telephone circuit 271 and antenna 275, and performs voice call processing using the microphone 280 and speaker 281. Furthermore, the CPU 250 performs exchange of digital data with the outside by means of packet communication protocol using the wireless portable telephone circuit 271 and antenna 275. Moreover, the CPU 250 performs exchange of messages with electronic devices having a short-range wireless communication capability that are in the vicinity of the portable telephone 120 via the short-range wireless communication circuit 272 and the antenna 276, and is able to exchange image information and the like. The CPU 250 reads and loads image data stored temporarily in EEPROM 268 into frame memory 269, and displays the image data on the display screen 221 using the screen control circuit 92.

Figure 126:
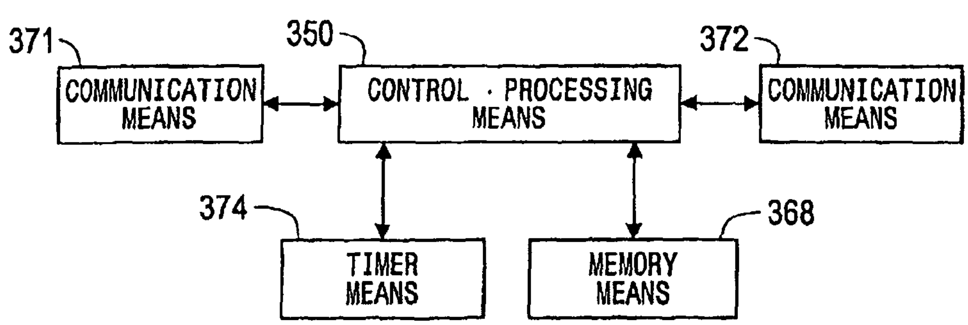

FIG. 126 is a block diagram showing the internal configuration of the gateway server 160, wherein a communication means 371 connected to a packet communication network, a communication means 372 connected to the Internet, a memory means 368 that stores information such as image data, and a timer means 374 are connected to a control/processing means 350 that performs overall control of the various elements of the gateway server 160. The gateway server 160 exchanges information such as image data with the portable telephone 120 using a packet communication protocol via the communication means 371, and exchanges information such as image data with image servers using Internet protocol via the communication means 372.

Figure 127:
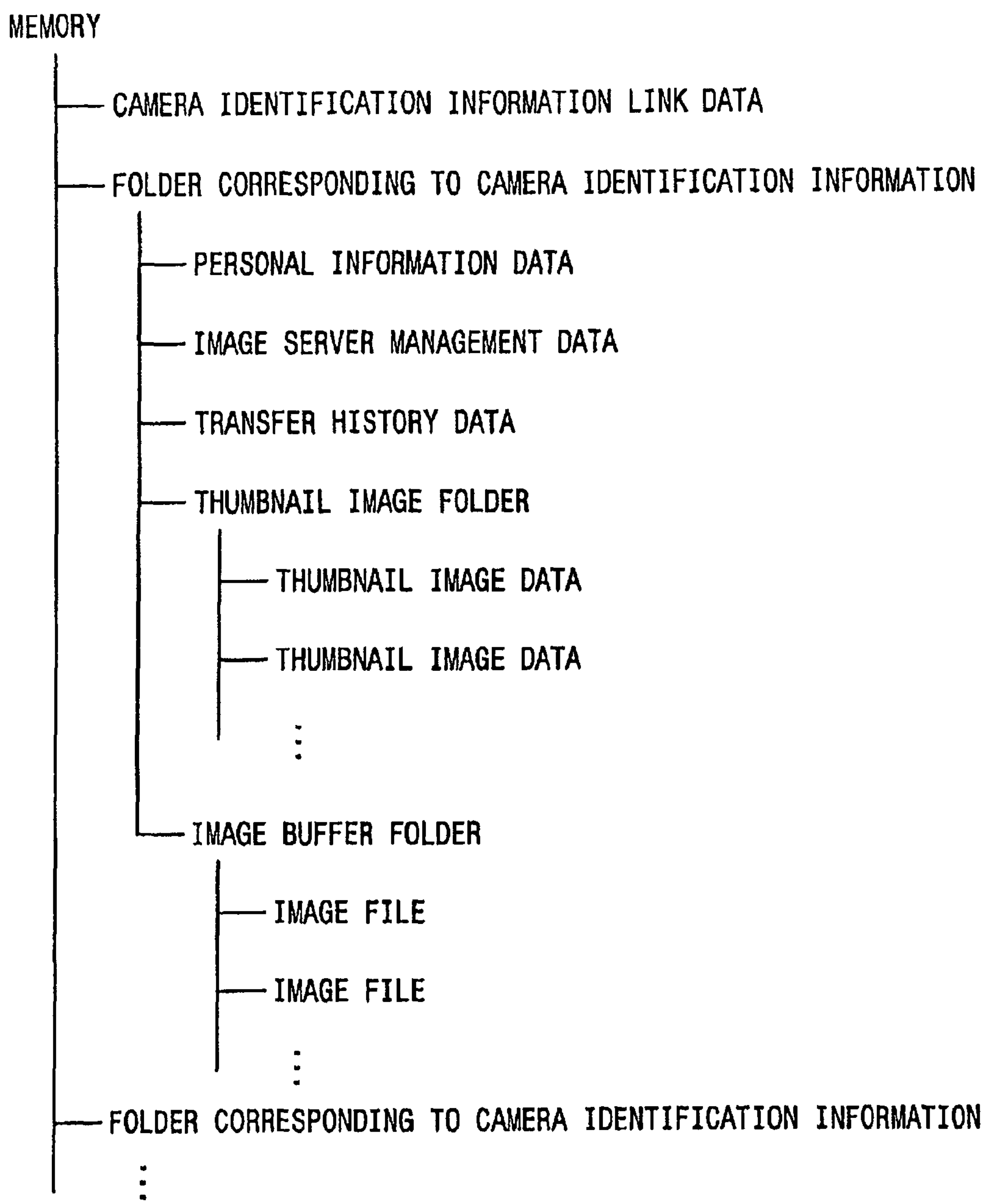

Various types of information are held in the memory means 368, as shown in FIG. 127. The camera identification information link data, as shown in FIG. 128, is data that indicates the correspondence relations of individual items of camera identification information, whereby the arrow indicates that the camera identification information on the right is the parent of the camera identification information on the left. It also represents whether a given item of camera identification information is parent camera identification information, or is single (no link) or is unused, etc. Namely, the gateway server 160 refers to this camera identification information link data, searches for parent camera identification information based on the received camera identification information, and if parent camera identification information exists, performs processing, which is described below, in accordance with the parent camera identification information. Performing such processing makes it possible to treat image data captured with different electronic cameras as image data captured with a single electronic camera. This camera identification information link data can be modified if necessary from an external personal computer 190 or the like, connected to the gateway server 160.

In the memory means 368, as shown in FIG. 127, a folder corresponding to each item of camera identification information is prepared, and each folder corresponding to an item of camera identification information holds personal identification data, image server management data, transfer history data, thumbnail image data and image file data. FIG. 129 is a drawing that shows the configuration of personal identification data, which comprises data relating to the user of the electronic camera 100 corresponding to the camera identification information; the personal identification data can be used by the gateway server 160 to register with image servers on the Internet to secure a new storage area for storing image data or when reading/writing image data to and from image servers. This personal identification data can be modified as necessary from an external personal computer 190, etc., connected to the gateway server 160, and may optionally be made modifiable by transmission of information stored on the UIM card 277 installed in the portable telephone 120 from the portable telephone 120 to the gateway server 160.

Figure 130:
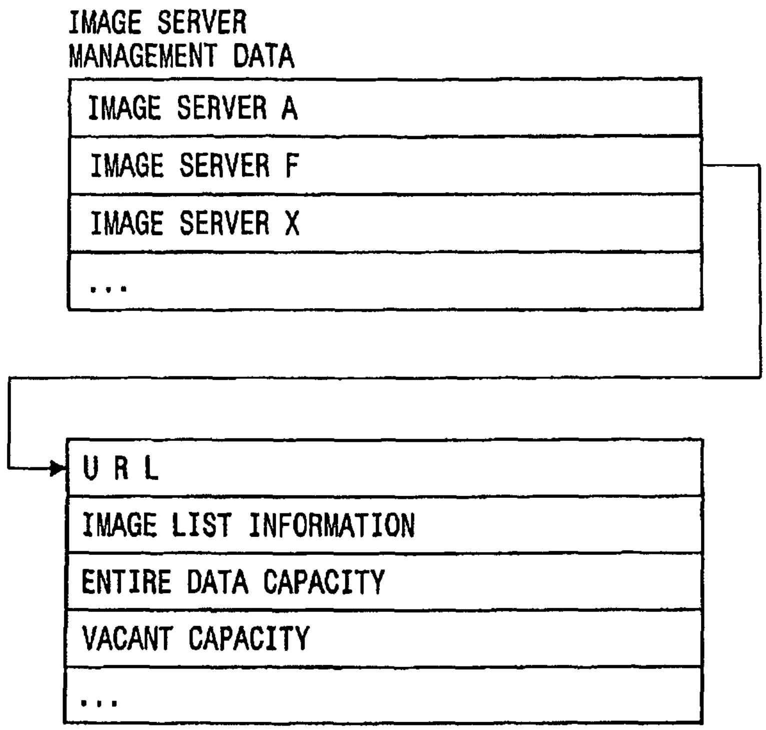

FIG. 130 is a drawing showing the configuration of server management data, which consists of identifying names of image servers on that the gateway server 160 stores image data according to the camera identification information, the URL (Uniform Resource Locator) of each image server, the total data capacity provided on each image server according to the camera identification information, the available capacity out of the total data capacity provided on each image server according to the camera identification information, and list information on the image data stored on each image server based on the camera identification information (image file identification information or image file names), etc.

Figure 131:
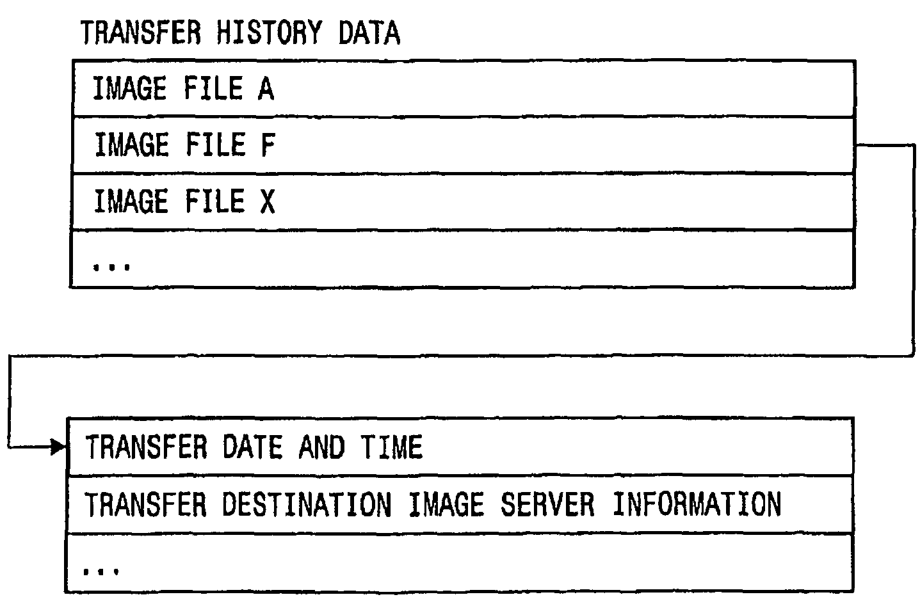

FIG. 131 is a drawing that shows the configuration of the transfer history data, which consists of list information on image data stored on the virtual image server 180 according to the camera identification information (image file identification information or image file names), information on the date and time of transfer of each item of image data to the image server, information relating to the image server to that image data is transferred, etc.

FIG. 132 is a block diagram showing the internal configuration of image servers 181 through 184, wherein a communication means 471 connected to the Internet and a memory means 468 that stores information such as image data are connected to the control/processing means 450 that performs overall control of the individual elements of image servers 181 through 184. Image servers 181 through 184 exchange information such as image data with the gateway server 160 via the communication means 471 using Internet protocol. In the memory means 468, a folder corresponding to each item of camera identification information is prepared, as shown in FIG. 133, and image file data is stored in the folders corresponding to each item of camera identification information.

FIG. 134 is a state transition diagram for an embodiment of the electronic camera 100 according to the present invention. When power is turned on, the camera enters capture mode, and manipulating the release button 16 causes the camera to perform a capture operation and a post-capture image file creation and loading of the image file into the memory card 77. In playback mode, it performs playback and display operations on the image data stored in the memory card 77. In capture mode, if the automatic transmission function is turned on, an image transfer operation is performed, whereby captured image data is automatically transmitted and stored on an image server. Furthermore, in playback mode, manipulating the transmit button 31 causes an image transmission operation to be performed, whereby the image data displayed on the left screen 21 is transmitted and stored on an image server. Moreover, manipulating the receive button 32 in playback mode causes an image reception operation to be performed, whereby the desired image data is received from the image server and displayed on the left screen 21. Furthermore, manipulating the capture mode button 28 causes a transition from playback mode to capture mode, and manipulating the playback mode button 29 causes a transition from capture mode to playback mode.

FIG. 135 is a main flow chart of the operation of the electronic camera 100 (CPU 50) in the mode of embodiment described above. First, in S10, the power supply is turned on by manipulating the power switch 17, and in S20, the capture mode subroutine is executed, leading to a capture enabled state. If the release button 16 is manipulated while in capture mode, the release interrupt handling subroutine is executed in S30, and the capture operation is carried out. If the playback mode button 29 is manipulated while in capture mode, a mode switch interrupt handling subroutine is executed in S40, the playback mode subroutine is executed in S50, and image data stored in the memory card 77 is played back and displayed on the left screen 21. Conversely, if the capture mode button 28 is manipulated while in playback mode, a mode switch interrupt handling subroutine is executed in S40, and the system moves to the capture mode subroutine of S20. If the automatic transmission function is turned on, manipulating the release button 16 causes the communication interrupt processing of S60 to be executed following the capture operation, and transmission of image data to the image server is carried out. Furthermore, manipulating the transmit button 31 or the receive button 32 while in playback mode causes the communication interrupt processing of S60 to be executed, and transmission of image data to the image server or reception of image data from the image server is carried out.

FIG. 136 is a detailed flow chart of the capture mode subroutine. Starting in S20, the processing of S201 is repeated. In S201, image data successively generated by the CCD 55 under the camera settings made by the user is displayed on the left screen 21 as shown in FIG. 137, at that time the capture settings are displayed as text on the right screen 22.

FIG. 138 is a detailed flow chart of the release interrupt handling subroutine. Starting in S30, it is checked in S301 whether the system is in capture mode, and if it is not in capture mode, the system returns in S308. If it is in capture mode, the capture operation is carried out under the capture conditions set by the user or the camera to generate image data, and appended informational data (capture data, time data, location data) is appended to the image data in S303 to generate an image file. In S304, it is checked whether the automatic transmit function is turned on, and if it is not turned on, the image file is loaded into the memory card 77 in S305 and the system returns in S308. If the automatic transmit function is turned on, communication with the portable telephone 120 is attempted using the short-range wireless communication circuit 72 in S306, checking whether communication is possible, and if communication with the portable telephone 120 is possible, the portable telephone image file transmission subroutine of S70 is executed, transmitting the image file to the portable telephone 120, and the system returns in S308. If communication with the portable telephone 120 is not possible, the system goes back to S305, stores the image file on the memory card 77, and returns in S308.

FIG. 139 is a detailed flow chart of the portable telephone image file transmission subroutine. Starting in S70, the image file, camera identification information, gateway server access information and an image transmission request are transmitted to the portable telephone 120 by means of the short-range wireless communication circuit 72 using a short-range wireless communication protocol (Bluetooth, etc.) in S701, and the system returns in S702.

FIG. 140 is a detailed flow chart of the mode switch interrupt handling subroutine. Starting in S40 upon manipulation of the capture mode button 28 or playback mode button 29, it is checked in S401 whether the manipulated button was the capture mode button 28, and if it was the capture mode button 28, playback mode is terminated and the system moves to the capture mode subroutine of S20. If the manipulated button was not the capture mode button 28, the capture mode is terminated and the system moves to the playback mode subroutine of S50.

FIG. 141 is detailed flow chart of the playback mode subroutine. Starting in S50, the processing of S501 is repeated. In S501, in response to the manipulation of the LEFT button 25 and RIGHT button 26, image data stored in the memory card 77 is selected and read, and is played back and displayed on the left screen 21 as shown in FIG. 142, while operating instructions are displayed on the right screen 22. Immediately after power is turned on, the most recent image data is displayed; subsequently, image data with older time data are displayed successively in response to manipulation of the LEFT button 25, and image data with newer time data are displayed successively in response to manipulation of the RIGHT button 26.

FIG. 143 is a detailed flow chart of the communication interrupt handling subroutine started by manipulating the transmit button 31 or receive button 32. Starting in S60, it is checked in S601 whether the manipulated button was the transmit button 31, and if was the transmit button 31, it is checked in S602 whether the system is in capture mode, and if it is in capture mode, the current setting of the automatic transmit function is inverted in S603, and the system returns in S613. If the system was in playback mode in S602, communication with the portable telephone 120 using the short-range wireless communication circuit 72 is attempted in S604, checking whether communication is possible, and if communication with portable telephone 120 is possible, the portable telephone image file transmission subroutine of S70 is executed, transmitting the image file of the image data currently displayed on the left screen 21 to the portable telephone 120, and the system returns in S613. If communication with the portable telephone 120 is not possible, the system returns in S613.

If the button manipulated in S601 was the receive button 32, it is checked in S605 whether the system is in capture mode, and if it is in capture mode, the system returns in S613. If it is in playback mode, communication with the portable telephone 120 using the short-range wireless communication circuit 72 is attempted in S606, checking whether communication is possible, and if communication with the portable telephone 120 is not possible, the system returns in S613. If communication with portable telephone 120 is possible, in S607, the camera identification information, gateway server access information and a thumbnail image reception request are transmitted to the portable telephone 120 by means of the short-range wireless communication circuit 72 using a short-range wireless communication protocol (Bluetooth, etc.). In S608, the system waits to receive thumbnail images form the portable telephone 120 and returns in S613 if reception was not possible. If thumbnail images were received, in S609, as shown in FIG. 144, the received thumbnail images are displayed on the left screen 21, while operating instructions are displayed on the right screen 22. The thumbnail images are scrolled by manipulating the UP button 23 and DOWN button 24, and either the left or right thumbnail image is selected by manipulating the LEFT button 25 or RIGHT button 26. Manipulating the SELECT button 27 confirms the selected thumbnail image. In S610, the image identification information appended to the selected thumbnail image, the camera identification information, gateway server access information and an image reception request are transmitted to the portable telephone 120 by means of the short-range wireless communication circuit 72 using a short-range wireless communication protocol (Bluetooth, etc.). In S611, the system waits to receive image data from the portable telephone 120 and returns in S613 if reception was not possible. If image data was received, in S612, as shown in FIG. 145, the received image data is displayed on the left screen 21 while operating instructions are displayed on the right screen 22, and the system returns in S613.

Next, operation of the portable telephone 120 (CPU 250) in the above mode of embodiment will be described. Description of the operation of the portable telephone 120 relating to talk functions will be omitted as it has little bearing on the present invention. FIG. 146 is a detailed flow chart of the communication interrupt handling started when the portable telephone 120 performs image transmission. Communication interrupt handling is started in A60 when a communication request is received via short-range wireless communication from the electronic camera 100, it is checked in A601 whether the system is currently processing a voice call, and if it is processing a voice call, the system returns in A613 without responding to the communication request from the electronic camera 100. If a voice call is not being processed, voice call processing is blocked in A602, it is checked in A603 whether the request from the electronic camera 100 is an image file transmission request, and if it was an image file transmission request, in A604, communication is attempted with the gateway server 160 using the wireless portable telephone circuit 271 based on the gateway server access information, checking whether communication is possible, and if communication with the gateway server 160 is possible, the gateway image file transmission subroutine of A70 is executed, the image file received from the electronic camera 100 is transmitted to the gateway server 160, voice call processing is unblocked in A613, and the system returns. If communication with the gateway server 160 is not possible, in A605, the image file, camera identification information, gateway server access information, etc. received from the electronic camera 100, are stored temporarily in EEPROM 268, and the system unlocks voice call processing and returns in A613.

If the request from the electronic camera 100 in A603 was not an image file transfer request, in A606, communication with the gateway server 160 is attempted using the wireless portable telephone circuit 271 based on the gateway server access information, checking if communication is possible, and if communication with the gateway server 160 is not possible, the system unblocks voice call processing in A613 and returns. If communication with the gateway server 160 is possible, it is checked in A607 whether the request from the electronic camera 100 is a thumbnail image reception request, and if it was a thumbnail image reception request, in A608, a thumbnail image reception request and camera identification information are transmitted to the gateway server 160 by means of the wireless portable telephone circuit 271 using a packet communication protocol. In A609, the thumbnail images are received from the gateway server 160 and are transmitted to the electronic camera 100 by means of the short-range wireless communication circuit 272 using a short-range wireless communication protocol. While transmitting thumbnail images to the electronic camera 100, the thumbnail images are displayed on the screen 221. Once transmission of thumbnail images to the electronic camera 100 is completed, the system unblocks voice call processing and returns in A613.

If the request from the electronic camera 100 in A607 was not a thumbnail image reception request, in A610 it is checked whether the request from the electronic camera 100 is a selected image reception request, and if it was not an image reception request, the system unblocks voice call processing and returns in A613. If it was an image reception request, in A611, an image reception request, image identification information and camera identification information are transmitted to the gateway server 160 by means of the wireless portable telephone circuit 271 using a packet communication protocol. In A612, image data corresponding to the image identification information is received from the gateway server 160, and is transmitted to the electronic camera 100 by means of the short-range wireless communication circuit 272 using a short-range wireless communication protocol. During transmission of images to the electronic camera 100, the image data is displayed on the screen 221, as shown in FIG. 149. Once transmission of image data to the electronic camera 100 is completed, display of image data on the screen 221 is terminated, and the system unblocks voice call processing and returns in A613. To more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

FIG. 147 is a detailed flow chart of the gateway image file transmission subroutine. Starting in A70, in A701 the image file, camera identification information and an image transmission request are transmitted by packet communication protocol using the wireless portable telephone circuit 271 to the gateway server 160 designated based on the gateway access information, and the system returns in A702. While an image file is being transmitted to the gateway server 160, the image data being transmitted is displayed on the screen 221, as shown in FIG. 148, and the display is terminated once transmission is completed. Furthermore, to more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

FIG. 150 is a detailed flow chart of the timer interrupt handling started at regular intervals by the timer 274 of the portable telephone 120. Starting in A80, it is checked in A801 whether the system is currently processing a voice call, and if it is currently processing a voice call, the system returns in A805. If it is not processing a voice call, voice call processing is blocked in A802, it is checked in A803 whether there are image files being temporarily stored in EEPROM 268, and if there are no image files being temporarily stored, the system unblocks voice call processing and returns in A805. If there are temporarily stored image files, communication with the gateway server 160 by means of the wireless portable telephone circuit 271 based on the gateway server access information is attempted in A804, checking whether communication is possible, and if communication with the gateway server 160 is not possible, the system unblocks voice call processing and returns in A805. If communication with the gateway server 160 is possible, the gateway image file transmission subroutine of A70 is executed, image files received from the electronic camera 100 are transmitted to the gateway server 160, and in A805, the system unblocks voice call processing and returns.

As indicated above, when communication with the gateway server 160 is not possible, the portable telephone 120 temporarily stores the image files received from the electronic camera 100, and when communication with the gateway server 160 becomes possible, it automatically transmits the temporarily stored image files to the gateway server 160. To notify the user of the fact that image files transmitted from the electronic camera 100 to the gateway server 160 are being temporarily stored by the portable telephone 120, one may optionally display a specific mark, icon or text on the screen 221 while image files are being temporarily stored by the portable telephone 120. By doing this, in a situation where the user is in a hurry to transmit the image files, the user will be able to see this display and perform image file transmission by a different method.

Furthermore, while the communication interrupt handling of FIG. 146 assumes that the connection between the electronic camera 100 and portable telephone 120 is maintained until communication is completed once the connection between the electronic camera 100 and portable telephone 120 has been established, in case the connection between the electronic camera 100 and the portable telephone 120 should be cut off (for example, if the portable telephone 120 becomes unable to transmit thumbnail images or image files received from the gateway server 160 to the electronic camera 100), one can have the thumbnail images and image files be stored temporarily in the EEPROM 268 of the portable telephone 120, have the portable telephone 120 detect when communication between the portable telephone 120 and electronic camera 100 becomes possible, and automatically transmit the thumbnail images or image files stored temporarily in EEPROM 268 to the electronic camera 100. The portable telephone 120 may optionally display the fact that that thumbnail images or image files transmitted to the electronic camera 100 from the gateway server 160 are being stored temporarily by the portable telephone 120 by displaying a special mark, icon or text on the screen 221 while the image files are being temporarily stored by the portable telephone 120. By doing this, in a situation where the user is in a hurry to transmit the image files, the user will be able to see this display, and take countermeasures such as rechecking the connection between the portable telephone 120 and electronic camera.

Next, the operation of the gateway server 160 (control/processing means 350) in the above mode of embodiment will be described. Description of operations of the gateway server 160 other than the image transmission operation will be omitted as they have little bearing on the present invention. FIG. 151 is a detailed flow chart of the communication interrupt handling started when the gateway server 160 performs image transmission. Starting in G60 with a communication request from the portable telephone 120 or personal computer 190, in G601, the parent camera identification information is identified by referring to the camera identification information link data based on the received camera identification information. Subsequent image data handling is performed on the folder corresponding to the parent camera identification information. In G602, it is checked whether the received request is an image file transmission request, and if it was an image file transmission request, in G603, the received image file is stored temporarily in an image buffer folder in the folder corresponding to the camera identification information, thumbnail image data corresponding to the image data is generated and stored in a thumbnail image folder, likewise in the folder corresponding to the camera identification information, and the system returns in G617.

If the request received in G602 was not an image file transmission request, it is checked in G604 whether the received request is a thumbnail image reception request, and if it was a thumbnail image reception request, in G605 the thumbnail images stored in the thumbnail image folder inside the folder corresponding to the camera identification information are transmitted by packet communication protocol to the originator of the thumbnail image reception request (portable telephone 120), and the system returns in G617. If the request received in G604 was not a thumbnail image reception request, it is checked in G606 whether the received request is an image reception request, and if it was an image reception request, it is checked in G607 whether image data corresponding to the image identification information exists in the image buffer folder inside the folder corresponding to the camera identification information, and if image data corresponding to the image identification information exists in the image buffer folder, the image file containing the image data is transmitted to the originator of the image reception request (portable telephone 120) using a packet communication protocol in G608, and the system returns in G617.

If there is no image data corresponding to the image identification information in the image buffer folder, the image server where the image file corresponding to the image identification information is stored is determined based on the transfer history data in G609, and an image reception request and the image identification information are transmitted to that image server using Internet protocol in G610. In G611, the system waits to receive the specified image file from the image server, returning in G617 if the image file could not be received from the image server; if the image file was received from the image server, the image file is transmitted to the originator of the image reception request (portable telephone 120) in G612 using a packet communication protocol, the image file is stored temporarily in the image buffer folder in the folder corresponding to the camera identification information, and the system returns in G617.

If the received request in G606 was not an image reception request, it is checked in G613 whether the received request is a data overwrite request, and if it was a data overwrite request, in G14 personal identification data in the folder corresponding to the camera identification information, camera identification information link data, etc., is overwritten according to the received data, and the system returns in G617. If the received request in G613 was not a data overwrite request, it is checked in G615 whether the received request was a data read request, and if it was a data read request, the personal identification data in the folder corresponding to the camera identification information, camera identification information link data, etc., is read and transmitted to the requester in accordance with the received data, and the system returns in G617. If the received request in G615 was not a data read request, the system returns in G617.

FIG. 152 is a detailed flow chart of the timer interrupt handling started at specific intervals by the timer means 374 of the gateway server 160. Starting in G80, the first item of camera identification information from the camera identification information list maintained by the gateway server 160 is selected in G801. In G802, it is checked based on the transfer history data whether there are image files that have not been transferred yet to the image server in the image buffer folder inside the folder corresponding to the selected camera identification information, and if there are no image files that have not been transferred yet, the system proceeds to G810. If there are image files that have not been transferred yet, it is checked in G803, based on image server management data, whether there is an image server with available capacity. In S804, if there is an image server with available capacity, the system proceeds to G806, and if there are no image servers with available capacity, a new image server with available capacity is searched for in G805. In G805, a search is carried out for open image servers on the Internet that are able to store image files, registration with the found image server is carried out automatically using camera identification information, and information on the image server (storage capacity, etc.) is recorded in the image server management data. In G806, an image server with available capacity is designated as the image server for storing images. In G807, image files that have not been transferred yet are transmitted using Internet protocol to the image server designated as the image server for storing images, the image server management data and transfer history data are updated, and all the image files stored temporarily in the image buffer folder are deleted. In G808, it is checked whether the currently selected camera identification information is the last item of camera identification information in the camera identification information list; if it is not the last item of camera identification information, in G809, the camera identification information is changed to the next item of camera identification information, the system goes back to G802 and repeats the processing described above, and if it is the last item of camera identification information, the system returns in G810.

Next, the operation of the image servers 181 through 184 (control/processing means 350) in the above mode of embodiment will be described. Description of operations of the image servers 181 through 184 other than the image transmission and storage operation will be omitted as they have little bearing on the present invention. FIG. 153 is a detailed flow chart of the communication interrupt handling started when a communication request is received by the image servers 181 through 184 from the gateway server 160. Starting in H60 upon receiving a communication request from the gateway server 160, it is checked in H601 whether the received request is an image server registration request, and if it was a registration request, it is checked in H602 whether a folder corresponding to the received camera identification information exists, and if it already exists, the system returns in H611. If no folder corresponding to the received camera identification information exists, in H603, a folder corresponding to the received camera identification information is created, and the system returns in H611.

If the request received in H601 is not an image server registration request, it is checked in H604 whether the received request is an image reception request (image read request), and if it was an image reception request, it is checked in H605 whether a folder corresponding to the received camera identification information exists, and if it does not exist, the system returns in H611. If a folder corresponding to the received camera identification information exists, it is checked in H606 whether an image file corresponding to the received image identification information exists in the folder, and if it does not exist, the system returns in H611. If an image file corresponding to the received image identification information exists, the image file in question is transmitted to the gateway server 160 using Internet protocol in H607, and the system returns in H611. If the received request in H604 is not an image reception request to the image server, it is checked in H608 whether the received request is an image transmission request (image write request), and if it was not an image transmission request, the system returns in H611. If it was an image transmission request, it is checked in H609 whether a folder corresponding to the received camera identification information exists, and if it does not exists, the system returns in H611. If a folder corresponding to the received camera identification information exists, the received image file is stored in the folder in H610, and the system returns in H611.

In the mode of embodiment described above (FIG. 118 through FIG. 153), while relaying image files received from the electronic camera 100 though the gateway server 160, the portable telephone 120 displays the image data being transmitted on the screen 221, as shown in FIG. 148, which allows the user to confirm based on the display of screen 221 that the image data he selected and transmitted is in fact being transmitted from the portable telephone 120 to the gateway server 160, and allows the user to confirm that transmission of image data from the portable telephone 120 to the gateway server 160 has been completed based on the fact that display of image data on the screen 221 has terminated. Furthermore, the fact that display of image data has started on the screen 221 of the portable telephone 120 allows one to confirm that transmission of image data from the electronic camera 100 to the portable telephone 120 has been completed, and one can accordingly start taking picture with the electronic camera 100.

In the above mode of embodiment (FIG. 118 through FIG. 153), while image files received from the gateway server 160 are being relayed to the electronic camera 100, the portable telephone 120 displays the image data being transmitted on the screen 221, as shown in FIG. 149, which allows the user to get an overview of the received image data based on the display of screen 221 before displaying and browsing the image data on the screen after transmission of the image data to the electronic camera 100 is completed, and allows the user to confirm that transmission of image data from the portable telephone 120 to the electronic camera 100 has been completed based on the fact that display of image data on the screen 221 has terminated.

In the above mode of embodiment (FIG. 118 through FIG. 153), if the portable telephone 120 was not able to relay image files received from the electronic camera 100 to the gateway server 160 (for example, when the portable telephone 120 is out of range of the wireless portable telephone link), those image files are stored temporarily in the EEPROM 268 of the portable telephone 120, and when transmission of image files to the gateway server 160 becomes possible, the image files stored temporarily in EEPROM 268 are automatically transmitted to the gateway server 160, so even if communication between the portable telephone 120 and the gateway server 160 is not possible, the user does not need to redo the image file transmission operation on the electronic camera 100 side, which makes it possible to avoid the risk of the user forgetting to retransmit, and allows the user to focus on taking pictures with the electronic camera 120 once image files have been transmitted from the electronic camera 100 to the portable telephone 120.

In the above mode of embodiment (FIG. 118 through FIG. 153), the gateway server 160 that relays image data between the electronic camera 100 and image servers 181 through 184 temporarily stores image data received from the electronic camera 100 or image servers 181 through 184 in the memory means 368 of the gateway server 160, and transmits the stored image data as necessary to the electronic camera 100 or image servers 181 through 184, thereby making it possible to reduce the communication traffic between the image servers 181 through 184 and gateway server 160 or between the electronic camera 100 and the gateway server 160.

In the above mode of embodiment (FIG. 118 through FIG. 153), the gateway server 160 that relays image data between the electronic camera 100 and image servers 181 through 184 stores the user's personal information in the memory means 368, and if there is no available capacity to store image data in the image server's album corresponding to the camera identification information, the gateway server connects to another image server on the Internet, automatically sets up an album (folder) corresponding to the camera identification information using the aforementioned personal information, transmits the image data received from the electronic camera 100 to the image server and causes it to be stored in the new album, thereby freeing the user from having to perform the complicated procedure of connecting to an image server and the bothersome procedure of setting up an album, which the user would otherwise have to carry out directly on the electronic camera 100 side.

In the above mode of embodiment (FIG. 118 through FIG. 153), the gateway server 160 that relays image data between the electronic camera 100 and image servers 181 through 184 keeps, in the memory means 368, server management information for unified management of albums (folders) set up corresponding to camera identification information on each of the image servers 181 through 184, and based on the server management information, performs generalized storage and management of image data stored in distributed fashion across multiple image servers 181 through 184 by combining it into one virtual album, thereby making it possible to exchange large volumes of image data between the virtual album and the electronic camera 100 by means of simple operations, without the user being aware of the multiple image servers 181 through 184 that actually store the image data on the Internet.

In the above mode of embodiment (FIG. 118 through FIG. 153), the gateway server 160 that relays image data between the electronic camera 100 and image servers 181 through 184 keeps, in the memory means 368, link information that represents the associations of camera identification information for individually identifying electronic cameras, views multiple electronic cameras as a single group based on the link information, and transmits and stores image data received from the electronic cameras in an album on an image server corresponding to the group to that those electronic cameras belong, thereby making it possible to store image data captured with multiple electronic cameras in a single album on the image server. (Description of modified embodiments) The present invention is not limited to the mode of embodiment described above, and various modifications and changes are possible.

While in the above mode of embodiment (FIG. 118 through FIG. 153), transmission was carried out individually for reach image file relayed from the electronic camera 100 via the portable telephone 120 to the gateway server 160, it is also permissible to transmit multiple image files as a batch from the electronic camera 100 via the portable telephone 120 to the gateway server 160. In such cases as well, during transmission of image data from the portable telephone 120 to the gateway server 160, the portable telephone 120 displays the image data being transmitted on the screen 221. Doing this allows the user to check the progress of the processing of image file transmission from the portable telephone 120 to the gateway server 160 based on the image data being displayed. Furthermore, when multiple image files are transmitted in a batch from the electronic camera 100 via the portable telephone 120 to the gateway server 160 in this manner, first all the image files to be transmitted are transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160. Doing so makes it unnecessary to transmit appended informational data (camera identification information, gateway server access information, image transmission requests etc.) for each individual image file from the electronic camera 100 to the portable telephone 120, making it possible to shorten the transmission time for image files between the electronic camera 100 and portable telephone 120. When transmitting image files from the portable telephone 120 to the gateway server 160, this also makes it unnecessary to transmit appended informational data (camera identification information, image transmission requests, etc.) for each individual image file from the portable telephone 120 to the gateway server 160, making it possible to reduce the transmitted data volume passing through the wireless portable telephone link 130 and packet communication network 150 and to shorten the image file transmission time, as well as to reduce communication fees.

Furthermore, when transmitting multiple image files in a batch from the electronic camera 100 via the portable telephone 120 to the gateway server 160, if all the image files to be transmitted are first transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160, then if problems occur with the wireless portable telephone link 130 or packet communication network 150 during transmission of image files from the portable telephone 120 to the gateway server 160 and transmission of image files becomes impossible, the portable telephone 120 will leave the image files that it has not finished transmitting in the EEPROM 268, and will automatically transmit the image files remaining in EEPROM 268 to the gateway server 160 once transmission of image files to the gateway server 160 becomes possible. Doing so makes it unnecessary for the user to redo the image file transmission operation on the electronic camera 100 side from the beginning even if communication between the portable telephone 120 and gateway server 160 becomes impossible midway during image transmission, allowing the user to focus on taking pictures with the electronic camera 120 once image files have been transmitted from the electronic camera 100 to the portable telephone 120, as well as making it possible to reduce the transmitted data volume passing through the wireless portable telephone link 130 and the packet communication network 150 compared to if file transfer from the electronic camera 100 to the gateway server 160 were redone from the beginning, and allowing one to shorten the image file transmission time and to reduce communication charges.

While in the above mode of embodiment (FIG. 118 through FIG. 153), greater data communication efficiency of the image transmission system was achieved by having the gateway server 160 temporarily store image files transmitted between the electronic camera 100 and the image server in an image buffer folder and make use of the image files stored temporarily in the image buffer folder as necessary, and by storing thumbnail image data corresponding to the image files in a thumbnail image folder and making use of that thumbnail image data as necessary, it is also possible, as shown in FIG. 154, to provide the same sort of image buffer folder and thumbnail image folder in the EEPROM 268 of the portable telephone 120 and temporarily store thumbnail image data and image files transmitted between the electronic camera 100 and the image server in the image buffer folder and thumbnail image folder, and, when the image file or thumbnail image data requested by the electronic camera 100 is present in the image buffer folder or thumbnail image folder, to have the portable telephone 120 transmit those image files and thumbnail image data to the electronic camera 100. In such cases, the image files or thumbnail image data stored temporarily in the image buffer folder and thumbnail image folder in the EEPROM 268 may be cleared periodically in their entirety, or the image files and thumbnail image data may be deleted in the order of their age according to the storage start date and time data of the image file or thumbnail image data, so as to keep the total data volume of the temporarily stored image files and thumbnail image data at or below a specific volume. Alternatively, image files kept for more than a specific period of time may be deleted based on the storage start date and time data of the image files or thumbnail image data, or else stored image files or thumbnail image data may be deleted at specific clock times.

If this is done, then when the user wishes to reconfirm the image data most recently transmitted or received via the portable telephone 120, it will be possible to display a summary of the status of temporarily stored images on the screen 221 of the portable telephone 120, as shown in FIG. 155, and to transmit the image files or corresponding thumbnail image data temporarily stored in the portable telephone 120 from the portable telephone 120 to the electronic camera 100 and make use of them, thereby making it unnecessary to make inquiries via the portable telephone 120 to the gateway server 160 regarding the image files or thumbnail image data and making it possible to quickly read image files or thumbnail image data into the electronic camera 100, as well as allowing the communication data volume between the portable telephone 120 and gateway server 160 to be reduced and correspondingly reduce the communication line usage fees.

While in the above mode of embodiment (FIG. 118 through FIG. 153), the electronic camera 100 transmits image data via a single portable telephone 120 to a single gateway server 160, it is also permissible to have the electronic camera 100 transmit image data via a single portable telephone 120 to multiple gateway servers. In such an image transmission system, the portable telephone 120 can store image files transmitted from the electronic camera 100 in EEPROM 268 under predetermined conditions (for a specific period of time from the start of storage, etc.) and transmit the stored image files to multiple gateway servers based on instructions from the electronic camera 100. When the electronic camera 100 transmits image files to multiple gateway servers, doing this will make it unnecessary to transmit image files from the electronic camera 100 to the portable telephone 120 every time an image file is to be transmitted, allowing the transmission of image files to the gateway servers to be carried out more quickly. For example, if an image file was transmitted from the electronic camera 100 to one gateway server and the user then wants to transmit the same image file to a different gateway server, the image identification information of the image file and the destination gateway server access information are sent from the electronic camera 100 to the portable telephone 120, whereupon, if an image file corresponding to the received image identification information is present in the EEPROM 268, the portable telephone 120 reads that image file from the EEPROM 268 and transmits it to the gateway server corresponding to the received gateway server access information. If no image file corresponding to the received image identification information is present in the EEPROM 268, the portable telephone 120 informs the electronic camera 100 that no image file corresponding to the received image identification information is present in the portable telephone 120, in response to that the electronic camera transmits the image file to the portable telephone 120.

While in the above mode of embodiment (FIG. 118 through FIG. 153), the portable telephone 120 performs relaying of image data in the transmission of image data between the electronic camera 100 and the gateway server 160, if the electronic camera 100 itself has a built-in wireless portable telephone function, it is also permissible to omit the portable telephone 120, as shown in FIG. 156, and to have the electronic camera 100 communicate directly with the gateway server 160 using a packet communication protocol. In FIG. 156, the base station 140 has been left out of the illustration.

In the above mode of embodiment (FIG. 118 through FIG. 153), the gateway server 160 provides the electronic camera 100 with a single virtual album that combines the albums secured according to the camera identification information on multiple image servers 181 through 184, and increases the available capacity of the virtual album by automatically setting up a new album corresponding to the camera identification information by registering with a new image server when the available capacity of the virtual album becomes insufficient; however, instead of setting up a new album on a new image server, a new album may also be set up on an existing server on that an album has already been set up. For example, if the gateway server 160 has unused camera identification information and the available capacity of the virtual album has become insufficient, the gateway server 160 can register with an image server, on that an album forming part of the virtual album has already been established, using one item of the unused camera identification information, and set up a new album corresponding to the unused item of camera identification information. Furthermore, the gateway server 160 can link the camera identification information used for setting up new albums to the camera identification information corresponding to the virtual album, so as to incorporate the newly created album into the virtual album. Doing this makes it possible to deal with insufficient available capacity of the virtual album when the number of image servers is limited.

While in the above mode of embodiment (FIG. 118 through FIG. 153), the gateway server 160 buffers image files received from the electronic camera 100 in an image buffer folder and delivers the image files buffered in the image buffer folder to image servers at specific intervals, when transmitting image files captured with a series of capture operations (continuous capture or continuous shutter, bracket capture, panorama capture, etc.) from the electronic camera in automatic transfer mode to the gateway server 160, the image transfer may also be performed by the scheme shown in FIG. 157. Here, continuous capture refers to continuously photographic the same subject at specific time intervals while tracking its movement; bracket capture refers to taking multiple photographs of the same subject while varying the capture conditions, such as exposure; and panorama capture refers to photographing a landscape or the like while shifting the capture direction by a certain amount each time. Namely, for each capture operation, the electronic camera 100 appends identification information to image files captured in series to the effect that this image is part of a series, and transmits it to the gateway server 160. The gateway server 160 temporarily stores image files with appended identification information indicating that it is part of a series of images in an image buffer folder. Once the series of image captures is completed, the electronic camera 100 transmits information to the gateway server 160 indicating that the series of image captures has been completed, and upon receiving that information, the gateway server 160 does a batch transmission of the series of image files stored temporarily in the image buffer folder to the same image server over the Internet and stores them there. Doing this makes it possible to transmit multiple image files between the gateway server 160 and image server with a single transmission procedure, allowing the transmission time to be shortened and allowing the image transmission processing load on the gateway server 160 and image servers 181 through 184 to be reduced. Furthermore, storing image files captured in a series on the same image server makes it highly convenient when the user later connects directly to the image server 181 through 184, with a personal computer or the like, to use the series of image data.

Instead of transmitting information indicating that a series of captures has been completed from the electronic camera 100 to the gateway server 160, it is also permissible to transmit to the gateway server 160, from a terminal such as a personal computer 190 connected to the gateway server 160, an instruction to transmit a series of image files accumulated on the gateway server 160 together to an image server, in response to that instruction, the gateway server 160 will transmit the series of image files accumulated on the gateway server 160 together to an image server.

Furthermore, when transmitting image files captured in a series from the electronic camera 100 to the gateway server 160 in automatic transmission mode, if an image file is transmitted from the electronic camera 100 to the gateway server 160 after every capture, the communication time will become longer due to the overhead for establishing communication and the appended information, and there are cases where, during this time, the picture-taking conditions will change or where the pictures cannot be taken at the planned time intervals. In such cases, one can optionally have the electronic camera 100 temporarily store the series of captured image files in RAM 70, and once the series of captures is completed, transmit the series of image files with appended identification information indicating that it is a series of images, together with information indicating that the series of captures has been completed, in a batch to the gateway server 160. Furthermore, when the data transfer rate of short-range wireless communication between the electronic camera 100 and portable telephone 120 is fast, one may optionally have the image files captured in a series be transmitted from the electronic camera 100 to the portable telephone 120 each time an image is captured, storing them temporarily in the EEPROM 268 of the portable telephone 120, and have the electronic camera 100 transmit information indicating that the series of captures has been completed to the portable telephone 120 once the series of captures has been completed, and in response to that information, have the portable telephone 120 transmit a series of image files with appended identification information indicating that this is a series of images in a batch to the gateway server 160. Doing this makes it possible for the electronic camera 100 to perform a series of captures under the desired capture conditions without affecting the image file transmission speed or the like, even in automatic transmission mode (a mode where captured image files are automatically transmitted to and stored on an image server).

Furthermore, when the electronic camera 100 selects image files captured in series, which have been saved on the memory card 77, and transmits those selected image files to an image server, by transmitting those image files with appended identification information indicating that they are a series of images, the gateway server 160 will be able recognize that these are image files captured in series and perform processing such as storing them on the same image server.

While in the above mode of embodiment (FIG. 118 through FIG. 153), the gateway server 160 buffers image files received from the electronic camera 100 in an image buffer folder and delivers the image files buffered in the image buffer folder to the image server at specific intervals, one can also have the image files buffered in the image buffer folder be delivered to the image server based on an external instruction. FIG. 158 is a drawing that shows the image transmission processing for such a scheme. Multiple image files are transmitted from the electronic camera 100 to the gateway server 160, and are stored temporarily in an image buffer folder in a folder corresponding to the camera identification information on the gateway server 160. Thereafter, a personal computer 190 connects to the gateway server 160 and transmits the camera identification information, the identification information of the image server to that the images are to be transferred, and an image transmission instruction to the gateway server 160. In response to the received camera identification information, the gateway server 160 transmits the image files, which are stored temporarily in the image buffer folder in the folder corresponding to the received camera identification information, in a batch to the image server corresponding to the received image server identification information. Doing this makes it possible for the user to transmit and store image data captured with the electronic camera 100 from the gateway server 160 at a convenient time to a suitable image server.

In the above mode of embodiment (FIG. 118 through FIG. 153), the gateway server 160 buffered image files transmitted between the electronic camera 100 and the image server in an image buffer folder and transmitted the image files buffered in the image buffer folder together to the image server at specific intervals; however, the gateway server 160 may also transmit accumulated image files to the image server by the following method. For example, the image files may be transmitted to the image server when the total data volume of the image files stored temporarily on the gateway server 160 exceeds a certain volume. Alternatively, the gateway server 160 may transmit image files to the image server once they have been accumulated for a set period or time, based on the date and time data of the start of storage of the image files in the image buffer folder. Alternatively, the gateway server 160 can transmit accumulated image files to the image server at specific clock times.

While in the above mode of embodiment (FIG. 118 through FIG. 153), the gateway server 160 buffers image files transmitted between the electronic camera 100 and the image server in an image buffer folder and clears the entirety of the image files buffered in the image buffer folder at specific intervals, the gateway server 160 may also delete image files by the following method. For example, the gateway server 160 may delete image files in the order of oldest to newest based on date and time information on the start of storage of the image files in the image buffer folder, so as to keep the total data volume of the image files stored temporarily in the image buffer folder at or below a specific volume. Alternatively, the gateway server 160 may delete image files stored for more than a specific period of time based on date and time information on the start of storage of the image files in the image buffer folder. Or the gateway server 160 may delete stored image files at specific clock times.

While in the above mode of embodiment (FIG. 118 through FIG. 153), the gateway server 160 buffers image files transmitted between the electronic camera 100 and the image server in an image buffer folder and transmits them as necessary to the electronic camera 100, the gateway server 160 may also transmit image files accumulated in the image buffer folder (image files transmitted by the electronic camera 100 to an image server or image files read by the electronic camera 100 from an image server) to another image server or electronic camera based on instructions from the electronic camera 100. Doing this makes it unnecessary to transmit each image file one by one from the electronic camera 100 to the gateway server 160, thereby making it possible to shorten the image file transmission time and reduce transmission charges.

While in the above mode of embodiment (FIG. 118 through FIG. 153), the gateway server 160 performed management of individual albums on image servers according to the camera identification information received from the electronic camera 100, it is also possible to use general identification information instead of camera identification information for individually identifying multiple electronic cameras 100. For example, using the next generation version of the IP protocol, IPV6 (Internet Protocol Version 6), the use of that on the Internet is planned, as the identification information, would make it possible for all electronic devices that handle images, besides electronic cameras, to make use of the image transmission system according to the present invention. Namely, IPV6 provides a 32-bit address space (on order of 10 to the $9^{th}$ power), so there is practically no concern of running out of addresses, which makes it possible for one device to have multiple addresses depending on the application, and can further increase the utility of the image transmission system according to the present invention. Furthermore, for instance in a network environment wherein electronic devices such as electronic cameras connect to the gateway server by means of a wireless LAN (Ethernet™) or the like, it is possible to use the MAC (Media Access Control) address or Ethernet™ address assigned to each individual electronic device as the identification information. A MAC address is assigned to each electronic device without duplication, which makes it suitable for individually identifying electronic devices and makes it possible to omit the effort to newly setting the identification information for applications of the present invention.

While the above mode of embodiment (FIG. 118 through FIG. 153 and FIG. 157) were described assuming that information such as image data was transmitted between the electronic camera 100, portable telephone 120 and gateway server 160 using packet communication, it is of course also permissible to transmit information such as image data using circuit-switched data communication.

In the above mode of embodiment (FIG. 118 through FIG. 153), the image servers 181 through 184 had individual albums (folders) corresponding to the camera identification information set individually for each electronic camera 100, the electronic camera 100 would transmit the camera identification information set in the camera in question to the gateway server 160, and the gateway server 160, based on the received camera identification information, would create new albums corresponding to the received camera identification information on the image servers 181 through 184 or perform reading and writing of image data to and from an album corresponding to the received camera identification information present on the image servers 181 through 184; however, it is also permissible to manage image data transmission and storage between the electronic camera 100 and image servers 181 through 184 using identification information other than camera identification information.

For example, in FIG. 159, a password input means is provided on the electronic camera side and image data transmission and storage is managed according to the password inputted by the user. In FIG. 159, electronic cameras A101 and B102 are equipped with password input means 81 and 82, and when transmitting a captured image file, electronic cameras A101 and B102 transmit the password inputted by the user and the image file as a pair to the gateway server 160. Meanwhile, the image server 181 has an album prepared that corresponds to the password, and the gateway server 160 transmits the received image file and stores it in the album on the image server 181 corresponding to the received password. The gateway server 160 can also create a new album on the image server corresponding to the received password. Furthermore, when downloading image files from the image server 181, the electronic cameras A101 and B102 transmit image identification information and a password to the gateway server 160, and the gateway server 160 transmits the received image identification information and password to the image server 181. The image server 181 reads the image file corresponding to the received image identification information from the album corresponding to the received password, and transmits that image file to via the gateway server 160 to the electronic cameras A101 and B102. Instead of password input, the electronic camera can obtain user identification information by installing a UIM card on that personal identification data has been stored in advance into the electronic camera.

If this is done, then when the same user uses multiple electronic cameras or when multiple users use the same camera, the image files captured by the electronic camera will be stored in an album on an image server corresponding to the password inputted by the user, so there is no inconvenience of having to later separate image files stored in the same album on an image server for different users, or collect image files stored in different albums on an image server for each user, allowing image files to be stored efficiently on a per-user basis and making it possible to protect the privacy of the stored image data.

While in FIG. 159, control and management of image data transmission and storage operations between the electronic camera 100 and image servers 181 through 184 is carried out based on the password inputted by the user into the electronic camera, in FIG. 160, instead of a password, a user identification means is provided on the electronic camera side, the electronic camera performs user identification automatically without manual intervention by the user, and image data transmission and storage is managed based on that user identification information. In FIG. 160, electronic cameras A101 and B102 are equipped with user identification means 83 and 84 (fingerprint detection means, iris pattern detection means, facial image detection means, etc.), and when transmitting a captured image file, the electronic cameras A101 and B102 transmit the image file paired with the user identification information detected by the user identification means 83 and 84 (fingerprint pattern characteristics information, iris pattern characteristics information, facial image pattern characteristics information, etc.) to the gateway server 160. The gateway server 160 compares the received user identification information with user identification information contained in the personal identification data that is stored in advance to identify the user. Meanwhile, the image server 181 has an album prepared that corresponds to the personal identification data, and the gateway server 160 transmits and stores received image files in the album on the image server corresponding to the personal identification data of the identified user. The gateway server 160 can also create a new album on the image server corresponding to the personal identification data of the identified user. Furthermore, when downloading image files from the image server 181, electronic cameras A101 and B102 transmit image identification information and user identification information to the gateway server 160, the gateway server 160 identifies the users based on the received user identification information, and transmits the personal identification data corresponding to the user along with the image identification information to the image server 181. The image server 181 reads image files corresponding to the received image identification information from the album corresponding to the received personal identification data, and transmits those image files via the gateway server 160 to the electronic cameras A101 and B102.

Doing this makes it possible to automatically perform user identification at the electronic camera, which eliminates the effort of inputting passwords for individual identification and resolves the problems of forgotten passwords and password theft.

The means of personal identification described above in FIG. 159 and FIG. 160 (password input means, UIM card, fingerprint detection or other user identification means) can also be provided on the portable telephone side, if the gateway server is connected to from the electronic camera via the portable telephone. In FIG. 161, when connecting from the electronic camera to the gateway server via the portable telephone, image data transmission and storage are managed based on the telephone number of the portable telephone. In FIG. 161, when transmitting a captured image file, the electronic cameras A101 and B102 connect to the portable telephone 121 (telephone number A) and transmit the image file to the portable telephone 121. The portable telephone 121 transmits the received image file paired with the telephone number to the gateway server 160. Meanwhile, the image server 181 has an album prepared corresponding to the telephone number of the portable telephone, and the gateway server 160 transmits and stores the received image file in an album on the image server 181 corresponding to the telephone number. The gateway server 160 can also create a new album on an image server corresponding to the telephone number. Furthermore, when downloading image files from the image server 181, the electronic cameras A101 and B102 send image identification information to the portable telephone 121, the portable telephone 121 transmits the telephone number and image identification information to the gateway server 160, and the gateway server 160 transmits the telephone number and image identification information to the image server 181. The image server 181 reads the image file corresponding to the received image identification information from the album corresponding to the received telephone number, and transmits that image file to the electronic cameras A101 and B102 via the gateway server 160 and the portable telephone 121.

Doing this allows the user to store image files separated on a per individual basis in a per-individual album on an image server or read image files from one's own exclusive album on an image server by performing image transmission and reception using his portable telephone, even when using multiple electronic cameras or when multiple persons use the same electronic camera.

Furthermore, by combining the electronic camera's camera identification information with multiple personal identification means, the user identification precision can be increased and a higher level of image information security can be attained.

As described above, in the image transmission system, image relay apparatus and electronic image device according to the present invention, the image relay apparatus views multiple electronic image devices as one electronic image device based on the individual identification information of the electronic image devices, and stores image data transmitted from the electronic image devices in a single album on an image server, which makes it possible to store image data transmitted by a single user using multiple electronic image devices in a single album on an image server, without the user having to perform bothersome procedures, as well as allowing the user to browse the image data stored in the album using multiple electronic image devices, without the user having to perform bothersome procedures.

Moreover, in the image transmission system, image relay apparatus and electronic image device according to the present invention, the image relay apparatus automatically establishes the identity of the user of the electronic camera based on a password or the user's personal information or the like and allows access (storage, browsing) from the electronic image device to the album on the image server corresponding to the identification results, so even if multiple users share a single electronic image device, it is possible to store captured image data in separate albums for each user without bothersome procedures, and to prohibit browsing of image data captured by other users without bothersome procedures.

FIG. 162 is a conceptual drawing of an image data transmission system applying the present invention. First, the case of transmitting image data from the electronic camera 100 to the image servers 181 through 184 will be described. The electronic camera 100 generates image data through capture operations. When transmitting the image data to external image servers 181 through 184, the electronic camera 100 connects to a portable telephone 120. The connection between the electronic camera 100 and the portable telephone 120 is made by means of a short-range communication link 110 (e.g., Bluetooth protocol based short-range wireless communication, short-range wired communication based on a cable connection-specific protocol, IEEE 802.11 protocol based wireless LAN communication, short-range infrared communication using the IrDA protocol, etc.). The electronic camera 100 selects the image data to transmit, displays the image data on the screen 21 and transmits it to the portable telephone 120. Since the electronic camera 100 and the portable telephone 120 are used by the user simultaneously, it suffices for the local wireless communication range to be on the order of several meters, which allows the power load on the electronic camera 100 and portable telephone 120 due to short-range wireless communication to be reduced.

The portable telephone 120 is provided with a short-range communication function for communicating with the aforementioned electronic camera 100 and a long-range communication function using a wireless portable telephone link 130, whereby the long-range communication function using the wireless portable telephone link 130 allows both conventional talk functions and packet communication protocol based digital data communication functions to be executed. The portable telephone 120 temporarily stores image data received from the electronic camera 100 via the short-range communication link 10 in an internal memory. Next, the portable telephone 120 sends the stored image data using a packet communication protocol via the wireless portable telephone link 130 to a base station 140. While transmitting image data to the base station 140, the portable telephone 120 displays the image data being transmitted on a screen 221.

The base station 140 transmits the image data, received from the portable telephone 120 using a packet communication protocol via the wireless portable telephone link 130, to a gateway server 160 via a packet communication network 150 using a packet communication protocol. The gateway server 160 stores the image data received from the base station 140 using a packet communication protocol via the packet communication network 150 for a time in an internal memory, and transmits the stored image data at specific intervals using Internet protocol via the Internet 170 to image servers 181 through 184. The gateway server 160 keeps thumbnail image data (scaled-down image data obtained by compressing and reducing the data volume of the original image data) corresponding to the image data transmitted to the image servers in an internal memory. Image servers 181 through 184 store the image data received using Internet protocol via the Internet 170 in a high capacity memory.

When transmitting image data from the electronic camera 100 to an image server, there is no need to perform the transmission with awareness of the complicated connection and communication procedures for accessing the image server on the electronic camera 100 side; rather, on the electronic camera 100 side, it suffices to append fixed address information for specifying the gateway server 160 and camera identification information for identifying the electronic camera 100 to the image data to be transmitted, and pass it on to the portable telephone 120. The portable telephone 120 transmits the image data and camera identification information by packet communication to the designated gateway server 160 based on the received gateway server address information. The gateway server 160 manages the image data according to the camera identification information received via packet communication, and transmits the image data to a suitable image server among multiple image servers 181 through 184 on the Internet 170 using Internet protocol. The multiple image servers 181 through 184 are treated as a single virtual image server 180 from the viewpoint of the electronic camera, and the complicated procedures for accessing each image server on the Internet 170 are all performed by the gateway server 150.

Next, the case where the electronic camera 100 receives image data from the virtual image server 180 will be described. First, the electronic camera 100 is connected to the portable telephone 120 by means of the short-range communication link 110. The electronic camera 100 transmits a browse data request, camera identification information and gateway server 160 address information to the portable telephone 120. Next, the portable telephone 120 transmits the browse data request and camera identification information via the base station 140 using packet communication protocol to the designated gateway server 160 based on the received gateway server 160 address information. Upon receiving the browse data request and camera identification information, the gateway server 160 transmits the thumbnail image data (browse data) for the image data corresponding to the camera identification information stored on the virtual server 180 via the base station 140 using packet communication protocol to the portable telephone 120 that transmitted the browse data request. The portable telephone 120 transmits the received browse data over the short-range communication link 110 to the electronic camera 100.

The electronic camera 100 displays the received browse data (thumbnail image data) on the screen 21, from that the desired image is selected. The electronic camera 100 transmits a request for the selected image data along with image identification information (image file name, etc.) for the image data, camera identification information and gateway server 160 address information over the short-range communication link 110 to the portable telephone 120. Next, the portable telephone 120, based on the received gateway server 160 address information, transmits the image data request, image identification information and camera identification information via the base station 140 using packet communication protocol to the designated gateway server 160. Upon receiving the image data request, image identification information and camera identification information, the gateway server 160 specifies the image data stored on the virtual server 180 according to the camera identification information and image identification information, and transmits the image data request and image identification information using Internet protocol to the image server 181 through 184 on the Internet 170 that is storing the image data in question.

The image server, which receives the image data request and image identification information, transmits the image data corresponding to the image identification information using Internet protocol to the gateway server 160. Upon receiving the image data, the gateway server 160 transmits that image data via the base station 140 using packet communication protocol to the portable telephone 120 that transmitted the image data request. The gateway server 160 temporarily stores the image data received from the image server in an internal memory. The portable telephone 120 transmits the received image data over the short-range communication link 110 to the electronic camera 100. The electronic camera 100 displays the received image data on the screen 21.

The gateway server 160 can also be connected to from a user's personal computer 190 via the Internet 170, and the user can read and use image data from the virtual server 180 via the gateway server 160 on a personal computer 190, and can modify the settings of the gateway server 160.

FIG. 163 and FIG. 164 are an external view (front view and rear view) of an embodiment of the electronic camera 100 used in an image data transmission system applying the present invention. As shown in FIG. 163, a photographic lens 10 for forming a subject image, a finder 11 for confirming the frame, a strobe 12 for illuminating the subject when a photograph is taken, a photometric circuit 13 for detecting the brightness of the subject, and a grip 14 extending from the camera housing for making it easier for the user hold the electronic camera 100 in his or her hands are provided at the front of the electronic camera 100, and a release button 16 and a power switch 17 for turning the power supply to the electronic camera 100 on and off are provided at the top.

As shown in FIG. 164, the eyepiece of the finder 11, a left LCD (left screen) 21 comprising a substantially rectangular screen for text and image display, and a right LCD (right screen) 22 comprising a substantially rectangular screen for text and image display are arranged at the rear of the electronic camera 100; an UP button 23, a DOWN button 24, LEFT button 25, RIGHT button 26 and SELECT button 27, used for image manipulation and the like, are arranged below the right LCD 22, and a capture mode button 28 for putting the electronic camera 100 into capture mode, a playback mode button 29 for putting the electronic camera 100 into playback mode, a transmit button 31 for controlling image data transmission, and a receive button 32 for controlling image data reception are arranged below the left LCD 21. A memory card slot 30 for installing a memory card 77 used for storing image data is provided at the side.

The release button 16, UP button 23, DOWN button 24, LEFT button 25, RIGHT button 26, SELECT button 27, capture mode button 28, playback mode button 29, transmit button 31 and receive button 32 are all control keys operated by the user.

A so-called touch screen 66, equipped with a function of outputting contact position data corresponding to the position indicated by a finger touch operation is arranged over the left LCD 21 and the right LCD 22, which touch screen can be used for selection of image data and options displayed on the screen. This touch screen 66 is made of a transparent material such as glass or resin, allowing the user to view the image or text formed on the inside of the touch screen 66 through the touch screen 66.

FIG. 165 is a block diagram showing an example of the internal electrical configuration of the electronic camera 100 shown in FIGS. 163 and 164, whereby the constitutive elements are connected to each other via a data/control bus 51 for transmitting various types of informational data and control data. The various constitutive elements can be roughly divided into a block centered on the capture control circuit 60 that executes image data capture operations, a block of the memory card 77 that stores and saves image files, a block centered on the screen control circuit 92 that executes the display of image data and associated information, and a block centered on the CPU 50, which performs overall control of the user interface such as the control keys 65 and of the various control circuits.

The CPU 50 (central processing unit) is the means that controls the entire electronic camera 100, issuing various instructions to the capture control circuit 60, screen control circuit 92 and power control circuit 64 in accordance with input information from the control keys 65, touch screen 66, power switch 17, timer 74 and photometric circuit 13. The photometric circuit 13 measures the brightness of the subject and outputs the photometric data that is the result of this measurement to the CPU 50. The CPU 50 sets the exposure time and sensitivity of the CCD 55 according to the photometric data by means of a CCD drive circuit 56, and controls the value of the diaphragm 53 by means of a diaphragm control circuit 54 via the capture control circuit 60 in accordance with the data of those settings.

In capture mode, the CPU 50 controls the capture operation via the capture control circuit 60 in accordance the manipulation of the release button 16. Furthermore, if the subject is dark based on the photometric data, the CPU 50 causes the strobe 12 to emit light via the strobe drive circuit 73 when taking a picture. The timer 74 has a built-in clock circuit and finds the date and time information corresponding to the current date and time and provides the capture date and time information to the CPU 50 when a picture is taken. The CPU 50 appends the capture date and time information to the image data and stores it in the memory card 77. The CPU 50 controls the various units according to a control program stored in ROM 67 (read-only memory). The EEPROM 68 (electrically erasable programmable ROM) is a non-volatile memory that stores settings information, etc. required for the operation of the electronic camera 100. The RAM 70 is a volatile memory that is used as a temporary working area of the CPU 50. The CPU 50 detects the manipulation state of the power switch 17 and controls the power supply 63 via a power supply control circuit 64.

The capture control circuit 60 performs focusing and zooming of the photographic lens 10 by means of a lens drive circuit 52, controls the exposure of the CCD 55 by controlling the diaphragm 53 by means of the diaphragm control circuit 54, and controls the operation of the CCD 55 by means of a CCD drive circuit 56. Light beams from the subject are formed by the photographic lens 10 into a subject image over the CCD 55 after passing through the diaphragm 53 to adjust the amount of light, and this subject image is picked up by the CCD 55. The CCD 55 (charge coupled device), which comprises a plurality of pixels, is a charge accumulation type image sensor used for picking up a subject image, and outputs electrical image signals corresponding to the strength of the subject image formed on the CCD 55 to an analog processing unit 57 in accordance with drive pulses provided by the CCD drive circuit 56.

The analog processing unit 57 samples the image signal, which has undergone photoelectric conversion by the CCD 55, with a specific timing, and amplifies the sampled signal to a specific level. An A/D conversion circuit 58 (analog/digital conversion circuit) digitizes the image signal sampled by the analog processing unit 57, thereby converting it to digital data, which is temporarily stored in capture buffer memory 59.

In capture mode, the capture control circuit 60 repeats the operation described above, while the screen control circuit 92 repeats the through-image display operation of reading out the digital data stored successively in the capture buffer memory 59 via the data/control bus 51, loading it once into the frame memory 69, converting the digital data into image data for display, loading it again into the frame memory 69, and displaying the image data for display on the left screen 21. Furthermore, the screen control circuit 92 obtains text display information from the CPU 50 as required, converts it to text data for display and stores it in the frame memory 69, and displays the text data for display on the left screen 21 and right screen 22. In this way, in capture mode, the image picked up by the CCD 50 is displayed in real time on the left screen 21, making it possible to use this through-image as a monitor screen to make the composition settings for taking a picture. The capture control circuit 60 analyzes the extent of the high frequency component of the digital data stored in the capture buffer memory 59 and detects the state of focus adjustment of the photographic lens 10, and performs focus adjustment of the photographic lens 10 by means of the lens drive circuit 52 in accordance with the detection results.

At the time of release, upon receiving a capture instruction from the CPU 50, the capture control circuit 60 causes the subject image to be picked up by the CCD 55 via the CCD drive circuit 56, passes the image signal generated by the image pickup through the analog processing unit 57 and A/D conversion circuit 58 and temporarily stores it as digital data (raw data) in the capture buffer memory 59. The capture control circuit 60 converts or compresses the digital data stored temporarily in the capture buffer memory 59 into a specific recording format (JPEG, etc.) to form the image data, and stores the image data on the memory card 77.

A GPS circuit 61 (global positioning system circuit) detects the location information (longitude data and latitude data) for the electronic camera 100 using information from multiple satellites orbiting around the earth, and provides the capture location information to the CPU 50 at the time of image capture. The CPU 50 appends the capture location information to the image data and stores it in the memory card 77.

The CPU 50 can transmit the image data stored in the memory card 77 to the outside via the short-range wireless communication circuit 72 and the antenna 76, or conversely store image data received from the outside via the short-range wireless communication circuit 72 and the antenna 76 in the memory card 77 and display it on the left screen 21, as required.

In playback mode, the screen control circuit 92 reads out the image data indicated by the CPU 50 from the memory card 77 and places it temporarily into the frame memory 69, displays the image data on the left screen 21, and, following the instructions of the CPU 50, places text data such as playback mode instructions into the frame memory 69 and displays the text data on the right screen 22.

Moreover, in playback mode, manipulating the transmit button 31 causes the image data being played back and displayed on the left screen 21 to be transmitted to the outside via the short-range wireless communication circuit 72 and antenna 76, and manipulating the receive button 32 causes image data to be received from the outside via the short-range wireless communication circuit 72 and antenna 76 and played back and displayed on the left screen 21.

FIG. 166 shows the data configuration of image files stored in the memory card 77. As shown in FIG. 166, multiple image files are stored in the memory card 77. Each image file is made up of image data and appended informational data. The appended informational data consists of capture data that indicates the various settings at the time of image capture, capture date and time data, and capture location data. FIG. 167 is a drawing that shows the configuration of information stored in the EEPROM 68, which consists of camera identification information for identifying the individual electronic camera 100 and gateway server access information used by the portable telephone 120 to access the gateway server 160.

FIG. 168 is an external view of the portable telephone 120, which is provided with a display screen 221 for displaying image data, various control keys 265, a microphone 280 and a speaker 281. FIG. 169 is a block diagram showing an example of the internal electrical configuration of the portable telephone 120 shown in FIG. 168, wherein the various elements are connected to each other via a data/control bus 251 for transmitting various types of informational data and control data. The CPU 250 (central processing unit) is the means that performs overall control of the entire portable telephone 120, issuing various instructions to the screen control circuit 292 and power supply control circuit 264 in accordance with input information from the control keys 265, power switch 217 and timer 274.

The CPU 250 controls the various units in accordance with a control program stored in ROM 267 (read-only memory). The EEPROM 268 (electrically erasable programmable ROM) is a non-volatile memory that is used for storage of settings information necessary for the operation of the portable telephone 120 and for temporary storage of image data. The RAM 270 is a volatile memory that is used as a temporary working area of the CPU 250. The UIM card (User Identity Module) 277 is a portable storage medium that can be installed in and removed from the portable telephone 120 and that stores personal information of the user of the portable telephone 120 and the like, which personal information can be used by the CPU 250 as required. The CPU 250 detects the state of manipulation of the power switch 217, and controls the power supply 263 via the power supply control circuit 264.

The CPU 250 performs processing of outgoing and incoming telephone calls using the wireless portable telephone circuit 271 and antenna 275, and performs voice call processing using the microphone 280 and speaker 281. Furthermore, the CPU 250 performs exchange of digital data with the outside by means of packet communication protocol using the wireless portable telephone circuit 271 and antenna 275. Moreover, the CPU 250 performs exchange of messages with electronic devices having a short-range wireless communication capability that are in the vicinity of the portable telephone 120 via the short-range wireless communication circuit 272 and the antenna 276, and is able to exchange image information and the like. The CPU 250 reads and loads image data stored temporarily in EEPROM 268 into frame memory 269, and displays the image data on the display screen 221 using the screen control circuit 92.

FIG. 170 is a block diagram showing the internal configuration of the gateway server 160, wherein a communication means 371 connected to a packet communication network, a communication means 372 connected to the Internet, a memory means 368 that stores information such as image data, and a timer means 374 are connected to a control/processing means 350 that performs overall control of the various elements of the gateway server 160. The gateway server 160 exchanges information such as image data with the portable telephone 120 using a packet communication protocol via the communication means 371, and exchanges information such as image data with image servers using Internet protocol via the communication means 372.

Various types of information are held in the memory means 368, as shown in FIG. 171. The camera identification information link data, as shown in FIG. 172, is data that indicates the correspondence relations of individual items of camera identification information, whereby the arrow indicates that the camera identification information on the right is the parent of the camera identification information on the left. It also represents whether a given item of camera identification information is parent camera identification information, or is single (no link) or is unused, etc. Namely, the gateway server 160 refers to this camera identification information link data, searches for parent camera identification information based on the received camera identification information, and if parent camera identification information exists, performs processing, which is described below, in accordance with the parent camera identification information. Performing such processing makes it possible to treat image data captured with different electronic cameras as image data captured with a single electronic camera. This camera identification information link data can be modified if necessary from an external personal computer 190 or the like, connected to the gateway server 160.

In the memory means 368, as shown in FIG. 171, a folder corresponding to each item of camera identification information is prepared, and each folder corresponding to an item of camera identification information holds personal identification data, image server management data, transfer history data, thumbnail image data and image file data. FIG. 173 is a drawing that shows the configuration of personal identification data, which comprises data relating to the user of the electronic camera 100 corresponding to the camera identification information; the personal identification data can be used by the gateway server 160 to register with image servers on the Internet to secure a new storage area for storing image data or when reading/writing image data to and from image servers. This personal identification data can be modified as necessary from an external personal computer 190, etc., connected to the gateway server 160, and may optionally be made modifiable by transmission of information stored on the UIM card 277 installed in the portable telephone 120 from the portable telephone 120 to the gateway server 160.

FIG. 174 is a drawing showing the configuration of server management data, which consists of identifying names of image servers on that the gateway server 160 stores image data according to the camera identification information, the URL (Uniform Resource Locator) of each image server, the total data capacity provided on each image server according to the camera identification information, the available capacity out of the total data capacity provided on each image server according to the camera identification information, and list information on the image data stored on each image server based on the camera identification information (image file identification information or image file names), etc.

FIG. 175 is a drawing that shows the configuration of the transfer history data, which consists of list information on image data stored on the virtual image server 180 according to the camera identification information (image file identification information or image file names), information on the date and time of transfer of each item of image data to the image server, information relating to the image server to that image data is transferred, etc.

FIG. 176 is a block diagram showing the internal configuration of image servers 181 through 184, wherein a communication means 471 connected to the Internet and a memory means 468 that stores information such as image data are connected to the control/processing means 450 that performs overall control of the individual elements of image servers 181 through 184. Image servers 181 through 184 exchange information such as image data with the gateway server 160 via the communication means 471 using Internet protocol. In the memory means 468, a folder corresponding to each item of camera identification information is prepared, as shown in FIG. 177, and image file data is stored in the folders corresponding to each item of camera identification information.

FIG. 178 is a state transition diagram for an embodiment of the electronic camera 100 according to the present invention. When power is turned on, the camera enters capture mode, and manipulating the release button 16 causes the camera to perform a capture operation and a post-capture image file creation and loading of the image file into the memory card 77. In playback mode, it performs playback and display operations on the image data stored in the memory card 77. In capture mode, if the automatic transmission function is turned on, an image transfer operation is performed, whereby captured image data is automatically transmitted and stored on an image server. Furthermore, in playback mode, manipulating the transmit button 31 causes an image transmission operation to be performed, whereby the image data displayed on the left screen 21 is transmitted and stored on an image server. Moreover, manipulating the receive button 32 in playback mode causes an image reception operation to be performed, whereby the desired image data is received from the image server and displayed on the left screen 21. Furthermore, manipulating the capture mode button 28 causes a transition from playback mode to capture mode, and manipulating the playback mode button 29 causes a transition from capture mode to playback mode.

FIG. 179 is a main flow chart of the operation of the electronic camera 100 (CPU 50) in the mode of embodiment described above. First, in S10, the power supply is turned on by manipulating the power switch 17, and in S20, the capture mode subroutine is executed, leading to a capture enabled state. If the release button 16 is manipulated while in capture mode, the release interrupt handling subroutine is executed in S30, and the capture operation is carried out. If the playback mode button 29 is manipulated while in capture mode, a mode switch interrupt handling subroutine is executed in S40, the playback mode subroutine is executed in S50, and image data stored in the memory card 77 is played back and displayed on the left screen 21. Conversely, if the capture mode button 28 is manipulated while in playback mode, a mode switch interrupt handling subroutine is executed in S40, and the system moves to the capture mode subroutine of S20. If the automatic transmission function is turned on, manipulating the release button 16 causes the communication interrupt processing of S60 to be executed following the capture operation, and transmission of image data to the image server is carried out. Furthermore, manipulating the transmit button 31 or the receive button 32 while in playback mode causes the communication interrupt processing of S60 to be executed, and transmission of image data to the image server or reception of image data from the image server is carried out.

FIG. 180 is a detailed flow chart of the capture mode subroutine. Starting in S20, the processing of S201 is repeated. In S201, image data successively generated by the CCD 55 under the camera settings made by the user is displayed on the left screen 21 as shown in FIG. 181, at that time the capture settings are displayed as text on the right screen 22.

FIG. 182 is a detailed flow chart of the release interrupt handling subroutine. Starting in S30, it is checked in S301 whether the system is in capture mode, and if it is not in capture mode, the system returns in S308. If it is in capture mode, the capture operation is carried out under the capture conditions set by the user or the camera to generate image data, and appended informational data (capture data, time data, location data) is appended to the image data in S303 to generate an image file. In S304, it is checked whether the automatic transmit function is turned on, and if it is not turned on, the image file is loaded into the memory card 77 in S305 and the system returns in S308. If the automatic transmit function is turned on, communication with the portable telephone 120 is attempted using the short-range wireless communication circuit 72 in S306, checking whether communication is possible, and if communication with the portable telephone 120 is possible, the portable telephone image file transmission subroutine of S70 is executed, transmitting the image file to the portable telephone 120, and the system returns in S308. If communication with the portable telephone 120 is not possible, the system goes back to S305, stores the image file on the memory card 77, and returns in S308.

FIG. 183 is a detailed flow chart of the portable telephone image file transmission subroutine. Starting in S70, the image file, camera identification information, gateway server access information and an image transmission request are transmitted to the portable telephone 120 by means of the short-range wireless communication circuit 72 using a short-range wireless communication protocol (Bluetooth, etc.) in S701, and the system returns in S702.

FIG. 184 is a detailed flow chart of the mode switch interrupt handling subroutine. Starting in S40 upon manipulation of the capture mode button 28 or playback mode button 29, it is checked in S401 whether the manipulated button was the capture mode button 28, and if it was the capture mode button 28, playback mode is terminated and the system moves to the capture mode subroutine of S20. If the manipulated button was not the capture mode button 28, the capture mode is terminated and the system moves to the playback mode subroutine of S50.

FIG. 185 is detailed flow chart of the playback mode subroutine. Starting in S50, the processing of S501 is repeated. In S501, in response to the manipulation of the LEFT button 25 and RIGHT button 26, image data stored in the memory card 77 is selected and read, and is played back and displayed on the left screen 21 as shown in FIG. 186, while operating instructions are displayed on the right screen 22. Immediately after power is turned on, the most recent image data is displayed; subsequently, image data with older time data are displayed successively in response to manipulation of the LEFT button 25, and image data with newer time data are displayed successively in response to manipulation of the RIGHT button 26.

FIG. 187 is a detailed flow chart of the communication interrupt handling subroutine started by manipulating the transmit button 31 or receive button 32. Starting in S60, it is checked in S601 whether the manipulated button was the transmit button 31, and if was the transmit button 31, it is checked in S602 whether the system is in capture mode, and if it is in capture mode, the current setting of the automatic transmit function is inverted in S603, and the system returns in S613. If the system was in playback mode in S602, communication with the portable telephone 120 using the short-range wireless communication circuit 72 is attempted in S604, checking whether communication is possible, and if communication with portable telephone 120 is possible, the portable telephone image file transmission subroutine of S70 is executed, transmitting the image file of the image data currently displayed on the left screen 21 to the portable telephone 120, and the system returns in S613. If communication with the portable telephone 120 is not possible, the system returns in S613.

If the button manipulated in S601 was the receive button 32, it is checked in S605 whether the system is in capture mode, and if it is in capture mode, the system returns in S613. If it is in playback mode, communication with the portable telephone 120 using the short-range wireless communication circuit 72 is attempted in S606, checking whether communication is possible, and if communication with the portable telephone 120 is not possible, the system returns in S613. If communication with portable telephone 120 is possible, in S607, the camera identification information, gateway server access information and a thumbnail image reception request are transmitted to the portable telephone 120 by means of the short-range wireless communication circuit 72 using a short-range wireless communication protocol (Bluetooth, etc.). In S608, the system waits to receive thumbnail images form the portable telephone 120 and returns in S613 if reception was not possible. If thumbnail images were received, in S609, as shown in FIG. 188, the received thumbnail images are displayed on the left screen 21, while operating instructions are displayed on the right screen 22. The thumbnail images are scrolled by manipulating the UP button 23 and DOWN button 24, and either the left or, right thumbnail image is selected by manipulating the LEFT button 25 or RIGHT button 26. Manipulating the SELECT button 27 confirms the selected thumbnail image. In S610, the image identification information appended to the selected thumbnail image, the camera identification information, gateway server access information and an image reception request are transmitted to the portable telephone 120 by means of the short-range wireless communication circuit 72 using a short-range wireless communication protocol (Bluetooth, etc.). In S611, the system waits to receive image data from the portable telephone 120 and returns in S613 if reception was not possible. If image data was received, in S612, as shown in FIG. 145, the received image data is displayed on the left screen 21 while operating instructions are displayed on the right screen 22, and the system returns in S613.

Next, operation of the portable telephone 120 (CPU 250) in the above mode of embodiment will be described. Description of the operation of the portable telephone 120 relating to talk functions will be omitted as it has little bearing on the present invention. FIG. 190 is a detailed flow chart of the communication interrupt handling started when the portable telephone 120 performs image transmission. Communication interrupt handling is started in A60 when a communication request is received via short-range wireless communication from the electronic camera 100, it is checked in A601 whether the system is currently processing a voice call, and if it is processing a voice call, the system returns in A613 without responding to the communication request from the electronic camera 100. If a voice call is not being processed, voice call processing is blocked in A602, it is checked in A603 whether the request from the electronic camera 100 is an image file transmission request, and if it was an image file transmission request, in A604, communication is attempted with the gateway server 160 using the wireless portable telephone circuit 271 based on the gateway server access information, checking whether communication is possible, and if communication with the gateway server 160 is possible, the gateway image file transmission subroutine of A70 is executed, the image file received from the electronic camera 100 is transmitted to the gateway server 160, voice call processing is unblocked in A613, and the system returns. If communication with the gateway server 160 is not possible, in A605, the image file, camera identification information, gateway server access information, etc. received from the electronic camera 100, are stored temporarily in EEPROM 268, and the system unlocks voice call processing and returns in A613.

If the request from the electronic camera 100 in A603 was not an image file transfer request, in A606, communication with the gateway server 160 is attempted using the wireless portable telephone circuit 271 based on the gateway server access information, checking if communication is possible, and if communication with the gateway server 160 is not possible, the system unblocks voice call processing in A613 and returns. If communication with the gateway server 160 is possible, it is checked in A607 whether the request from the electronic camera 100 is a thumbnail image reception request, and if it was a thumbnail image reception request, in A608, a thumbnail image reception request and camera identification information are transmitted to the gateway server 160 by means of the wireless portable telephone circuit 271 using a packet communication protocol. In A609, the thumbnail images are received from the gateway server 160 and are transmitted to the electronic camera 100 by means of the short-range wireless communication circuit 272 using a short-range wireless communication protocol. While transmitting thumbnail images to the electronic camera 100, the thumbnail images are displayed on the screen 221. Once transmission of thumbnail images to the electronic camera 100 is completed, the system unblocks voice call processing and returns in A613.

If the request from the electronic camera 100 in A607 was not a thumbnail image reception request, in A610 it is checked whether the request from the electronic camera 100 is a selected image reception request, and if it was not an image reception request, the system unblocks voice call processing and returns in A613. If it was an image reception request, in A611, an image reception request, image identification information and camera identification information are transmitted to the gateway server 160 by means of the wireless portable telephone circuit 271 using a packet communication protocol. In A612, image data corresponding to the image identification information is received from the gateway server 160, and is transmitted to the electronic camera 100 by means of the short-range wireless communication circuit 272 using a short-range wireless communication protocol. During transmission of images to the electronic camera 100, the image data is displayed on the screen 221, as shown in FIG. 193. Once transmission of image data to the electronic camera 100 is completed, display of image data on the screen 221 is terminated, and the system unblocks voice call processing and returns in A613. To more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

FIG. 191 is a detailed flow chart of the gateway image file transmission subroutine. Starting in A70, in A701 the image file, camera identification information and an image transmission request are transmitted by packet communication protocol using the wireless portable telephone circuit 271 to the gateway server 160 designated based on the gateway access information, and the system returns in A702. While an image file is being transmitted to the gateway server 160, the image data being transmitted is displayed on the screen 221, as shown in FIG. 192, and the display is terminated once transmission is completed. Furthermore, to more effectively alert the user of the fact that image data is being transmitted, a different display mode from normal image data display may be used, for instance periodic flashing (repeated display and non-display) of the image data displayed on the screen 221. Here, normal display mode refers to the display mode whereby image data is statically displayed.

FIG. 194 is a detailed flow chart of the timer interrupt handling started at regular intervals by the timer 274 of the portable telephone 120. Starting in A80, it is checked in A801 whether the system is currently processing a voice call, and if it is currently processing a voice call, the system returns in A805. If it is not processing a voice call, voice call processing is blocked in A802, it is checked in A803 whether there are image files being temporarily stored in EEPROM 268, and if there are no image files being temporarily stored, the system unblocks voice call processing and returns in A805. If there are temporarily stored image files, communication with the gateway server 160 by means of the wireless portable telephone circuit 271 based on the gateway server access information is attempted in A804, checking whether communication is possible, and if communication with the gateway server 160 is not possible, the system unblocks voice call processing and returns in A805. If communication with the gateway server 160 is possible, the gateway image file transmission subroutine of A70 is executed, image files received from the electronic camera 100 are transmitted to the gateway server 160, and in A805, the system unblocks voice call processing and returns.

As indicated above, when communication with the gateway server 160 is not possible, the portable telephone 120 temporarily stores the image files received from the electronic camera 100, and when communication with the gateway server 160 becomes possible, it automatically transmits the temporarily stored image files to the gateway server 160. To notify the user of the fact that image files transmitted from the electronic camera 100 to the gateway server 160 are being temporarily stored by the portable telephone 120, one may optionally display a specific mark, icon or text on the screen 221 while image files are being temporarily stored by the portable telephone 120. By doing this, in a situation where the user is in a hurry to transmit the image files, the user will be able to see this display and perform image file transmission by a different method.

Furthermore, while the communication interrupt handling of FIG. 190 assumes that the connection between the electronic camera 100 and portable telephone 120 is maintained until communication is completed once the connection between the electronic camera 100 and portable telephone 120 has been established, in case the connection between the electronic camera 100 and the portable telephone 120 should be cut off (for example, if the portable telephone 120 becomes unable to transmit thumbnail images or image files received from the gateway server 160 to the electronic camera 100), one can have the thumbnail images and image files be stored temporarily in the EEPROM 268 of the portable telephone 120, have the portable telephone 120 detect when communication between the portable telephone 120 and electronic camera 100 becomes possible, and automatically transmit the thumbnail images or image files stored temporarily in EEPROM 268 to the electronic camera 100. The portable telephone 120 may optionally display the fact that that thumbnail images or image files transmitted to the electronic camera 100 from the gateway server 160 are being stored temporarily by the portable telephone 120 by displaying a special mark, icon or text on the screen 221 while the image files are being temporarily stored by the portable telephone 120. By doing this, in a situation where the user is in a hurry to transmit the image files, the user will be able to see this display, and take countermeasures such as rechecking the connection between the portable telephone 120 and electronic camera.

Next, the operation of the gateway server 160 (control/processing means 350) in the above mode of embodiment will be described. Description of operations of the gateway server 160 other than the image transmission operation will be omitted as they have little bearing on the present invention. FIG. 195 is a detailed flow chart of the communication interrupt handling started when the gateway server 160 performs image transmission. Starting in G60 with a communication request from the portable telephone 120 or personal computer 190, in G601, the parent camera identification information is identified by referring to the camera identification information link data based on the received camera identification information. Subsequent image data handling is performed on the folder corresponding to the parent camera identification information. In G602, it is checked whether the received request is an image file transmission request, and if it was an image file transmission request, in G603, the received image file is stored temporarily in an image buffer folder in the folder corresponding to the camera identification information, thumbnail image data corresponding to the image data is generated and stored in a thumbnail image folder, likewise in the folder corresponding to the camera identification information, and the system returns in G617.

If the request received in G602 was not an image file transmission request, it is checked in G604 whether the received request is a thumbnail image reception request, and if it was a thumbnail image reception request, in G605 the thumbnail images stored in the thumbnail image folder inside the folder corresponding to the camera identification information are transmitted by packet communication protocol to the originator of the thumbnail image reception request (portable telephone 120), and the system returns in G617. If the request received in G604 was not a thumbnail image reception request, it is checked in G606 whether the received request is an image reception request, and if it was an image reception request, it is checked in G607 whether image data corresponding to the image identification information exists in the image buffer folder inside the folder corresponding to the camera identification information, and if image data corresponding to the image identification information exists in the image buffer folder, the image file containing the image data is transmitted to the originator of the image reception request (portable telephone 120) using a packet communication protocol in G608, and the system returns in G617.

If there is no image data corresponding to the image identification information in the image buffer folder, the image server where the image file corresponding to the image identification information is stored is determined based on the transfer history data in G609, and an image reception request and the image identification information are transmitted to that image server using Internet protocol in G610. In G611, the system waits to receive the specified image file from the image server, returning in G617 if the image file could not be received from the image server; if the image file was received from the image server, the image file is transmitted to the originator of the image reception request (portable telephone 120) in G612 using a packet communication protocol, the image file is stored temporarily in the image buffer folder in the folder corresponding to the camera identification information, and the system returns in G617.

If the received request in G606 was not an image reception request, it is checked in G613 whether the received request is a data overwrite request, and if it was a data overwrite request, personal identification data in the folder corresponding to the camera identification information, camera identification information link data, etc., is overwritten according to the received data, and the system returns in G617. If the received request in 0613 was not a data overwrite request, it is checked in G615 whether the received request was a data read request, and if it was a data read request, the personal identification data in the folder corresponding to the camera identification information, camera identification information link data, etc., is read and transmitted to the requestor in accordance with the received data, and the system returns in G617. If the received request in G615 was not a data read request, the system returns in G617.

FIG. 196 is a detailed flow chart of the timer interrupt handling started at specific intervals by the timer means 374 of the gateway server 160. Starting in G80, the first item of camera identification information from the camera identification information list maintained by the gateway server 160 is selected in G801. In G802, it is checked based on the transfer history data whether there are image files that have not been transferred yet to the image server in the image buffer folder inside the folder corresponding to the selected camera identification information, and if there are no image files that have not been transferred yet, the system proceeds to G810. If there are image files that have not been transferred yet, it is checked in G803, based on image server management data, whether there is an image server with available capacity. In S804, if there is an image server with available capacity, the system proceeds to G806, and if there are no image servers with available capacity, a new image server with available capacity is searched for in G805. In G805, a search is carried out for open image servers on the Internet that are able to store image files, registration with the found image server is carried out automatically using camera identification information, and information on the image server (storage capacity, etc.) is recorded in the image server management data. In G806, an image server with available capacity is designated as the image server for storing images. In G807, image files that have not been transferred yet are transmitted using Internet protocol to the image server designated as the image server for storing images, the image server management data and transfer history data are updated, and all the image files stored temporarily in the image buffer folder are deleted. In G808, it is checked whether the currently selected camera identification information is the last item of camera identification information in the camera identification information list; if it is not the last item of camera identification information, in G809, the camera identification information is changed to the next item of camera identification information, the system goes back to G802 and repeats the processing described above, and if it is the last item of camera identification information, the system returns in G810.

Next, the operation of the image servers 181 through 184 (control/processing means 350) in the above mode of embodiment will be described. Description of operations of the image servers 181 through 184 other than the image transmission and storage operation will be omitted as they have little bearing on the present invention. FIG. 197 is a detailed flow chart of the communication interrupt handling started when a communication request is received by the image servers 181 through 184 from the gateway server 160. Starting in H60 upon receiving a communication request from the gateway server 160, it is checked in H601 whether the received request is an image server registration request, and if it was a registration request, it is checked in H602 whether a folder corresponding to the received camera identification information exists, and if it already exists, the system returns in H611. If no folder corresponding to the received camera identification information exists, in H603, a folder corresponding to the received camera identification information is created, and the system returns in H611.

If the request received in H601 is not an image server registration request, it is checked in H604 whether the received request is an image reception request (image read request), and if it was an image reception request, it is checked in H605 whether a folder corresponding to the received camera identification information exists, and if it does not exist, the system returns in H611. If a folder corresponding to the received camera identification information exists, it is checked in H606 whether an image file corresponding to the received image identification information exists in the folder, and if it does not exist, the system returns in H611. If an image file corresponding to the received image identification information exists, the image file in question is transmitted to the gateway server 160 using Internet protocol in H607, and the system returns in H611. If the received request in H604 is not an image reception request to the image server, it is checked in H608 whether the received request is an image transmission request (image write request), and if it was not an image transmission request, the system returns in H611. If it was an image transmission request, it is checked in H609 whether a folder corresponding to the received camera identification information exists, and if it does not exists, the system returns in H611. If a folder corresponding to the received camera identification information exists, the received image file is stored in the folder in H610, and the system returns in H611.

In the mode of embodiment described above (FIG. 162 through FIG. 197), while relaying image files received from the electronic camera 100 though the gateway server 160, the portable telephone 120 displays the image data being transmitted on the screen 221, as shown in FIG. 192, which allows the user to confirm based on the display of screen 221 that the image data he selected and transmitted is in fact being transmitted from the portable telephone 120 to the gateway server 160, and allows the user to confirm that transmission of image data from the portable telephone 120 to the gateway server 160 has been completed based on the fact that display of image data on the screen 221 has terminated. Furthermore, the fact that display of image data has started on the screen 221 of the portable telephone 120 allows one to confirm that transmission of image data from the electronic camera 100 to the portable telephone 120 has been completed, and one can accordingly start taking picture with the electronic camera 100.

In the above mode of embodiment (FIG. 162 through FIG. 197), while image files received from the gateway server 160 are being relayed to the electronic camera 100, the portable telephone 120 displays the image data being transmitted on the screen 221, as shown in FIG. 193, which allows the user to get an overview of the received image data based on the display of screen 221 before displaying and browsing the image data on the screen after transmission of the image data to the electronic camera 100 is completed, and allows the user to confirm that transmission of image data from the portable telephone 120 to the electronic camera 100 has been completed based on the fact that display of image data on the screen 221 has terminated.

In the above mode of embodiment (FIG. 162 through FIG. 197), if the portable telephone 120 was not able to relay image files received from the electronic camera 100 to the gateway server 160 (for example, when the portable telephone 120 is out of range of the wireless portable telephone link), those image files are stored temporarily in the EEPROM 268 of the portable telephone 120, and when transmission of image files to the gateway server 160 becomes possible, the image files stored temporarily in EEPROM 268 are automatically transmitted to the gateway server 160, so even if communication between the portable telephone 120 and the gateway server 160 is not possible, the user does not need to redo the image file transmission operation on the electronic camera 100 side, which makes it possible to avoid the risk of the user forgetting to retransmit, and allows the user to focus on taking pictures with the electronic camera 120 once image files have been transmitted from the electronic camera 100 to the portable telephone 120.

In the above mode of embodiment (FIG. 162 through FIG. 197), the gateway server 160 that relays image data between the electronic camera 100 and image servers 181 through 184 temporarily stores image data received from the electronic camera 100 or image servers 181 through 184 in the memory means 368 of the gateway server 160, and transmits the stored image data as necessary to the electronic camera 100 or image servers 181 through 184, thereby making it possible to reduce the communication traffic between the image servers 181 through 184 and gateway server 160 or between the electronic camera 100 and the gateway server 160.

In the above mode of embodiment (FIG. 162 through FIG. 197), the gateway server 160 that relays image data between the electronic camera 100 and image servers 181 through 184 stores the user's personal information in the memory means 368, and if there is no available capacity to store image data in the image server's album corresponding to the camera identification information, the gateway server connects to another image server on the Internet, automatically sets up an album (folder) corresponding to the camera identification information using the aforementioned personal information, transmits the image data received from the electronic camera 100 to the image server and causes it to be stored in the new album, thereby freeing the user from having to perform the complicated procedure of connecting to an image server and the bothersome procedure of setting up an album, which the user would otherwise have to carry out directly on the electronic camera 100 side.

In the above mode of embodiment (FIG. 162 through FIG. 197), the gateway server 160 that relays image data between the electronic camera 100 and image servers 181 through 184 keeps, in the memory means 368, server management information for unified management of albums (folders) set up corresponding to camera identification information on each of the image servers 181 through 184, and based on the server management information, performs generalized storage and management of image data stored in distributed fashion across multiple image servers 181 through 184 by combining it into one virtual album, thereby making it possible to exchange large volumes of image data between the virtual album and the electronic camera 100 by means of simple operations, without the user being aware of the multiple image servers 181 through 184 that actually store the image data on the Internet.

In the above mode of embodiment (FIG. 162 through FIG. 197), the gateway server 160 that relays image data between the electronic camera 100 and image servers 181 through 184 keeps, in the memory means 368, link information that represents the associations of camera identification information for individually identifying electronic cameras, views multiple electronic cameras as a single group based on the link information, and transmits and stores image data received from the electronic cameras in an album on an image server corresponding to the group to that those electronic cameras belong, thereby making it possible to store image data captured with multiple electronic cameras in a single album on the image server.

(Description of modified embodiments) The present invention is not limited to the mode of embodiment described above, and various modifications and changes are possible.

While in the above mode of embodiment (FIG. 162 through FIG. 197), transmission was carried out individually for reach image file relayed from the electronic camera 100 via the portable telephone 120 to the gateway server 160, it is also permissible to transmit multiple image files as a batch from the electronic camera 100 via the portable telephone 120 to the gateway server 160. In such cases as well, during transmission of image data from the portable telephone 120 to the gateway server 160, the portable telephone 120 displays the image data being transmitted on the screen 221. Doing this allows the user to check the progress of the processing of image file transmission from the portable telephone 120 to the gateway server 160 based on the image data being displayed. Furthermore, when multiple image files are transmitted in a batch from the electronic camera 100 via the portable telephone 120 to the gateway server 160 in this manner, first all the image files to be transmitted are transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160. Doing so makes it unnecessary to transmit appended informational data (camera identification information, gateway server access information, image transmission requests etc.) for each individual image file from the electronic camera 100 to the portable telephone 120, making it possible to shorten the transmission time for image files between the electronic camera 100 and portable telephone 120. When transmitting image files from the portable telephone 120 to the gateway server 160, this also makes it unnecessary to transmit appended informational data (camera identification information, image transmission requests, etc.) for each individual image file from the portable telephone 120 to the gateway server 160, making it possible to reduce the transmitted data volume passing through the wireless portable telephone link 130 and packet communication network 150 and to shorten the image file transmission time, as well as to reduce communication fees.

Furthermore, when transmitting multiple image files in a batch from the electronic camera 100 via the portable telephone 120 to the gateway server 160, if all the image files to be transmitted are first transmitted from the electronic camera 100 to the portable telephone 120 and are temporarily buffered in the EEPROM 268 of the portable telephone 120, and once transmission of image files from the electronic camera 100 to the portable telephone 120 is completed, the portable telephone 120 transmits the image files stored temporarily in EEPROM 268 to the gateway server 160, then if problems occur with the wireless portable telephone link 130 or packet communication network 150 during transmission of image files from the portable telephone 120 to the gateway server 160 and transmission of image files becomes impossible, the portable telephone 120 will leave the image files that it has not finished transmitting in the EEPROM 268, and will automatically transmit the image files remaining in EEPROM 268 to the gateway server 160 once transmission of image files to the gateway server 160 becomes possible. Doing so makes it unnecessary for the user to redo the image file transmission operation on the electronic camera 100 side from the beginning even if communication between the portable telephone 120 and gateway server 160 becomes impossible midway during image transmission, allowing the user to focus on taking pictures with the electronic camera 120 once image files have been transmitted from the electronic camera 100 to the portable telephone 120, as well as making it possible to reduce the transmitted data volume passing through the wireless portable telephone link 130 and the packet communication network 150 compared to if file transfer from the electronic camera 100 to the gateway server 160 were redone from the beginning, and allowing one to shorten the image file transmission time and to reduce communication charges.

While in the above mode of embodiment (FIG. 162 through FIG. 197), greater data communication efficiency of the image transmission system was achieved by having the gateway server 160 temporarily store image files transmitted between the electronic camera 100 and the image server in an image buffer folder and make use of the image files stored temporarily in the image buffer folder as necessary, and by storing thumbnail image data corresponding to the image files in a thumbnail image folder and making use of that thumbnail image data as necessary, it is also possible, as shown in FIG. 198, to provide the same sort of image buffer folder and thumbnail image folder in the EEPROM 268 of the portable telephone 120 and temporarily store thumbnail image data and image files transmitted between the electronic camera 100 and the image server in the image buffer folder and thumbnail image folder, and, when the image file or thumbnail image data requested by the electronic camera 100 is present in the image buffer folder or thumbnail image folder, to have the portable telephone 120 transmit those image files and thumbnail image data to the electronic camera 100. In such cases, the image files or thumbnail image data stored temporarily in the image buffer folder and thumbnail image folder in the EEPROM 268 may be cleared periodically in their entirety, or the image files and thumbnail image data may be deleted in the order of their age according to the storage start date and time data of the image file or thumbnail image data, so as to keep the total data volume of the temporarily stored image files and thumbnail image data at or below a specific volume. Alternatively, image files kept for more than a specific period of time may be deleted based on the storage start date and time data of the image files or thumbnail image data, or else stored image files or thumbnail image data may be deleted at specific clock times.

If this is done, then when the user wishes to reconfirm the image data most recently transmitted or received via the portable telephone 120, it will be possible to display a summary of the status of temporarily stored images on the screen 221 of the portable telephone 120, as shown in FIG. 199, and to transmit the image files or corresponding thumbnail image data temporarily stored in the portable telephone 120 from the portable telephone 120 to the electronic camera 100 and make use of them, thereby making it unnecessary to make inquiries via the portable telephone 120 to the gateway server 160 regarding the image files or thumbnail image data and making it possible to quickly read image files or thumbnail image data into the electronic camera 100, as well as allowing the communication data volume between the portable telephone 120 and gateway server 160 to be reduced and correspondingly reduce the communication line usage fees.

While in the above mode of embodiment (FIG. 162 through FIG. 197), the electronic camera 100 transmits image data via a single portable telephone 120 to a single gateway server 160, it is also permissible to have the electronic camera 100 transmit image data via a single portable telephone 120 to multiple gateway servers. In such an image transmission system, the portable telephone 120 can store image files transmitted from the electronic camera 100 in EEPROM 268 under predetermined conditions (for a specific period of time from the start of storage, etc.) and transmit the stored image files to multiple gateway servers based on instructions from the electronic camera 100. When the electronic camera 100 transmits image files to multiple gateway servers, doing this will make it unnecessary to transmit image files from the electronic camera 100 to the portable telephone 120 every time an image file is to be transmitted, allowing the transmission of image files to the gateway servers to be carried out more quickly. For example, if an image file was transmitted from the electronic camera 100 to one gateway server and the user then wants to transmit the same image file to a different gateway server, the image identification information of the image file and the destination gateway server access information are sent from the electronic camera 100 to the portable telephone 120, whereupon, if an image file corresponding to the received image identification information is present in the EEPROM 268, the portable telephone 120 reads that image file from the EEPROM 268 and transmits it to the gateway server corresponding to the received gateway server access information. If no image file corresponding to the received image identification information is present in the EEPROM 268, the portable telephone 120 informs the electronic camera 100 that no image file corresponding to the received image identification information is present in the portable telephone 120, in response to that the electronic camera transmits the image file to the portable telephone 120.

While in the above mode of embodiment (FIG. 162 through FIG. 197), the portable telephone 120 performs relaying of image data in the transmission of image data between the electronic camera 100 and the gateway server 160, if the electronic camera 100 itself has a built-in wireless portable telephone function, it is also permissible to omit the portable telephone 120, as shown in FIG. 200, and to have the electronic camera 100 communicate directly with the gateway server 160 using a packet communication protocol. In FIG. 200, the base station 140 has been left out of the illustration.

In the above mode of embodiment (FIG. 162 through FIG. 197), the gateway server 160 provides the electronic camera 100 with a single virtual album that combines the albums secured according to the camera identification information on multiple image servers 181 through 184, and increases the available capacity of the virtual album by automatically setting up a new album corresponding to the camera identification information by registering with a new image server when the available capacity of the virtual album becomes insufficient; however, instead of setting up a new album on a new image server, a new album may also be set up on an existing server on that an album has already been set up. For example, if the gateway server 160 has unused camera identification information and the available capacity of the virtual album has become insufficient, the gateway server 160 can register with an image server, on that an album forming part of the virtual album has already been established, using one item of the unused camera identification information, and set up a new album corresponding to the unused item of camera identification information. Furthermore, the gateway server 160 can link the camera identification information used for setting up new albums to the camera identification information corresponding to the virtual album, so as to incorporate the newly created album into the virtual album. Doing this makes it possible to deal with insufficient available capacity of the virtual album when the number of image servers is limited.

While in the above mode of embodiment (FIG. 162 through FIG. 197), the gateway server 160 buffers image files received from the electronic camera 100 in an image buffer folder and delivers the image files buffered in the image buffer folder to image servers at specific intervals, when transmitting image files captured with a series of capture operations (continuous capture or continuous shutter, bracket capture, panorama capture, etc.) from the electronic camera in automatic transfer mode to the gateway server 160, the image transfer may also be performed by the scheme shown in FIG. 201. Here, continuous capture refers to continuously photographic the same subject at specific time intervals while tracking its movement; bracket capture refers to taking multiple photographs of the same subject while varying the capture conditions, such as exposure; and panorama capture refers to photographing a landscape or the like while shifting the capture direction by a certain amount each time. Namely, for each capture operation, the electronic camera 100 appends identification information to image files captured in series to the effect that this image is part of a series, and transmits it to the gateway server 160. The gateway server 160 temporarily stores image files with appended identification information indicating that it is part of a series of images in an image buffer folder. Once the series of image captures is completed, the electronic camera 100 transmits information to the gateway server 160 indicating that the series of image captures has been completed, and upon receiving that information, the gateway server 160 does a batch transmission of the series of image files stored temporarily in the image buffer folder to the same image server over the Internet and stores them there. Doing this makes it possible to transmit multiple image files between the gateway server 160 and image server with a single transmission procedure, allowing the transmission time to be shortened and allowing the image transmission processing load on the gateway server 160 and image servers 181 through 184 to be reduced. Furthermore, storing image files captured in a series on the same image server makes it highly convenient when the user later connects directly to the image server 181 through 184, with a personal computer or the like, to use the series of image data.

Instead of transmitting information indicating that a series of captures has been completed from the electronic camera 100 to the gateway server 160, it is also permissible to transmit to the gateway server 160, from a terminal such as a personal computer 190 connected to the gateway server 160, an instruction to transmit a series of image files accumulated on the gateway server 160 together to an image server; in response to that instruction, the gateway server 160 will transmit the series of image files accumulated on the gateway server 160 together to an image server.

Furthermore, when transmitting image files captured in a series from the electronic camera 100 to the gateway server 160 in automatic transmission mode, if an image file is transmitted from the electronic camera 100 to the gateway server 160 after every capture, the communication time will become longer due to the overhead for establishing communication and the appended information, and there are cases where, during this time, the picture-taking conditions will change or where the pictures cannot be taken at the planned time intervals. In such cases, one can optionally have the electronic camera 100 temporarily store the series of captured image files in RAM 70, and once the series of captures is completed, transmit the series of image files with appended identification information indicating that it is a series of images, together with information indicating that the series of captures has been completed, in a batch to the gateway server 160. Furthermore, when the data transfer rate of short-range wireless communication between the electronic camera 100 and portable telephone 120 is fast, one may optionally have the image files captured in a series be transmitted from the electronic camera 100 to the portable telephone 120 each time an image is captured, storing them temporarily in the EEPROM 268 of the portable telephone 120, and have the electronic camera 100 transmit information indicating that the series of captures has been completed to the portable telephone 120 once the series of captures has been completed, and in response to that information, have the portable telephone 120 transmit a series of image files with appended identification information indicating that this is a series of images in a batch to the gateway server 160. Doing this makes it possible for the electronic camera 100 to perform a series of captures under the desired capture conditions without affecting the image file transmission speed or the like even in automatic transmission mode (a mode where captured image files are automatically transmitted to and stored on an image server).

Furthermore, when the electronic camera 100 selects image files captured in series, which have been saved on the memory card 77, and transmits those selected image files to an image server, by transmitting those image files with appended identification information indicating that they are a series of images, the gateway server 160 will be able recognize that these are image files captured in series and perform processing such as storing them on the same image server.

While in the above mode of embodiment (FIG. 162 through FIG. 197), the gateway server 160 buffers image files received from the electronic camera 100 in an image buffer folder and delivers the image files buffered in the image buffer folder to the image server at specific intervals, one can also have the image files buffered in the image buffer folder be delivered to the image server based on an external instruction. FIG. 202 is a drawing that shows the image transmission processing for such a scheme. Multiple image files are transmitted from the electronic camera 100 to the gateway server 160, and are stored temporarily in an image buffer folder in a folder corresponding to the camera identification information on the gateway server 160. Thereafter, a personal computer 190 connects to the gateway server 160 and transmits the camera identification information, the identification information of the image server to that the images are to be transferred, and an image transmission instruction to the gateway server 160. In response to the received camera identification information, the gateway server 160 transmits the image files, which are stored temporarily in the image buffer folder in the folder corresponding to the received camera identification information, in a batch to the image server corresponding to the received image server identification information. Doing this makes it possible for the user to transmit and store image data captured with the electronic camera 100 from the gateway server 160 at a convenient time to a suitable image server.

In the above mode of embodiment (FIG. 162 through FIG. 197), the gateway server 160 buffered image files transmitted between the electronic camera 100 and the image server in an image buffer folder and transmitted the image files buffered in the image buffer folder together to the image server at specific intervals; however, the gateway server 160 may also transmit accumulated image files to the image server by the following method. For example, the image files may be transmitted to the image server when the total data volume of the image files stored temporarily on the gateway server 160 exceeds a certain volume. Alternatively, the gateway server 160 may transmit image files to the image server once they have been accumulated for a set period or time, based on the date and time data of the start of storage of the image files in the image buffer folder. Alternatively, the gateway server 160 can transmit accumulated image files to the image server at specific clock times.

While in the above mode of embodiment (FIG. 162 through FIG. 197), the gateway server 160 buffers image files transmitted between the electronic camera 100 and the image server in an image buffer folder and clears the entirety of the image files buffered in the image buffer folder at specific intervals, the gateway server 160 may also delete image files by the following method. For example, the gateway server 160 may delete image files in the order of oldest to newest based on date and time information on the start of storage of the image files in the image buffer folder, so as to keep the total data volume of the image files stored temporarily in the image buffer folder at or below a specific volume. Alternatively, the gateway server 160 may delete image files stored for more than a specific period of time based on date and time information on the start of storage of the image files in the image buffer folder. Or the gateway server 160 may delete stored image files at specific clock times.

While in the above mode of embodiment (FIG. 162 through FIG. 197), the gateway server 160 buffers image files transmitted between the electronic camera 100 and the image server in an image buffer folder and transmits them as necessary to the electronic camera 100, the gateway server 160 may also transmit image files accumulated in the image buffer folder (image files transmitted by the electronic camera 100 to an image server or image files read by the electronic camera 100 from an image server) to another image server or electronic camera based on instructions from the electronic camera 100. Doing this makes it unnecessary to transmit each image file one by one from the electronic camera 100 to the gateway server 160, thereby making it possible to shorten the image file transmission time and reduce transmission charges.

While in the above mode of embodiment (FIG. 162 through FIG. 197), the gateway server 160 performed management of individual albums on image servers according to the camera identification information received from the electronic camera 100, it is also possible to use general identification information instead of camera identification information for individually identifying multiple electronic cameras 100. For example, using the next generation version of the IP protocol, IPV6 (Internet Protocol Version 6), the use of that on the Internet is planned, as the identification information, would make it possible for all electronic devices that handle images, besides electronic cameras, to make use of the image transmission system according to the present invention. Namely, IPV6 provides a 32-bit address space (on order of 10 to the 9$^{th}$ power), so there is practically no concern of running out of addresses, which makes it possible for one device to have multiple addresses depending on the application, and can further increase the utility of the image transmission system according to the present invention. Furthermore, for instance in a network environment wherein electronic devices such as electronic cameras connect to the gateway server by means of a wireless LAN (Ethernet™) or the like, it is possible to use the MAC (Media Access Control) address or Ethernet™ address assigned to each individual electronic device as the identification information. A MAC address is assigned to each electronic device without duplication, which makes it suitable for individually identifying electronic devices and makes it possible to omit the effort to newly setting the identification information for applications of the present invention.

While the above mode of embodiment (FIG. 162 through FIG. 197 and FIG. 200) were described assuming that information such as image data was transmitted between the electronic camera 100, portable telephone 120 and gateway server 160 using packet communication, it is of course also permissible to transmit information such as image data using circuit-switched data communication.

In the above mode of embodiment (FIG. 162 through FIG. 197), the image servers 181 through 184 had individual albums (folders) corresponding to the camera identification information set individually for each electronic camera 100, the electronic camera 100 would transmit the camera identification information set in the camera in question to the gateway server 160, and the gateway server 160, based on the received camera identification information, would create new albums corresponding to the received camera identification information on the image servers 181 through 184 or perform reading and writing of image data to and from an album corresponding to the received camera identification information present on the image servers 181 through 184; however, it is also permissible to manage image data transmission and storage between the electronic camera 100 and image servers 181 through 184 using identification information other than camera identification information.

For example, in FIG. 203, a password input means is provided on the electronic camera side and image data transmission and storage is managed according to the password inputted by the user. In FIG. 203, electronic cameras A101 and B102 are equipped with password input means 81 and 82, and when transmitting a captured image file, electronic cameras A101 and B102 transmit the password inputted by the user and the image file as a pair to the gateway server 160. Meanwhile, the image server 181 has an album prepared that corresponds to the password, and the gateway server 160 transmits the received image file and stores it in the album on the image server 181 corresponding to the received password. The gateway server 160 can also create a new album on the image server corresponding to the received password. Furthermore, when downloading image files from the image server 181, the electronic cameras A101 and B102 transmit image identification information and a password to the gateway server 160, and the gateway server 160 transmits the received image identification information and password to the image server 181. The image server 181 reads the image file corresponding to the received image identification information from the album corresponding to the received password, and transmits that image file to via the gateway server 160 to the electronic cameras A101 and B102. Instead of password input, the electronic camera can obtain user identification information by installing a UIM card on that personal identification data has been stored in advance into the electronic camera.

If this is done, then when the same user uses multiple electronic cameras or when multiple users use the same camera, the image files captured by the electronic camera will be stored in an album on an image server corresponding to the password inputted by the user, so there is no inconvenience of having to later separate image files stored in the same album on an image server for different users, or collect image files stored in different albums on an image server for each user, allowing image files to be stored efficiently on a per-user basis and making it possible to protect the privacy of the stored image data.

While in FIG. 203, control and management of image data transmission and storage operations between the electronic camera 100 and image servers 181 through 184 is carried out based on the password inputted by the user into the electronic camera, in FIG. 204, instead of a password a user identification means is provided on the electronic camera side, the electronic camera performs user identification automatically without manual intervention by the user, and image data transmission and storage is managed based on that user identification information. In FIG. 204, electronic cameras A101 and B102 are equipped with user identification means 83 and 84 (fingerprint detection means, iris pattern detection means, facial image detection means, etc.), and when transmitting a captured image file, the electronic cameras A101 and B102 transmit the image file paired with the user identification information detected by the user identification means 83 and 84 (fingerprint pattern characteristics information, iris pattern characteristics information, facial image pattern characteristics information, etc.) to the gateway server 160. The gateway server 160 compares the received user identification information with user identification information contained in the personal identification data that is stored in advance to identify the user. Meanwhile, the image server 181 has an album prepared that corresponds to the personal identification data, and the gateway server 160 transmits and stores received image files in the album on the image server corresponding to the personal identification data of the identified user. The gateway server 160 can also create a new album on the image server corresponding to the personal identification data of the identified user. Furthermore, when downloading image files from the image server 181, electronic cameras A101 and B102 transmit image identification information and user identification information to the gateway server 160, the gateway server 160 identifies the users based on the received user identification information, and transmits the personal identification data corresponding to the user along with the image identification information to the image server 181. The image server 181 reads image files corresponding to the received image identification information from the album corresponding to the received personal identification data, and transmits those image files via the gateway server 160 to the electronic cameras A101 and B102.

Doing this makes it possible to automatically perform user identification at the electronic camera, which eliminates the effort of inputting passwords for individual identification and resolves the problems of forgotten passwords and password theft.

The means of personal identification described above in FIG. 203 and FIG. 204 (password input means, UIM card, fingerprint detection or other user identification means) can also be provided on the portable telephone side if the gateway server is connected to from the electronic camera via the portable telephone. In FIG. 205, when connecting from the electronic camera to the gateway server via the portable telephone, image data transmission and storage are managed based on the telephone number of the portable telephone. In FIG. 205, when transmitting a captured image file, the electronic cameras A101 and B102 connect to the portable telephone 121 (telephone number A) and transmit the image file to the portable telephone 121. The portable telephone 121 transmits the received image file paired with the telephone number to the gateway server 160. Meanwhile, the image server 181 has an album prepared corresponding to the telephone number of the portable telephone, and the gateway server 160 transmits and stores the received image file in an album on the image server 181 corresponding to the telephone number. The gateway server 160 can also create a new album on an image server corresponding to the telephone number. Furthermore, when downloading image files from the image server 181, the electronic cameras A101 and B102 send image identification information to the portable telephone 121, the portable telephone 121 transmits the telephone number and image identification information to the gateway server 160, and the gateway server 160 transmits the telephone number and image identification information to the image server 181. The image server 181 reads the image file corresponding to the received image identification information from the album corresponding to the received telephone number, and transmits that image file to the electronic cameras A101 and B102 via the gateway server 160 and the portable telephone 121.

Doing this allows the user to store image files separated on a per individual basis in a per-individual album on an image server or read image files from one's own exclusive album on an image server by performing image transmission and reception using his portable telephone, even when using multiple electronic cameras or when multiple persons use the same electronic camera.

Furthermore, by combining the electronic camera's camera identification information with multiple personal identification means, the user identification precision can be increased and a higher level of image information security can be attained.

As described above, in the image transmission system and image relay apparatus according to the present invention, when the storage capacity of an album on an image server on the Internet for storing a user's image data is insufficient, the image relay apparatus uses the user's stored personal information to register with a new image server and automatically set up a new album for storing image data for the user, which allows the user to make use of large volumes of image data without having to worry about the storage capacity of the album used for storing image data, and makes it possible to further promote image services that employ such image servers on the Internet.

Moreover, in the image transmission system and image relay apparatus according to the present invention, the image relay apparatus, based on server management information for unified management of albums (folders), which are set up corresponding to user identification information (camera identification information) on individual image servers, performs generalized storage and management of image data stored in distributed fashion across multiple image servers by combining it into one virtual album, thereby making it possible to manipulate large volumes of image data by means of simple operations on a virtual album managed by the image relay apparatus, without the user being aware of the multiple image servers that actually store the image data on the Internet, as well as making it possible to further promote image services that employ such image servers on the Internet.

What is claimed is:

1. An image transmission system comprising:

an electronic image device that generates image information, the electronic image device having at least a first transmission mode and a second transmission mode, the first transmission mode corresponding to a capture mode, and the second transmission mode corresponding to a playback mode;

multiple image storage devices that store the image information; and an image relay apparatus that relays the image information between the electronic image device and the multiple image storage devices, the image relay apparatus being a device that is independent from the image storage devices and is separated from the image storage devices by the Internet, wherein:

if the first transmission mode is selected, the electronic image device automatically transmits the generated image information and user identification information for identifying the user of the electronic image device to the image relay apparatus, when the first transmission mode is selected, the electronic image device checks whether communication is possible, and if the communication with a portable telephone is possible, transmits the image information to the portable telephone, but if communication with the portable telephone is not possible, stores the image information on a memory and then automatically terminates the first transmission mode;

if the second transmission mode is selected, the electronic image device transmits the generated image information and user identification information for identifying the user of the electronic image device to the image relay apparatus after the user manipulates a transmit member;

when the second transmission mode is selected and the transmit member is manipulated, the electronic image device checks whether communication is possible, and if the communication with a portable telephone is possible, transmits the image information to the portable telephone, but if the communication with the portable telephone is not possible, automatically terminates the second transmission mode;

the electronic image device transmits the image information to the image relay apparatus via the portable telephone;

the multiple image storage devices have individual albums prepared corresponding to each item of the user identification information for storing the image information;

the image relay apparatus, based on the user identification information received from the electronic image device via the portable telephone, automatically selects an image storage device from the multiple image storage devices and transmits the image information and the user identification information received from the electronic image device to the image storage device;

the image storage device, which receives the image information and the user identification information from the image relay apparatus stores the received image information in an album corresponding to the received user identification information; and the portable telephone displays a summary of the status of temporarily stored images with small images, on the screen display of the portable telephone when the user wishes to reconfirm the image information recently transmitted or received via the portable telephone.

2. An image transmission system as set forth in claim 1, wherein the electronic image device transmits all the generated image information to the image relay apparatus immediately after the image information is generated and deletes the image information that it has finished transmitting.

3. An image transmission system as set forth in claim 2, wherein the electronic image device comprises storage means for storing information, temporarily stores generated image information in the storage means when the image information cannot be transmitted to the image relay apparatus, and automatically transmits the image information temporarily stored in the storage means to the image relay apparatus under specific startup conditions.

4. An image transmission system as set forth in claim 3, wherein the startup conditions are a predetermined time.

5. An image transmission system as set forth in claim 3, wherein the startup conditions are a state of communication between the electronic image device and the image relay apparatus.

6. An image transmission system as set forth in claim 1, wherein the image relay apparatus generates image identification information for identifying the image information received from the electronic image device and transmits the image identification information to the image storage device that stores the image information corresponding to the image identification information and to the electronic image device that transmitted the image information corresponding to the image identification information.

7. An image transmission system as set forth in claim 1, wherein a removable storage medium that stores the user identification information can be installed in the electronic image device, and the electronic image device transmits the user identification information stored in the installed removable storage medium to the image relay apparatus.

8. An image transmission system as set forth in claim 1, wherein the electronic image device comprises a storage means for storing information, and stores scaled-down image information obtained by compressing the data volume of image information received from and transmitted to the image relay apparatus in the storage means.

9. An image transmission system as set forth in claim 1, wherein the electronic image device comprises an identification means that identifies the user of the electronic image device, and transmits the user identification information according to the results of identification by the identification means to the image relay apparatus.

10. An image transmission system as set forth in claim 1, wherein the electronic image device comprises a display means that displays the image information.

11. An image transmission system as set forth in claim 1, wherein the electronic image device comprises an image pickup means that generates image information through an image pickup operation.

12. An image transmission system as set forth in claim 1, wherein a protocol of information transmission between the electronic image device and the image relay apparatus is different from a protocol of information transmission between the image storage device and the image relay apparatus.

13. An image transmission system comprising:

multiple electronic image devices that generate image information, the electronic image devices each having at least a first transmission mode and a second transmission mode, the first transmission mode corresponding to a capture mode, and the second transmission mode corresponding to a playback mode;

an image storage device that stores the image information; and an image relay apparatus that relays the image information between the electronic image devices and the image storage device, the image relay apparatus being a device that is independent from the image storage device and is separated from the image storage device by the Internet, wherein:

if the first transmission mode of one of the multiple electronic image devices is selected, the corresponding electronic image device automatically transmits the generated image information to the image relay apparatus, when the first transmission mode is selected, the electronic image device checks whether communication is possible, and if the communication with a portable telephone is possible, transmits the image information to the portable telephone, but if communication with the portable telephone is not possible, stores the image information on a memory and then automatically terminates the first transmission mode;

if the second transmission mode of one of the multiple electronic image devices is selected, the corresponding electronic image device transmits the generated image information to the image relay apparatus after the user manipulates a transmit member;

when the second transmission mode is selected and the transmit member is manipulated, the electronic image device checks whether communication is possible, and if the communication with a portable telephone is possible, transmits the image information to the portable telephone, but if the communication with the portable telephone is not possible, automatically terminates the second transmission mode;

the multiple electronic image devices transmit the generated image information to the image relay apparatus via the portable telephone;

the image relay apparatus transmits the image information received from the multiple electronic image devices to the image storage device;

the image storage device stores the image information received from the image relay apparatus;

the image relay apparatus generates image identification information for identifying the image information received from the multiple electronic image devices and transmits the image identification information to the image storage device that stores the image information corresponding to the image identification information and to the electronic image device that transmitted the image information corresponding to the image identification information; and the portable telephone displays a summary of the status of temporarily stored images with small images, on the screen display of the portable telephone when the user wishes to reconfirm the image information recently transmitted or received via the portable telephone.

14. An image transmission system as set forth in claim 13, wherein each of the electronic image devices comprises a display means that displays the image information.

15. An image transmission system as set forth in claim 13, wherein each of the electronic image devices comprises an image pickup means that generates image information through an image pickup operation.

16. An image transmission system as set forth in claim 13, wherein a protocol of information transmission between the electronic image devices and the image relay apparatus is different from a protocol of information transmission between the image storage device and the image relay apparatus.

* * * * *